(12) United States Patent
Kondo et al.

(10) Patent No.: US 7,483,565 B2
(45) Date of Patent: Jan. 27, 2009

(54) IMAGE PROCESSING DEVICE AND METHOD, LEARNING DEVICE AND METHOD, RECORDING MEDIUM, AND PROGRAM

(75) Inventors: Tetsujiro Kondo, Tokyo (JP); Takashi Sawao, Tokyo (JP); Junichi Ishibashi, Saitama (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/044,557

(22) Filed: Mar. 7, 2008

(65) Prior Publication Data

US 2008/0199072 A1     Aug. 21, 2008

Related U.S. Application Data

(62) Division of application No. 10/545,074, filed as application No. PCT/JP2004/001607 on Feb. 13, 2004.

(30) Foreign Application Priority Data

Feb. 27, 2003   (JP)   ............... 2003-050208

(51) Int. Cl.
  *G06K 9/62* (2006.01)
  *G06K 9/36* (2006.01)
  *G06K 9/46* (2006.01)
(52) U.S. Cl. ................. 382/155; 382/238; 382/190; 348/E11.002; 348/E7.004; 348/E7.016
(58) Field of Classification Search ............... 382/155, 382/238, 190, 191; 348/E11.002, E7.004, 348/E7.016, E3.038
See application file for complete search history.

(56) References Cited

U.S. PATENT DOCUMENTS 5,517,588 A * 5/1996 Kondo ................. 382/300

(Continued)

FOREIGN PATENT DOCUMENTS

EP    0 746 157    12/1996

(Continued)

*Primary Examiner*—Samir A Ahmed
*Assistant Examiner*—Max Shikhman
(74) *Attorney, Agent, or Firm*—Oblon, Spivak, McClelland, Maier & Neustadt, P.C.

(57) ABSTRACT

With the present invention, data continuity is used at the time of converting an input image into high-quality image data with higher quality than the input image data, to obtain processing results which are more accurate and have higher precision. A class tap extracting unit (902) and prediction tap extracting unit (906) extract a class tap and prediction tap based on data continuity of multiple perimeter pixels corresponding to a pixel of interest in the input image, detected by a data continuity detecting unit (901). An image synthesizing unit (909) selectively outputs a prediction value of a first pixel of interest and a prediction value of a second pixel of interest, based on the relation between a prediction value, predicted by a pixel value predicting unit (907), of the first pixel of interest, and a second prediction value of the second pixel of interest temporally or spatially adjacent to the first pixel of interest, and the pixel value of a corresponding pixel in the input image situated at a position encompassing at least the first pixel of interest and the second pixel of interest in the temporal direction or spatial direction, which is detected by an integration property determining unit (908).

3 Claims, 122 Drawing Sheets

U.S. PATENT DOCUMENTS

| | | | | |
|---|---|---|---|---|
| 5,852,470 A | * | 12/1998 | Kondo et al. | 348/448 |
| 5,912,708 A | * | 6/1999 | Kondo et al. | 348/415.1 |
| 6,339,615 B1 | * | 1/2002 | Kondo et al. | 375/240.14 |
| 6,356,587 B1 | * | 3/2002 | Choi | 375/240 |
| 6,483,545 B1 | * | 11/2002 | Kondo et al. | 348/448 |
| 6,600,517 B1 | * | 7/2003 | He et al. | 348/625 |
| 6,636,222 B1 | * | 10/2003 | Valmiki et al. | 345/505 |
| 6,903,782 B2 | * | 6/2005 | Herman et al. | 348/625 |
| 7,031,513 B1 | * | 4/2006 | Kondo | 382/155 |
| 2002/0027611 A1 | * | 3/2002 | Kondo et al. | 348/458 |
| 2003/0063216 A1 | * | 4/2003 | Kondo et al. | 348/441 |

FOREIGN PATENT DOCUMENTS

| | | |
|---|---|---|
| JP | 9-51510 | 2/1997 |
| JP | 10-327392 | 12/1998 |
| JP | 11-69144 | 3/1999 |

* cited by examiner

FIG. 29

| RANGE OF CALCULATION | NUMBER OF ROWS | NUMBER OF PIXELS IN EACH ROW | SELECTION RANGE OF PIXELS |
|---|---|---|---|
| RANGE A (45° TO 63.4°) | 5 | 5 | 5 TO 9 |
| RANGE B (63.4° TO 71.6°) | 4 | 7 | 8 TO 11 |
| RANGE C (71.6° TO 76.0°) | 3 | 9 | 9 TO 11 |
| RANGE D (76.0° TO 87.7°) | 2 | 11 | 8 TO 50 |

FIG. 46

| θ | REFERENCE BLOCKS WITH SMALLEST DISTANCE |
|---|---|
| 0.0 TO 18.4 | A AND A' |
| 18.4 TO 33.7 | B AND B' |
| 33.7 TO 56.3 | C AND C' |
| 56.3 TO 71.6 | D AND D' |
| 71.6 TO 108.4 | E AND E' |
| 108.4 TO 123.7 | F AND F' |
| 123.7 TO 146.3 | G AND G' |
| 146.3 TO 161.6 | H AND H' |
| 161.6 TO 180.0 | A AND A' |

SPATIAL DIRECTION Y

SPATIAL DIRECTION X d_CCD

BACKGROUND LEVEL

FINE LINE LEVEL

BACKGROUND LEVEL

SPATIAL DIRECTION Y

SPATIAL DIRECTION X

SPATIAL DIRECTION Y

X0 X1 X2

SPATIAL DIRECTION X

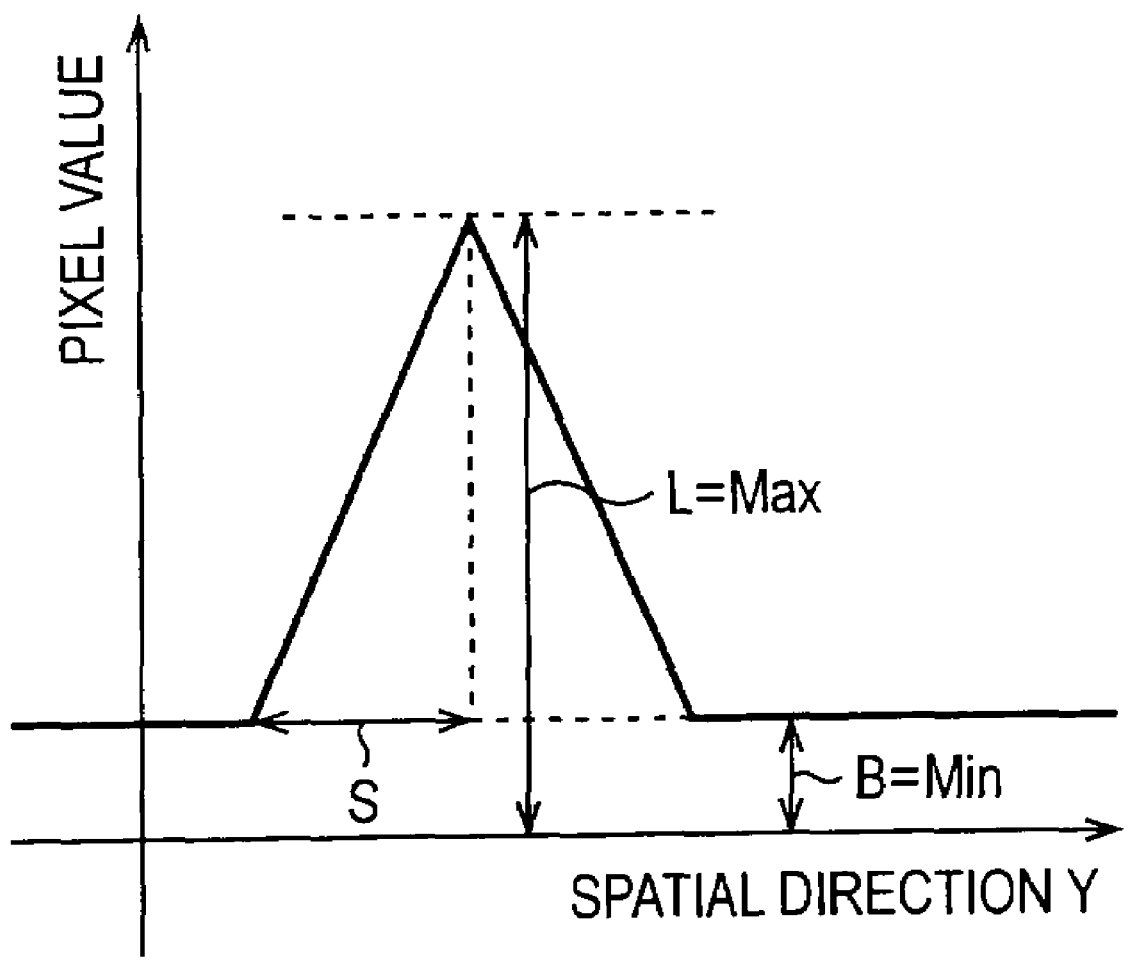

SPATIAL DIRECTION Y

SPATIAL DIRECTION X d_CCD

FIRST EDGE LEVEL

SECOND EDGE LEVEL

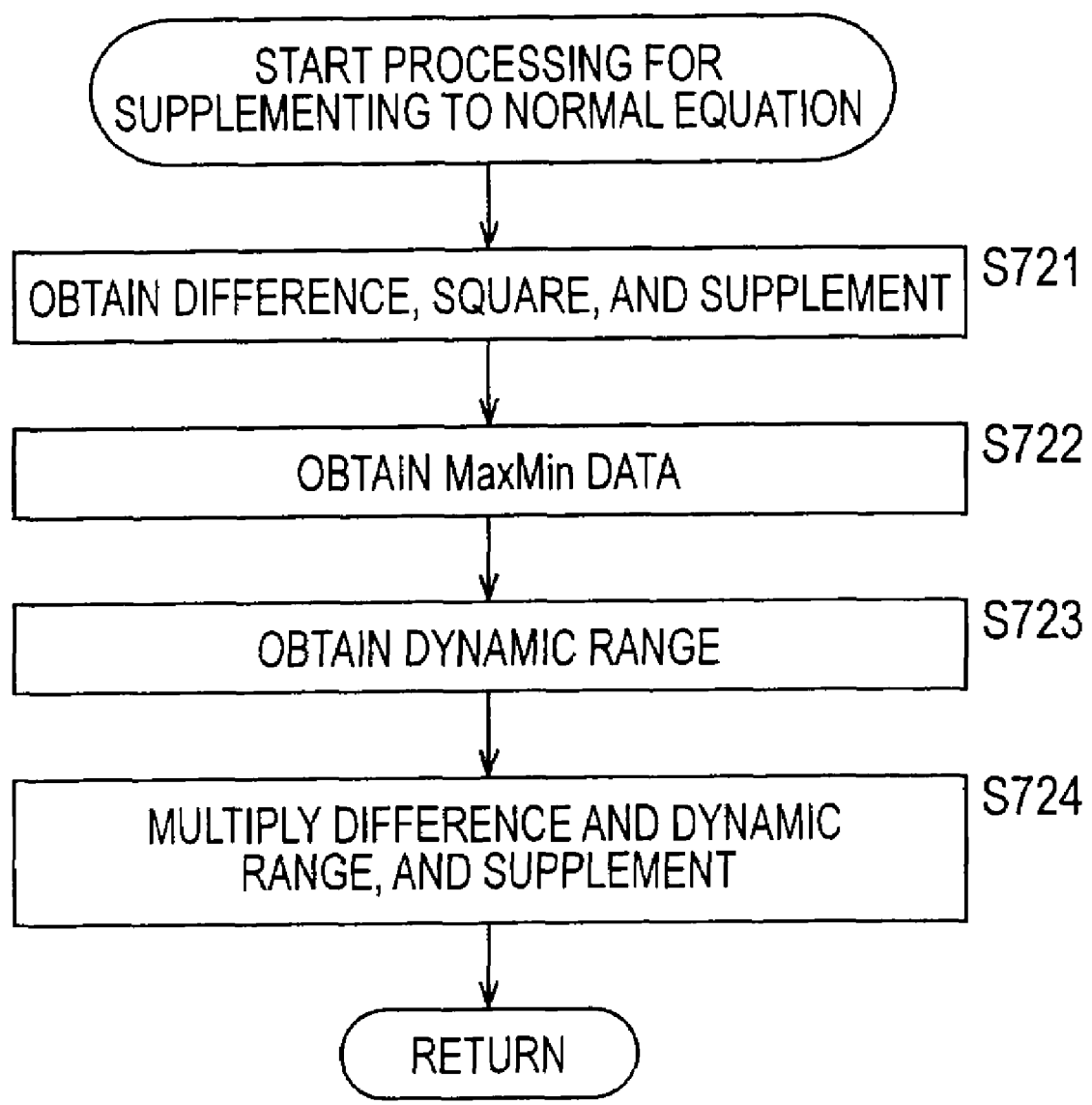

IMAGE PROCESSING DEVICE AND METHOD, LEARNING DEVICE AND METHOD, RECORDING MEDIUM, AND PROGRAM

CROSS REFERENCE TO RELATED APPLICATION

This application is a divisional and claims the benefit of priority under 35 U.S.C. § 120 from U.S. application Ser. No. 10/545,074, filed Aug. 9, 2005 which is a National Stage of PCT/JP04/01607, filed Feb. 13, 2004 and claims the benefit of priority under 35 U.S.C. § 119 of Japanese Patent Application No. 2003-050208, filed Feb. 27, 2003. The entire contents of these applications are incorporated herein by reference.

TECHNICAL FIELD

The present invention relates to an image processing device and method, learning device and method, recording medium, and program, and particularly relates to an image processing device and method, learning device and method, recording medium, and program, for creating images with higher resolution.

BACKGROUND ART

The present applicant has previously proposed class classification adaptation processing as image processing for improving image quality and so forth of images and for performing other image conversion, for example.

Class classification adaptation processing is made up of class classification processing and adaptation processing, wherein data of images is classified according to the nature thereof by the class classification processing, with adaptation processing begin performed for each class, adaptation processing being a technique as follows.

That is to say, with adaptation processing, for example, a low-image quality or standard image quality image (hereafter referred to as SD (Standard Definition) image as appropriate) is converted into a high-quality image (hereafter referred to as HD (High Definition) image as appropriate), by mapping (mapping) using a predetermined tap coefficient (hereafter also called prediction coefficient as appropriate).

Now, employing a linear combination model as the mapping method using this tap coefficient, (the pixel value) y of a pixel making up the HD image (hereafter referred to as HD pixel as appropriate) is obtained with the following linear expression (linear combination) using multiple SD pixels extracted from pixels making up the SD image, hereafter referred to as SD pixel as appropriate) as a prediction tap for predicting the HD pixel, and the tap coefficient.

$$y = \sum_{n=1}^{N} w_n x_n \quad (1)$$

Wherein, in Expression (1), $x_n$ represents the pixel value of the n'th pixel in the SD image, making up a prediction tap regarding the HD pixel y, and $w_n$ represents the n'th tap coefficient to be multiplied by (the pixel value of) the n'th SD pixel. Note that in Expression (1), a prediction tap is made up of an N number of SD pixels $x_1, x_2, \ldots, x_N$.

Now, the pixel value y of the HD pixel can be obtained by a quadratic expression or higher, instead of the linear expression shown in Expression (1).

Now, saying that $y_k$ represents the true value of the pixel value of an HD pixel in a k'th sample, and $y_k'$ represents a prediction value of the true value $y_k$ obtained by the Expression (1), the prediction error $e_k$ thereof is as expressed in the following Expression.

$$e_k = y_k - y_k' \quad (2)$$

The prediction value $y_k'$ in Expression (2) is obtained according to Expression (1), so substituting the $y_k'$ in Expression (2) according Expression (1) yields the following Expression.

$$e_k = y_k - \left( \sum_{n=1}^{N} w_n x_{n,k} \right) \quad (3)$$

Wherein, in Expression (3), $X_{n,k}$ represents the n'th SD pixel making up the prediction tap for the HD pixel in the k'th sample.

While a tap coefficient $w_n$ wherein the prediction error $e_k$ is 0 in Expression (3) is optimal for predicting the HD pixel, obtaining such a tap coefficient $w_n$ for all HD pixels is generally difficult.

Accordingly, as a rule representing the tap coefficient $w_n$ as being optimal, employing the least-square method for example, means that the optimal tap coefficient $w_n$ can be obtained by minimizing the summation E of squared errors represented in the following Expression for example, as a statistical error.

$$E = \sum_{k=1}^{K} e_k^2 \quad (4)$$

Wherein, in Expression (4), K represents the number of samples of sets made up of an HD pixel $y_k$ and SD pixels $X_{1,k}, X_{2,k}, \ldots, X_{N,k}$ making up a prediction tap regarding that HD pixel $y_k$.

The tap coefficient $W_n$ which makes the summation E of squared errors in Expression (4) smallest (the minimum) is such that the partial differentiation of the summation E by the tap coefficient $w_n$ yields 0. Accordingly, the following Expression must be satisfied.

$$\frac{\partial E}{\partial w_n} = e_1 \frac{\partial e_1}{\partial w_n} + e_2 \frac{\partial e_2}{\partial w_n} + \ldots + e_k \frac{\partial e_{k2}}{\partial w_n} = 0 \ (n = 1, 2, \ldots, N) \quad (5)$$

Now, partial differentiation of the above Expression (3) by the tap coefficient $w_n$ yields the following Expression.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, (k = 1, 2, \ldots, K) \quad (6)$$

Expressions (5) and (6) yield the following Expression.

$$\sum_{k=1}^{k} e_k x_{1,k} = 0, \sum_{k=1}^{k} e_k x_{2,k} = 0, \ldots \sum_{k=1}^{k} e_k x_{N,k} = 0 \quad (7)$$

Substituting Expression (3) for $e_k$ in Expression (7) allows Expression (7) to be expressed in the form of the normal equation in Expression (8).

$$\begin{bmatrix} \left(\sum_{k=1}^{k} x_{1,k}x_{1,k}\right) & \left(\sum_{k=1}^{k} x_{1,k}x_{2,k}\right) & \cdots & \left(\sum_{k=1}^{k} x_{1,k}x_{N,k}\right) \\ \left(\sum_{k=1}^{k} x_{2,k}x_{1,k}\right) & \left(\sum_{k=1}^{k} x_{2,k}x_{2,k}\right) & \cdots & \left(\sum_{k=1}^{k} x_{2,k}x_{N,k}\right) \\ \vdots & \vdots & \ddots & \vdots \\ \left(\sum_{k=1}^{k} x_{N,k}x_{1,k}\right) & \left(\sum_{k=1}^{k} x_{N,k}x_{2,k}\right) & \cdots & \left(\sum_{k=1}^{k} x_{N,k}x_{N,k}\right) \end{bmatrix} \begin{bmatrix} w_1 \\ w_2 \\ \vdots \\ w_N \end{bmatrix}$$

$$= \begin{bmatrix} \left(\sum_{k=1}^{k} x_{1,k}y_k\right) \\ \left(\sum_{k=1}^{k} x_{2,k}y_k\right) \\ \vdots \\ \left(\sum_{k=1}^{k} x_{1,k}y_k\right) \end{bmatrix} \tag{8}$$

Preparing a certain number of sets of the HD pixel $y_k$ and SD pixels $x_{n,k}$ allows as many of the normal equations in Expression (8) to be formulated as the number of tap coefficients $w_n$ to be obtained. Accordingly, solving Expression (8) (it should be noted that the matrices on the left side regarding the tap coefficient $w_n$ must be regular in Expression (8) in order to solve Expression (8)) allows optimal tap coefficients $w_n$ to be obtained. Note that sweeping (Gauss-Jordan elimination), for example, can be used for solving Expression (8).

As described above, adaptation processing involves taking a great number of HD pixels $y_1, y_2, \ldots, y_k$ as tutor data to serve as a tutor for learning for tap coefficients, and also taking SD pixels $X_{1,k}, X_{2,k}, \ldots, X_{N,k}$ making up a prediction tap regarding each HD pixel $y_k$ as student data to serve as a student for learning for tap coefficients, and solving Expression (8), thereby performing learning for obtaining an optimal tap coefficient $w_n$, and further using the tap coefficient $w_n$ to perform mapping (conversion) of an SD image into an HD image according to Expression (1).

Hereafter, a tap coefficient will also be called a prediction coefficient.

Note that adaptation processing differs from simple interpolation processing or the like, for example, in that components not included in the SD image but are included in the HD image are reproduced. That is to say, with adaptation processing, it would seem by looking at Expression (1) alone that this is the same as interpolation processing using a so-called interpolation filter, but the tap coefficient $w_n$ which is equivalent to the tap coefficient of the interpolation filter has been obtained by learning using an HD image serving as tutor data and an SD image serving as student data, so the component contained in the HD image can be reproduced. Thus, adaptation processing can be said to be processing which as image creation (resolution imagination) effects, so as to say.

Now, tap coefficients $w_n$ which perform various types of conversion can be obtained in the tap coefficient $w_n$ learning, depending on what sort of combination of tutor data y and student data x is employed.

That is to say, in a case of taking an HD image as the tutor data y and taking an SD image wherein noise or blurring is added to this HD image as the student data x, for example, a tap coefficient $w_n$ for converting an image into an image with the noise and blurring thereof removed, can be obtained. Also, in a case of taking an HD image as the tutor data y and taking an SD image wherein the resolution of the HD image has been deteriorated as the student data x, for example, a tap coefficient $w_n$ for converting an image into an image with the resolution improved, can be obtained. Further, in a case of taking an image as the tutor data y and taking a DCT (Discrete Cosine Transform) coefficient obtained by DCT conversion of the image as the student data x, for example, a tap coefficient $w_n$ for converting a DCT coefficient into an image, can be obtained.

Next, description will be made regarding the configuration of a conventional image processing device for performing class classification adaptation processing.

FIG. 1 is a block diagram for describing the configuration of a conventional image processing device which creates an output image which is an HD image, from an input image which is an SD image, by class classification adaptation processing.

With the image processing device of which the configuration is shown in FIG. 1, the input image is supplied to a class tap extracting unit 11 and prediction tap extracting unit 15.

The class tap extracting unit 11 extracts, from the input image, a class tap which is predetermined pixels corresponding to a pixel which is of interest (hereafter also referred to as pixel of interest), and supplies the extracted class tap to a features detecting unit 12 along with the input image. The features detecting unit 12 detects features of the image corresponding to the pixel of interest from the input image supplied via the class tap extracting unit 11, and supplies the detected features to a class classification unit 13 along with the class tap. Note that features of an image means movement or in-frame change in pixel values.

The class classification unit 13 performs classification of the pixel of interest, based on the class tap and features supplied from the features detecting unit 12, and supplies a class code representing the classification result to coefficient memory 14 and the prediction tap extracting unit 15.

The coefficient memory 14 supplies a tap coefficient corresponding to the class of the pixel of interest to a pixel value computing unit 16, based on the class code supplied from the class classification unit 13.

The prediction tap extracting unit 15 extracts a predetermined prediction tap from the input image, corresponding to the pixel of interest, based on the class code supplied from the class classification unit 13. The prediction tap extracting unit 15 supplies the extracted prediction tap to the pixel value computing unit 16.

The pixel value predicting unit 16 predicts the pixel value of the pixel of interest in the HD image by the computation shown in Expression (1), from the prediction tap supplied from the prediction tap extracting unit 15 and the tap coefficient supplied from the coefficient memory 14. The pixel value predicting unit 16 outputs an HD image made up of pixel values predicted by sequentially taking all pixels in the HD image as a pixel of interest using class classification adaptation processing.

FIG. 2 is a flowchart describing the processing for creating an image with a conventional image processing device which creates an output image which is an HD image, from an input image which is an SD image.

In step S11, the class tap extracting unit 11 extracts a class tap corresponding to the selected pixel of interest, from the input image which is an SD image. In step S12, the features detecting unit 12 detects features corresponding to the pixel of interest, from the input image.

In step S13, the class classification unit 13 classifies the class of the pixel of interest, based on the class tap extracted by the processing in step S11 and the features detected by the processing in step S12.

In step S14, the prediction tap extracting unit 15 extracts a prediction tap corresponding top the pixel of interest from the input image, corresponding to the results of class classification by the processing in step S13. In step S15, the coefficient memory 14 reads out the prediction coefficient corresponding to the classified class, from prediction coefficients which are stored beforehand, corresponding to the class classification results of the processing in step S13.

In step S16, the pixel predicting unit 16 predicts the pixel value corresponding to the pixel of interest by adaptation processing, based on the prediction tap extracted in the processing in step S14 and the prediction coefficient read out in the processing in step S15.

In step S17, the image processing device determines whether or not prediction has ended for all pixels, and in the event that determination is made that prediction has not ended for all pixels, the flow returns to step S11 with the next pixel as the pixel of interest, and the class classification and adaptation processing is repeated.

In the event that determination is made in step S17 that prediction has been completed for all pixels, the processing ends.

FIG. 3 is a block diagram for describing the configuration of a conventional image processing device which generates prediction coefficients used in the class classification adaptation processing for creating an output image which is an HD image from an input image which is an SD image.

The input image which is input to the image processing device shown in FIG. 3 is a tutor image which is an HD image, and is supplied to a student image generating unit 31 and a tutor pixel extracting unit 38. (Pixels value of) pixels contained in the tutor image are used as tutor data.

The student image generating unit 31 generates a student image which is an SD image corresponding to the tutor image, by thinning out pixels form the input tutor image which is an HD image, and supplies the generated student image to image memory 32.

The image memory 32 stores the student image which is the SD image supplied from the student image generating unit 31, and supplies the stored student image to a class tap extracting unit 33 and prediction tap extracting unit 36.

The class tap extracting unit 33 sequentially selects the pixel of interest, extracts a class tap from the student image corresponding to the selected pixel of interest, and supplies the extracted class tap to a features detecting unit 34 along with the student image. The features detecting unit 34 detects the features from the student image, corresponding to the pixel of interest, and supplies the detected features to a class classification unit 35 along with the class tap.

The class classification unit 35 classifies the class of the pixel of interest based on the class tap and features supplied from the features detecting unit 34, and supplies a class code indicating the classified class to a prediction tap extracting unit 36 and learning memory 39.

The prediction tap extracting unit 36 extracts a prediction tap corresponding to the classified class from the student image supplied from the image memory 32, based on the class code supplied from the class classification unit 35, and supplies the extracted prediction tap to a supplementing computing unit 37.

A tutor pixel extracting unit 38 extracts the tutor data, i.e., the pixel of interest of the tutor image, and supplies the extracted tutor data to the supplementing computing unit 37.

The supplementing computing unit 37 supplements tutor data which is an HD pixel and the prediction tap which is SD pixels to the normal equation in Expression (8), and supplies the normal equation supplemented with the tutor data and prediction tap to the learning memory 39.

The learning memory 39 stores the normal equations supplied from the supplementing computing unit 37 by class, based on the class code supplied from the class classification unit 35. The learning memory 39 supplies the normal equations to which the tutor data and prediction tap has been supplemented, and stored for each class, to a normal equation computing unit 40.

The normal equation computing unit 40 solves the normal equations supplied from the learning memory 39 by sweeping, and obtains a prediction coefficient for each class. The normal equation computing unit 40 supplies the prediction coefficients for each class to coefficient memory 41.

The coefficient memory 41 stores the prediction coefficients for each class, supplied from the normal equation computing unit 40.

FIG. 4 is a flowchart for describing the processing of learning of the conventional image processing device which generates prediction coefficients used for class classification adaptation processing for creating an output image which is an HD image from an input image which is an SD image.

In step S31, the student image generating unit 31 generates a student image from an input image which is a tutor image. In step S32, the class tap extracting unit 33 sequentially selects the pixel of interest, and extracts a class tap corresponding to the selected pixel of interest from the student image.

In step S33, the features detecting unit 34 detects the features corresponding to the pixel of interest, from the student image. In step S34, the class classification unit 35 classifies the class of the pixel of interest based on the class tap extracted by the processing in step S32 and the features detected by the processing in step S33.

In step S35, the prediction tap extracting unit 36 extracts a prediction tap corresponding to the pixel of interest from the student image, based on the class classified by the processing in step S34.

In step S36, the tutor pixel extracting unit 38 extracts a pixel of interest from the input image which is a tutor image, i.e., extracts a tutor pixel (tutor data).

In step S37, the supplementing computing unit 37 performs computation for supplementing the prediction tap extracted in the processing in step S35 and the tutor pixel (tutor data) extracted in the processing in step S36 into the normal equation.

In step S38, the image processing device determines whether or not supplementing processing has ended for all pixels in the tutor image, and in the event that determination is made that the supplementing processing has not ended for all pixels, the flow returns to step S32, and the processing wherein a pixel which has not yet been taken as a pixel of interest is taken as the pixel of interest, the prediction tap and tutor pixel are extracted, and supplemented to the normal equation, is repeated.

In the event that determination is made in step S38 that the supplementing processing has ended for all pixels of the tutor image, the flow proceeds to step S39, where the normal equation computing unit 40 computes the normal equations where the prediction taps and tutor pixels have been supplemented, thereby obtaining prediction coefficients.

In step S40, the image processing device determines whether or not prediction coefficients have been calculated for all classes, and in the event that determination is made that prediction coefficients have not been calculated for all classes, the flow returns to step S39, and the processing for a calculating normal equation to obtain a prediction coefficient is repeated.

In the event that determination is made in step S40 that prediction coefficients have been calculated for all classes, the processing ends.

Also, Japanese Unexamined Patent Application Publication No. 9-74543 discloses not only class classification of input images based on level distribution patterns of input images, but also class classification of input images based on movement of input images to generate class codes.

However, image processing taking into consideration the data continuity of image data has not been heretofore conceived.

DISCLOSURE OF INVENTION

The present invention has been made in light of the current situation as described above, and it is an object thereof to use data continuity to enable processing results with more accuracy and higher precision.

The image processing device according to the present invention comprises: image data continuity detecting means for detecting first continuity of image data corresponding to the continuity of light signals of the real world, for a plurality of first perimeter pixels within the input image data that correspond to a first pixel of interest within the high-quality image data, and for detecting second continuity of image data corresponding to the continuity of light signals of the real world, for a plurality of second perimeter pixels within the input image data that correspond to a second pixel of interest within the high-quality image data which is temporally or spatially adjacent to the first pixel of interest; first extracting means for extracting a plurality of third perimeter pixels within the input image data that correspond to the first pixel of interest, based on the first continuity of image data detected by the image data continuity detecting means, and for extracting a plurality of fourth perimeter pixels within the input image data that correspond to the second pixel of interest, based on the second continuity of image data detected by the image data continuity detecting means; second extracting means for extracting a plurality of fifth perimeter pixels within the input image data that correspond to the first pixel of interest, based on the first continuity of image data detected by the image data continuity detecting means, and for extracting a plurality of sixth perimeter pixels within the input image data that correspond to the second pixel of interest, based on the second continuity of image data detected by the image data continuity detecting means; first features detecting means for detecting first features of the plurality of third perimeter pixels extracted by the first extracting means, and for detecting second features of the plurality of fourth perimeter pixels extracted by the first extracting means; first predicting means for predicting the first pixel of interest from the plurality of fifth perimeter pixels extracted by the second extracting means, based on the first features detected by the first features detecting means, predicting the second pixel of interest from the plurality of sixth perimeter pixels extracted by the second extracting means, based on the second features detected by the first features detecting means, and outputting a first prediction value of the first pixel of interest and a second prediction value of the second pixel of interest; and selective output means for detecting the relation between the first prediction value of the first pixel of interest predicted by the first predicting means, the second prediction value of the second pixel of interest predicted by the first predicting means, and the pixel values of corresponding pixels within the input image data situated at positions encompassing at least the first pixel of interest and the second pixel of interest in the temporal direction or spatial direction, and selectively outputting the first prediction value of the first pixel of interest and the second prediction value of the second pixel of interest output from the first prediction means, according to the detection results.

The image processing device may further comprise: third extracting means for extracting a plurality of seventh perimeter pixels within the input image data that correspond to the first pixel of interest within the high quality image data, and for extracting a plurality of eighth perimeter pixels within the input image data that correspond to the second pixel of interest within the high quality image data; fourth extracting means for extracting a plurality of ninth perimeter pixels within the input image data that correspond to the first pixel of interest, and for extracting a plurality of tenth perimeter pixels within the input image data that correspond to the second pixel of interest; second features detecting means for detecting third features of the plurality of seventh perimeter pixels extracted by the third extracting means, and for detecting fourth features of the plurality of eighth perimeter pixels extracted by the third extracting means; and second predicting means for predicting the first pixel of interest from the plurality of ninth perimeter pixels extracted by the fourth extracting means, based on the third features detected by the second features detecting means, predicting the second pixel of interest from the plurality of tenth perimeter pixels extracted by the fourth extracting means, based on the fourth features detected by the second features detecting means, and outputting a third prediction value of the first pixel of interest and a fourth prediction value of the second pixel of interest; with the selective output means detecting the relation between the first prediction value of the first pixel of interest predicted by the first predicting means, the second prediction value of the second pixel of interest predicted by the first predicting means, and the pixel values of corresponding pixels in the image data, and selectively outputting a first set made up of the first prediction value and the second prediction value or a second set made up of the third prediction value and the fourth prediction value, according to the detection results.

The selective output means may selectively output the first set of prediction values made up of the first prediction value and the second prediction value in the event that the absolute value obtained by subtracting the first prediction value of the first pixel of interest and the second prediction value of the second pixel of interest from the pixel value of the corresponding pixel is smaller than a predetermined threshold value.

An image processing method according to the present invention comprises: an image data continuity detecting step for detecting first continuity of image data corresponding to the continuity of light signals of the real world, for a plurality of first perimeter pixels within the input image data that correspond to a first pixel of interest within the high-quality image data, and for detecting second continuity of image data corresponding to the continuity of light signals of the real world, for a plurality of second perimeter pixels within the input image data that correspond to a second pixel of interest within the high-quality image data which is temporally or spatially adjacent to the first pixel of interest; a first extracting step for extracting a plurality of third perimeter pixels within the input image data that correspond to the first pixel of interest, based on the first continuity of image data detected in the image data continuity detecting step, and for extracting a plurality of fourth perimeter pixels within the input image data that correspond to the second pixel of interest, based on the second continuity of image data detected in the image data continuity detecting step; a second extracting step for extracting a plurality of fifth perimeter pixels within the input image data that correspond to the first pixel of interest, based on the first continuity of image data detected in the image data continuity detecting step, and for extracting a plurality of sixth perimeter pixels within the input image data that correspond to the second pixel of interest, based on the second continuity of image data detected in the image data continuity detecting step; a features detecting step for detecting first features of the plurality of third perimeter pixels extracted in the first extracting step, and for detecting second features of the plurality of fourth perimeter pixels extracted in the first extracting step; a predicting step for predicting the first pixel of interest from the plurality of fifth perimeter pixels extracted in the second extracting step, based on the first features detected in the features detecting step, predicting the second pixel of interest from the plurality of sixth perimeter pixels extracted in the second extracting step, based on the second features detected in the features detecting step, and outputting a first prediction value of the first pixel of interest and a second prediction value of the second pixel of interest; and a selective output step for detecting the relation between the first prediction value of the first pixel of interest predicted in the predicting step, the second prediction value of the second pixel of interest predicted in the predicting step, and the pixel values of corresponding pixels within the input image data situated at positions encompassing at least the first pixel of interest and the second pixel of interest in the temporal direction or spatial direction, and selectively outputting the first prediction value of the first pixel of interest and the second prediction value of the second pixel of interest, according to the detection results.

A program stored in a first recording medium according to the present invention comprises: an image data continuity detecting step for detecting first continuity of image data corresponding to the continuity of light signals of the real world, for a plurality of first perimeter pixels within the input image data that correspond to a first pixel of interest within the high-quality image data, and for detecting second continuity of image data corresponding to the continuity of light signals of the real world, for a plurality of second perimeter pixels within the input image data that correspond to a second pixel of interest within the high-quality image data which is temporally or spatially adjacent to the first pixel of interest; a first extracting step for extracting a plurality of third perimeter pixels within the input image data that correspond to the first pixel of interest, based on the first continuity of image data detected in the image data continuity detecting step, and for extracting a plurality of fourth perimeter pixels within the input image data that correspond to the second pixel of interest, based on the second continuity of image data detected in the image data continuity detecting step; a second extracting step for extracting a plurality of fifth perimeter pixels within the input image data that correspond to the first pixel of interest, based on the first continuity of image data detected in the image data continuity detecting step, and for extracting a plurality of sixth perimeter pixels within the input image data that correspond to the second pixel of interest, based on the second continuity of image data detected in the image data continuity detecting step; a first features detecting step for detecting first features of the plurality of third perimeter pixels extracted in the first extracting step, and for detecting second features of the plurality of fourth perimeter pixels extracted in the first extracting step; a predicting step for predicting the first pixel of interest from the plurality of fifth perimeter pixels extracted in the second extracting step, based on the first features detected in the features detecting step, predicting the second pixel of interest from the plurality of sixth perimeter pixels extracted in the second extracting step, based on the second features detected in the features detecting step, and outputting a first prediction value of the first pixel of interest and a second prediction value of the second pixel of interest; and a selective output step for detecting the relation between the first prediction value of the first pixel of interest predicted in the predicting step, the second prediction value of the second pixel of interest predicted in the predicting step, and the pixel values of corresponding pixels within the input image data situated at positions encompassing at least the first pixel of interest and the second pixel of interest in the temporal direction or spatial direction, and selectively outputting the first prediction value of the first pixel of interest and the second prediction value of the second pixel of interest, according to the detection results.

A first program according to the present invention causes a computer to perform: an image data continuity detecting step for detecting first continuity of image data corresponding to the continuity of light signals of the real world, for a plurality of first perimeter pixels within the input image data that correspond to a first pixel of interest within the high-quality image data, and for detecting second continuity of image data corresponding to the continuity of light signals of the real world, for a plurality of second perimeter pixels within the input image data that correspond to a second pixel of interest within the high-quality image data which is temporally or spatially adjacent to the first pixel of interest; a first extracting step for extracting a plurality of third perimeter pixels within the input image data that correspond to the first pixel of interest, based on the first continuity of image data detected in the image data continuity detecting step, and for extracting a plurality of fourth perimeter pixels within the input image data that correspond to the second pixel of interest, based on the second continuity of image data detected in the image data continuity detecting step; a second extracting step for extracting a plurality of fifth perimeter pixels within the input image data that correspond to the first pixel of interest, based on the first continuity of image data detected in the image data continuity detecting step, and for extracting a plurality of sixth perimeter pixels within the input image data that correspond to the second pixel of interest, based on the second continuity of image data detected in the image data continuity detecting step; a features detecting step for detecting first features of the plurality of third perimeter pixels extracted in the first extracting step, and for detecting second features of the plurality of fourth perimeter pixels extracted in the first extracting step; a predicting step for predicting the first pixel of interest from the plurality of fifth perimeter pixels extracted in the second extracting step, based on the first features detected in the features detecting step, predicting the second pixel of interest from the plurality of sixth perimeter pixels extracted in the second extracting step, based on the second features detected in the features detecting step, and outputting a first prediction value of the first pixel of interest and a second prediction value of the second pixel of interest; and a selective output step for detecting the relation between the first prediction value of the first pixel of interest predicted in the predicting step, the second prediction value of the second pixel of interest predicted in the predicting step, and the pixel values of corresponding pixels within the input image data situated at positions encompassing at least the first pixel of interest and the second pixel of interest in the temporal direction or spatial direction, and selectively outputting the first prediction value of the first pixel of interest and the second prediction value of the second pixel of interest, according to the detection results.

A learning device according to the present invention comprises: image data continuity detecting means for detecting image data continuity corresponding to the continuity of light signals of the real world, for a plurality of first perimeter pixels within the input image data that correspond to a pixel of interest within the high-quality image data; first extracting means for extracting a plurality of second perimeter pixels within the input image data that correspond to the pixel of interest in the high-quality image data, based on the image data continuity detected by the image data continuity detecting means; second extracting means for extracting a plurality of third perimeter pixels within the input image data that correspond to the pixel of interest, based on the image data continuity detected by the image data continuity detecting means; features detecting means for detecting features of the plurality of second perimeter pixels extracted by the first extracting means; and learning means for learning the predicting means for predicting the pixel of interest from the plurality of third perimeter pixels extracted by the second extracting means for each of the features detected by the features detecting means.

A learning method according to the present invention comprises: an image data continuity detecting step for detecting image data continuity corresponding to the continuity of light signals of the real world, for a plurality of first perimeter pixels within the input image data that correspond to a pixel of interest within the high-quality image data; a first extracting step for extracting a plurality of second perimeter pixels within the input image data that correspond to the pixel of interest in the high-quality image data, based on the image data continuity detected in the image data continuity detecting step; a second extracting step for extracting a plurality of third perimeter pixels within the input image data that correspond to the pixel of interest, based on the image data continuity detected in the image data continuity detecting step; a features detecting step for detecting features of the plurality of second perimeter pixels extracted in the first extracting step; and a learning step for learning the predicting means for predicting the pixel of interest from the plurality of third perimeter pixels extracted in the second extracting step for each of the features detected in the features detecting step.

A program stored in a second recording medium according to the present invention comprises: an image data continuity detecting step for detecting image data continuity corresponding to the continuity of light signals of the real world, for a plurality of first perimeter pixels within the input image data that correspond to a pixel of interest within the high-quality image data; a first extracting step for extracting a plurality of second perimeter pixels within the input image data that correspond to the pixel of interest in the high-quality image data, based on the image data continuity detected in the image data continuity detecting step; a second extracting step for extracting a plurality of third perimeter pixels within the input image data that correspond to the pixel of interest, based on the image data continuity detected in the image data continuity detecting step; a features detecting step for detecting features of the plurality of second perimeter pixels extracted in the first extracting step; and a learning step for learning the predicting means for predicting the pixel of interest from the plurality of third perimeter pixels extracted in the second extracting step for each of the features detected in the features detecting step.

A second program according to the present invention causes a computer to perform: an image data continuity detecting step for detecting image data continuity corresponding to the continuity of light signals of the real world, for a plurality of first perimeter pixels within the input image data that correspond to a pixel of interest within the high-quality image data; a first extracting step for extracting a plurality of second perimeter pixels within the input image data that correspond to the pixel of interest in the high-quality image data, based on the image data continuity detected in the image data continuity detecting step; a second extracting step for extracting a plurality of third perimeter pixels within the input image data that correspond to the pixel of interest, based on the image data continuity detected in the image data continuity detecting step; a features detecting step for detecting features of the plurality of second perimeter pixels extracted in the first extracting step; and a learning step for learning the predicting means for predicting the pixel of interest from the plurality of third perimeter pixels extracted in the second extracting step for each of the features detected in the features detecting step.

The image processing device may be an independent device, or may be a block for performing image processing.

The learning device may be an independent device, or may be a block for performing learning processing.

First continuity of image data corresponding to the continuity of light signals of the real world is detected for a plurality of first perimeter pixels within the input image data that correspond to a first pixel of interest within the high-quality image data, second continuity of image data corresponding to the continuity of light signals of the real world is detected for a plurality of second perimeter pixels within the input image data that correspond to a second pixel of interest within the high-quality image data which is temporally or spatially adjacent to the first pixel of interest, a plurality of third perimeter pixels within the input image data that correspond to the first pixel of interest are extracted based on the first continuity of image data detected, a plurality of fourth perimeter pixels within the input image data that correspond to the second pixel of interest are extracted based on the second continuity of image data detected, a plurality of fifth perimeter pixels within the input image data that correspond to the first pixel of interest are extracted based on the first continuity of image data detected, a plurality of sixth perimeter pixels within the input image data that correspond to the second pixel of interest are extracted based on the second continuity of image data detected, first features of the plurality of third perimeter pixels extracted are detected, second features of the plurality of fourth perimeter pixels extracted are detected, the first pixel of interest is predicted from the plurality of fifth perimeter pixels extracted, based on the first features detected, the second pixel of interest is predicted from the plurality of sixth perimeter pixels extracted, based on the second features detected, a first prediction value of the first pixel of interest and a second prediction value of the second pixel of interest are output, the relation is detected between the first prediction value of the first pixel of interest predicted, the second prediction value of the second pixel of interest predicted, and the pixel values of corresponding pixels within the input image data situated at positions encompassing at least the first pixel of interest and the second pixel of interest in the temporal direction or spatial direction, and the first prediction value of the first pixel of interest and the second prediction value of the second pixel of interest are selectively output, according to the detection results.

Image data continuity corresponding to the continuity of light signals of the real world is detected for a plurality of first perimeter pixels within the input image data that correspond to a pixel of interest within the high-quality image data, a plurality of second perimeter pixels within the input image data that correspond to the pixel of interest in the high-quality image data are extracted based on the image data continuity detected, a plurality of third perimeter pixels within the input image data that correspond to the pixel of interest are extracted based on the image data continuity detected, features of the plurality of second perimeter pixels extracted are detected; and predicting means for predicting the pixel of interest from the plurality of third perimeter pixels extracted are learned for each of the features.

BRIEF DESCRIPTION OF THE DRAWINGS

FIG. 29 is a diagram describing the range of angle of the set straight lines, the number of pixel sets, and the number of pixels per pixel set.

FIG. 46 is a diagram illustrating reference block wherein the distance as to a straight line which passes through the pixel of interest and has an angle of $\theta$ as to the axis of the spatial direction X, is minimal.

FIG. 77 is a diagram for describing how to obtain the angle of a fine line.

FIG. 90 is a flowchart for describing supplementing processing to a normal equation.

FIG. 97B is a diagram illustrating an example of distribution of the mixture ratio of a fine line.

FIG. 98A is a diagram illustrating an example of distribution of the mixture ratio of a two-valued edge.

FIG. 98B is a diagram illustrating an example of distribution of the mixture ratio of a two-valued edge.

FIG. 99 is a diagram for describing linear approximation of the mixture ratio.

FIG. 100A is a diagram for describing a method for obtaining movement of an object as data continuity information.

FIG. 100B is a diagram for describing a method for obtaining movement of an object as data continuity information.

FIG. 101A is a diagram for describing a method for obtaining movement of an object as data continuity information.

FIG. 101B is a diagram for describing a method for obtaining movement of an object as data continuity information.

FIG. 102A is a diagram for describing a method for obtaining a mixture ratio according to movement of an object as data continuity information.

FIG. 102B is a diagram for describing a method for obtaining a mixture ratio according to movement of an object as data continuity information.

FIG. 102C is a diagram for describing a method for obtaining a mixture ratio according to movement of an object as data continuity information.

FIG. 103 is a diagram for describing linear approximation of the mixture ratio at the time of obtaining the mixture ratio according to movement of the object as data continuity information.

Figure 104:
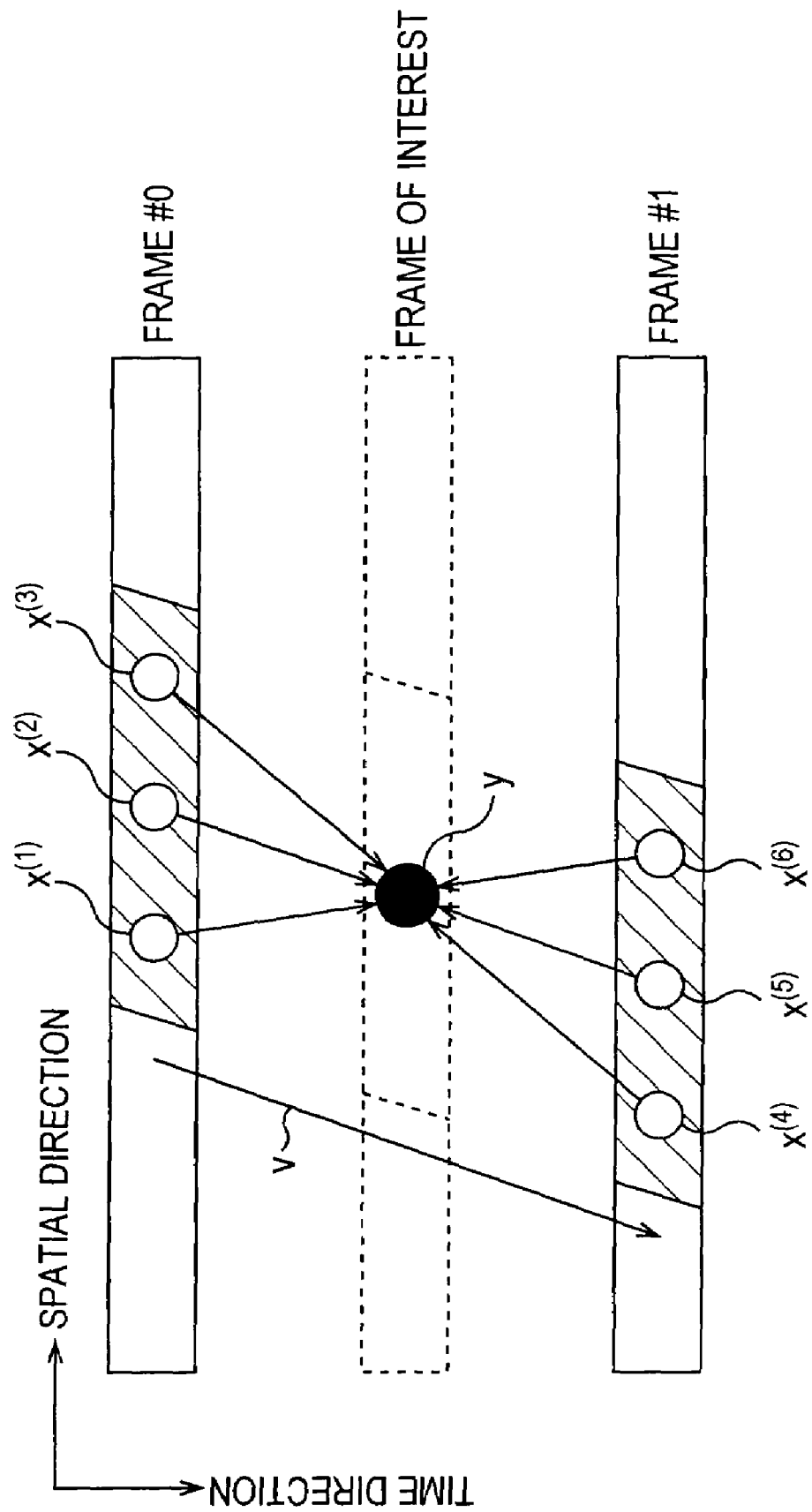

FIG. 104 is a diagram for describing conventional class tap extracting processing.

Figure 105:
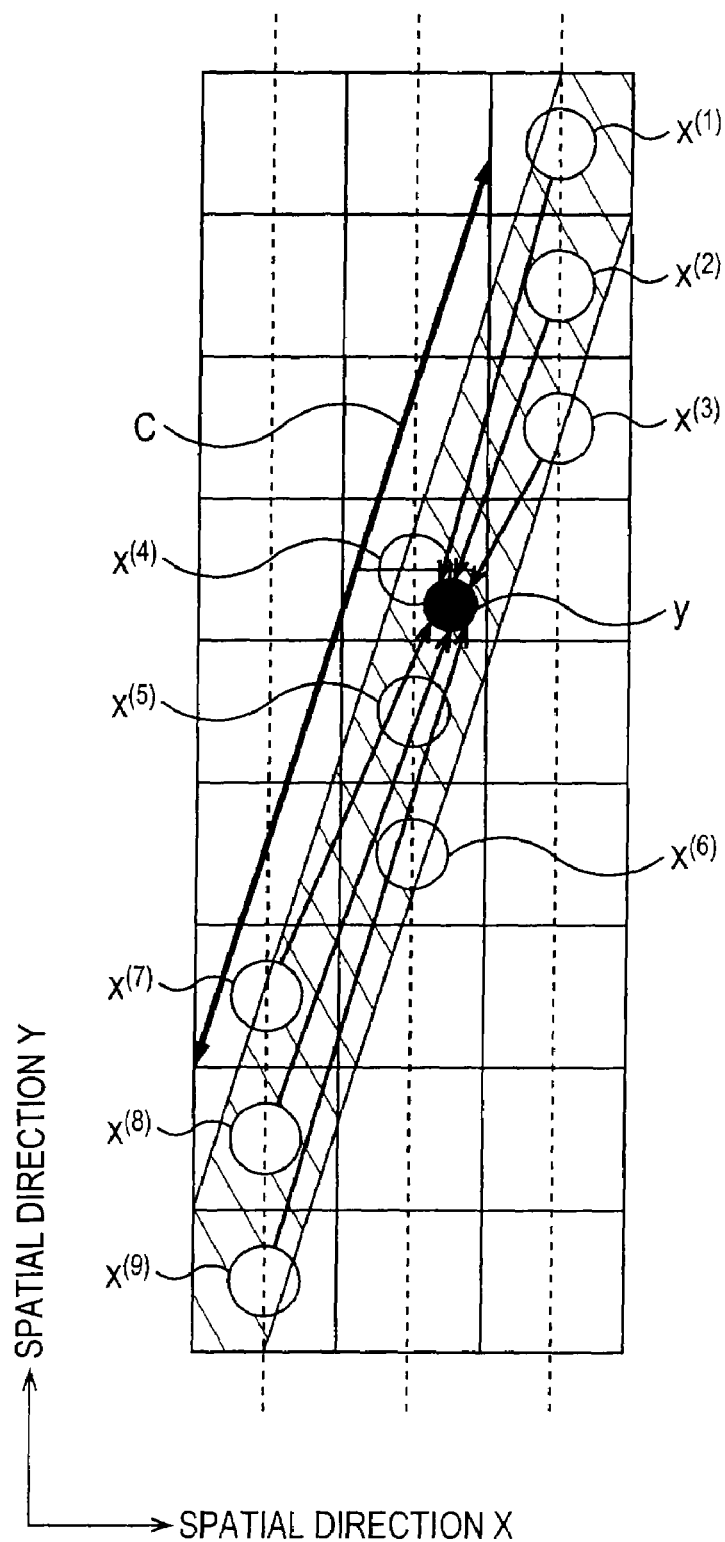

FIG. 105 is a diagram for describing class tap extracting processing with the image processing device according to the present invention.

Figure 106:
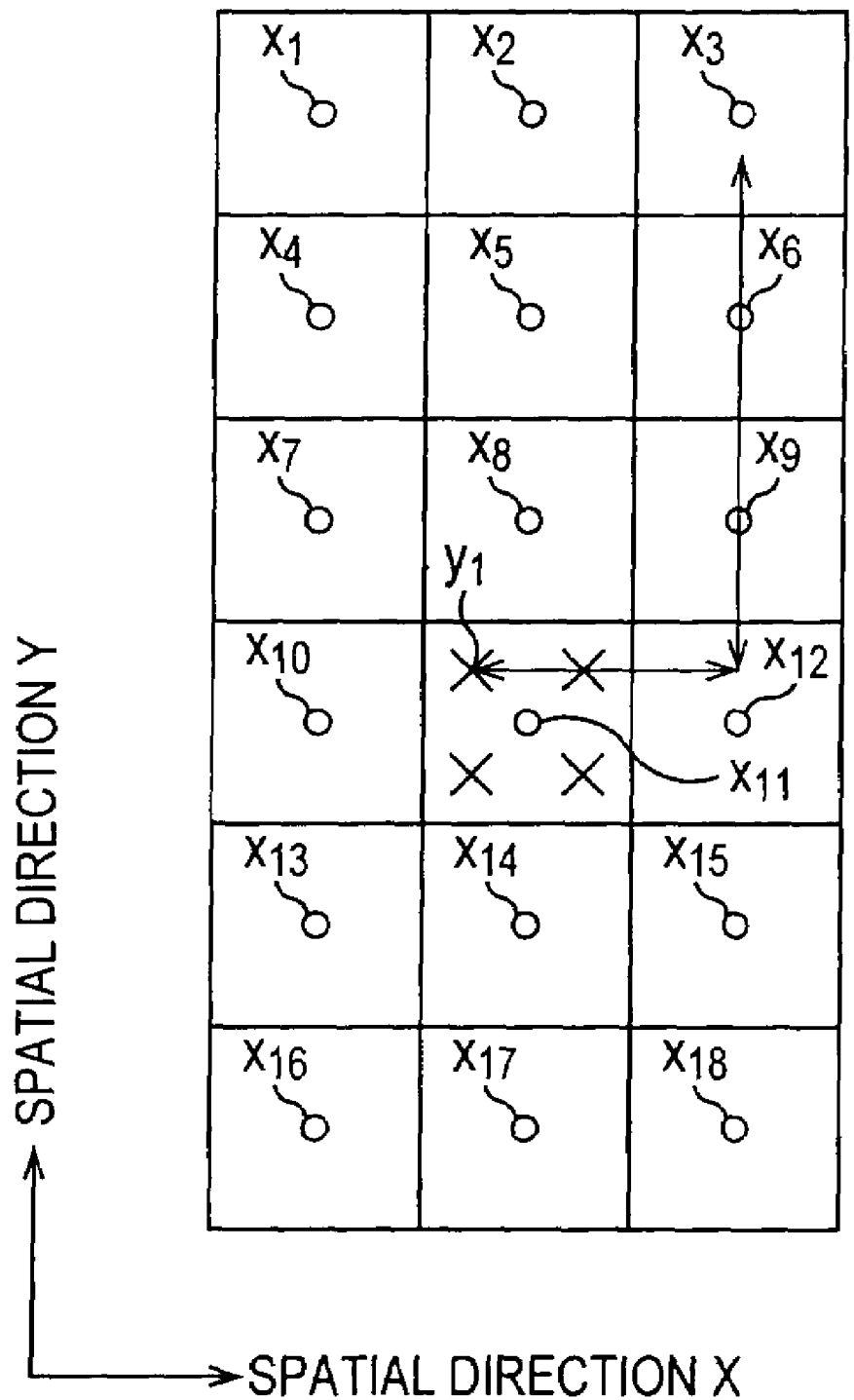

FIG. 106 is a diagram for describing determination of the position of pixels extracted as a class tap, based on data continuity.

Figure 107:
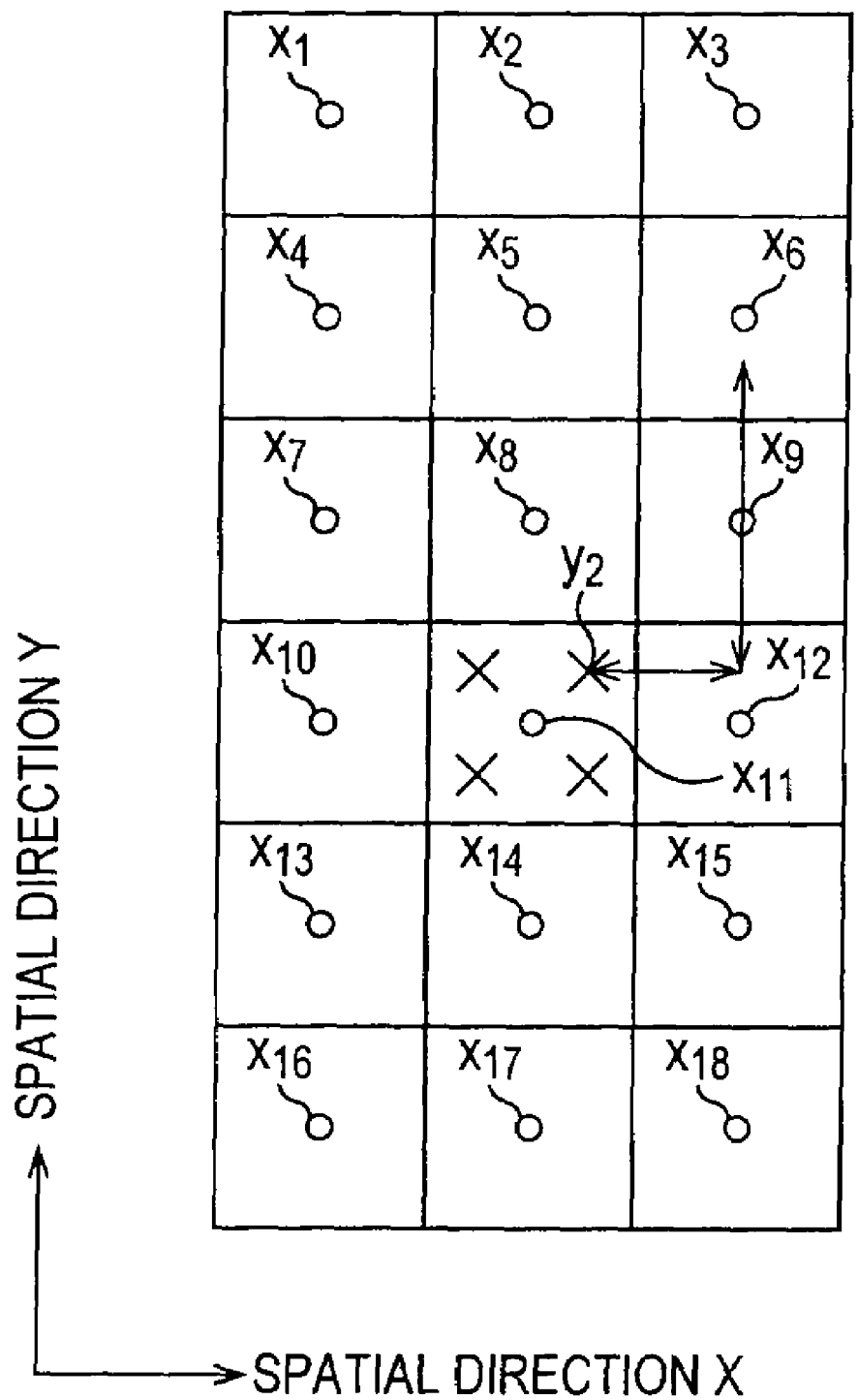

FIG. 107 is a diagram for describing determination of the position of pixels extracted as a class tap, based on data continuity.

Figure 108:
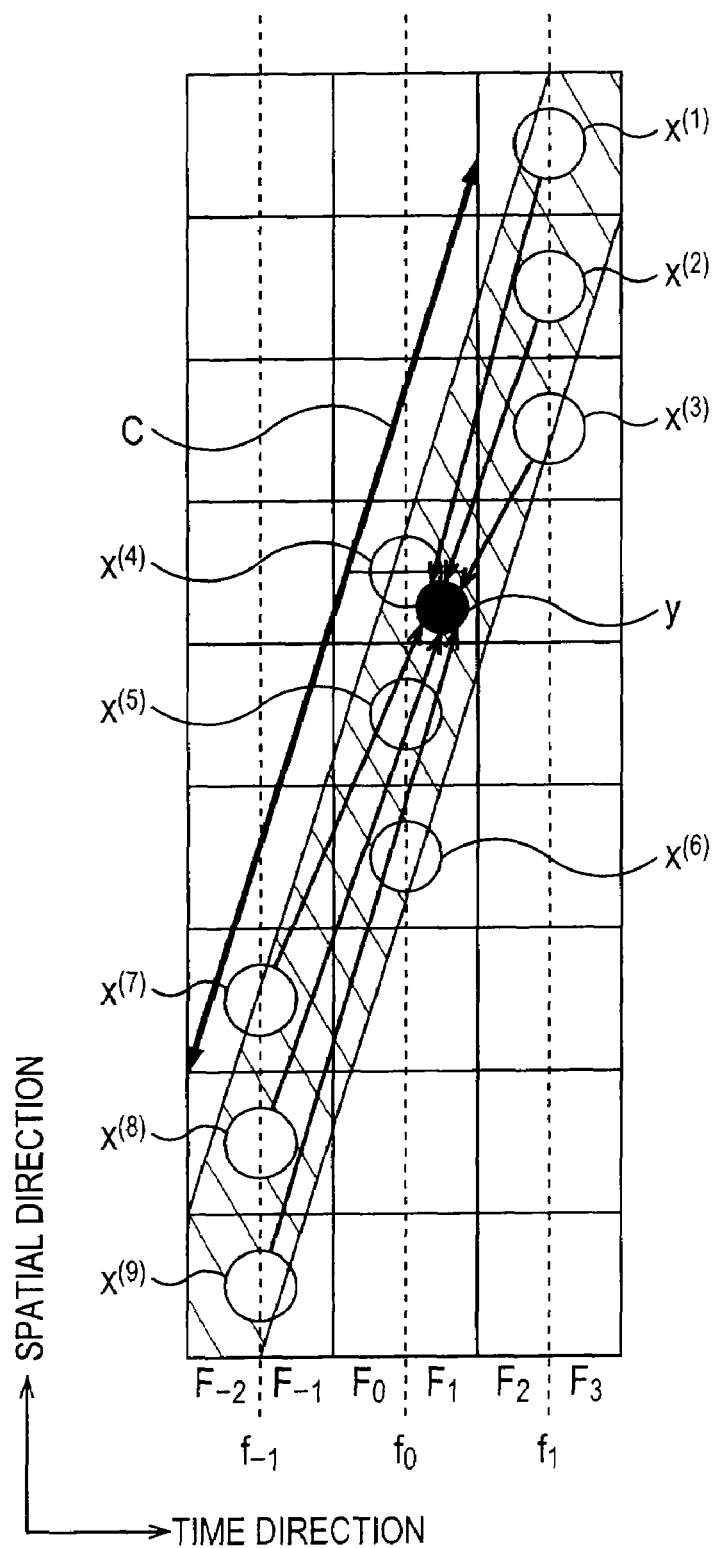

FIG. 108 is a diagram for describing class tap extracting processing with the image processing device according to the present invention.

Figure 109:
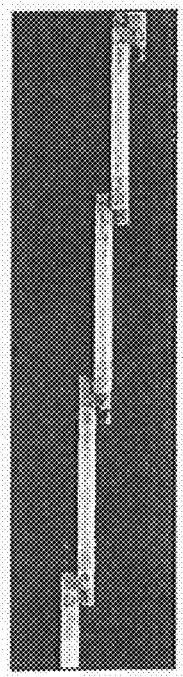

FIG. 109 is a diagram illustrating an example of an input image.

Figure 110:
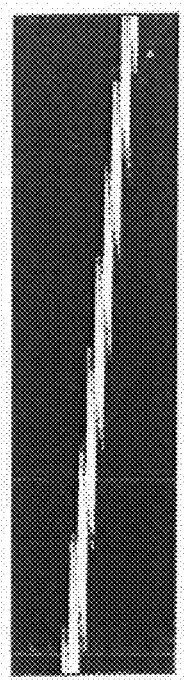

FIG. 110 is a diagram illustrating an original image of the input image.

Figure 111:
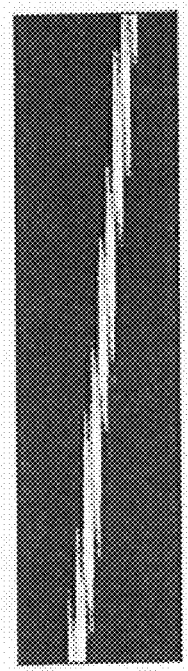

FIG. 111 is a diagram illustrating an image generated by conventional class classification adaptation processing.

Figure 112:
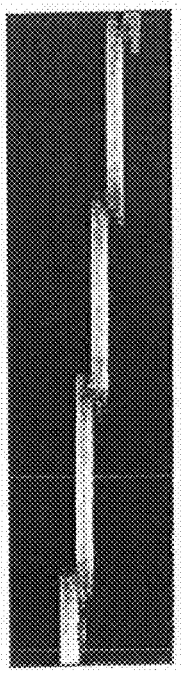

FIG. 112 is a diagram illustrating an image generated such that a corresponding pixel and center pixel are always the same.

Figure 113:
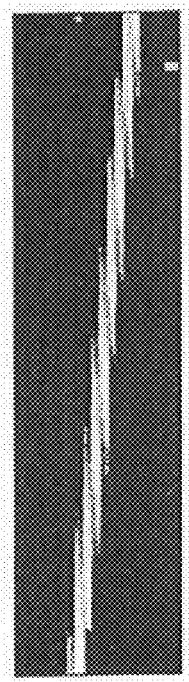

FIG. 113 is a diagram illustrating an image generated by the image processing device according to the present invention.

Figure 114:
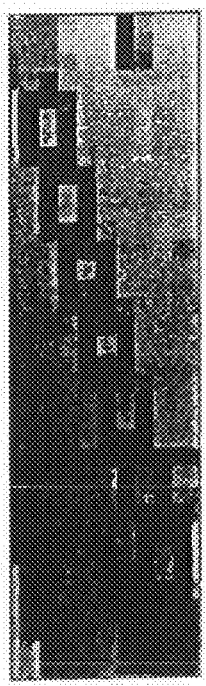

FIG. 114 is a diagram illustrating an example of an input image.

Figure 115:
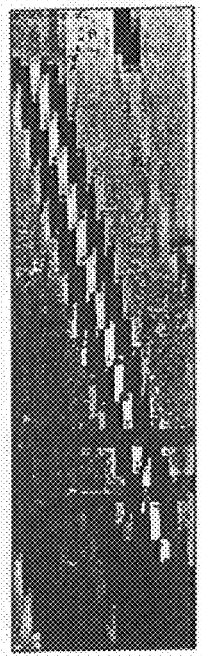

FIG. 115 is a diagram illustrating the original image of the input image.

Figure 116:
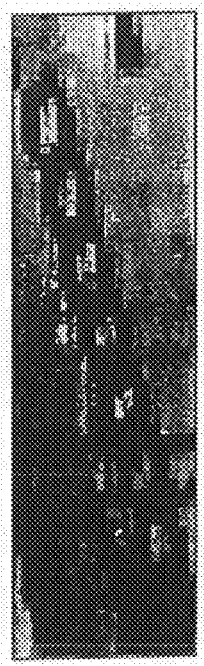

FIG. 116 is a diagram illustrating an image generated by conventional class classification adaptation processing.

Figure 117:
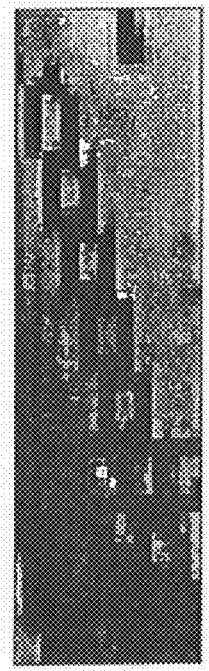

FIG. 117 is a diagram illustrating an image generated such that a corresponding pixel and center pixel are always the same.

Figure 118:
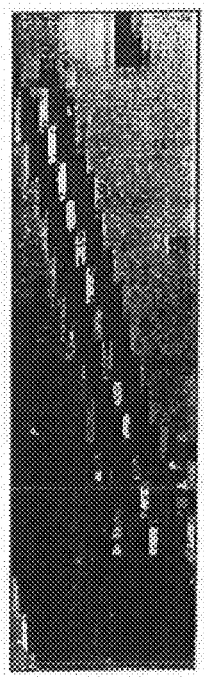

FIG. 118 is a diagram illustrating an image generated by the image processing device according to the present invention.

Figure 119:
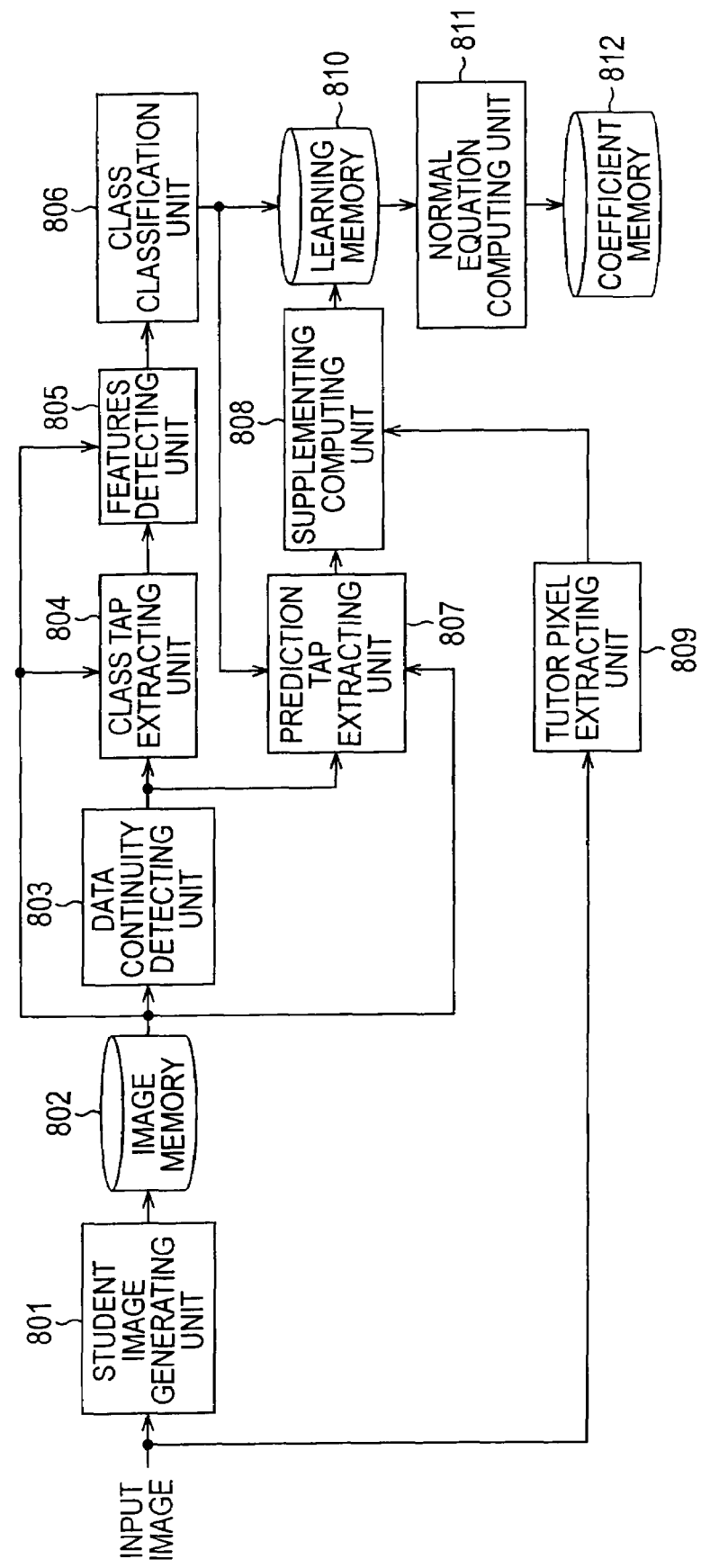

FIG. 119 is a block diagram illustrating the configuration of an embodiment of the learning device according to the present invention.

Figure 120:
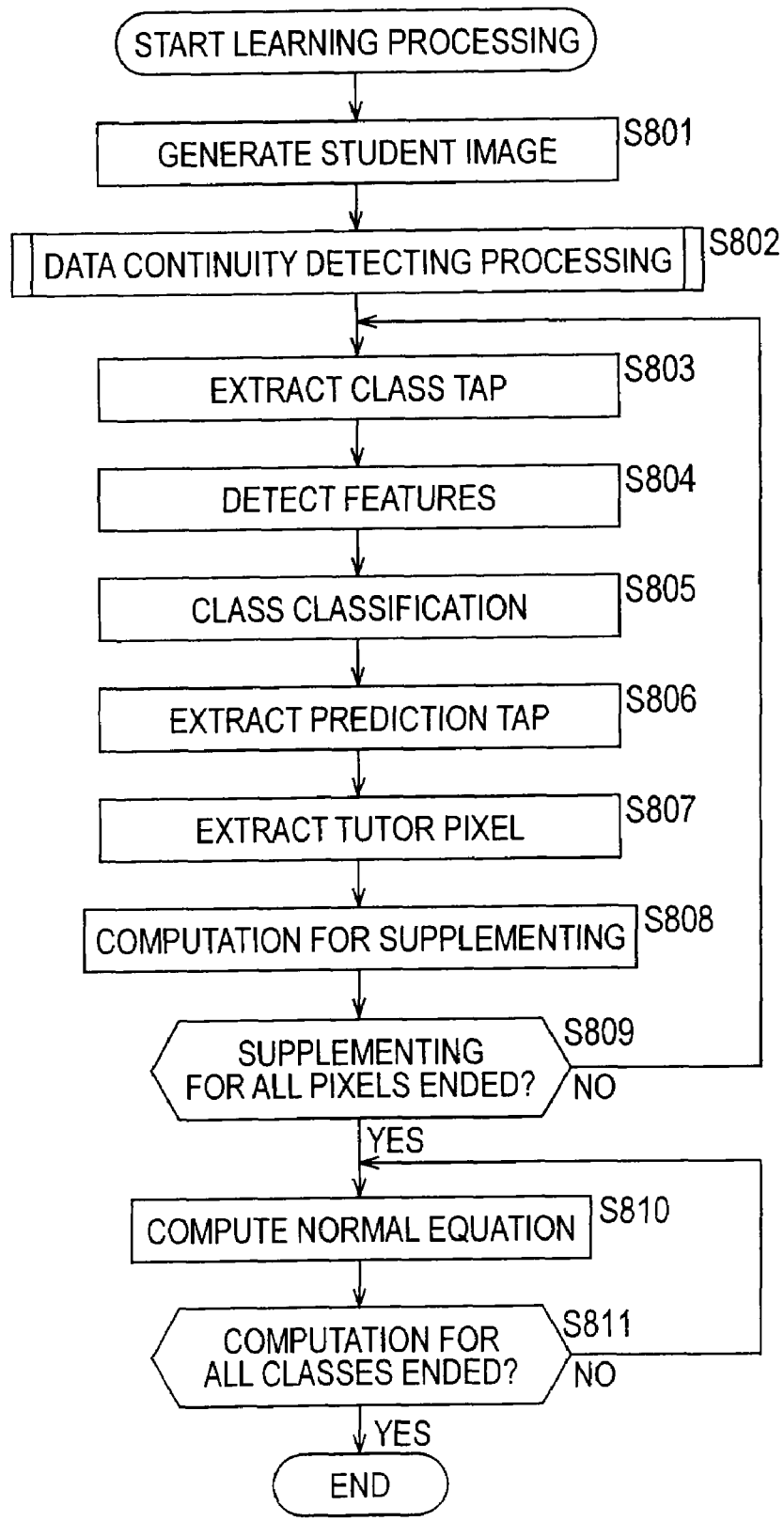

FIG. 120 is a flowchart describing learning processing.

Figure 121:
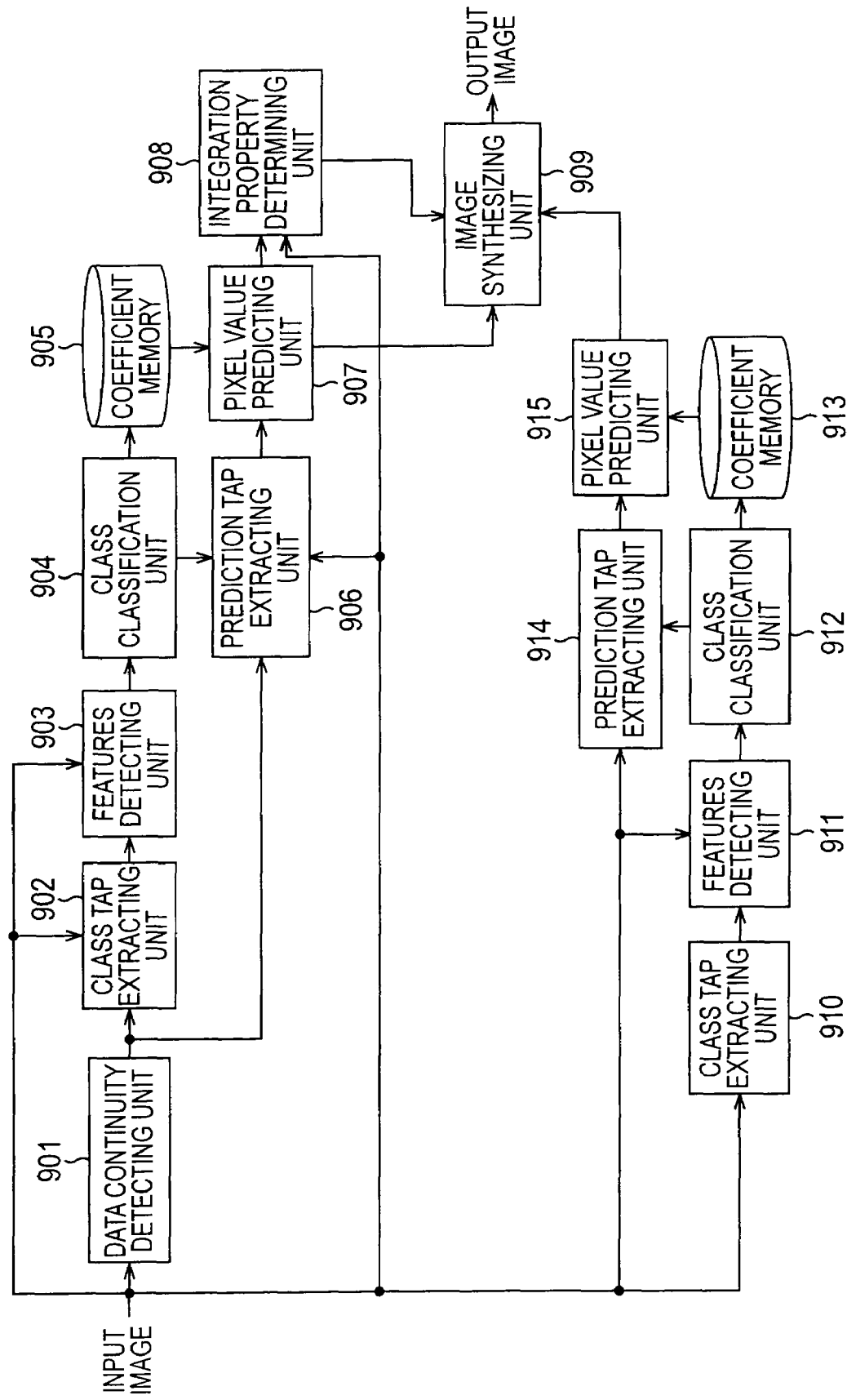

FIG. 121 is a block diagram illustrating another configuration of an embodiment of the learning device according to the present invention.

Figure 122:
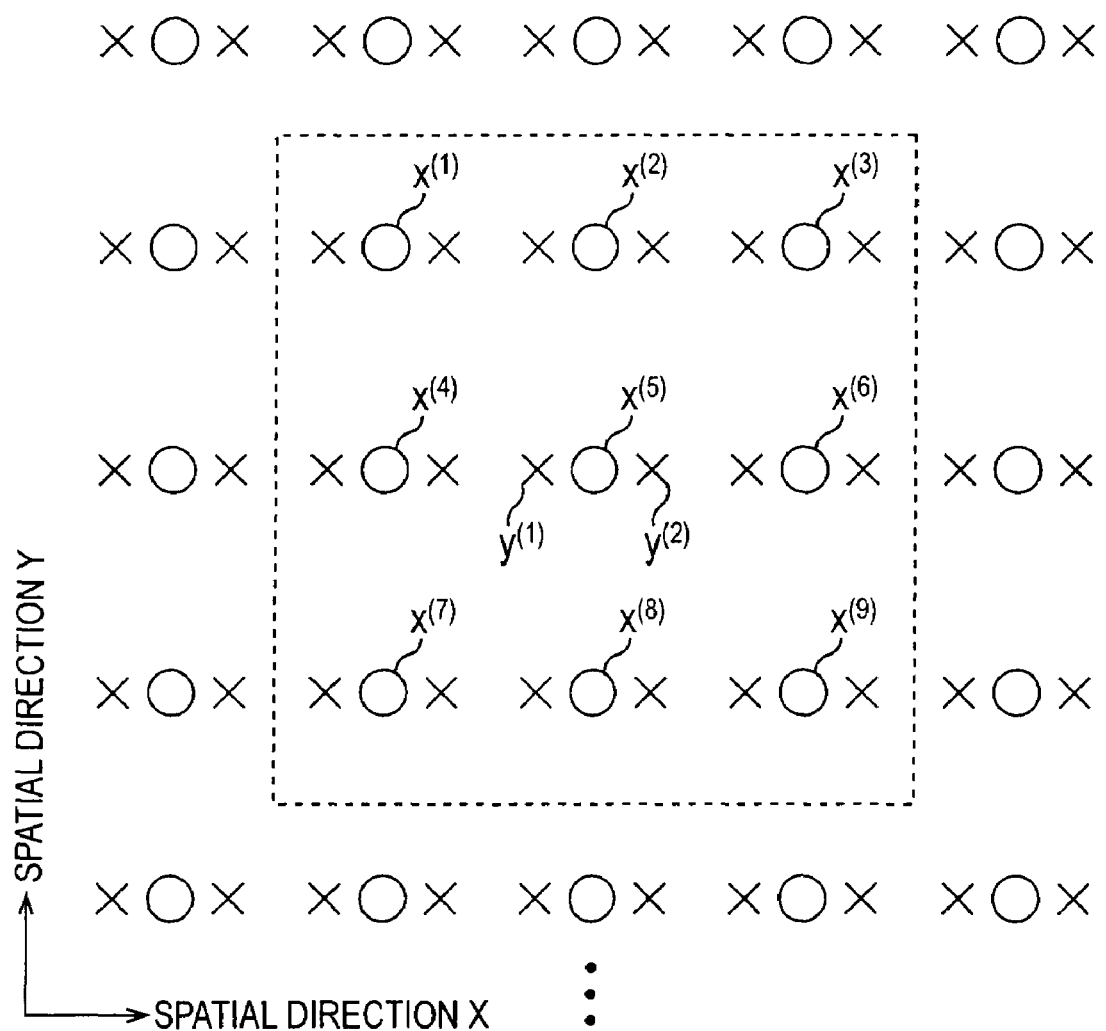

FIG. 122 is a diagram describing a pixel of interest.

Figure 123:
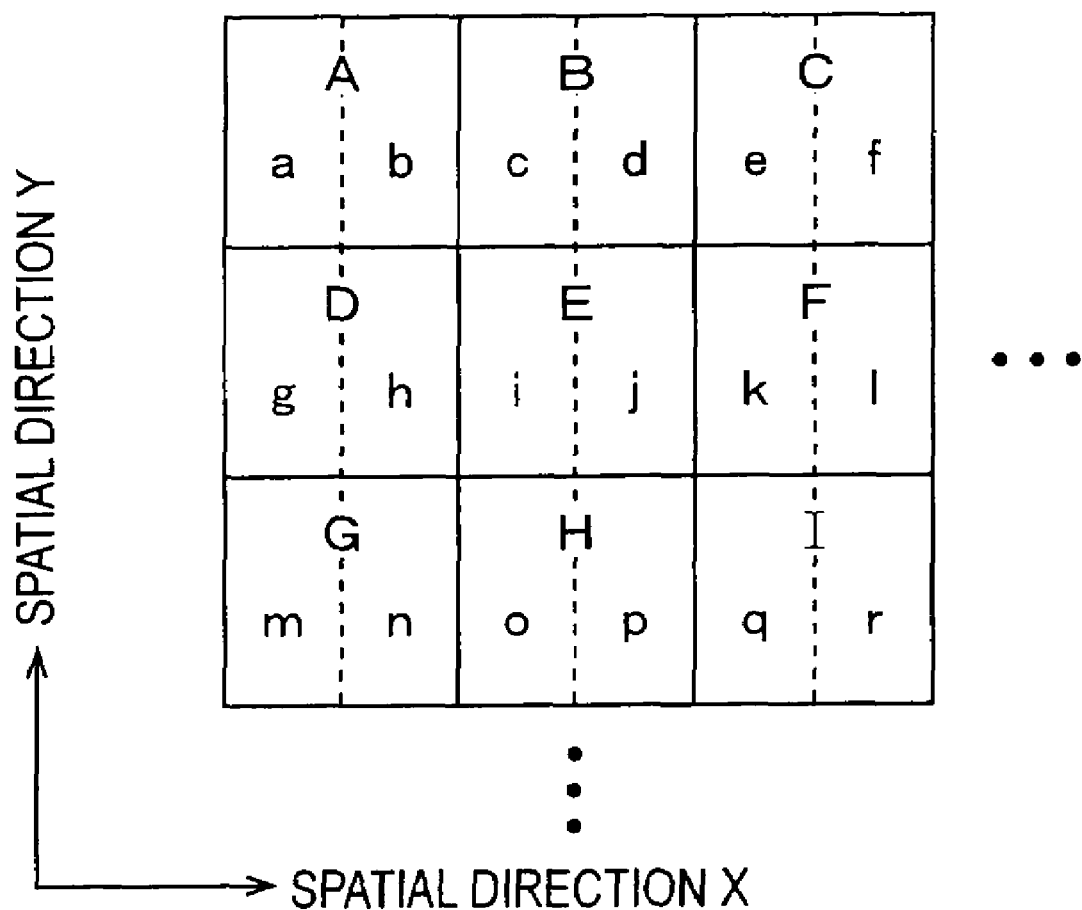

FIG. 123 is a diagram describing placement of pixels provided to an image sensor, and regions corresponding to pixels of a horizontal-double-density image.

Figure 124:
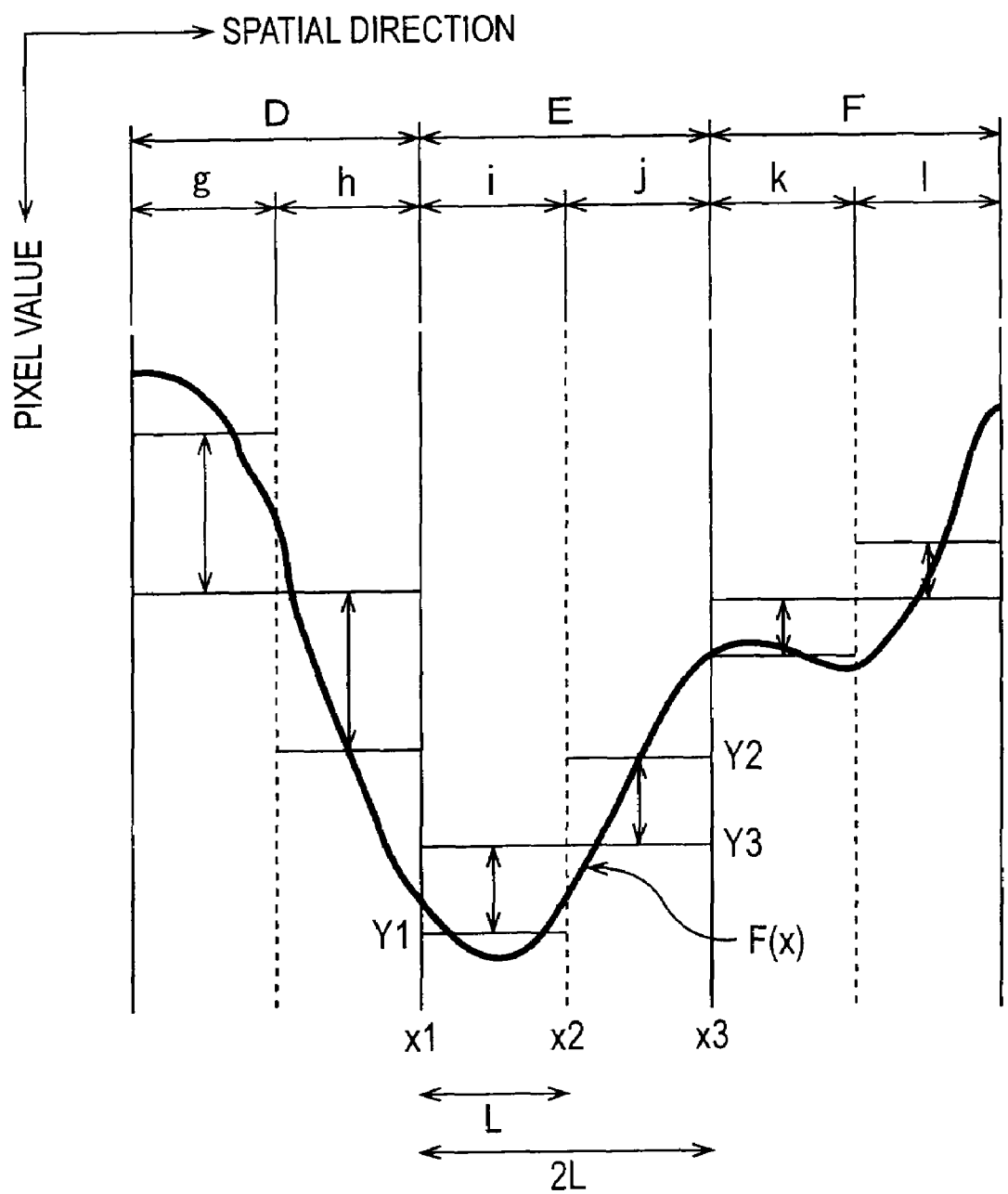

FIG. 124 is a diagram for describing pixel values of pixels corresponding to light cast into regions a through r.

Figure 125:
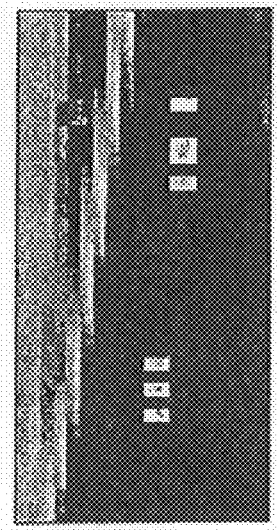

FIG. 125 is a diagram illustrating an example of an output image including a prediction value from a pixel value prediction unit, wherein the relation in Expression (53) does not hold.

Figure 126:
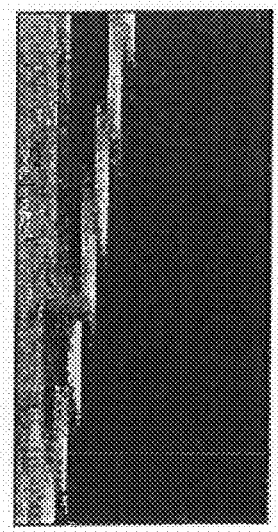

FIG. 126 is a diagram illustrating an example of an output image wherein the prediction value from the pixel value prediction unit, in which the relation in Expression (53) does not hold, has been substituted with a prediction value from the pixel value prediction unit.

Figure 127:
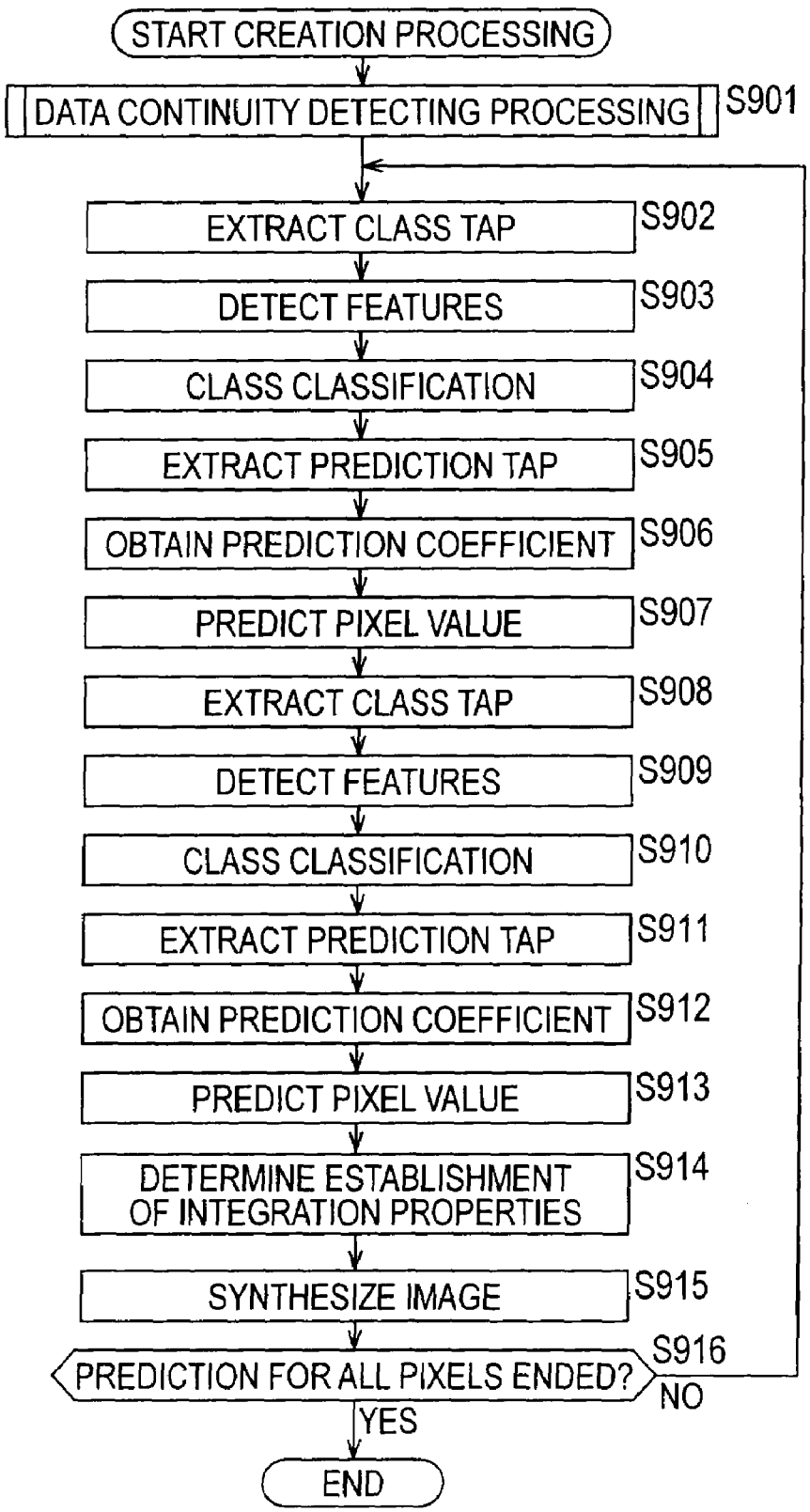

FIG. 127 is a flowchart for describing image creation processing.

Figure 128:
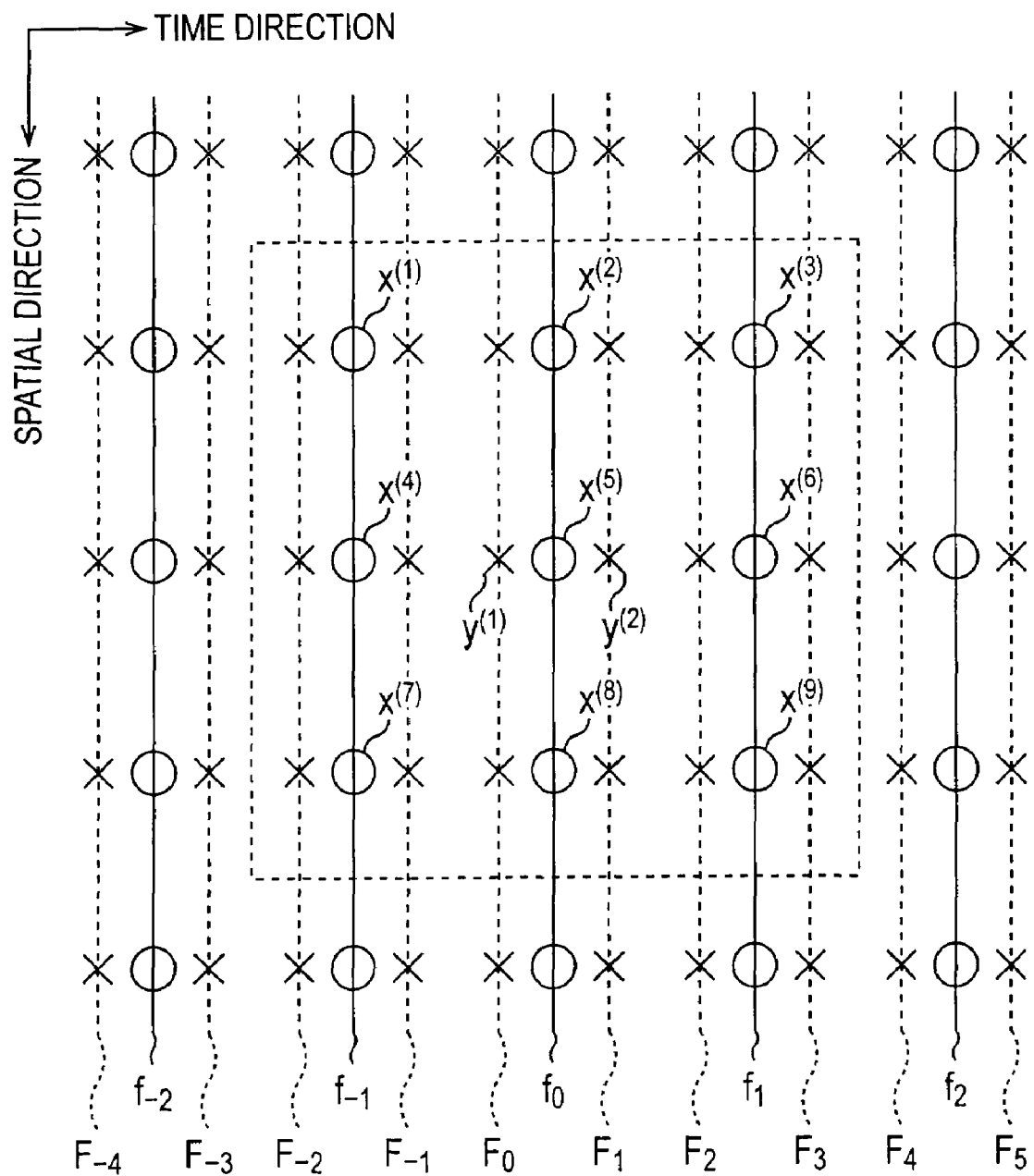

FIG. 128 is a diagram for describing a pixel of interest, in a case of creating a time-double-density image.

Figure 129:
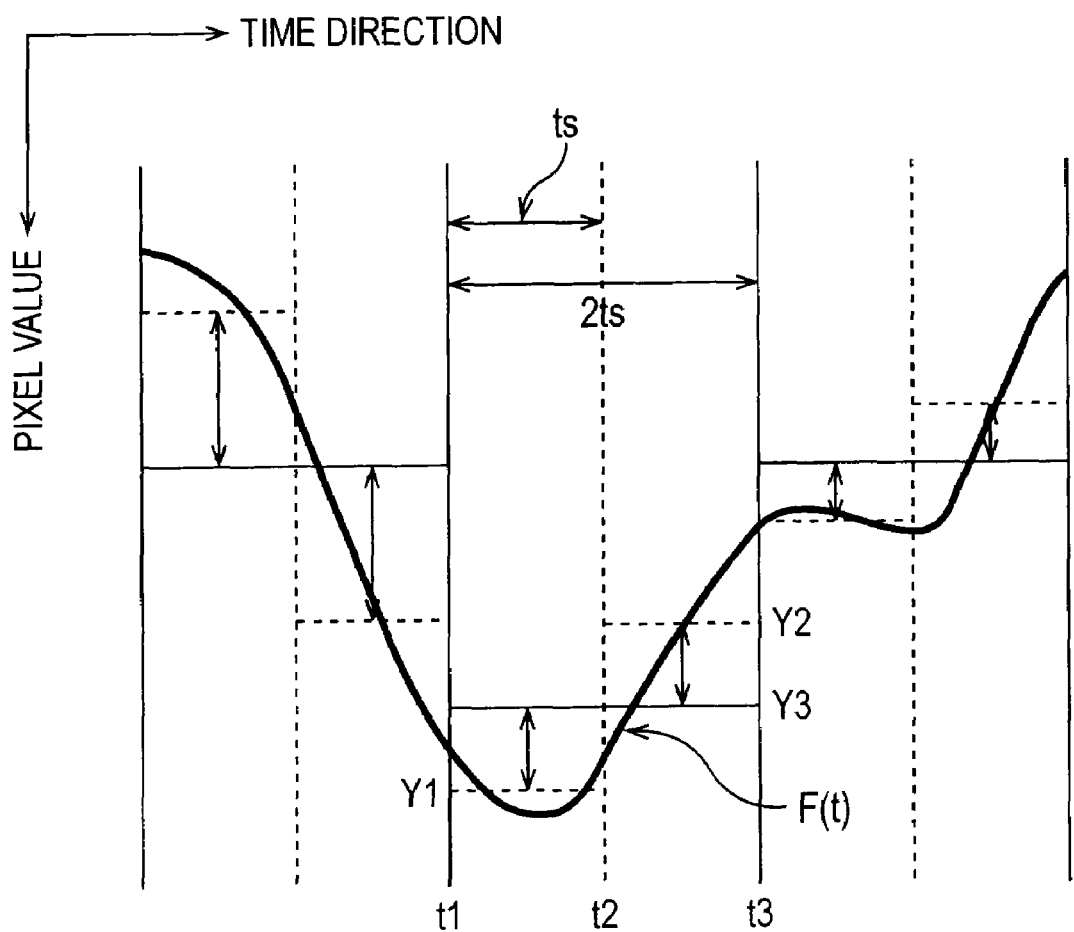

FIG. 129 is a diagram describing the relation between a pixel of interest $y^{(1)}$, a pixel of interest $y^{(2)}$, and a corresponding pixel $x^{(5)}$ which encompasses the pixel of interest $y^{(1)}$ and the pixel of interest $y^{(2)}$ in the time direction.

Figure 130:
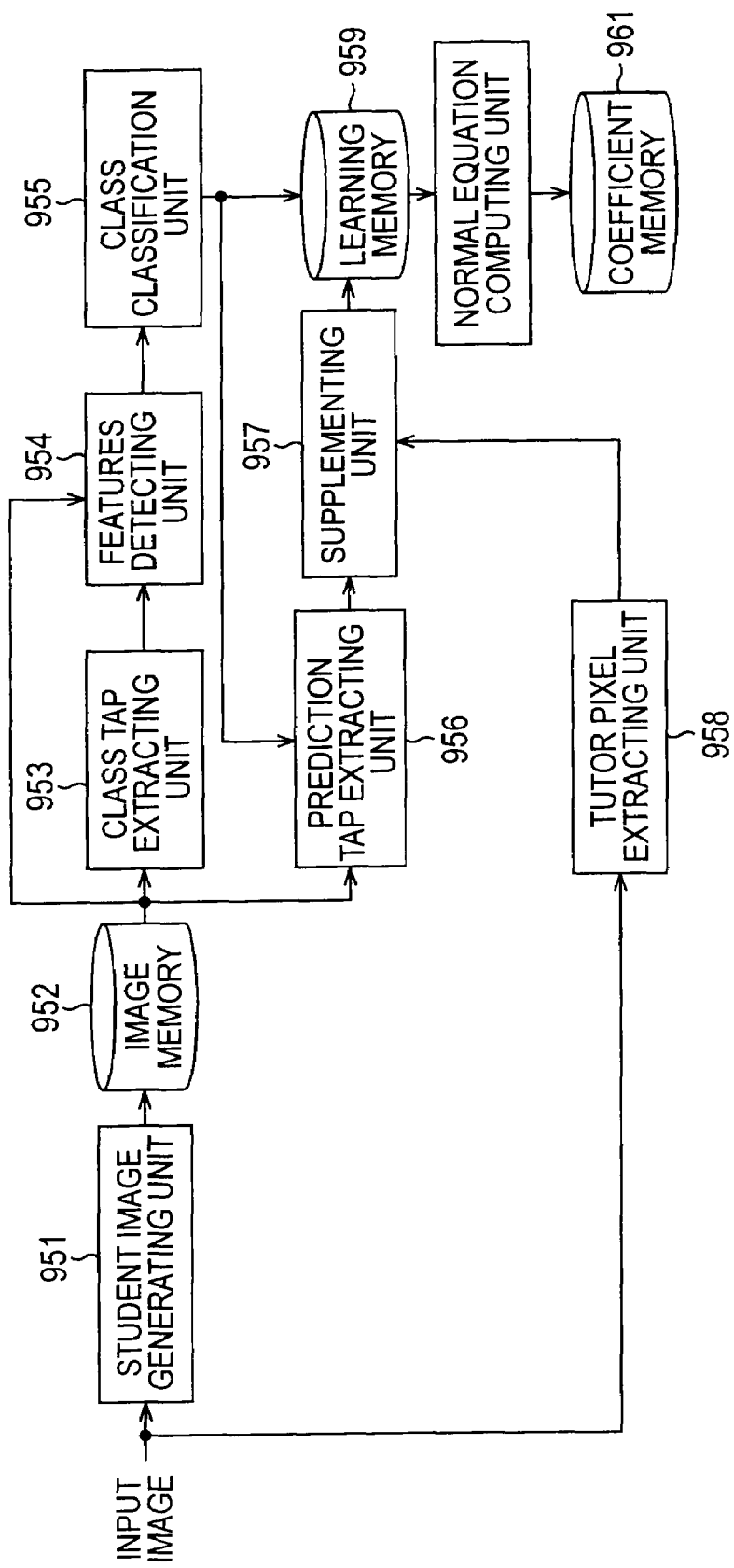

FIG. 130 is a block diagram illustrating the configuration of an embodiment of the learning device.

Figure 131:
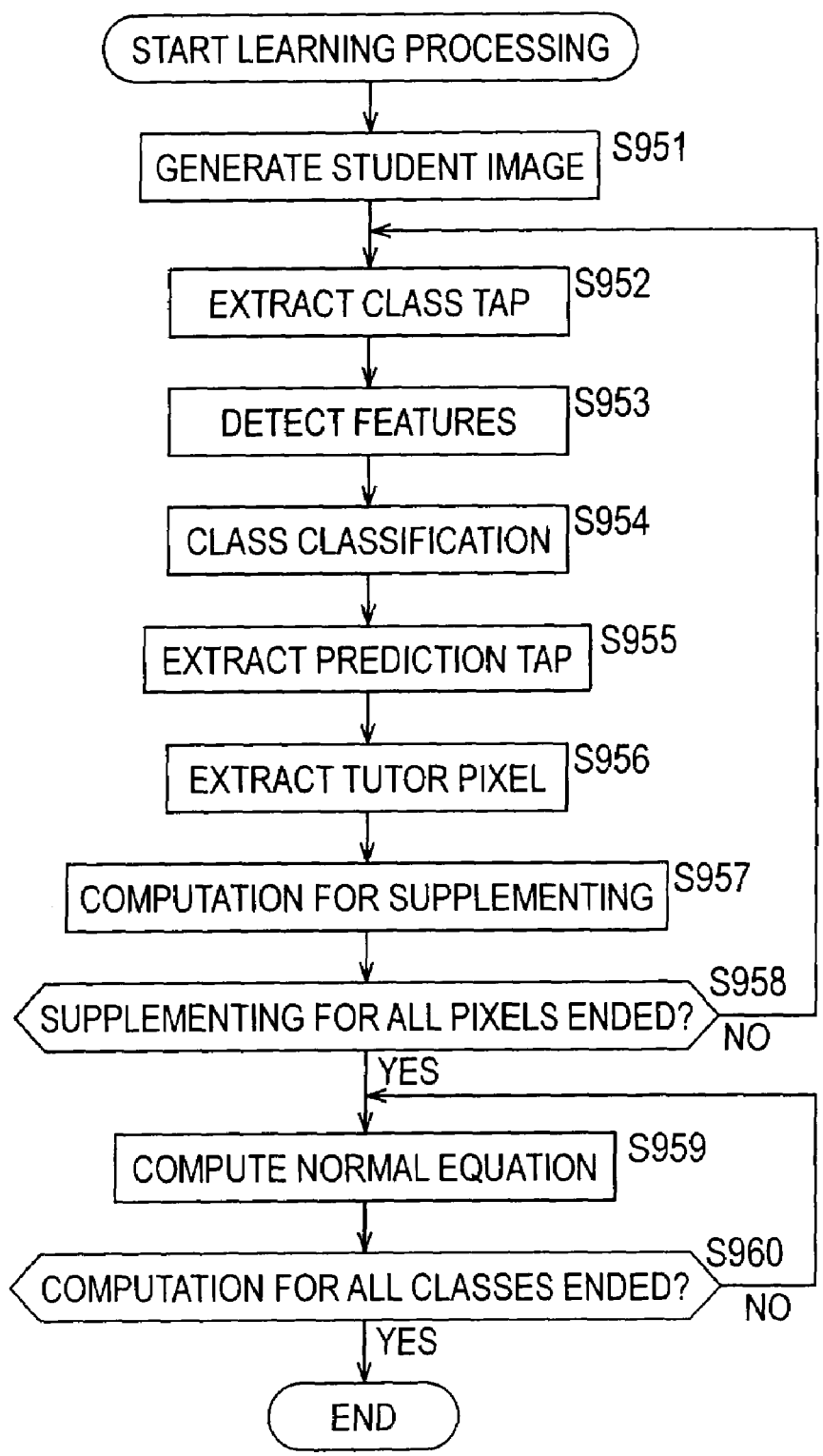

FIG. 131 is a flowchart for describing learning processing.

Figure 132:
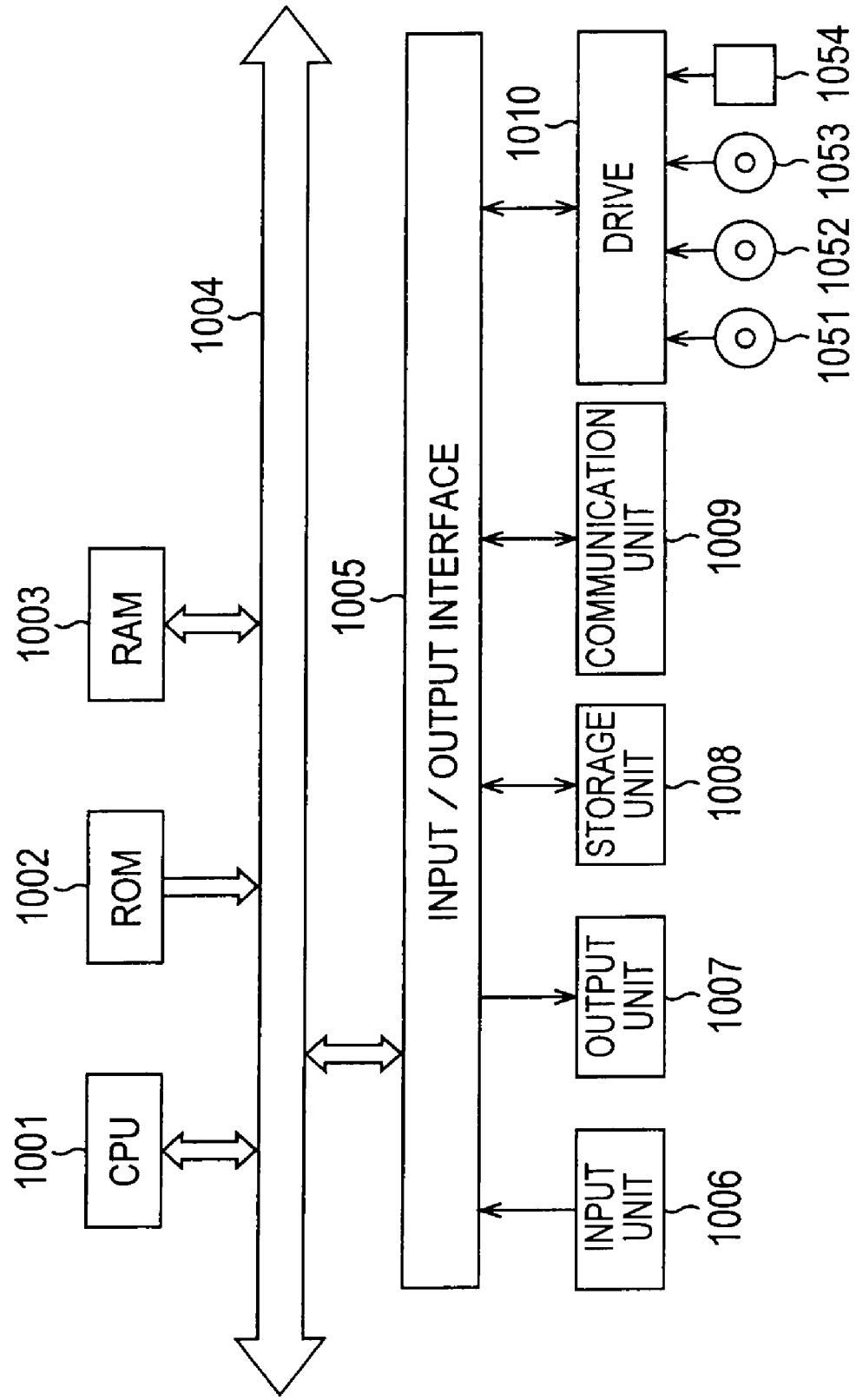

FIG. 132 is a block diagram illustrating an example of the configuration of a personal computer.

BEST MODE FOR CARRYING OUT THE INVENTION

Figure 1:
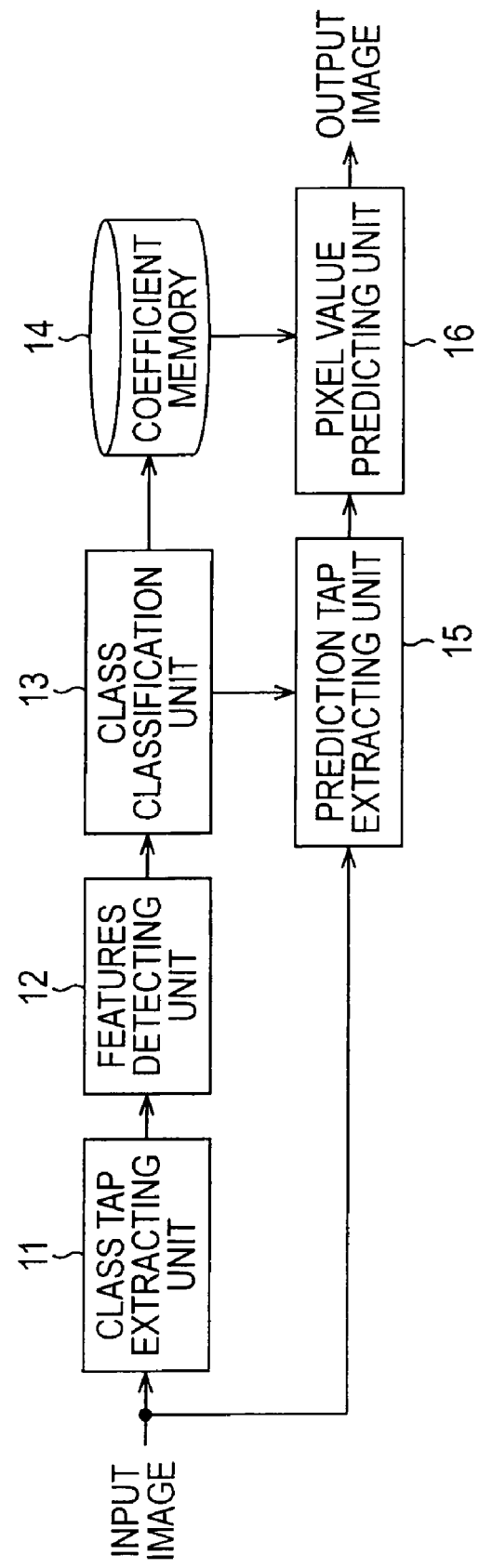
FIG. 1 is a block diagram for describing the configuration of a conventional image processing device.
Figure 2:
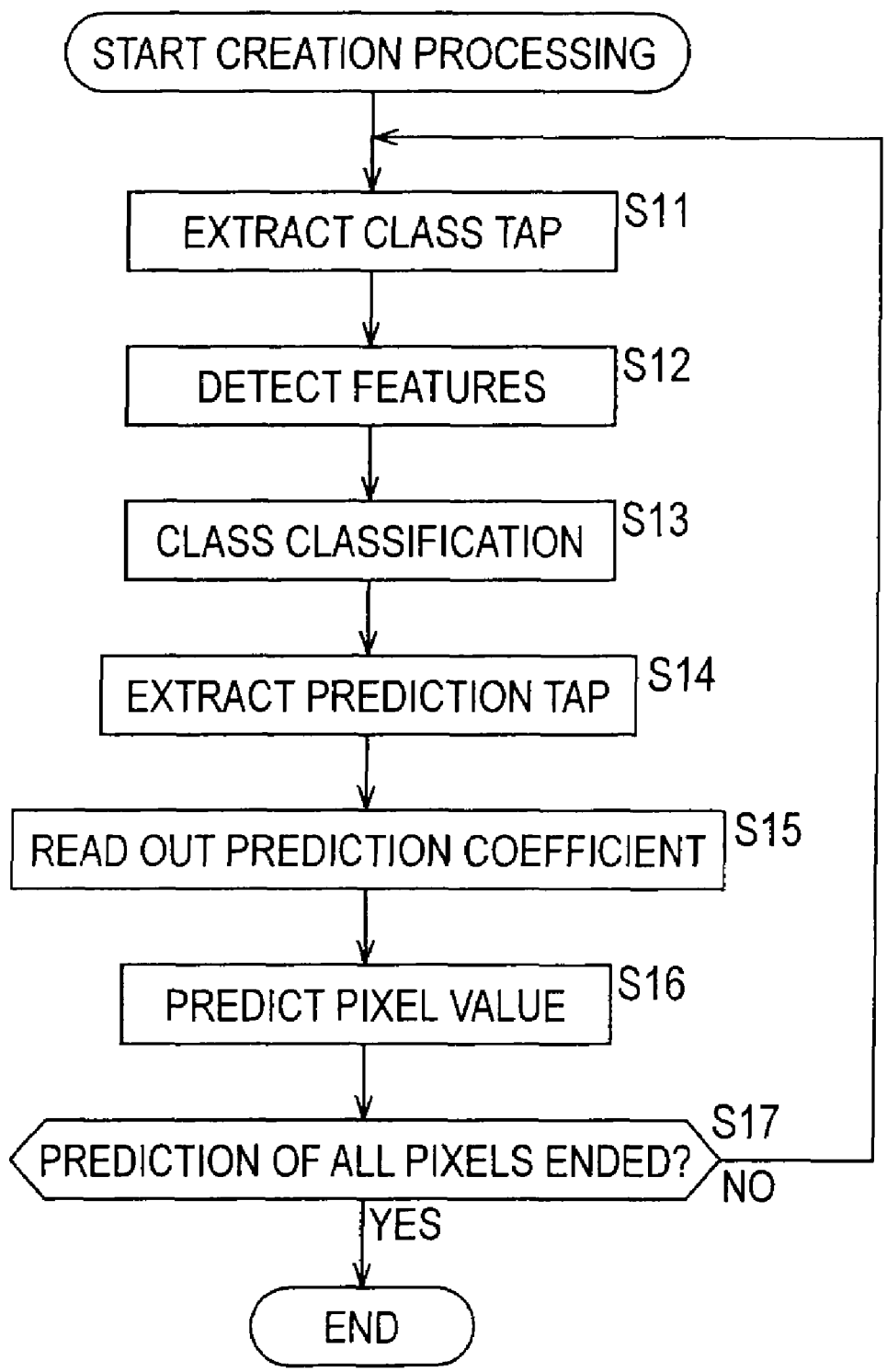
FIG. 2 is a flowchart for describing conventional image creation processing.
Figure 3:
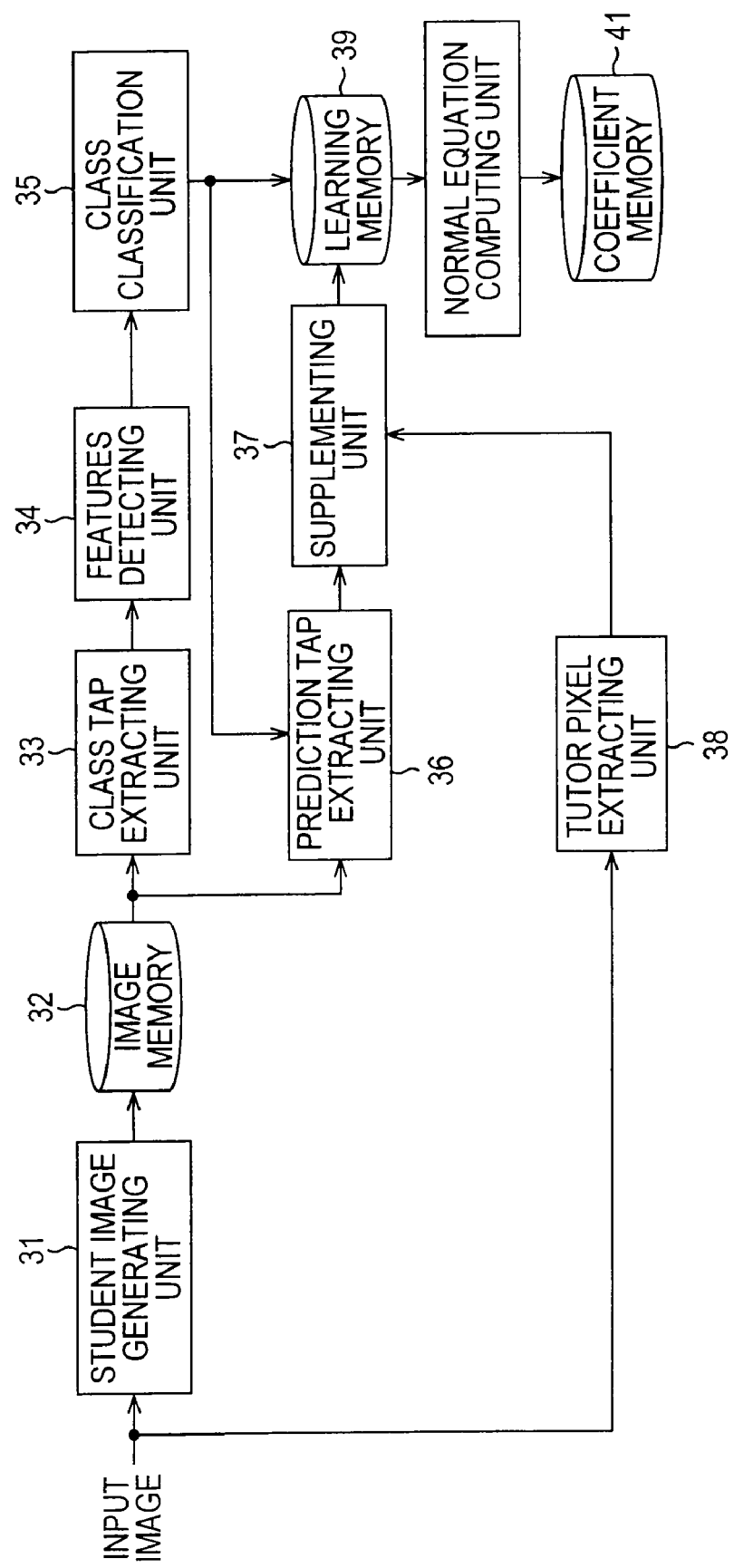
FIG. 3 is a block diagram describing the configuration of a conventional image processing device for generating prediction coefficients.
Figure 4:
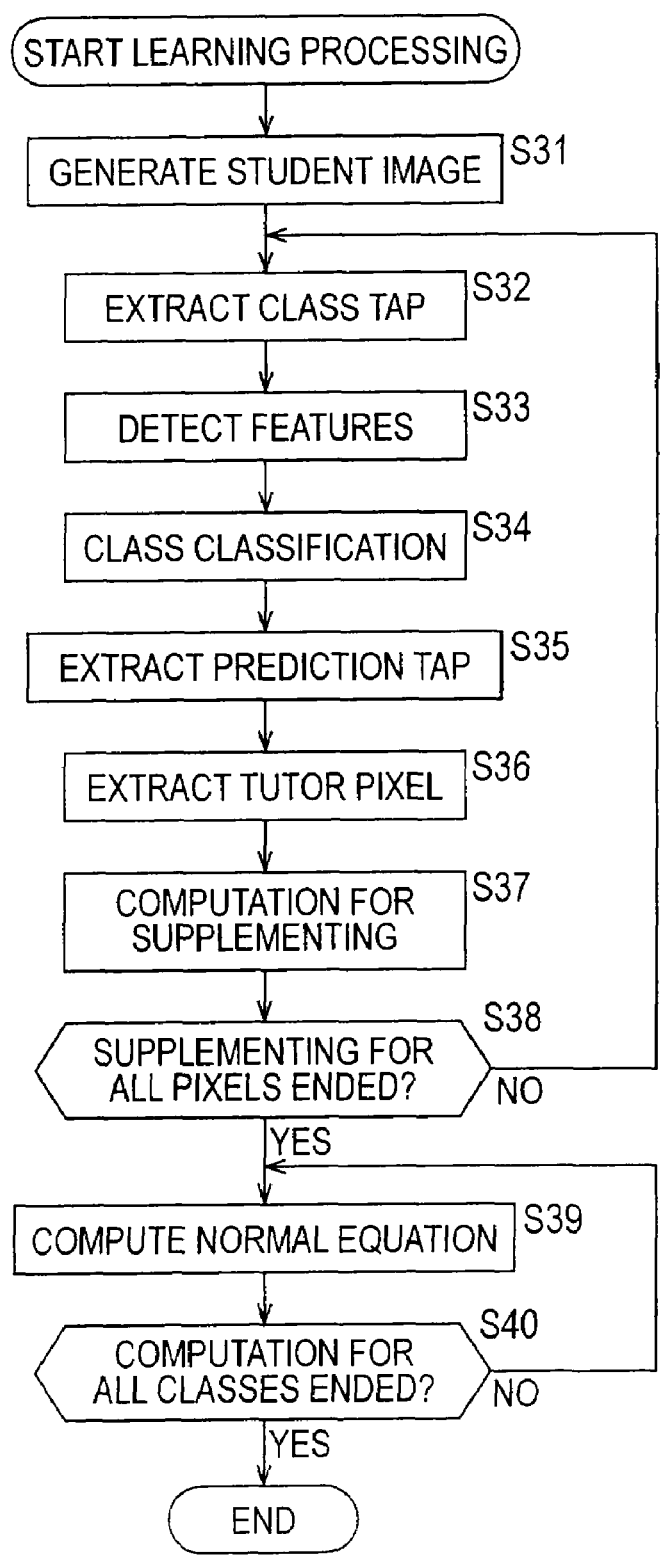
FIG. 4 is a flowchart for describing conventional learning processing.
Figure 5:
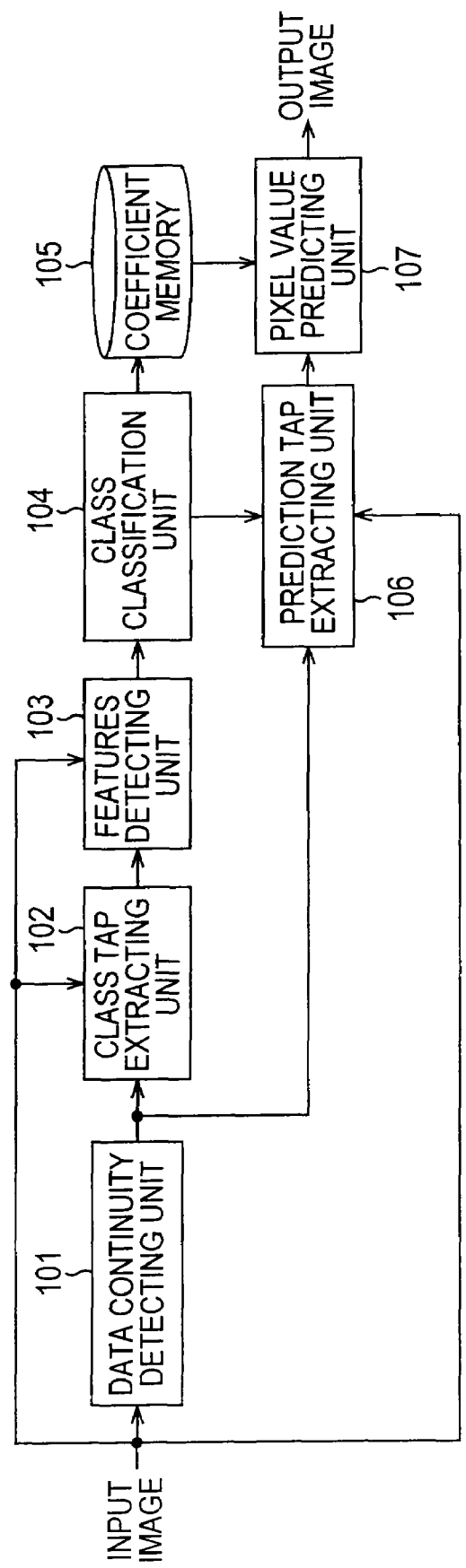
FIG. 5 is a block diagram illustrating the configuration of an embodiment of the image processing device according to the present invention.

FIG. 5 is a block diagram illustrating the configuration of an embodiment of the image processing device according to the present invention. The image processing device of which the configuration is shown in FIG. 5 acquires an input image, and creates and outputs an image with twice the resolution in the horizontal direction of the screen and twice in the vertical direction, as to the input image which has been input.

With the image processing device shown in FIG. 5, for example, an SD image which is an example of an input image is input, data continuity is detected from the input SD image, and class classification adaptation processing is performed on the SD image, based on the detected data continuity, thereby creating an HD image. Data continuity will be described later.

That is to say, this image processing device comprises a data continuity detecting unit 101, a class tap extracting unit 102, a features detecting unit 103, a class classification unit 104, coefficient memory 105, a prediction tap extracting unit 106, and a pixel value prediction unit 107.

The input image to be subjected to spatial resolution creation, input to the image processing device, is supplied to the data continuity detecting unit 101, class tap extracting unit 102, features detecting unit 103, and prediction tap extracting unit 106.

The data continuity detecting unit 101 detects data continuity from the input image, and supplies data continuity information indicating the detected continuity to the class tap extracting unit 102 and prediction tap extracting unit 106. The data continuity information includes the direction (time direction and spatial direction angle or gradient) of a pixel region having data continuity, for example (hereafter also called data continuity direction). The details of the configuration of the data continuity detecting unit 101 will be described later.

The class tap extracting unit 102 sequentially takes one of HD pixels of the HD image which is to be obtained by class classification adaptation processing, as a pixel of interest. The class tap extracting unit 102 extracts multiple perimeter pixels of the input image corresponding to the pixel of interest, based on the data continuity detected by the data continuity detecting unit 101, and takes the extracted multiple perimeter pixels of the input image as a class tap. That is to say, the class tap extracting unit 102 extracts a class tap to be used for class classification of the pixel of interest from the input image, based on the data continuity detected by the data continuity detecting unit 101, and outputs the extracted class tap to the features detecting unit 103.

For example, the class tap extracting unit 102 takes as a class tap multiple pixels at positions close to the position of the pixel of interest, which are extracted from the input image, either spatially or temporally, based on the data continuity, and outputs to the features detecting unit 103.

Note that the data continuity detecting unit 101, class tap extracting unit 102, and prediction tap extracting unit 106 each have unshown frame memory upstream of the interiors thereof, so as to temporarily store the SD image input to the image processing device in increments of frames (or fields), for example. With the present embodiment, the data continuity detecting unit 101, class tap extracting unit 102, and prediction tap extracting unit 106 can store multiple frames of input images in the built-in frame memory, by bank switching, and accordingly, real-time processing can be performed even for cases wherein the input image input to the image processing device is a moving image.

In this case, each of the data continuity detecting unit 101, class tap extracting unit 102, and prediction tap extracting unit 106, can immediately read out a requested frame, due to frame memory being provided to each of the data continuity detecting unit 101, class tap extracting unit 102, and prediction tap extracting unit 106, and accordingly processing can be performed at higher speed.

Also, an arrangement of the image processing device may be made wherein a single frame memory is provided on the input side, with multiple frames of input images being stored by bank switching, and the stored input images being supplied to the data continuity detecting unit 101, class tap extracting unit 102, and prediction tap extracting unit 106. In this case, a single frame memory is sufficient, and the image processing device can be made to have a simpler configuration.

For example, the class tap extracting unit 102 extracts, from an input image, 3×3 pixels, horizontally×vertically, closest to the position of the pixel of interest, thereby taking a class tap with regard to the pixel of interest, based on the data continuity detected by the data continuity detecting unit 101.

Thus, the class tap extracting unit 102 supplies the extracted class tap to the features detecting unit 103.

The features detecting unit 103 detects features from the class tap or the input image, and supplies the detected features to the class classification unit 104.

For example, the features detecting unit 103 detects a movement vector of pixels of the input image, based on the class tap or the input image, and supplies the detected movement vector to the class classification unit 104 as features. Also, for example, the features detecting unit 103 detects spatial or temporal change (activity) of pixel values of multiple pixels of the class tap or input image based on the class tap of the input image, and supplies the detected change in pixel values to the class classification unit 104 as features.

Further, for example, the features detecting unit 103 detects the gradient of temporal change in pixel values of multiple pixels of the class tap or the input image, based on the class tap or the input image, and supplies the detected gradient of temporal change in pixel values to the class classification unit 104 as features.

Note that the Laplacian, Sobel, dispersion, etc., for the pixel values, can be used as features.

The features detecting unit 103 supplies the class tap to the class classification unit 104, separate from the features.

The class classification unit 104 performs class classification of the pixel of interest to one class of one or more classes, based on the features or class tap from the features detecting unit 103, and supplies the resulting class code corresponding to the pixel of interest to the coefficient memory 105 and the prediction tap extracting unit 106. For example, the class classification unit 104 subjects the class tap from the class tap extracting unit 102 to 1-bit ADRC (Adaptive Dynamic Range Coding), and takes the resulting ADRC code as the class code.

Note that in K-bit ADRC processing, the maximal value MAX and the minimal value MIN of the pixel values of the input image making up the class tap are detected, DR=MAX−MIN is taken as a local dynamic range, and the pixel values making up the class tap are re-quantized into K bits, based on this dynamic range DR. That is to say, the minimal value MIN is subtracted from each of the pixel values making up the class tap, and the subtraction values are divided by $DR/2^K$ (quantization). Accordingly, in the event that the class tap is subjected to 1-bit ADRC processing, each pixel value making up the class tap is made to be 1 bit. In this case, a bit stream obtained by arraying the 1-bit values for each of the pixel values making up the class tap, obtained as described above, in a predetermined order, is output as ADRC code.

Note, however, that class classification can also be performed by taking pixel values making up a class tap as vector components, for example, and performing vector quantization of the vector, and so forth. Also, single-class class classification can be performed for class classification. In this case, the class classification unit 104 outputs a fixed class code regardless of the class tap supplied thereto.

Also, the class classification unit 104 takes the features from the features detecting unit 103 as class code without any change, for example. Further, the class classification unit 104 performs orthogonal conversion of multiple features from the features detecting unit 103, for example, and takes the obtained value as the class code.

For example, the class classification unit 104 combines (synthesizes) a class code based on the class tap and a class tap based on features, so as to generate a final class code, and supplies the final class code to the coefficient memory 105 and the prediction tap extracting unit 106.

Note that an arrangement may be made wherein one of the class code based on the class tap and the class code based on features is taken as the final class code.

The coefficient memory 105 stores tap coefficients obtained by learning, for each of one or more classes, the relation between tutor data which is HD pixels of an HD image which is an example of an output image serving as a tutor for learning, and student data which is SD pixels of an SD image which is an example of an input image serving as a student for learning. Upon class code of the pixel of interest being supplied from the class classification unit 104, the coefficient memory 105 reads out the tap coefficient stored in the address corresponding to the class code, thereby obtaining the tap coefficient for the class of the pixel of interest, which is supplied to the pixel value predicting unit 107. Details regarding the learning method of the tap coefficients stored in the coefficient memory 105 will be described later.

The prediction tap extracting unit 106 extracts multiple perimeter pixels corresponding to the pixel of interest from the input image, based on the data continuity detected by the data continuity detecting unit 101, and takes the extracted multiple perimeter pixels of the input image as a prediction tap. That is to say, the prediction tap extracting unit 106 extracts, from the input image, a prediction tap used to obtain (the prediction value of) the pixel of interest at the pixel value predicting unit 107, based on the data continuity detected by the data continuity detecting unit 101 and the class code supplied from the class classification unit 104, and supplies the extracted prediction tap to the pixel value predicting unit 107.

For example, the prediction tap extracting unit 106 extracts, from the input image, multiple pixel values at positions spatially or temporally near the pixel of interest, based on the data continuity, so as to take these as a prediction tap, which are supplied to the pixel value predicting unit 107. For example, the prediction tap extracting unit 106 extracts, from an input image, 3×3 pixels, horizontally×vertically, closest to the position of the pixel of interest, thereby taking a prediction tap with regard to the pixel of interest, based on the data continuity detected by the data continuity detecting unit 101.

Note that the pixel values to be taken as the class tap and the pixel values to be taken as the prediction tap may be the same, or may differ. That is to say, the class tap and prediction tap can be each individually configured (generated). Also, the pixel values to be taken as the prediction tap may be different for each class, or the same.

Note that the configurations of the class tap and prediction tap are not restricted to 3×3 pixel values.

The pixel value predicting unit 107 performs a sum-of-products arithmetic operation shown in Expression (1) using the tap coefficients $w_1, w_2, \ldots$ regarding the class of the pixel of interest supplied from the coefficient memory 105, and (the pixel values making up) the prediction tap $x_1, x_2, \ldots$ from the prediction tap extracting unit 106, thereby predicting (the prediction value of) the pixel of interest y, which is taken as the pixel value of the HD image. The pixel value predicting unit 107 outputs an HD image made up of pixel values computed in this way, as an output image.

As described above, the image processing device of which the configuration is shown in FIG. 5 can create an output image with a higher resolution, corresponding to an input image that has been input, and output the created output image.

Figure 6:
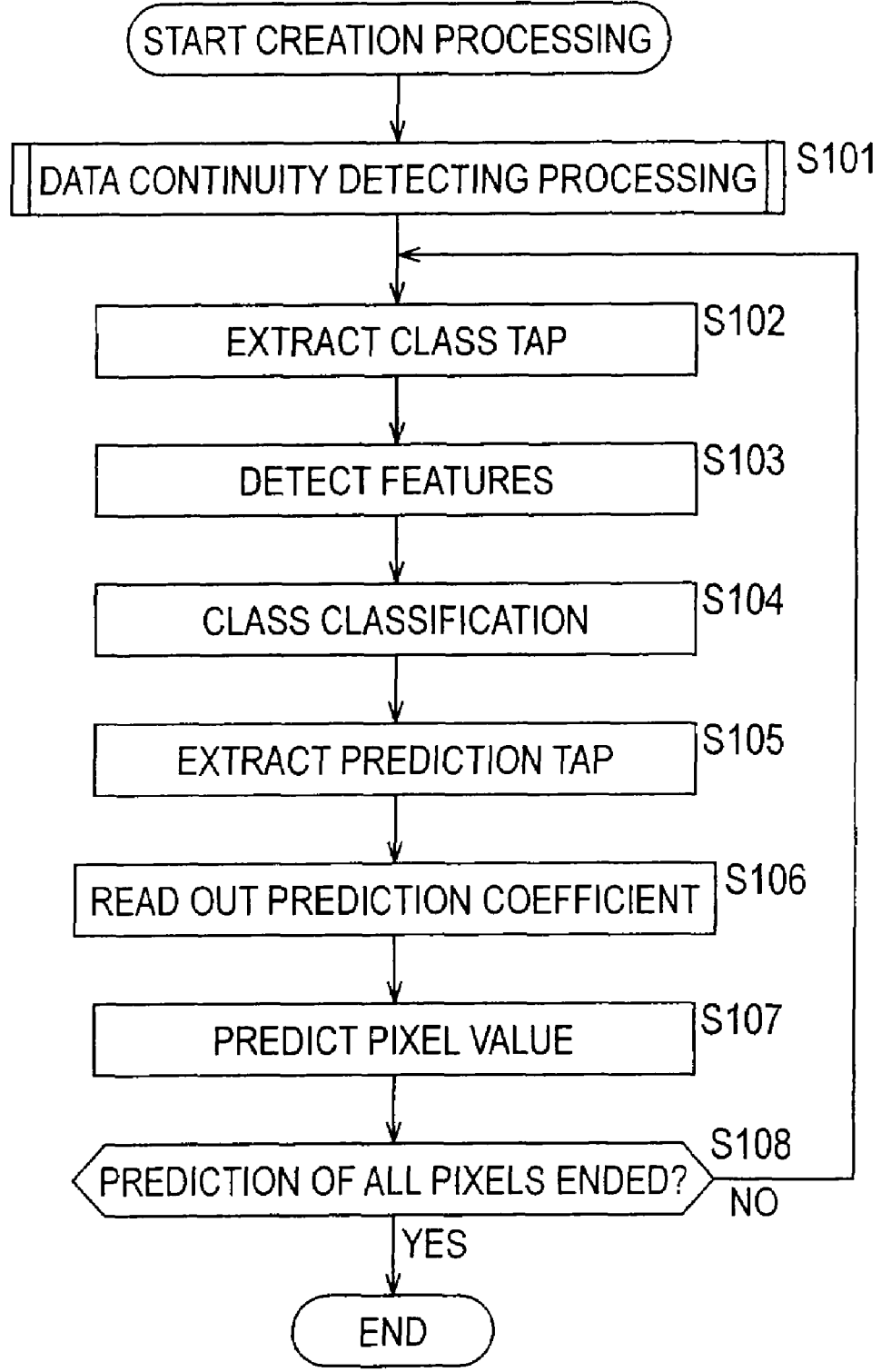
FIG. 6 is a flowchart for describing image creation processing for creating an output image with even higher resolution.

Next, the image creation processing for creating an output image with a higher resolution than the input image, which the image processing device in FIG. 5 performs, will be described with reference to the flowchart in FIG. 6.

In step S101 the data continuity detecting unit 101 performs continuity detecting processing. The data continuity detecting unit 101 detects the data continuity contained in the input image, and supplies data continuity information indicating the detected data continuity to the class tap extracting unit 102 and the prediction tap extracting unit 106. For example, the data continuity detecting unit 101 detects the direction of data continuity from the input image.

Now, data continuity, the configuration of the data continuity detecting unit 101, and data continuity extracting processing, will be described in detail.

First, description will be made regarding an input image serving as data projected by a sensor.

Events (phenomena) in an actual world having dimensions such as space, time, mass, and so forth, are acquired by a sensor 2, and formed into data. Events in the actual world refer to light (images), sound, pressure, temperature, mass, density, brightness/darkness, or acts, and so forth. The events in the actual world are distributed in the space-time directions. For example, an image of the actual world is a distribution of the intensity of light of the actual world in the space-time directions.

Taking note of the sensor, of the events in the actual world having the dimensions of space, time, and mass, the events in the actual world which the sensor can acquire, are converted into data by the sensor. It can be said that information indicating events in the actual world are acquired by the sensor.

That is to say, the sensor converts information indicating events in the actual world, into data. It can be said that signals which are information indicating the events (phenomena) in the actual world having dimensions such as space, time, and mass, are acquired by the sensor and formed into data.

Hereafter, the distribution of events such as images, sound, pressure, temperature, mass, density, rightness/darkness, or smells, and so forth, in the actual world, will be referred to as signals of the actual world, which are information indicating events. Also, signals which are information indicating events of the actual world will also be referred to simply as signals of the actual world. In the present Specification, signals are to be understood to include phenomena and events, and also include those wherein there is no intent on the transmitting side.

The data (detected signals) output from the sensor is information obtained by projecting the information indicating the events of the actual world on a space-time having a lower dimension than the actual world. For example, the data which is image data of a moving image, is information obtained by projecting an image of the three-dimensional space direction and time direction of the actual world on the time-space having the two-dimensional space direction and time direction. Also, in the event that the data is digital data for example, the data is rounded off according to the sampling increments. In the event that the data is analog data, information of the data is either compressed according to the dynamic range, or a part of the information has been deleted by a limiter or the like.

Thus, by projecting the signals which are information indicating events in the actual world having a predetermined number of dimensions onto data (detection signals), a part of the information indicating events in the actual world is dropped. That is to say, a part of the information indicating events in the actual world is dropped from the data which the sensor outputs.

However, even though a part of the information indicating events in the actual world is dropped due to projection, the data includes useful information for estimating the signals which are information indicating events (phenomena) in the actual world.

With the present invention, information having continuity contained in the data is used as useful information for estimating the signals which are information of the actual world. Continuity is a concept which is newly defined.

Taking note of the actual world, events in the actual world include characteristics which are constant in predetermined dimensional directions. For example, an object (corporeal object) in the actual world either has shape, pattern, color, or the like, that is continuous in the space direction or time direction, or has repeated patterns of shape, pattern, color, or the like.

Accordingly, the information indicating the events in actual world includes characteristics constant in a predetermined dimensional direction.

With a more specific example, a linear object such as a string, cord, or rope, has a characteristic which is constant in the length-wise direction, i.e., the spatial direction, that the cross-sectional shape is the same at arbitrary positions in the length-wise direction. The constant characteristic in the spatial direction that the cross-sectional shape is the same at arbitrary positions in the length-wise direction comes from the characteristic that the linear object is long.

Accordingly, an image of the linear object has a characteristic which is constant in the length-wise direction, i.e., the spatial direction, that the cross-sectional shape is the same, at arbitrary positions in the length-wise direction.

Also, a monotone object, which is a corporeal object, having an expanse in the spatial direction, can be said to have a constant characteristic of having the same color in the spatial direction regardless of the part thereof.

In the same way, an image of a monotone object, which is a corporeal object, having an expanse in the spatial direction, can be said to have a constant characteristic of having the same color in the spatial direction regardless of the part thereof.

In this way, events in the actual world (real world) have characteristics which are constant in predetermined dimensional directions, so signals of the actual world have characteristics which are constant in predetermined dimensional directions In the present Specification, such characteristics which are constant in predetermined dimensional directions will be called continuity. Continuity of the signals of the actual world (real world) means the characteristics which are constant in predetermined dimensional directions which the signals indicating the events of the actual world (real world) have.

Countless such continuities exist in the actual world (real world).

Next, taking note of the data, the data is obtained by signals which are information indicating events of the actual world having predetermined dimensions being projected by the sensor, and includes continuity corresponding to the continuity of signals in the real world. It can be said that the data includes continuity wherein the continuity of actual world signals has been projected.

However, as described above, in the data output from the sensor, a part of the information of the actual world has been lost, so a part of the continuity contained in the signals of the actual world (real world) is lost.

In other words, the data contains a part of the continuity within the continuity of the signals of the actual world (real world) as data continuity. Data continuity means characteristics which are constant in predetermined dimensional directions, which the data has.

With the present invention, the data continuity which the data has is used as significant data for estimating signals which are information indicating events of the actual world.

Now, with the present invention, of the length (space), time, and mass, which are dimensions of signals serving as information indicating events in the actual world, continuity in the spatial direction or time direction, are used.

Next, the space-time integration of images will be described with reference to FIG. 7 through FIG. 10.

An image sensor images a subject (object) in the real world, and outputs the obtained image data as a result of imagining in increments of single frames. That is to say, the image sensor acquires signals of the actual world which is light reflected off of the subject of the actual world, and outputs the data.

For example, the image sensor outputs image data of 30 frames per second. In this case, the exposure time of the image sensor can be made to be 1/30 seconds. The exposure time is the time from the image sensor starting conversion of incident light into electric charge, to ending of the conversion of incident light into electric charge. Hereafter, the exposure time will also be called shutter time.

Figure 7:
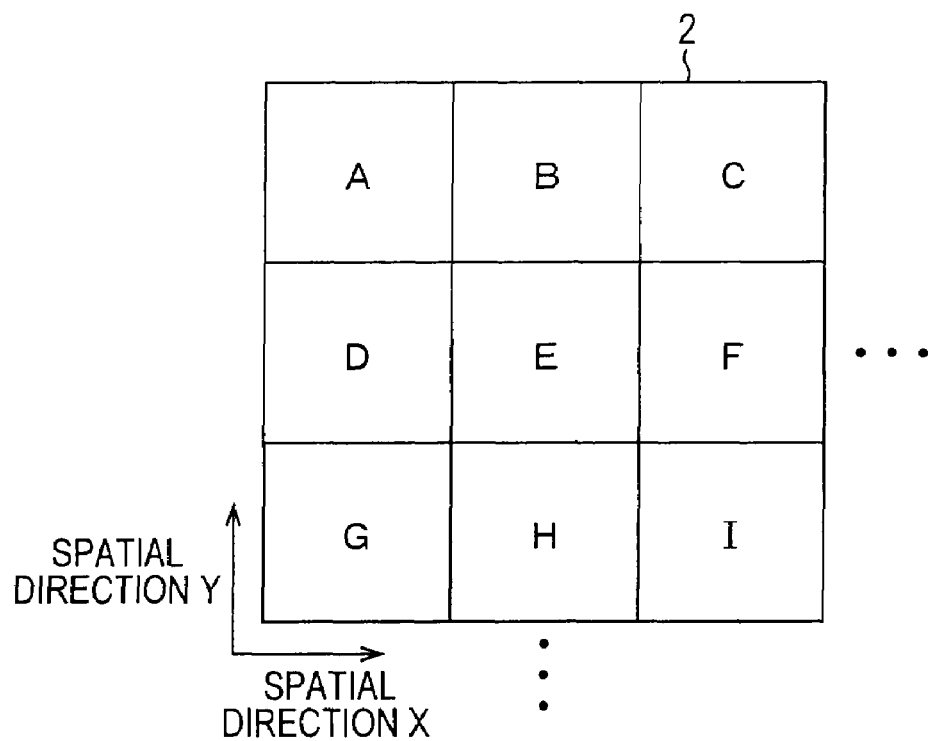
FIG. 7 is a diagram describing an example of the placement of pixels on an image sensor.

FIG. 7 is a diagram describing an example of a pixel array on the image sensor such as a CCD (Charge Coupled Device) of CMOS (Complementary Metal-Oxide Semiconductor) sensor. In FIG. 7, A through I denote individual pixels. The pixels are placed on a plane corresponding to the image displayed by the image data. A single detecting element corresponding to a single pixel is placed on the image sensor. At the time of the image sensor taking images of the actual world, the one detecting element outputs one pixel value corresponding to the one pixel making up the image data. For example, the position in the spatial direction X (X coordinate) of the detecting element corresponds to the horizontal position on the image displayed by the image data, and the position in the spatial direction Y (Y coordinate) of the detecting element corresponds to the vertical position on the image displayed by the image data.

Distribution of intensity of light of the actual world has expanse in the three-dimensional spatial directions and the time direction, but the image sensor acquires light of the actual world in two-dimensional spatial directions and the time direction, and generates data representing the distribution of intensity of light in the two-dimensional spatial directions and the time direction.

Figure 8:
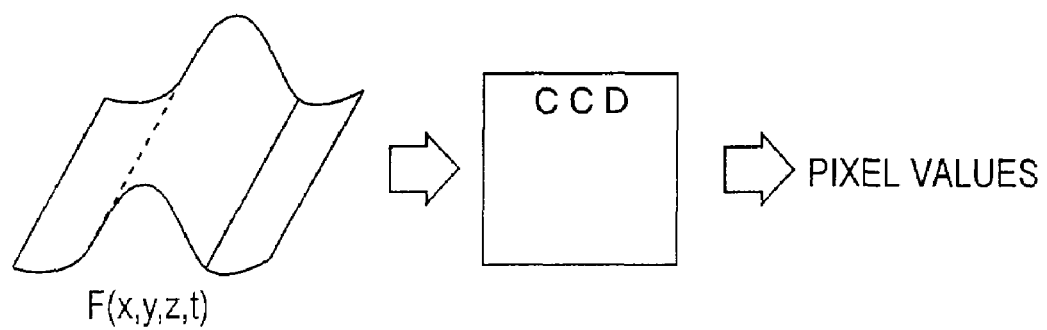
FIG. 8 is a diagram for describing the operations of a detecting device which is a CCD.

As shown in FIG. 8, the detecting device which is a CCD for example, converts light cast onto the photoreception face (photoreception region) (detecting region) into electric charge during a period corresponding to the shutter time, and accumulates the converted charge. The light is information (signals) of the actual world regarding which the intensity is determined by the three-dimensional spatial position and point-in-time. The distribution of intensity of light of the actual world can be represented by a function F(x, y, z, t), wherein position x, y, z, in three-dimensional space, and point-in-time t, are variables.

The amount of charge accumulated in the detecting device which is a CCD is approximately proportionate to the intensity of the light cast onto the entire photoreception face having two-dimensional spatial expanse, and the amount of time that light is cast thereupon. The detecting device adds the charge converted from the light cast onto the entire photoreception face, to the charge already accumulated during a period corresponding to the shutter time. That is to say, the detecting device integrates the light cast onto the entire photoreception face having a two-dimensional spatial expanse, and accumulates a change of an amount corresponding to the integrated light during a period corresponding to the shutter time. The detecting device can also be said to have an integration effect regarding space (photoreception face) and time (shutter time).

The charge accumulated in the detecting device is converted into a voltage value by an unshown circuit, the voltage value is further converted into a pixel value such as digital data or the like, and is output as data. Accordingly, the individual pixel values output from the image sensor have a value projected on one-dimensional space, which is the result of integrating the portion of the information (signals) of the actual world having time-space expanse with regard to the time direction of the shutter time and the spatial direction of the photoreception face of the detecting device.

That is to say, the pixel value of one pixel is represented as the integration of F(x, y, t). F(x, y, t) is a function representing the distribution of light intensity on the photoreception face of the detecting device. For example, the pixel value P is represented by Expression (9).

$$P = \int_{t_1}^{t_2} \int_{y_1}^{y_2} \int_{x_1}^{x_2} F(x, y, t) \, dx \, dy \, dt \tag{9}$$

In Expression (9), $x_1$ represents the spatial coordinate at the left-side boundary of the photoreception face of the detecting device (X coordinate). $x_2$ represents the spatial coordinate at the right-side boundary of the photoreception face of the detecting device (X coordinate). In Expression (9), $y_1$ represents the spatial coordinate at the top-side boundary of the photoreception face of the detecting device (Y coordinate). $y_2$ represents the spatial coordinate at the bottom-side boundary of the photoreception face of the detecting device (Y coordinate). Also, $t_1$ represents the point-in-time at which conversion of incident light into an electric charge was started. $t_2$ represents the point-in-time at which conversion of incident light into an electric charge was ended.

Note that actually, the gain of the pixel values of the image data output from the image sensor is corrected for the overall frame.

Each of the pixel values of the image data are integration values of the light cast on the photoreception face of each of the detecting elements of the image sensor, and of the light cast onto the image sensor, waveforms of light of the actual world finer than the photoreception face of the detecting element are hidden in the pixel value as integrated values.

Hereafter, in the present Specification, the waveform of signals represented with a predetermined dimension as a reference may be referred to simply as waveforms.

Thus, the image of the actual world is integrated in the spatial direction and time direction in increments of pixels, so a part of the continuity of the image of the actual world drops out from the image data, so only another part of the continuity of the image of the actual world is left in the image data. Or, there may be cases wherein continuity which has changed from the continuity of the image of the actual world is included in the image data.

Further description will be made regarding the integration effect in the spatial direction for an image taken by an image sensor having integration effects.

Figure 9:
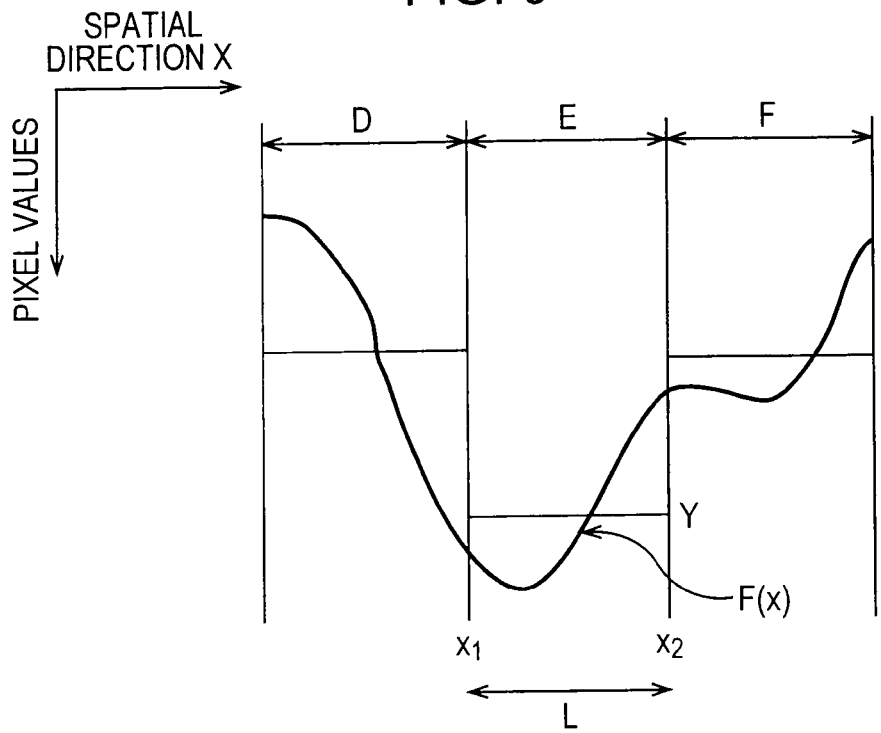
FIG. 9 is a diagram for describing the relationship between light cast into detecting elements corresponding to pixel D through pixel F, and pixel values.

FIG. 9 is a diagram describing the relationship between incident light to the detecting elements corresponding to the pixel D through pixel F, and the pixel values. F(x) in FIG. 9 is an example of a function representing the distribution of light intensity of the actual world, having the coordinate x in the spatial direction X in space (on the detecting device) as a variable. In other words, F(x) is an example of a function representing the distribution of light intensity of the actual world, with the spatial direction Y and time direction constant. In FIG. 9, L indicates the length in the spatial direction X of the photoreception face of the detecting device corresponding to the pixel D through pixel F.

The pixel value of a single pixel is represented as the integral of F(x). For example, the pixel value P of the pixel E is represented by Expression (10).

$$P = \int_{x_1}^{x_2} F(x) \, dx \tag{10}$$

In the Expression (10), $x_1$ represents the spatial coordinate in the spatial direction X at the left-side boundary of the photoreception face of the detecting device corresponding to the pixel E. $x_2$ represents the spatial coordinate in the spatial direction X at the right-side boundary of the photoreception face of the detecting device corresponding to the pixel E.

In the same way, further description will be made regarding the integration effect in the time direction for an image taken by an image sensor having integration effects.

Figure 10:
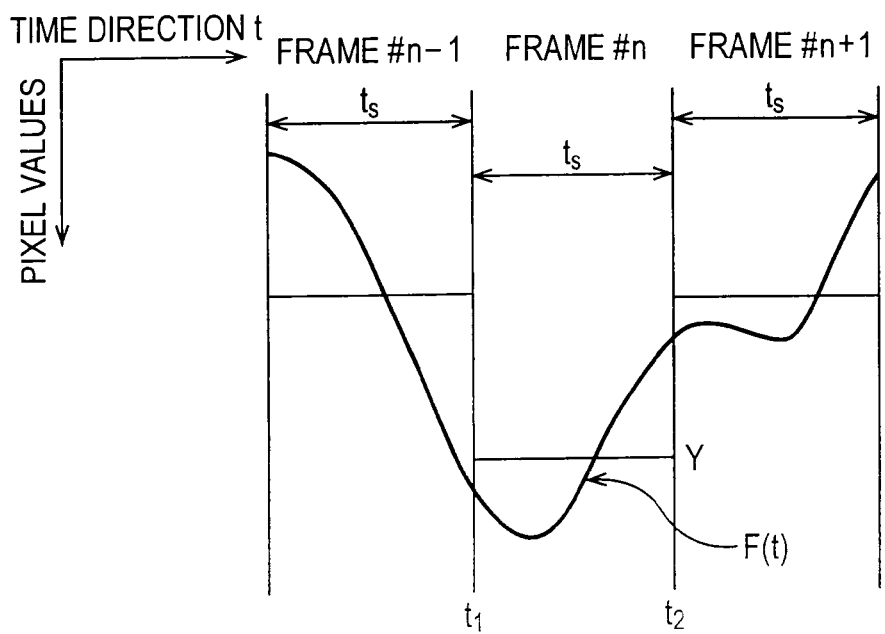
FIG. 10 is a diagram for describing the relationship between the passage of time, light cast into a detecting element corresponding to one pixel, and pixel values.

FIG. 10 is a diagram for describing the relationship between time elapsed, the incident light to a detecting element corresponding to a single pixel, and the pixel value. F(t) in FIG. 10 is a function representing the distribution of light intensity of the actual world, having the point-in-time t as a variable. In other words, F(t) is an example of a function representing the distribution of light intensity of the actual world, with the spatial direction Y and the spatial direction X constant. $T_s$ represents the shutter time.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

Note that in the example shown in FIG. 10, the shutter time $t_s$ and the frame intervals are the same.

The pixel value of a single pixel is represented as the integral of F(x). For example, the pixel value P of the pixel of frame #n for example, is represented by Expression (11).

$$P = \int_{t_1}^{t_2} F(t) dx \quad (11)$$

In the Expression (11), $t_1$ represents the time at which conversion of incident light into an electric charge was started. $t_2$ represents the time at which conversion of incident light into an electric charge was ended.

Hereafter, the integration effect in the spatial direction by the sensor will be referred to simply as spatial integration effect, and the integration effect in the time direction by the sensor also will be referred to simply as time integration effect. Also, space integration effects or time integration effects will be simply called integration effects.

Next, description will be made regarding an example of continuity of data included in the data acquired by the image sensor having integration effects.

Figure 11:
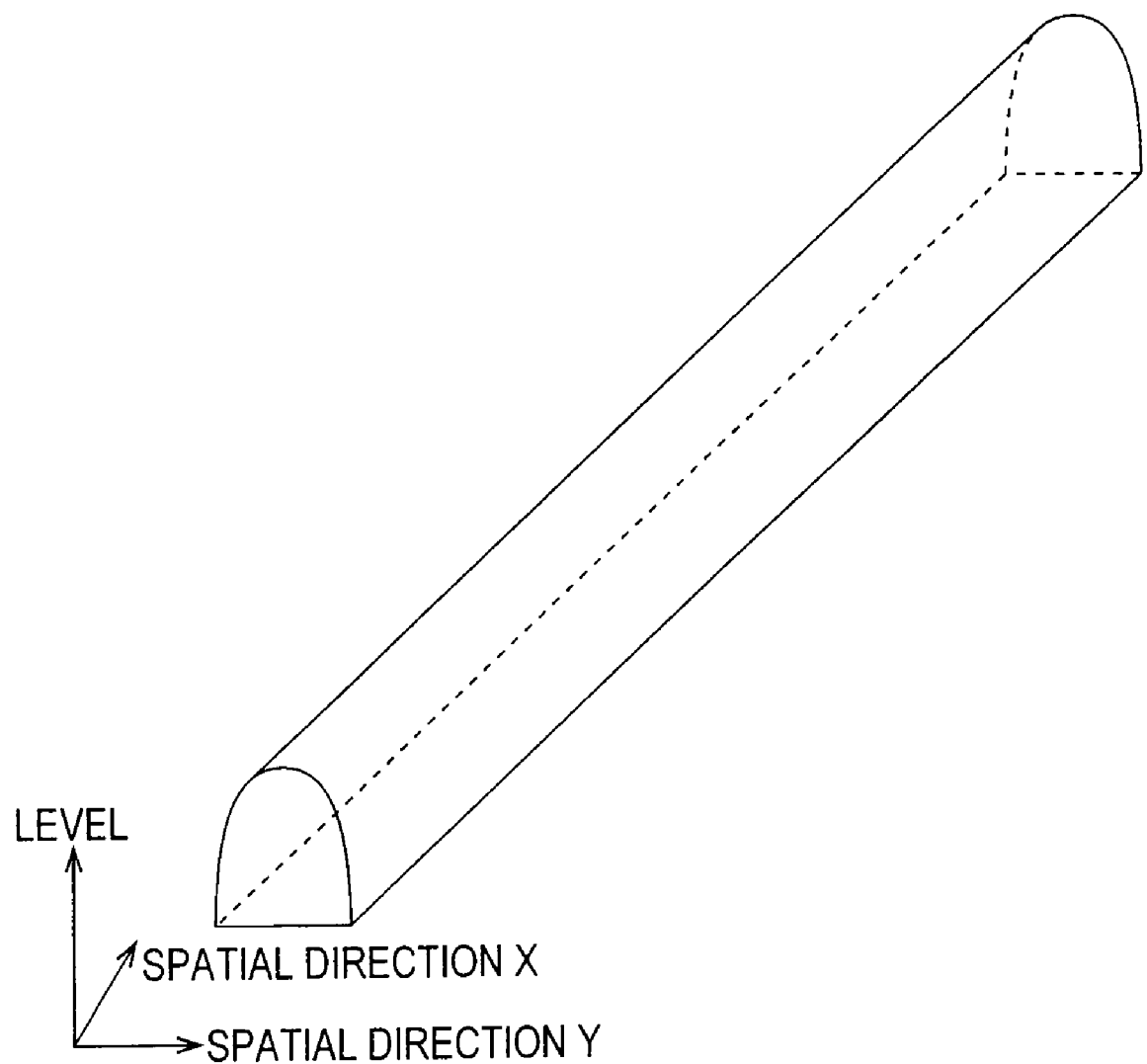
FIG. 11 is a diagram illustrating an example of an image of a linear-shaped object in the actual world.

FIG. 11 is a diagram illustrating a linear object of the actual world (e.g., a fine line), i.e., an example of distribution of light intensity. In FIG. 11, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the linear object of the actual world includes predetermined continuity. That is to say, the image shown in FIG. 11 has continuity in that the cross-sectional shape (the change in level as to the change in position in the direction orthogonal to the length direction), at any arbitrary position in the length direction.

Figure 12:
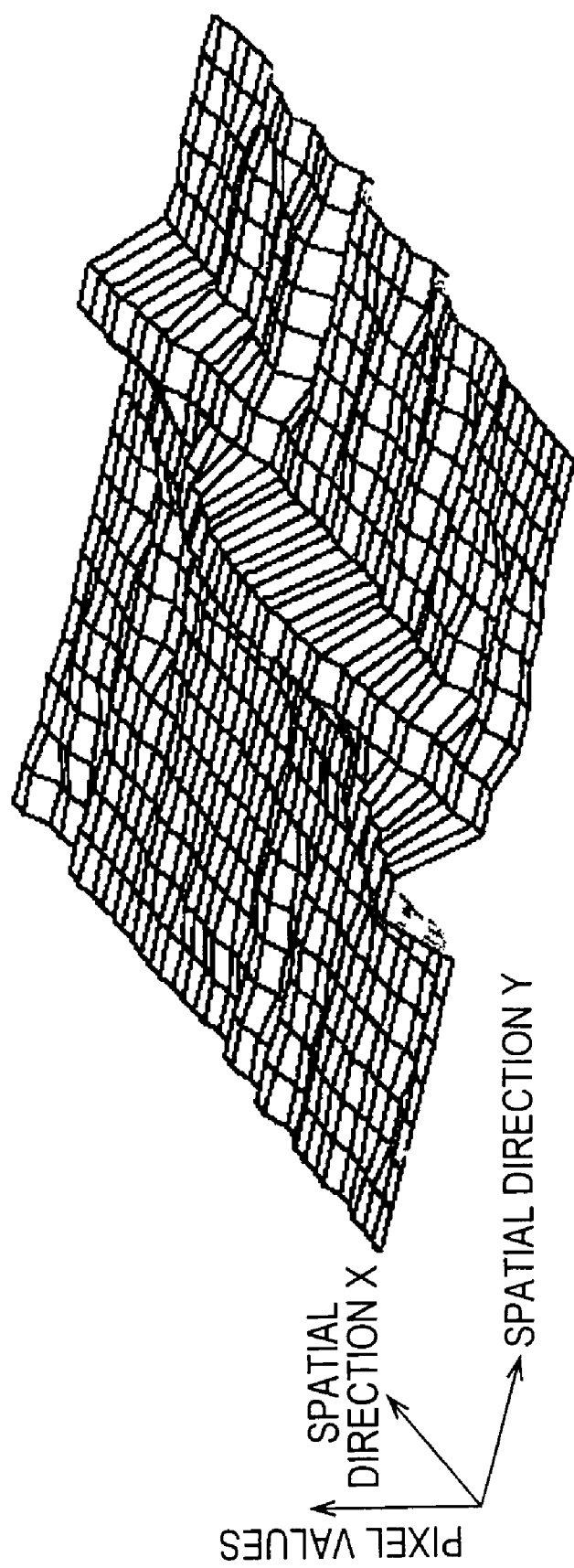
FIG. 12 is a diagram illustrating an example of pixel values of image data obtained by actual image-taking.

FIG. 12 is a diagram illustrating an example of pixel values of image data obtained by actual image-taking, corresponding to the image shown in FIG. 11.

Figure 13:
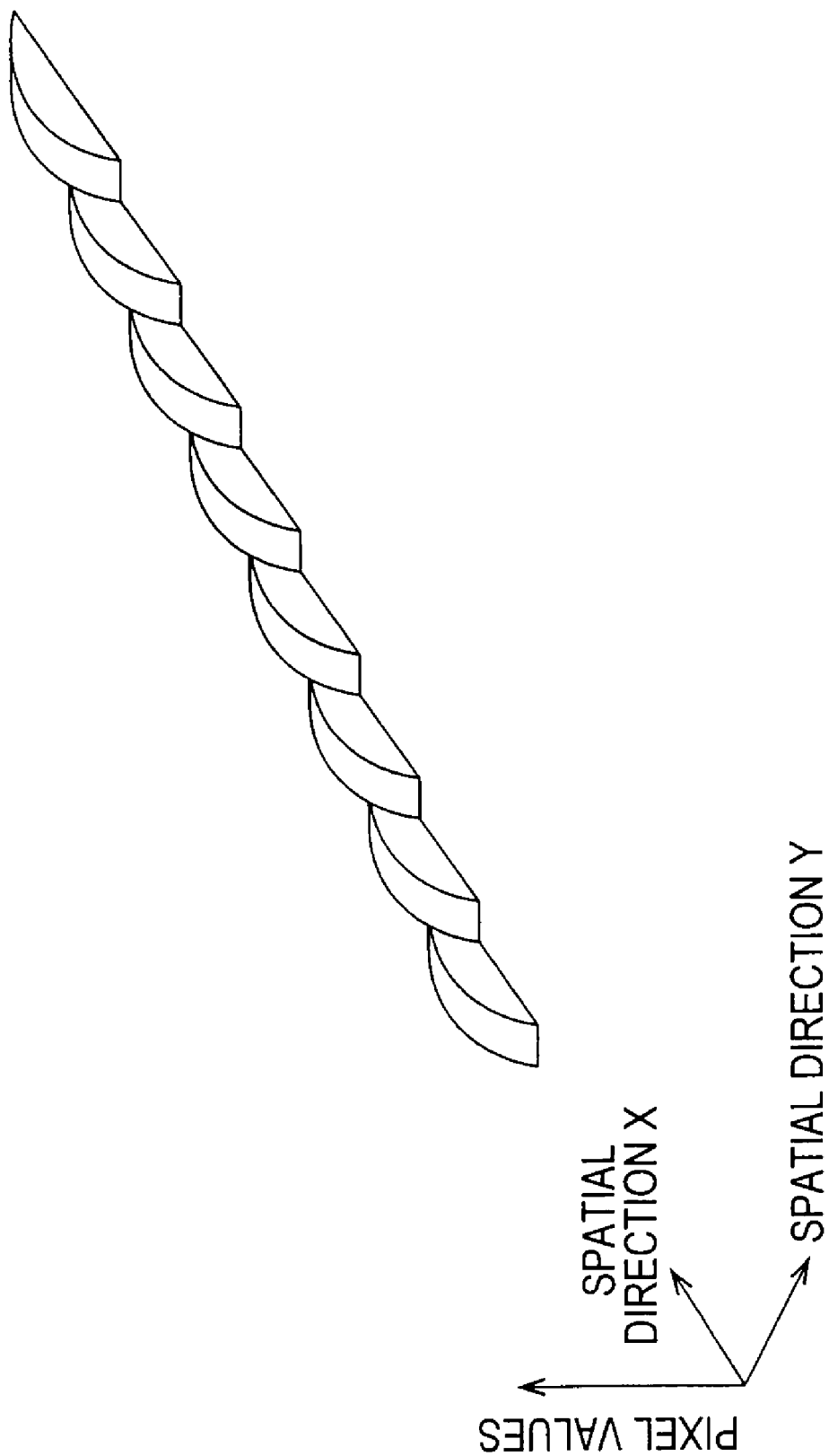
FIG. 13 is a schematic diagram of image data.

FIG. 13 is a model diagram of the image data shown in FIG. 12.

The model diagram shown in FIG. 13 is a model diagram of image data obtained by imaging, with the image sensor, an image of a linear object having a diameter shorter than the length L of the photoreception face of each pixel, and extending in a direction offset from the array of the pixels of the image sensor (the vertical or horizontal array of the pixels). The image cast into the image sensor at the time that the image data shown in FIG. 13 was acquired is an image of the linear object of the actual world shown in FIG. 11.

In FIG. 13, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 13 corresponds to the direction of level in FIG. 11, and the spatial direction X and spatial direction Y in FIG. 13 also are the same as the directions in FIG. 11.

In the event of taking an image of a linear object having a diameter narrower than the length L of the photoreception face of each pixel with the image sensor, the linear object is represented in the image data obtained as a result of the image-taking as multiple arc shapes (half-discs) having a predetermined length which are arrayed in a diagonally-offset fashion, in a model representation, for example. The arc shapes are of approximately the same shape. One arc shape is formed on one row of pixels vertically, or is formed on one row of pixels horizontally. For example, one arc shape shown in FIG. 13 is formed on one row of pixels vertically.

Thus, with the image data taken and obtained by the image sensor for example, the continuity in that the cross-sectional shape in the spatial direction Y at any arbitrary position in the length direction which the linear object image of the actual world had, is lost. Also, it can be said that the continuity, which the linear object image of the actual world had, has changed into continuity in that arc shapes of the same shape formed on one row of pixels vertically or formed on one row of pixels horizontally are arrayed at predetermined intervals.

Figure 14:
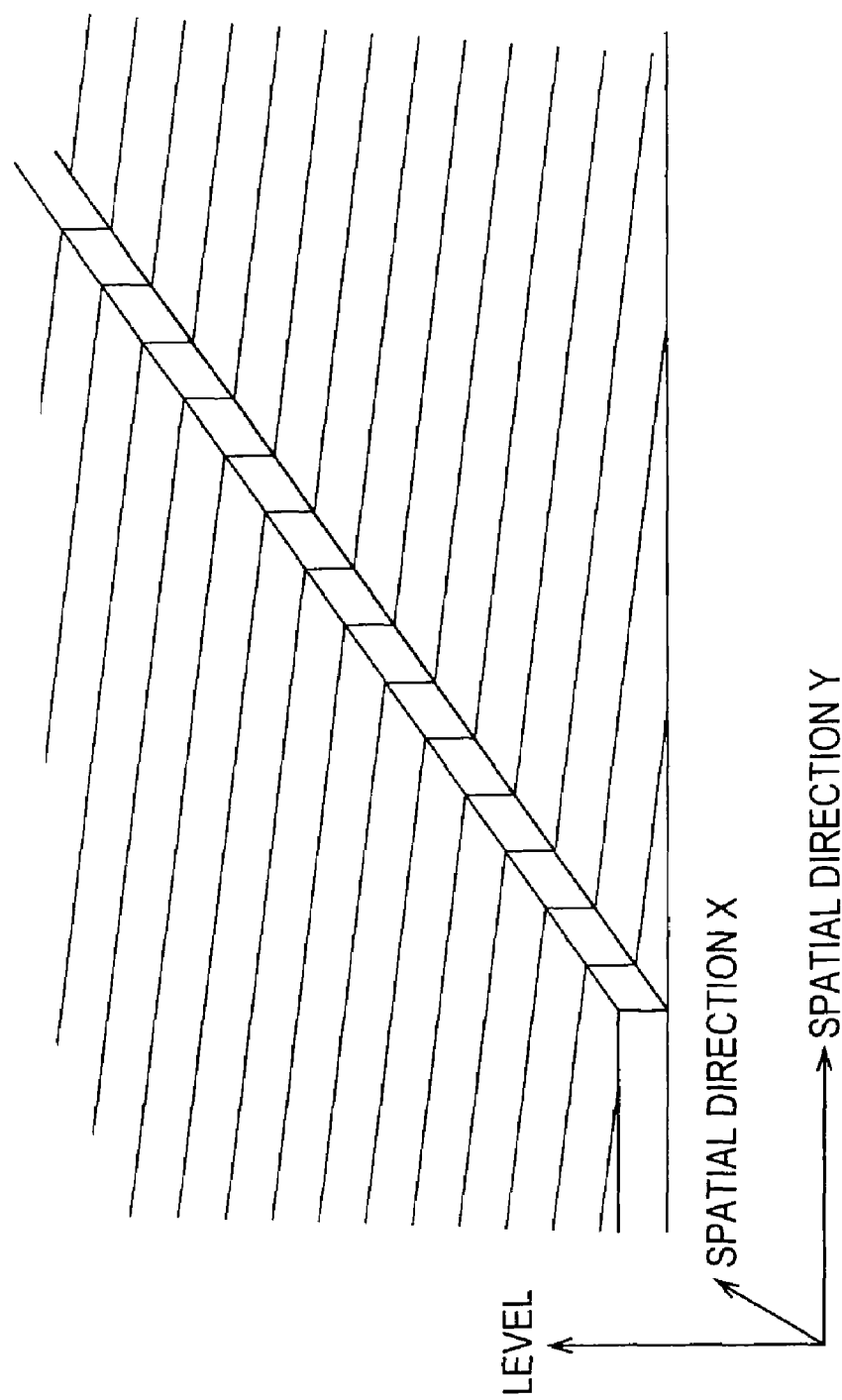
FIG. 14 is a diagram illustrating an example of an image of an actual world having a linear shape of a single color which is a different color from the background.

FIG. 14 is a diagram illustrating an image in the actual world of an object having a straight edge, and is of a monotone color different from that of the background, i.e., an example of distribution of light intensity. In FIG. 14, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the object of the actual world which has a straight edge and is of a monotone color different from that of the background, includes predetermined continuity. That is to say, the image shown in FIG. 14 has continuity in that the cross-sectional shape (the change in level as to the change in position in the direction orthogonal to the length direction) is the same at any arbitrary position in the length direction.

Figure 15:
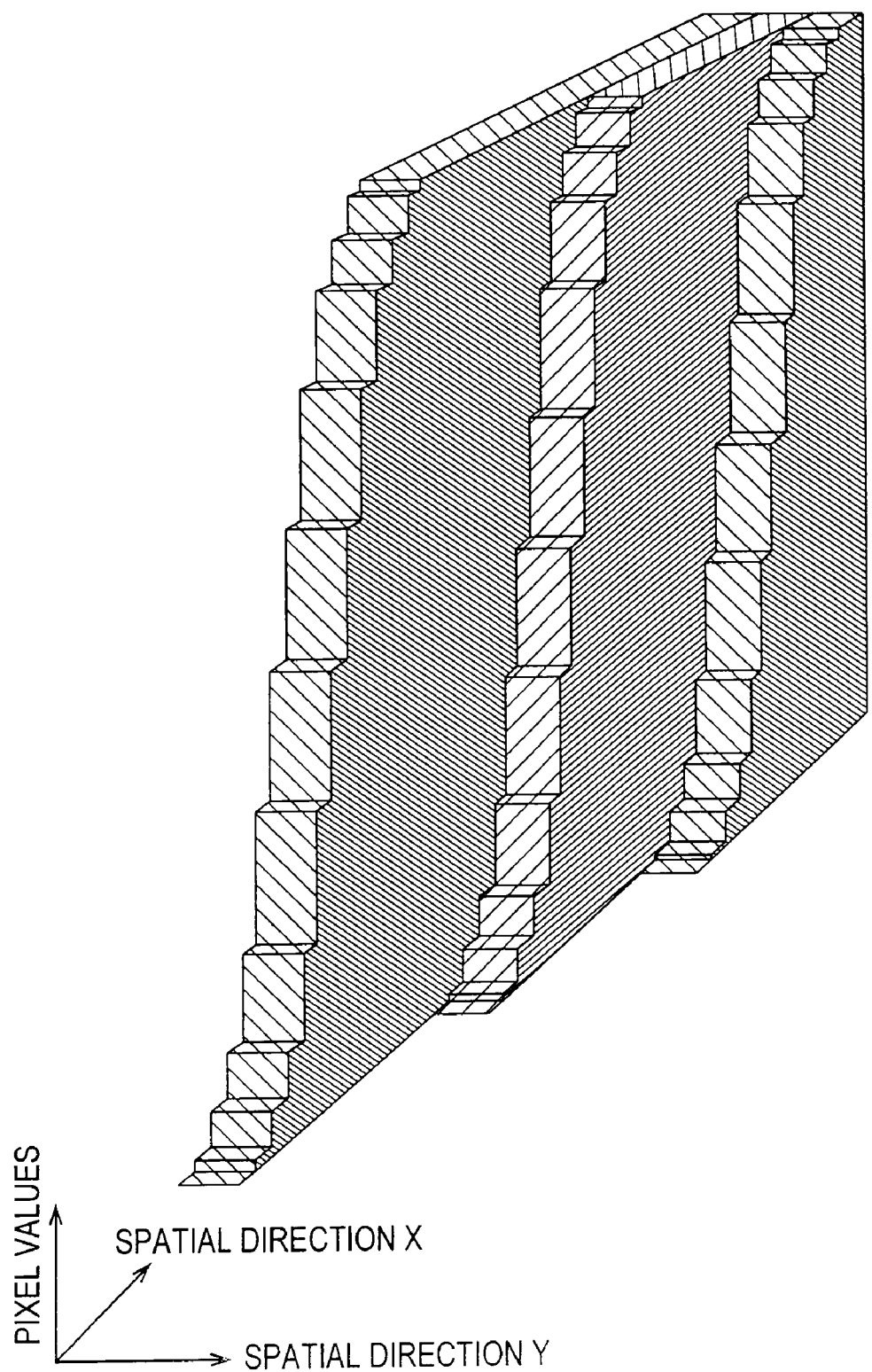
FIG. 15 is a diagram illustrating an example of pixel values of image data obtained by actual image-taking.

FIG. 15 is a diagram illustrating an example of pixel values of the image data obtained by actual image-taking, corresponding to the image shown in FIG. 14. As shown in FIG. 15, the image data is in a stepped shape, since the image data is made up of pixel values in increments of pixels.

Figure 16:
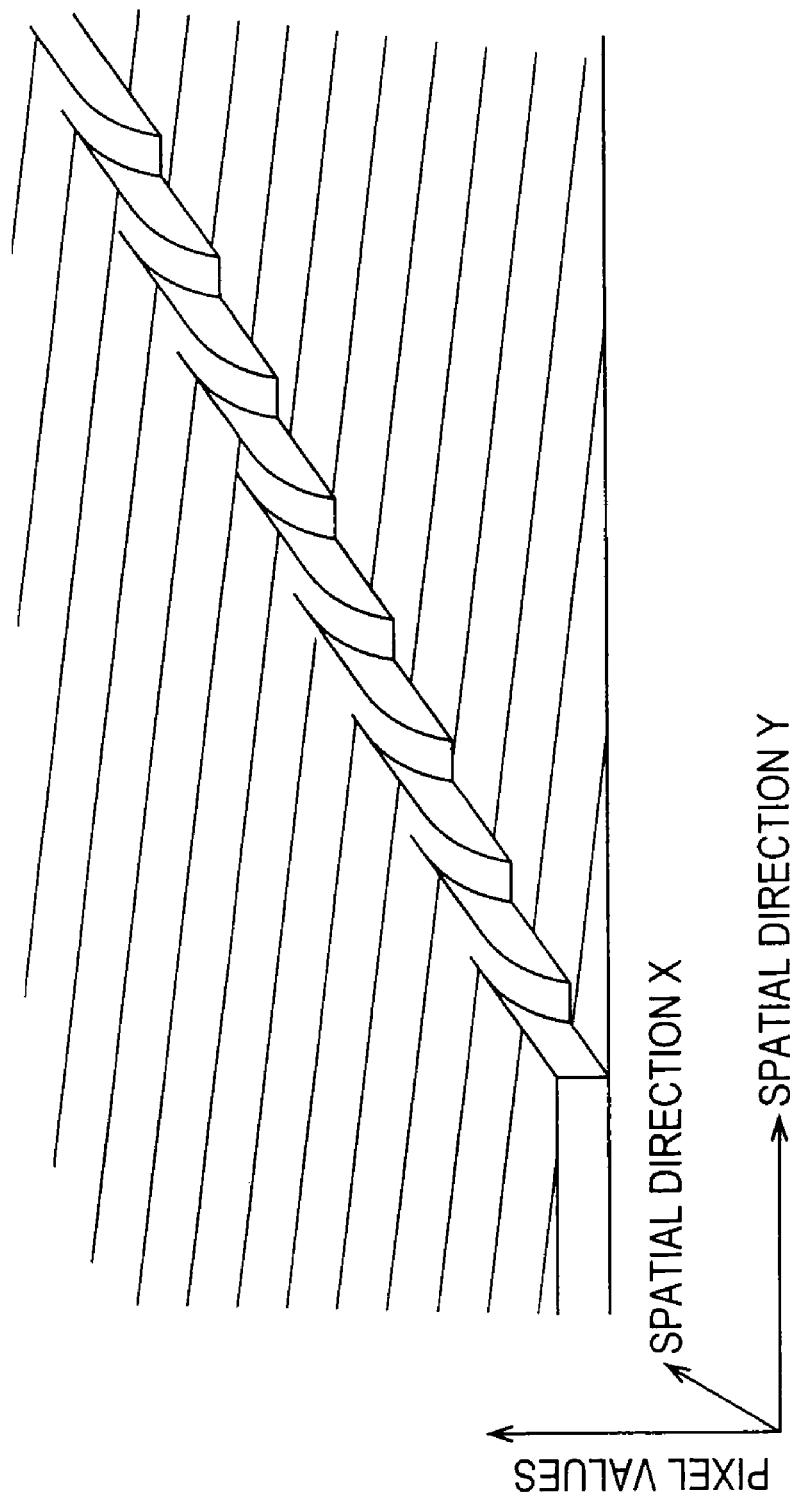
FIG. 16 is a schematic diagram of image data.

FIG. 16 is a model diagram illustrating the image data shown in FIG. 15.

The model diagram shown in FIG. 16 is a model diagram of image data obtained by taking, with the image sensor, an image of the object of the actual world which has a straight edge and is of a monotone color different from that of the background, and extending in a direction offset from the array of the pixels of the image sensor (the vertical or horizontal array of the pixels). The image cast into the image sensor at the time that the image data shown in FIG. 16 was acquired is an image of the object of the actual world which has a straight edge and is of a monotone color different from that of the background, shown in FIG. 14.

In FIG. 16, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 16 corresponds to the direction of level in FIG. 14, and the spatial direction X and spatial direction Y in FIG. 16 also are the same as the directions in FIG. 14.

In the event of taking an image of an object of the actual world which has a straight edge and is of a monotone color different from that of the background with an image sensor, the straight edge is represented in the image data obtained as a result of the image-taking as multiple pawl shapes having a predetermined length which are arrayed in a diagonally-offset fashion, in a model representation, for example. The pawl shapes are of approximately the same shape. One pawl shape is formed on one row of pixels vertically, or is formed on one row of pixels horizontally. For example, one pawl shape shown in FIG. 16 is formed on one row of pixels vertically.

Thus, the continuity of image of the object of the actual world which has a straight edge and is of a monotone color different from that of the background, in that the cross-sectional shape is the same at any arbitrary position in the length direction of the edge, for example, is lost in the image data obtained by imaging with an image sensor. Also, it can be said that the continuity, which the image of the object of the actual world which has a straight edge and is of a monotone color different from that of the background had, has changed into continuity in that pawl shapes of the same shape formed on one row of pixels vertically or formed on one row of pixels horizontally are arrayed at predetermined intervals.

The data continuity detecting unit 101 detects such data continuity of the data which is an input image, for example. For example, the data continuity detecting unit 101 detects data continuity by detecting spatial direction angle (gradient) exhibiting the same arc-shaped array or pawl-shaped array.

Also, for example, the data continuity detecting unit 101 detects continuity of data by detecting angle (movement) in the space direction and time direction, indicating the array of the same shapes in the space direction and the time direction.

Hereafter, the portion of data where the sensor has projected the image of the object of the actual world which has a straight edge and is of a monotone color different from that of the background, will also be called a two-valued edge.

Figure 17:
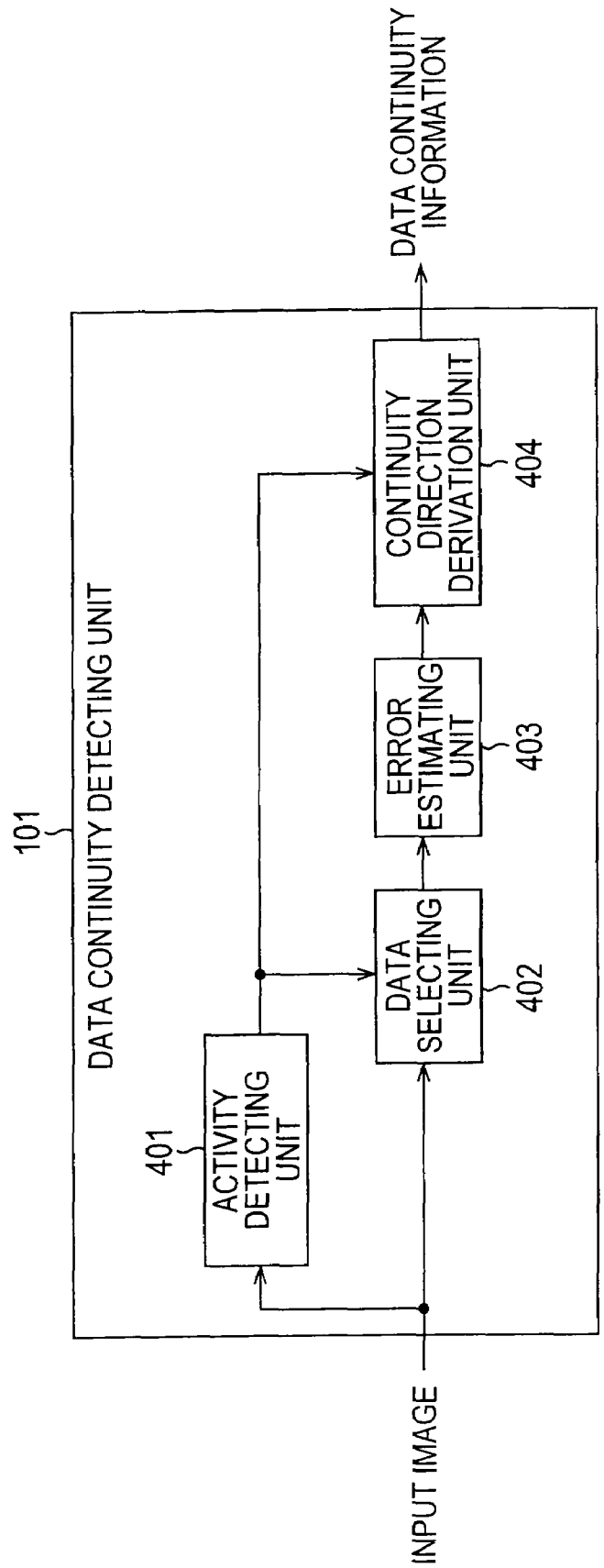
FIG. 17 is a block diagram illustrating the configuration of a continuity component extracting unit.

FIG. 17 is a block diagram illustrating another configuration of the data continuity detecting unit 101.

With the data continuity detecting unit 101 of which the configuration is shown in FIG. 17, change in the pixel value of the pixel of interest which is a pixel of interest in the spatial direction of the input image, i.e. activity in the spatial direction of the input image, is detected, multiple sets of pixels made up of a predetermined number of pixels in one row in the vertical direction or one row in the horizontal direction are extracted for each angle based on the pixel of interest and a reference axis according to the detected activity, the correlation of the extracted pixel sets is detected, and the angle of data continuity based on the reference axis in the input image is detected based on the correlation.

The angle of data continuity means an angle assumed by the reference axis, and the direction of a predetermined dimension where constant characteristics repeatedly appear in the data. Constant characteristics repeatedly appearing means a case wherein, for example, the change in value as to the change in position in the data, i.e., the cross-sectional shape, is the same, and so forth.

The reference axis may be, for example, an axis indicating the spatial direction X (the horizontal direction of the screen), an axis indicating the spatial direction Y (the vertical direction of the screen), and so forth.

The input image is supplied to an activity detecting unit 401 and data selecting unit 402.

The activity detecting unit 401 detects change in the pixel values as to the spatial direction of the input image, i.e., activity in the spatial direction, and supplies the activity information which indicates the detected results to the data selecting unit 402 and a continuity direction derivation unit 404.

For example, the activity detecting unit 401 detects the change of a pixel value as to the horizontal direction of the screen, and the change of a pixel value as to the vertical direction of the screen, and compares the detected change of the pixel value in the horizontal direction and the change of the pixel value in the vertical direction, thereby detecting whether the change of the pixel value in the horizontal direction is greater as compared with the change of the pixel value in the vertical direction, or whether the change of the pixel value in the vertical direction is greater as compared with the change of the pixel value in the horizontal direction.

The activity detecting unit 401 supplies to the data selecting unit 402 and the continuity direction derivation unit 404 activity information, which is the detection results, indicating that the change of the pixel value in the horizontal direction is greater as compared with the change of the pixel value in the vertical direction, or indicating that the change of the pixel value in the vertical direction is greater as compared with the change of the pixel value in the horizontal direction.

Figure 18:
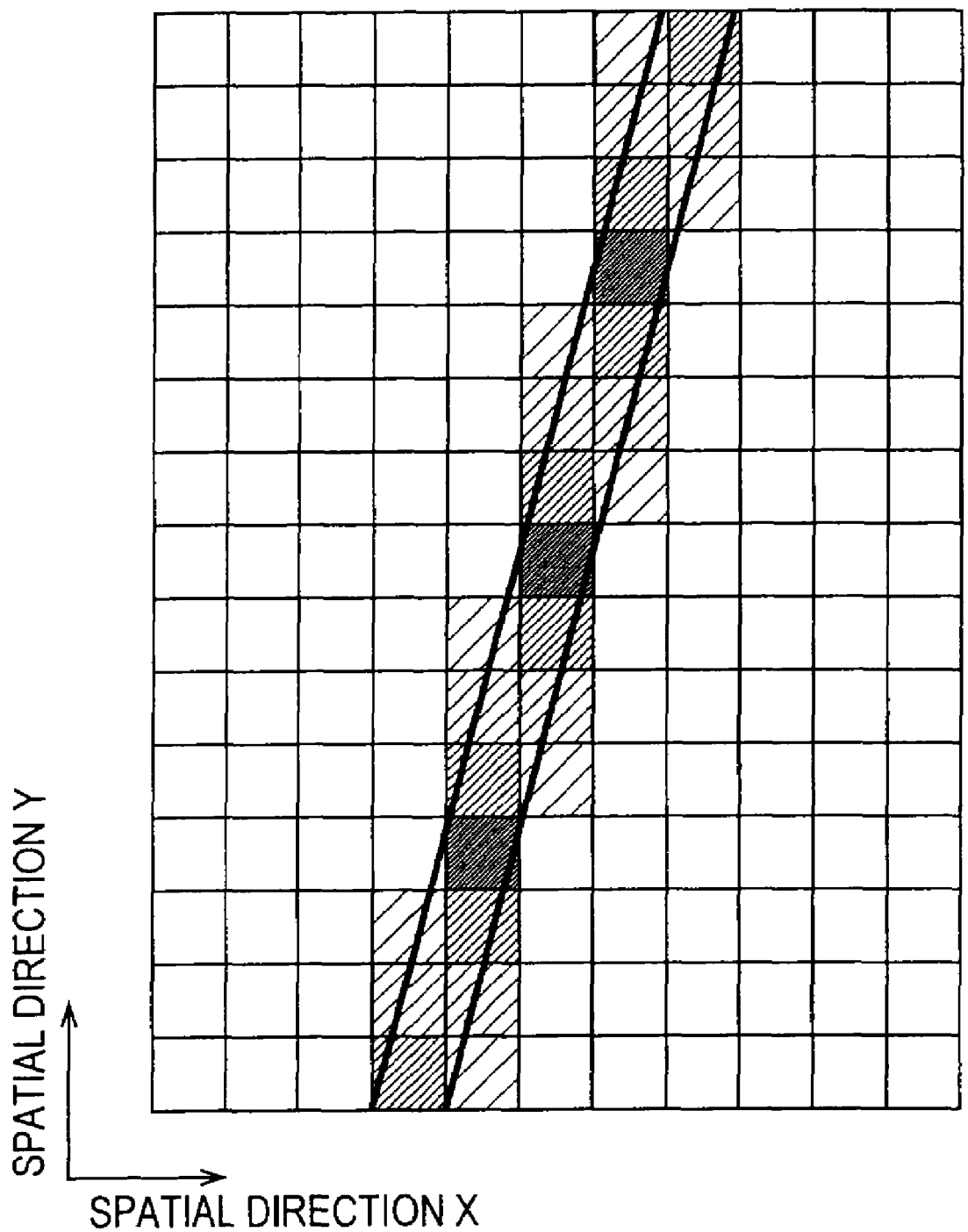
FIG. 18 is a diagram for describing the activity on an input image having data continuity.

In the event that the change of the pixel value in the horizontal direction is greater as compared with the change of the pixel value in the vertical direction, arc shapes (half-disc shapes) or pawl shapes are formed on one row in the vertical direction, as indicated by FIG. 18 for example, and the arc shapes or pawl shapes are formed repetitively more in the vertical direction. That is to say, in the event that the change of the pixel value in the horizontal direction is greater as compared with the change of the pixel value in the vertical direction, with the reference axis as the axis representing the spatial direction X, the angle of the data continuity based on the reference axis in the input image is a value of any from 45 degrees to 90 degrees.

In the event that the change of the pixel value in the vertical direction is greater as compared with the change of the pixel value in the horizontal direction, arc shapes or pawl shapes are formed on one row in the vertical direction, for example, and the arc shapes or pawl shapes are formed repetitively more in the horizontal direction. That is to say, in the event that the change of the pixel value in the vertical direction is greater as compared with the change of the pixel value in the horizontal direction, with the reference axis as the axis representing the spatial direction X, the angle of the data continuity based on the reference axis in the input image is a value of any from 0 degrees to 45 degrees.

Figure 19:
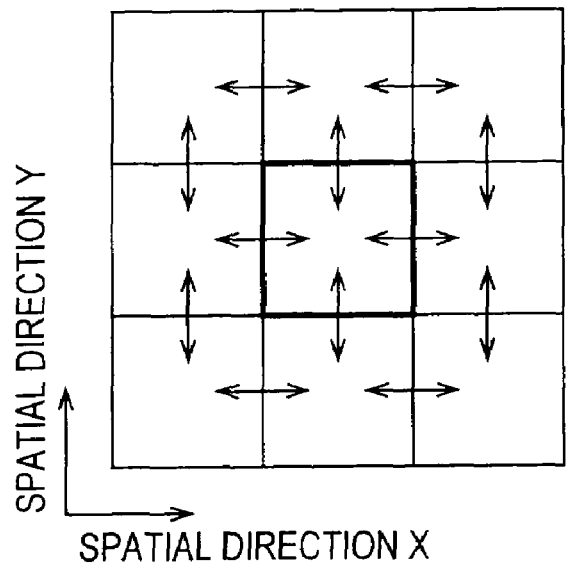
FIG. 19 is a diagram for describing a block for detecting activity.

For example, the activity detecting unit 401 extracts from the input image a block made up of the 9 pixels, 3×3 centered on the pixel of interest, as shown in FIG. 19. The activity detecting unit 401 calculates the sum of differences of the pixels values regarding the pixels vertically adjacent, and the sum of differences of the pixels values regarding the pixels horizontally adjacent. The sum of differences $h_{diff}$ of the pixels values regarding the pixels horizontally adjacent can be obtained with Expression (12).

$$h_{diff} = \Sigma(P_{i+1,j} - P_{i,j}) \tag{12}$$

In the same way, the sum of differences $v_{diff}$ of the pixels values regarding the pixels vertically adjacent can be obtained with Expression (13).

$$v_{diff} = \Sigma(P_{i,j+1} - P_{i,j}) \tag{13}$$

In Expression (12) and Expression (13), P represents the pixel value, i represents the position of the pixel in the horizontal direction, and j represents the position of the pixel in the vertical direction.

An arrangement may be made wherein the activity detecting unit 401 compares the calculated sum of differences $h_{diff}$ of the pixels values regarding the pixels horizontally adjacent with the sum of differences $v_{diff}$ of the pixels values regarding the pixels vertically adjacent, so as to determine the range of the angle of the data continuity based on the reference axis in the input image. That is to say, in this case, the activity detecting unit 401 determines whether a shape indicated by change in the pixel value as to the position in the spatial direction is formed repeatedly in the horizontal direction, or formed repeatedly in the vertical direction.

For example, change in pixel values in the horizontal direction with regard to an arc formed on pixels in one horizontal row is greater than the change of pixel values in the vertical direction, change in pixel values in the vertical direction with regard to an arc formed on pixels in one horizontal row is greater than the change of pixel values in the horizontal direction, and it can be said that the direction of data continuity, i.e., the change in the direction of the predetermined dimension of a constant feature which the input image that is the data has is smaller in comparison with the change in the orthogonal direction too the data continuity. In other words, the difference of the direction orthogonal to the direction of data continuity (hereafter also referred to as non-continuity direction) is greater as compared to the difference in the direction of data continuity.

Figure 20:
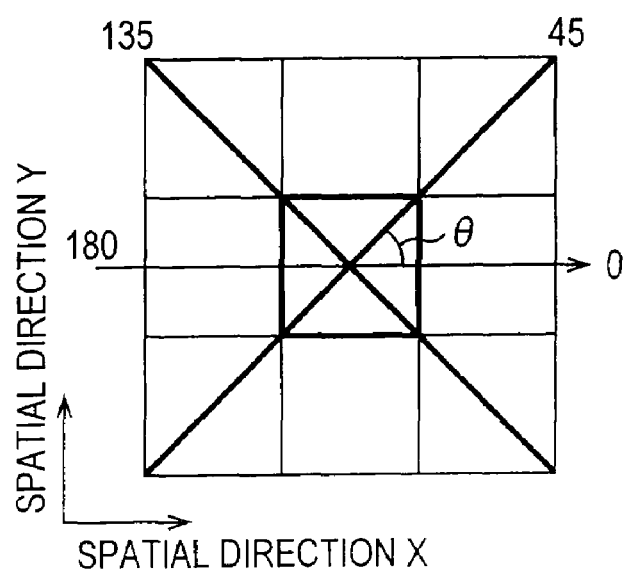
FIG. 20 is a diagram for describing the angle of data continuity as to activity.

For example, as shown in FIG. 20, the activity detecting unit 401 compares the calculated sum of differences $h_{diff}$ of the pixels values regarding the pixels horizontally adjacent with the sum of differences $v_{diff}$ of the pixels values regarding the pixels vertically adjacent, and in the event that the sum of differences $h_{diff}$ of the pixels values regarding the pixels horizontally adjacent is greater, determines that the angle of the data continuity based on the reference axis is a value of any from 45 degrees to 135 degrees, and in the event that the sum of differences $v_{diff}$ of the pixels values regarding the pixels vertically adjacent is greater, determines that the angle of the data continuity based on the reference axis is a value of any from 0 degrees to 45 degrees, or a value of any from 135 degrees to 180 degrees.

For example, the activity detecting unit 401 supplies activity information indicating the determination results to the data selecting unit 402 and the continuity direction derivation unit 404.

Note that the activity detecting unit 401 can detect activity by extracting blocks of arbitrary sizes, such as a block made up of 25 pixels of 5×5, a block made up of 49 pixels of 7×7, and so forth.

The data selecting unit 402 sequentially selects pixels of interest from the pixels of the input image, and extracts multiple sets of pixels made up of a predetermined number of pixels in one row in the vertical direction or one row in the horizontal direction for each angle based on the pixel of interest and the reference axis, based on the activity information supplied from the activity detecting unit 401.

For example, in the event that the activity information indicates that the change in pixel values in the horizontal direction is greater in comparison with the change in pixel values in the vertical direction, this means that the data continuity angle is a value of any from 45 degrees to 135 degrees, so the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the change in pixel values in the vertical direction is greater in comparison with the change in pixel values in the horizontal direction, this means that the data continuity angle is a value of any from 0 degrees to 45 degrees or from 135 degrees to 180 degrees, so the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

Also, for example, in the event that the activity information indicates that the angle of data continuity is a value of any from 45 degrees to 135 degrees, the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the angle of data continuity is a value of any from 0 degrees to 45 degrees or from 135 degrees to 180 degrees, the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

The data selecting unit 402 supplies the multiple sets made up of the extracted pixels to an error estimating unit 403.

The error estimating unit 403 detects correlation of pixel sets for each angle with regard to the multiple sets of extracted pixels.

For example, with regard to the multiple sets of pixels made up of a predetermined number of pixels in one row in the vertical direction corresponding to one angle, the error estimating unit 403 detects the correlation of the pixels values of the pixels at corresponding positions of the pixel sets. With regard to the multiple sets of pixels made up of a predetermined number of pixels in one row in the horizontal direction corresponding to one angle, the error estimating unit 403 detects the correlation of the pixels values of the pixels at corresponding positions of the sets.

The error estimating unit 403 supplies correlation information indicating the detected correlation to the continuity direction derivation unit 404. The error estimating unit 403 calculates the sum of the pixel values of pixels of a set including the pixel of interest supplied from the data selecting unit 402 as values indicating correlation, and the absolute value of difference of the pixel values of the pixels at corresponding positions in other sets, and supplies the sum of absolute value of difference to the continuity direction derivation unit 404 as correlation information.

Based on the correlation information supplied from the error estimating unit 403, the continuity direction derivation unit 404 detects the data continuity angle based on the reference axis in the input image, corresponding to the lost continuity of the light signals of the actual world, and outputs data continuity information indicating an angle. For example, based on the correlation information supplied from the error estimating unit 403, the continuity direction derivation unit 404 detects an angle corresponding to the pixel set with the greatest correlation as the data continuity angle, and outputs data continuity information indicating the angle corresponding to the pixel set with the greatest correlation that has been detected.

The following description will be made regarding detection of data continuity angle in the range of 0 degrees through 90 degrees (the so-called first quadrant).

Figure 21:
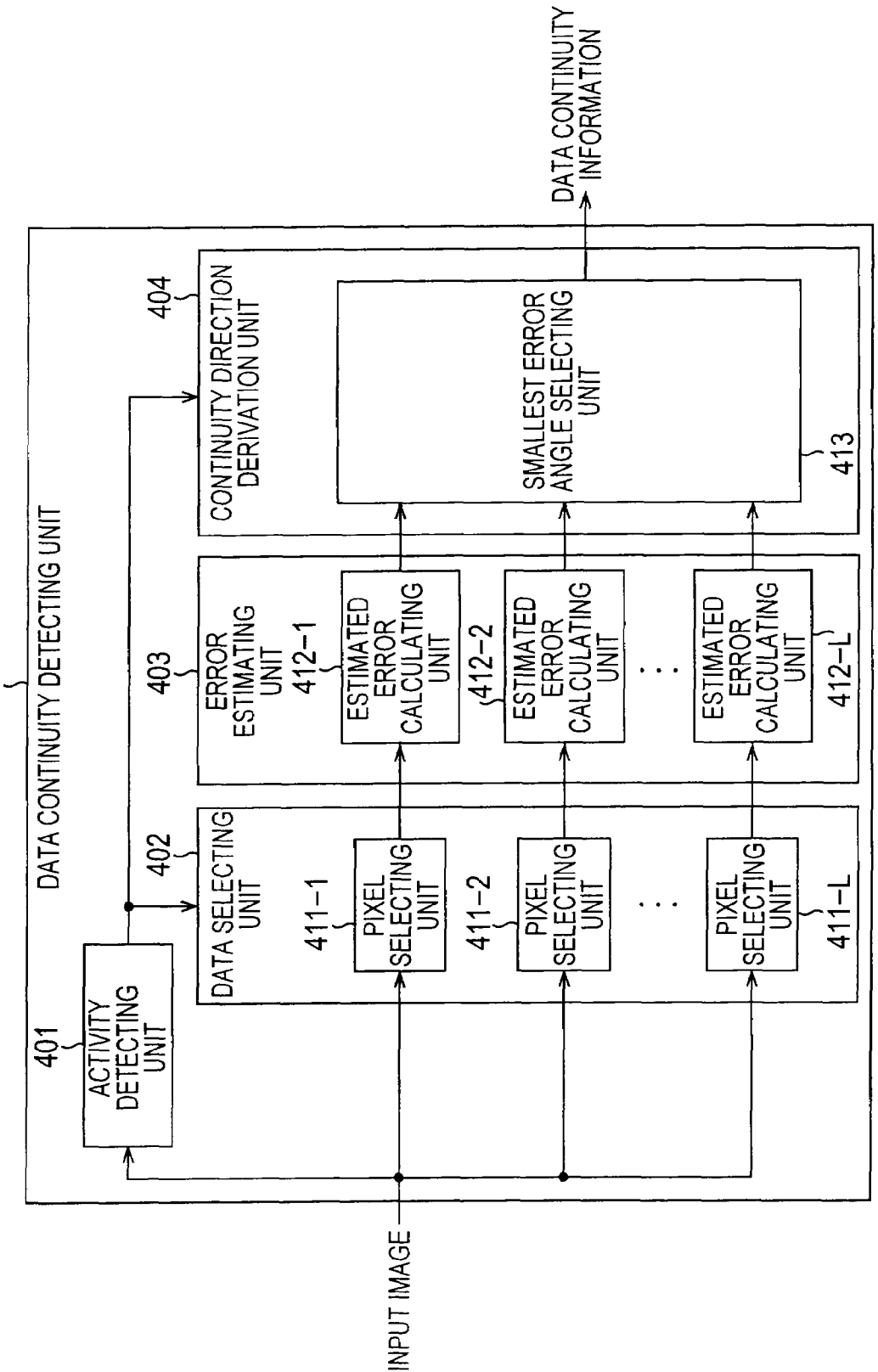
FIG. 21 is a block diagram illustrating a detailed configuration of the data continuity detecting unit.

FIG. 21 is a block diagram illustrating a more detailed configuration of the data continuity detecting unit 101 shown in FIG. 17.

The data selecting unit 402 includes pixel selecting unit 411-1 through pixel selecting unit 411-L. The error estimating unit 403 includes estimated error calculating unit 412-1 through estimated error calculating unit 412-L. The continuity direction derivation unit 404 includes a smallest error angle selecting unit 413.

First, description will be made regarding the processing of the pixel selecting unit 411-1 through pixel selecting unit

411-L in the event that the data continuity angle indicated by the activity information is a value of any from 45 degrees to 135 degrees.

The pixel selecting unit 411-1 through pixel selecting unit 411-L set straight lines of mutually differing predetermined angles which pass through the pixel of interest, with the axis indicating the spatial direction X as the reference axis. The pixel selecting unit 411-1 through pixel selecting unit 411-L select, of the pixels belonging to a vertical row of pixels to which the pixel of interest belongs, a predetermined number of pixels above the pixel of interest, and predetermined number of pixels below the pixel of interest, and the pixel of interest, as a set.

Figure 22:
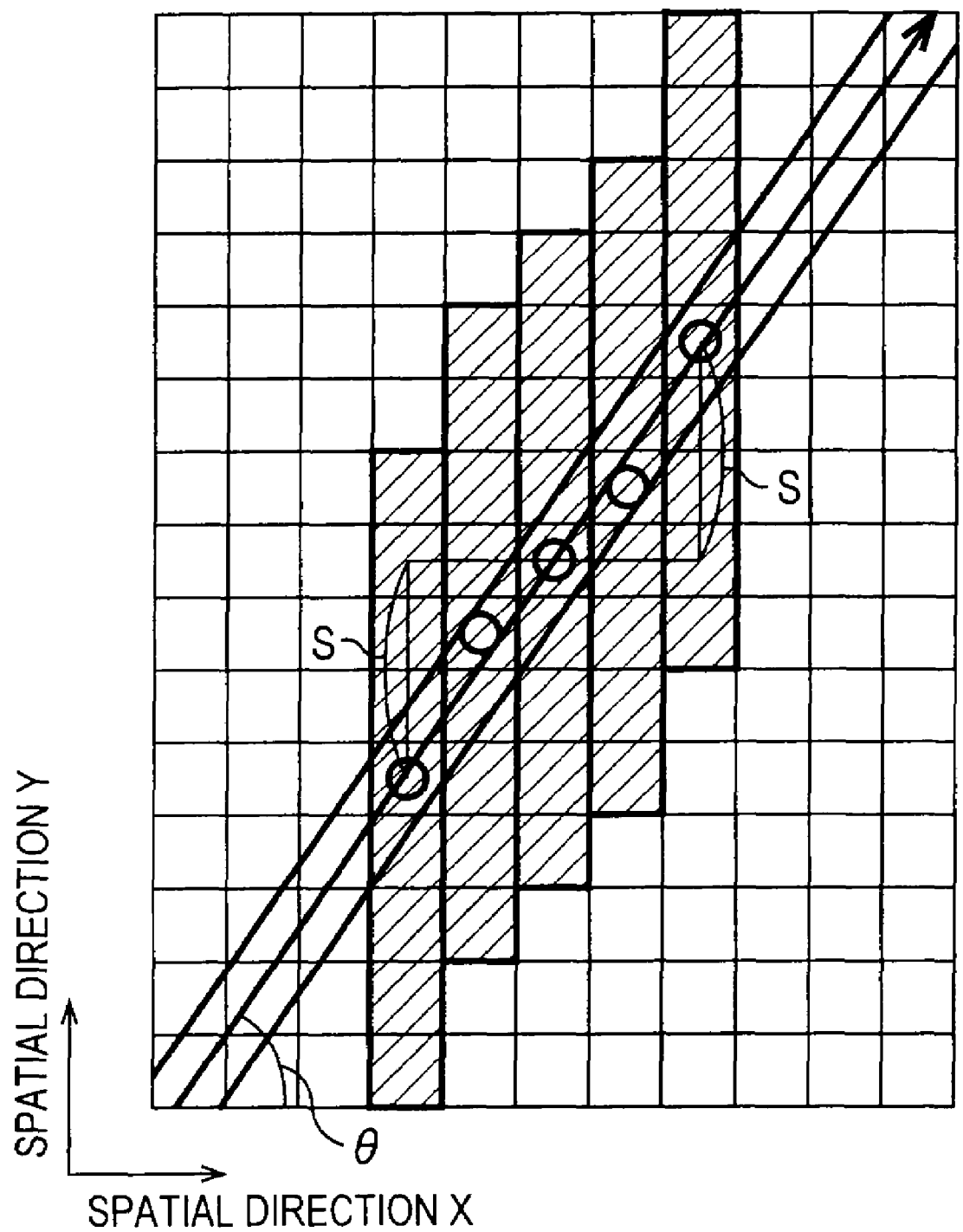
FIG. 22 is a diagram describing a set of pixels.

For example, as shown in FIG. 22, the pixel selecting unit 411-1 through pixel selecting unit 411-L select 9 pixels centered on the pixel of interest, as a set of pixels, from the pixels belonging to a vertical row of pixels to which the pixel of interest belongs.

In FIG. 22, one grid-shaped square (one grid) represents one pixel. In FIG. 22, the circle shown at the center represents the pixel of interest.

The pixel selecting unit 411-1 through pixel selecting unit 411-L select, from pixels belonging to a vertical row of pixels to the left of the vertical row of pixels to which the pixel of interest belongs, a pixel at the position closest to the straight line set for each. In FIG. 22, the circle to the lower left of the pixel of interest represents an example of a selected pixel. The pixel selecting unit 411-1 through pixel selecting unit 411-L then select, from the pixels belonging to the vertical row of pixels to the left of the vertical row of pixels to which the pixel of interest belongs, a predetermined number of pixels above the selected pixel, a predetermined number of pixels below the selected pixel, and the selected pixel, as a set of pixels.

For example, as shown in FIG. 22, the pixel selecting unit 411-1 through pixel selecting unit 411-L select 9 pixels centered on the pixel at the position closest to the straight line, from the pixels belonging to the vertical row of pixels to the left of the vertical row of pixels to which the pixel of interest belongs, as a set of pixels.

The pixel selecting unit 411-1 through pixel selecting unit 411-L select, from pixels belonging to a vertical row of pixels second left from the vertical row of pixels to which the pixel of interest belongs, a pixel at the position closest to the straight line set for each. In FIG. 22, the circle to the far left represents an example of the selected pixel. The pixel selecting unit 411-1 through pixel selecting unit 411-L then select, as a set of pixels, from the pixels belonging to the vertical row of pixels second left from the vertical row of pixels to which the pixel of interest belongs, a predetermined number of pixels above the selected pixel, a predetermined number of pixels below the selected pixel, and the selected pixel.

For example, as shown in FIG. 22, the pixel selecting unit 411-1 through pixel selecting unit 411-L select 9 pixels centered on the pixel at the position closest to the straight line, from the pixels belonging to the vertical row of pixels second left from the vertical row of pixels to which the pixel of interest belongs, as a set of pixels.

The pixel selecting unit 411-1 through pixel selecting unit 411-L select, from pixels belonging to a vertical row of pixels to the right of the vertical row of pixels to which the pixel of interest belongs, a pixel at the position closest to the straight line set for each. In FIG. 22, the circle to the upper right of the pixel of interest represents an example of a selected pixel. The pixel selecting unit 411-1 through pixel selecting unit 411-L then select, from the pixels belonging to the vertical row of pixels to the right of the vertical row of pixels to which the pixel of interest belongs, a predetermined number of pixels above the selected pixel, a predetermined number of pixels below the selected pixel, and the selected pixel, as a set of pixels.

For example, as shown in FIG. 22, the pixel selecting unit 411-1 through pixel selecting unit 411-L select 9 pixels centered on the pixel at the position closest to the straight line, from the pixels belonging to the vertical row of pixels to the right of the vertical row of pixels to which the pixel of interest belongs, as a set of pixels.

The pixel selecting unit 411-1 through pixel selecting unit 411-L select, from pixels belonging to a vertical row of pixels second right from the vertical row of pixels to which the pixel of interest belongs, a pixel at the position closest to the straight line set for each. In FIG. 22, the circle to the far right represents an example of the selected pixel. The pixel selecting unit 411-1 through pixel selecting unit 411-L then select, from the pixels belonging to the vertical row of pixels second right from the vertical row of pixels to which the pixel of interest belongs, a predetermined number of pixels above the selected pixel, a predetermined number of pixels below the selected pixel, and the selected pixel, as a set of pixels.

For example, as shown in FIG. 22, the pixel selecting unit 411-1 through pixel selecting unit 411-L select 9 pixels centered on the pixel at the position closest to the straight line, from the pixels belonging to the vertical row of pixels second right from the vertical row of pixels to which the pixel of interest belongs, as a set of pixels.

Thus, the pixel selecting unit 411-1 through pixel selecting unit 411-L each select five sets of pixels.

The pixel selecting unit 411-1 through pixel selecting unit 411-L select pixel sets for (lines set to) mutually different angles. For example, the pixel selecting unit 411-1 selects sets of pixels regarding 45 degrees, the pixel selecting unit 411-2 selects sets of pixels regarding 47.5 degrees, and the pixel selecting unit 411-3 selects sets of pixels regarding 50 degrees. The pixel selecting unit 411-1 through pixel selecting unit 411-L select sets of pixels regarding angles every 2.5 degrees, from 52.5 degrees through 135 degrees.

Note that the number of pixel sets may be an optional number, such as 3 or 7, for example, and does not restrict the present invention. Also, the number of pixels selected as one set may be an optional number, such as 5 or 13, for example, and does not restrict the present invention.

Note that the pixel selecting unit 411-1 through pixel selecting unit 411-L may be arranged to select pixel sets from pixels within a predetermined range in the vertical direction. For example, the pixel selecting unit 411-1 through pixel selecting unit 411-L can select pixel sets from 121 pixels in the vertical direction (60 pixels upward from the pixel of interest, and 60 pixels downward). In this case, the data continuity detecting unit 101 can detect the angle of data continuity up to 88.09 degrees as to the axis representing the spatial direction X.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. For example, the estimated error calculating unit 412-1 through estimated error calculating unit 412-L calculates, as a value indicating the correlation, the sum of absolute values of difference between the pixel values of the pixels of the set containing the pixel of interest, and the pixel values of the pixels at corresponding positions in other sets, supplied from one of the pixel selecting unit 411-1 through pixel selecting unit 411-L.

More specifically, based on the pixel values of the pixels of the set containing the pixel of interest and the pixel values of the pixels of the set made up of pixels belonging to one vertical row of pixels to the left side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the left from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

Then, based on the pixel values of the pixels of the set containing the pixel of interest and the pixel values of the pixels of the set made up of pixels belonging to one vertical row of pixels to the right side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the right from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

The estimated error calculating unit 412-1 through estimated error calculating unit 412-L add all of the sums of absolute values of difference of the pixel values thus calculated, thereby calculating the aggregate of absolute values of difference of the pixel values.

The estimated error calculating unit 412-1 through estimated error calculating unit 412-L supply information indicating the detected correlation to the smallest error angle selecting unit 413. For example, the estimated error calculating unit 412-1 through estimated error calculating unit 412-L supply the aggregate of absolute values of difference of the pixel values calculated, to the smallest error angle selecting unit 413.

Note that the estimated error calculating unit 412-1 through estimated error calculating unit 412-L are not restricted to the sum of absolute values of difference of pixel values, and can also calculate other values as correlation values as well, such as the sum of squared differences of pixel values, or correlation coefficients based on pixel values, and so forth.

The smallest error angle selecting unit 413 detects the data continuity angle based on the reference axis in the input image which corresponds to the continuity of the image which is the lost actual world light signals, based on the correlation detected by the estimated error calculating unit 412-1 through estimated error calculating unit 412-L with regard to mutually different angles. That is to say, based on the correlation detected by the estimated error calculating unit 412-1 through estimated error calculating unit 412-L with regard to mutually different angles, the smallest error angle selecting unit 413 selects the greatest correlation, and takes the angle regarding which the selected correlation was detected as the data continuity angle based on the reference axis, thereby detecting the data continuity angle based on the reference axis in the input image.

For example, of the aggregates of absolute values of difference of the pixel values supplied from the estimated error calculating unit 412-1 through estimated error calculating unit 412-L, the smallest error angle selecting unit 413 selects the smallest aggregate. With regard to the pixel set of which the selected aggregate was calculated, the smallest error angle selecting unit 413 makes reference to a pixel belonging to the one vertical row of pixels two to the left from the pixel of interest and at the closest position to the straight line, and to a pixel belonging to the one vertical row of pixels two to the right from the pixel of interest and at the closest position to the straight line.

Figure 23:
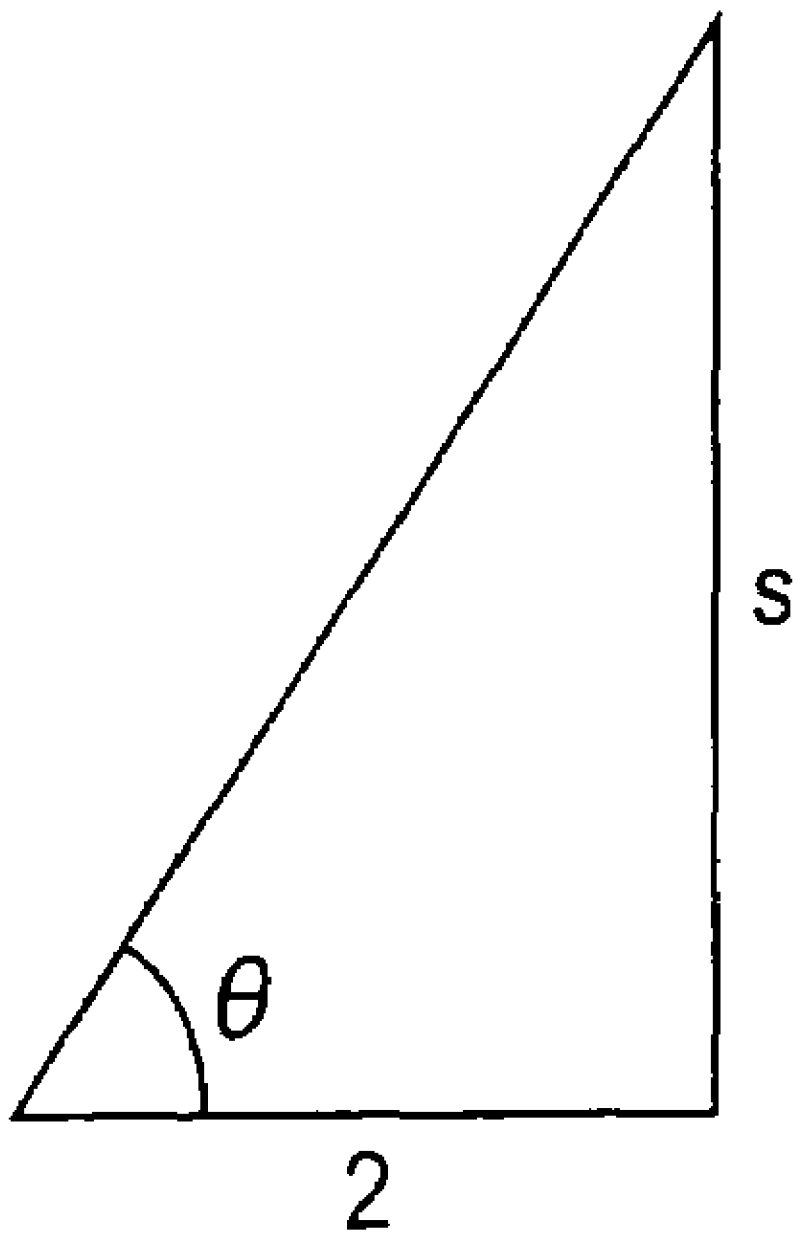
FIG. 23 is a diagram describing the relation between the position of a pixel set and the angle of data continuity.

As shown in FIG. 22, the smallest error angle selecting unit 413 obtains the distance S in the vertical direction of the position of the pixels to reference from the position of the pixel of interest. As shown in FIG. 23, the smallest error angle selecting unit 413 calculates the angle θ of data continuity based on the axis indicating the spatial direction X which is the reference axis in the input image which is image data, that corresponds to the lost actual world light signals continuity, from Expression (14).

$$\theta = \tan^{-1}(s/2) \tag{14}$$

Next, description will be made regarding the processing of the pixel selecting unit 411-1 through pixel selecting unit 411-L in the event that the data continuity angle indicated by the activity information is a value of any from 0 degrees to 45 degrees and 135 degrees to 180 degrees.

The pixel selecting unit 411-1 through pixel selecting unit 411-L set straight lines of predetermined angles which pass through the pixel of interest, with the axis indicating the spatial direction X as the reference axis, and select, of the pixels belonging to a horizontal row of pixels to which the pixel of interest belongs, a predetermined number of pixels to the left of the pixel of interest, and predetermined number of pixels to the right of the pixel of interest, and the pixel of interest, as a pixel set.

The pixel selecting unit 411-1 through pixel selecting unit 411-L select, from pixels belonging to a horizontal row of pixels above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels below the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two below the horizontal row of pixels to which the pixel of interest belongs, a predetermined number of pixels to the left of the selected pixel, a predetermined number of pixels to the right of the selected pixel, and the selected pixel, as a pixel set.

Thus, the pixel selecting unit 411-1 through pixel selecting unit 411-L each select five sets of pixels.

The pixel selecting unit 411-1 through pixel selecting unit 411-L select pixel sets for mutually different angles. For example, the pixel selecting unit 411-1 selects sets of pixels regarding 0 degrees, the pixel selecting unit 411-2 selects sets of pixels regarding 2.5 degrees, and the pixel selecting unit 411-3 selects sets of pixels regarding 5 degrees. The pixel selecting unit 411-1 through pixel selecting unit 411-L select sets of pixels regarding angles every 2.5 degrees, from 7.5 degrees through 45 degrees and from 135 degrees through 180 degrees.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. The estimated error calculating unit 412-1 through estimated error calculating unit 412-L supply information indicating the detected correlation to the smallest error angle selecting unit 413.

The smallest error angle selecting unit 413 detects the data continuity angle based on the reference axis in the input image which corresponds to the continuity of the image which is the lost actual world light signals, based on the correlation detected by the estimated error calculating unit 412-1 through estimated error calculating unit 412-L.

Figure 24:
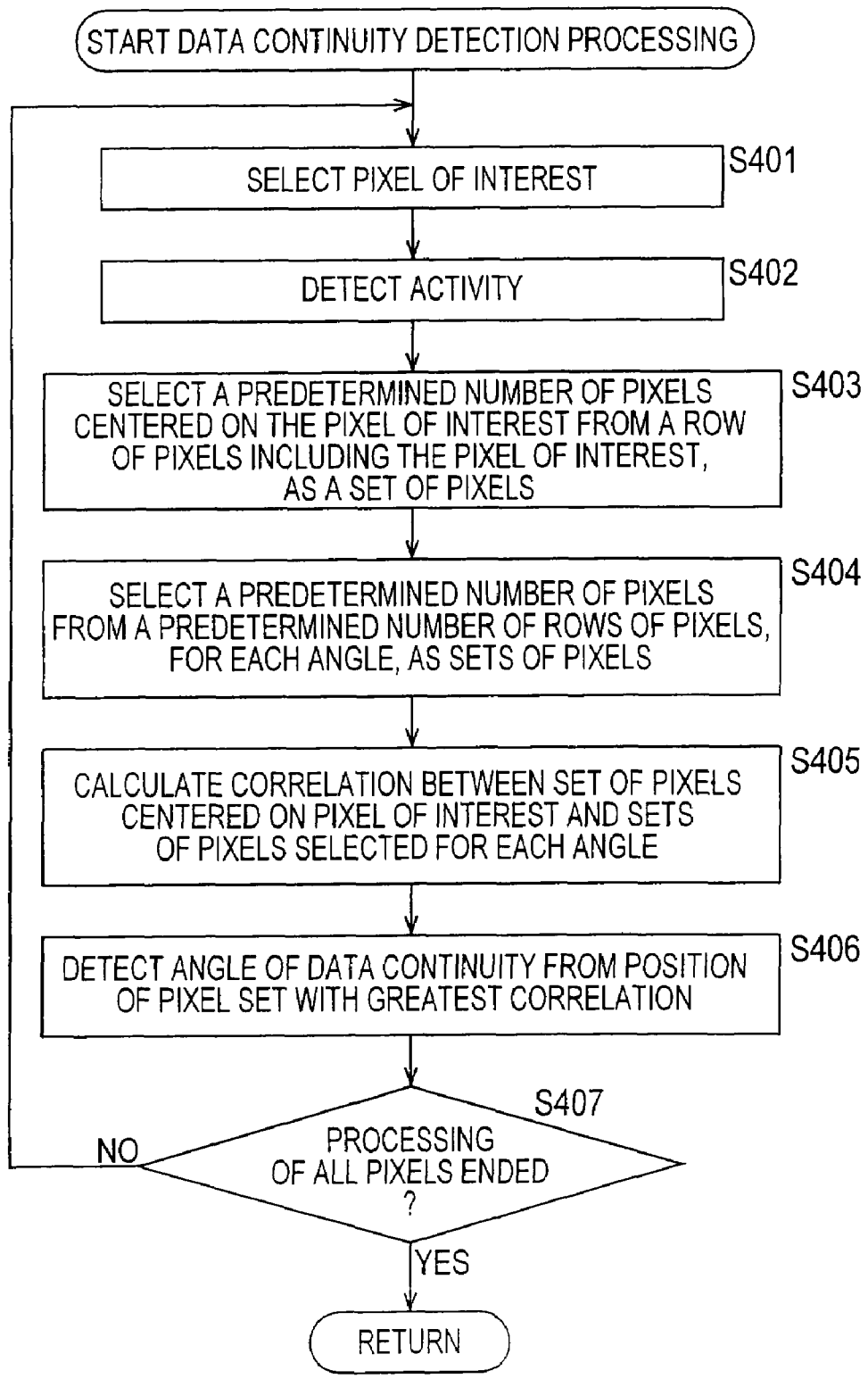
FIG. 24 is a flowchart for describing processing for detecting data continuity.

Next, data continuity detection processing with the data continuity detecting unit 101 of which the configuration is shown in FIG. 17, corresponding to the processing in step S101, will be described with reference to the flowchart in FIG. 24.

In step S401, the activity detecting unit 401 and the data selecting unit 402 select the pixel of interest which is a pixel of interest from the input image. The activity detecting unit 401 and the data selecting unit 402 select the same pixel of interest. For example, the activity detecting unit 401 and the data selecting unit 402 select the pixel of interest from the input image in raster scan order.

In step S402, the activity detecting unit 401 detects activity with regard to the pixel of interest. For example, the activity detecting unit 401 detects activity based on the difference of pixel values of pixels aligned in the vertical direction of a block made up of a predetermined number of pixels centered on the pixel of interest, and the difference of pixel values of pixels aligned in the horizontal direction.

The activity detecting unit 401 detects activity in the spatial direction as to the pixel of interest, and supplies activity information indicating the detected results to the data selecting unit 402 and the continuity direction derivation unit 404.

In step S403, the data selecting unit 402 selects, from a row of pixels including the pixel of interest, a predetermined number of pixels centered on the pixel of interest, as a pixel set. For example, the data selecting unit 402 selects a predetermined number of pixels above or to the left of the pixel of interest, and a predetermined number of pixels below or to the right of the pixel of interest, which are pixels belonging to a vertical or horizontal row of pixels to which the pixel of interest belongs, and also the pixel of interest, as a pixel set.

In step S404, the data selecting unit 402 selects, as a pixel set, a predetermined number of pixels each from a predetermined number of pixel rows for each angle in a predetermined range based on the activity detected by the processing in step S402. For example, the data selecting unit 402 sets straight lines with angles of a predetermined range which pass through the pixel of interest, with the axis indicating the spatial direction X as the reference axis, selects a pixel which is one or two rows away from the pixel of interest in the horizontal direction or vertical direction and which is closest to the straight line, and selects a predetermined number of pixels above or to the left of the selected pixel, and a predetermined number of pixels below or to the right of the selected pixel, and the selected pixel closest to the line, as a pixel set. The data selecting unit 402 selects pixel sets for each angle.

The data selecting unit 402 supplies the selected pixel sets to the error estimating unit 403.

In step S405, the error estimating unit 403 calculates the correlation between the set of pixels centered on the pixel of interest, and the pixel sets selected for each angle. For example, the error estimating unit 403 calculates the sum of absolute values of difference of the pixel values of the pixels of the set including the pixel of interest and the pixel values of the pixels at corresponding positions in other sets, for each angle.

The angle of data continuity may be detected based on the correlation between pixel sets selected for each angle.

The error estimating unit 403 supplies the information indicating the calculated correlation to the continuity direction derivation unit 404.

In step S406, from position of the pixel set having the strongest correlation based on the correlation calculated in the processing in step S405, the continuity direction derivation unit 404 detects the data continuity angle based on the reference axis in the input image which is image data that corresponds to the lost actual world light signal continuity.

For example, the continuity direction derivation unit 404 selects the smallest aggregate of the aggregate of absolute values of difference of pixel values, and detects the data continuity angle θ from the position of the pixel set regarding which the selected aggregate has been calculated.

The continuity direction derivation unit 404 outputs data continuity information indicating the angle of the data continuity that has been detected.

In step S407, the data selecting unit 402 determines whether or not processing of all pixels has ended, and in the event that determination is made that processing of all pixels has not ended, the flow returns to step S401, a pixel of interest is selected from pixels not yet taken as the pixel of interest, and the above-described processing is repeated.

In the event that determination is made in step S407 that processing of all pixels has ended, the processing ends.

Thus, the data continuity detecting unit 101 can detect the data continuity angle based on the reference axis in the image data, corresponding to the lost actual world light signal continuity.

Note that an arrangement may be made wherein the data continuity detecting unit 101 of which the configuration is shown in FIG. 17 detects activity in the spatial direction of the input image with regard to the pixel of interest which is a pixel of interest in the frame of interest which is a frame of interest, extracts multiple pixel sets made up of a predetermined number of pixels in one row in the vertical direction or one row in the horizontal direction from the frame of interest and from each of frames before or after time-wise the frame of interest, for each angle and movement vector based on the pixel of interest and the space-directional reference axis, according to the detected activity, detects the correlation of the extracted pixel sets, and detects the data continuity angle in the time direction and spatial direction in the input image, based on this correlation.

Figure 25:
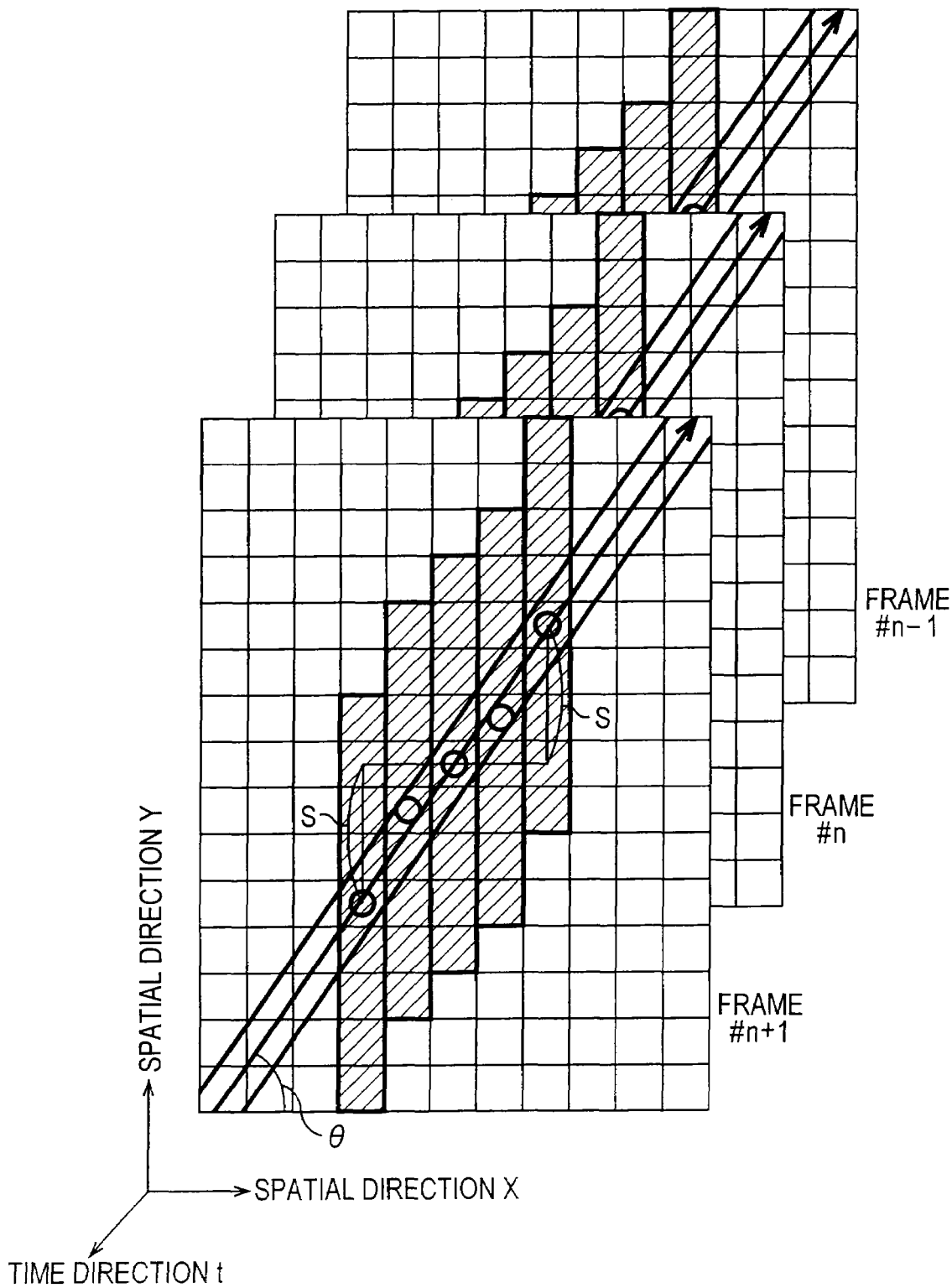
FIG. 25 is a diagram illustrating a set of pixels extracted when detecting the angle of data continuity in the time direction and space direction.

For example, as shown in FIG. 25, the data selecting unit 402 extracts multiple pixel sets made up of a predetermined number of pixels in one row in the vertical direction or one row in the horizontal direction from frame #n which is the frame of interest, frame #n−1, and frame #n+1, for each angle and movement vector based on the pixel of interest and the space-directional reference axis, according to the detected activity.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

The error estimating unit 403 detects the correlation of pixel sets for each single angle and single movement vector, with regard to the multiple sets of the pixels that have been extracted. The continuity direction derivation unit 404 detects the data continuity angle in the temporal direction and spatial direction in the input image which corresponds to the lost actual world light signal continuity, based on the correlation of pixel sets, and outputs the data continuity information indicating the angle.

Figure 26:
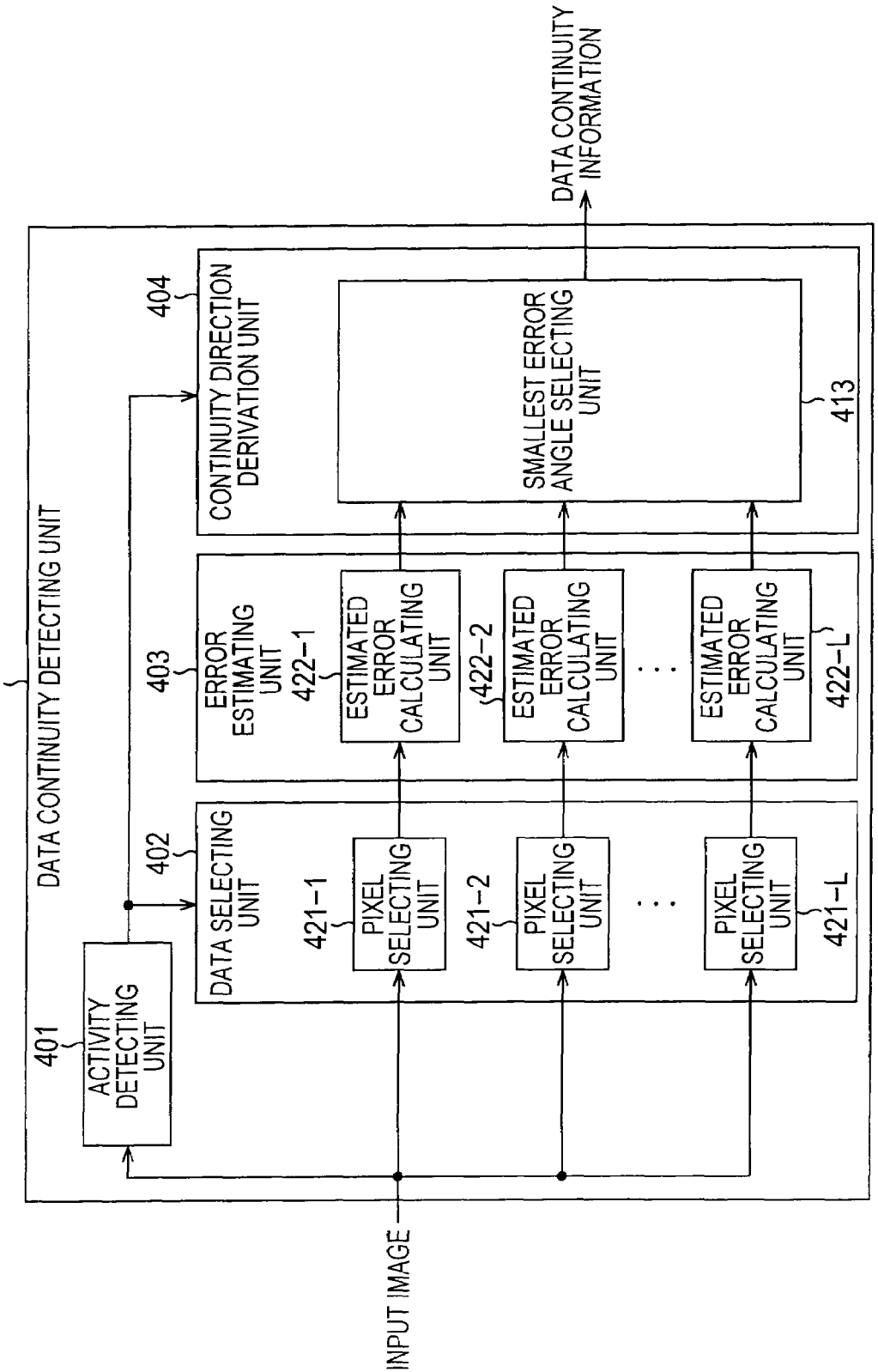
FIG. 26 is a block diagram illustrating another further detailed configuration of the data continuity detecting unit.

FIG. 26 is a block diagram illustrating another configuration of the data continuity detecting unit 101 shown in FIG. 17, in further detail. Portions which are the same as the case shown in FIG. 21 are denoted with the same numerals, and description thereof will be omitted.

The data selecting unit 402 includes pixel selecting unit 421-1 through pixel selecting unit 421-L. The error estimating unit 403 includes estimated error calculating unit 422-1 through estimated error calculating unit 422-L.

With the data continuity detecting unit 101 shown in FIG. 26, sets of a number corresponding to the range of the angle are extracted wherein the pixel sets are made up of pixels of a number corresponding to the range of the angle, the correlation of the extracted pixel sets is detected, and the data continuity angle based on the reference axis in the input image is detected based on the detected correlation.

First, the processing of the pixel selecting unit 421-1 through pixel selecting unit 421-L in the event that the angle of the data continuity indicated by activity information is any value 45 degrees to 135 degrees, will be described.

Figure 27:
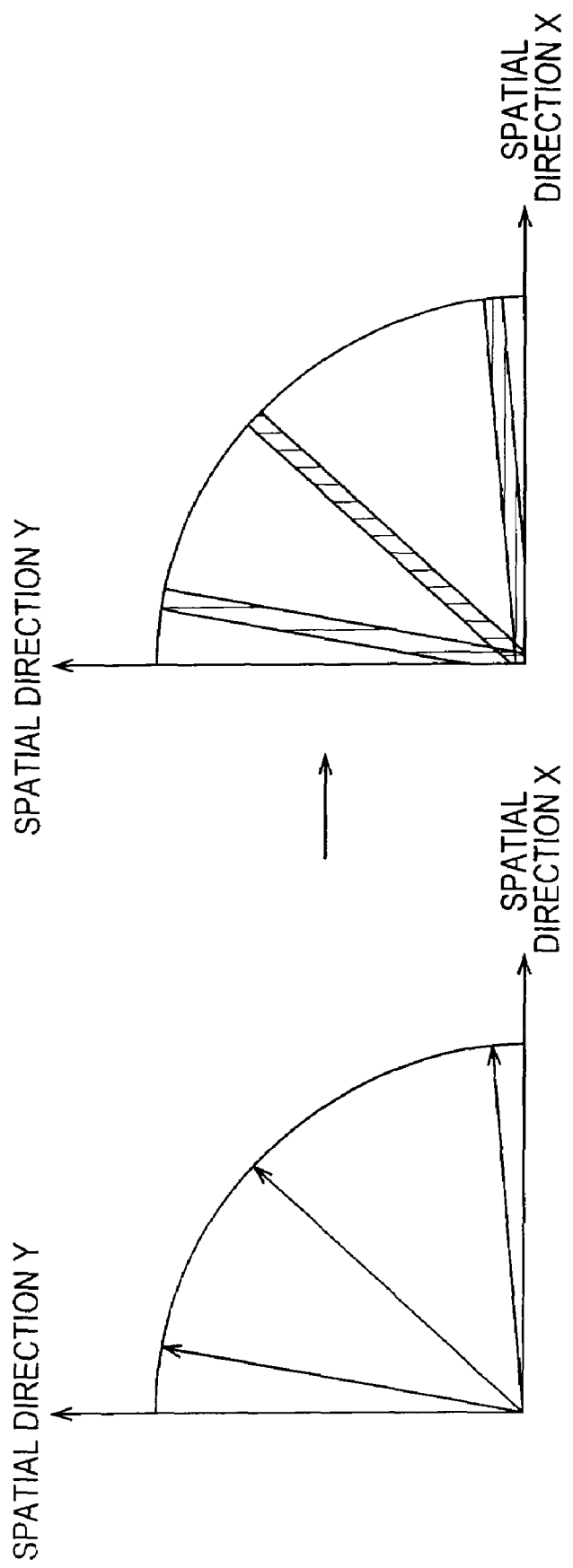
FIG. 27 is a diagram for describing a set of pixels made up of pixels of a number corresponding to the range of angle of set straight lines.

As shown to the left side in FIG. 27, with the data continuity detecting unit 101 shown in FIG. 21, pixel sets of a predetermined number of pixels are extracted regardless of the angle of the set straight line, but with the data continuity detecting unit 101 shown in FIG. 26, pixel sets of a number of pixels corresponding to the range of the angle of the set straight line are extracted, as indicated at the right side of FIG. 27. Also, with the data continuity detecting unit 101 shown in FIG. 26, pixels sets of a number corresponding to the range of the angle of the set straight line are extracted.

The pixel selecting unit 421-1 through pixel selecting unit 421-L set straight lines of mutually differing predetermined angles which pass through the pixel of interest with the axis indicating the spatial direction X as a reference axis, in the range of 45 degrees to 135 degrees.

The pixel selecting unit 421-1 through pixel selecting unit 421-L select, from pixels belonging to one vertical row of pixels to which the pixel of interest belongs, pixels above the pixel of interest and pixels below the pixel of interest of a number corresponding to the range of the angle of the straight line set for each, and the pixel of interest, as a pixel set.

The pixel selecting unit 421-1 through pixel selecting unit 421-L select, from pixels belonging to one vertical line each on the left side and the right side as to the one vertical row of pixels to which the pixel of interest belongs, a predetermined distance away therefrom in the horizontal direction with the pixel as a reference, pixels closest to the straight lines set for each, and selects, from one vertical row of pixels as to the selected pixel, pixels above the selected pixel of a number corresponding to the range of angle of the set straight line, pixels below the selected pixel of a number corresponding to the range of angle of the set straight line, and the selected pixel, as a pixel set.

That is to say, the pixel selecting unit 421-1 through pixel selecting unit 421-L select pixels of a number corresponding to the range of angle of the set straight line as pixel sets. The pixel selecting unit 421-1 through pixel selecting unit 421-L select pixels sets of a number corresponding to the range of angle of the set straight line.

For example, in the event that the image of a fine line, positioned at an angle approximately 45 degrees as to the spatial direction X, and having a width which is approximately the same width as the detection region of a detecting element, has been imaged with the sensor, the image of the fine line is projected on the data such that arc shapes are formed on three pixels aligned in one row in the spatial direction Y for the fine-line image. Conversely, in the event that the image of a fine line, positioned at an angle approximately vertical to the spatial direction X, and having a width which is approximately the same width as the detection region of a detecting element, has been imaged with the sensor, the image of the fine line is projected on the data such that arc shapes are formed on a great number of pixels aligned in one row in the spatial direction Y for the fine-line image.

With the same number of pixels included in the pixel sets, in the event that the fine line is positioned at an angle approximately 45 degrees to the spatial direction X, the number of pixels on which the fine line image has been projected is smaller in the pixel set, meaning that the resolution is lower. On the other hand, in the event that the fine line is positioned approximately vertical to the spatial direction X, processing is performed on a part of the pixels on which the fine line image has been projected, which may lead to lower accuracy.

Accordingly, to make the number of pixels upon which the fine line image is projected to be approximately equal, the pixel selecting unit 421-1 through pixel selecting unit 421-L selects the pixels and the pixel sets so as to reduce the number of pixels included in each of the pixels sets and increase the number of pixel sets in the event that the straight line set is closer to an angle of 45 degrees as to the spatial direction X, and increase the number of pixels included in each of the pixels sets and reduce the number of pixel sets in the event that the straight line set is closer to being vertical as to the spatial direction X.

Figure 28:
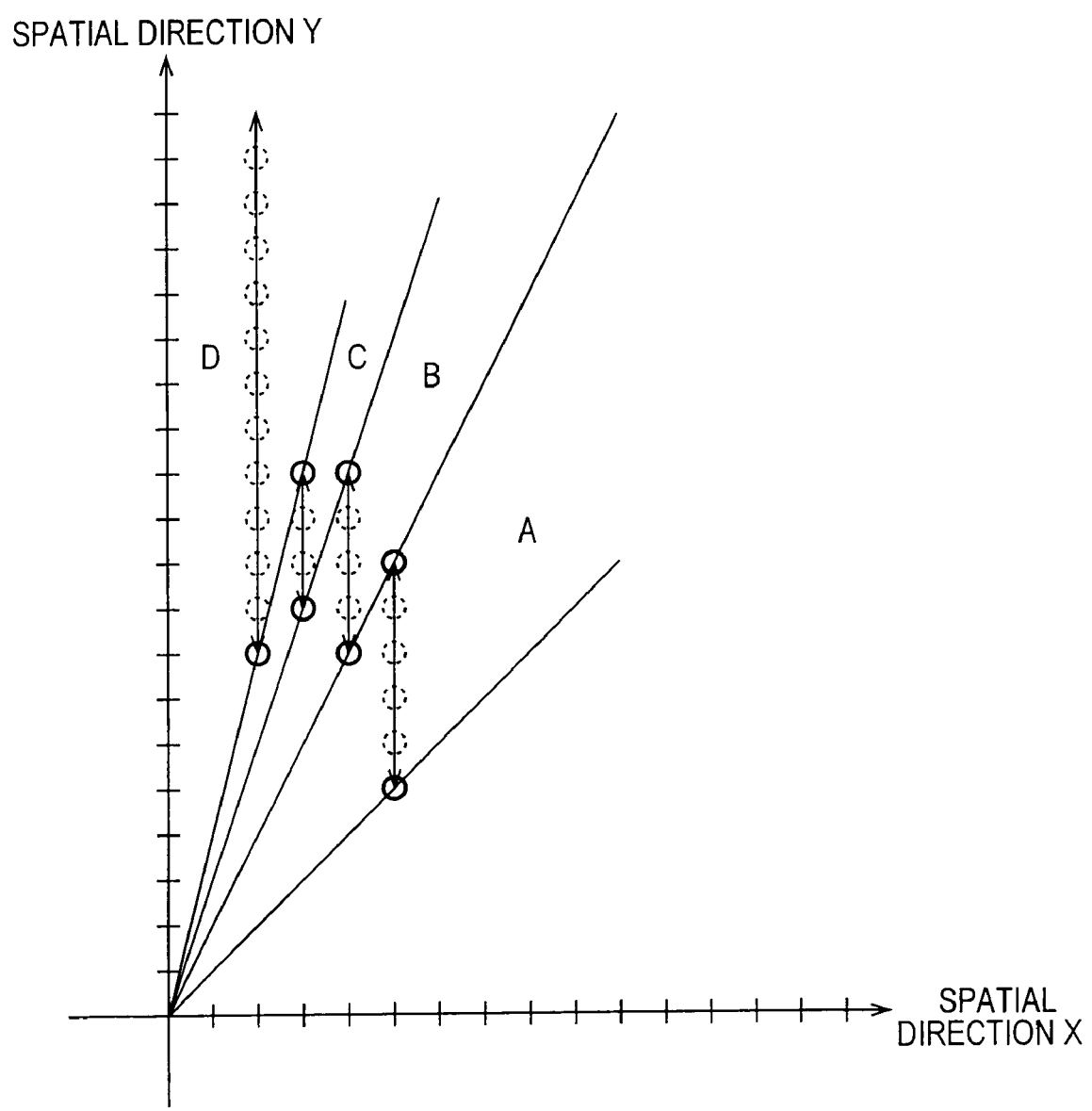
FIG. 28 is a diagram describing the range of angle of the set straight lines.

For example, as shown in FIG. 28 and FIG. 29, in the event that the angle of the set straight line is within the range of 45 degrees or greater but smaller than 63.4 degrees (the range indicated by A in FIG. 28 and FIG. 29), the pixel selecting unit 421-1 through pixel selecting unit 421-L select five pixels centered on the pixel of interest from one vertical row of pixels as to the pixel of interest, as a pixel set, and also select as pixel sets five pixels each from pixels belonging to one row of pixels each on the left side and the right side of the pixel of interest within five pixels therefrom in the horizontal direction.

That is to say, in the event that the angle of the set straight line is within the range of 45 degrees or greater but smaller than 63.4 degrees the pixel selecting unit 421-1 through pixel selecting unit 421-L select 11 pixel sets each made up of five pixels, from the input image. In this case, the pixel selected as the pixel which is at the closest position to the set straight line is at a position five pixels to nine pixels in the vertical direction as to the pixel of interest.

In FIG. 29, the number of rows indicates the number of rows of pixels to the left side or right side of the pixel of interest from which pixels are selected as pixel sets. In FIG. 29, the number of pixels in one row indicates the number of pixels selected as a pixel set from the one row of pixels vertical as to the pixel of interest, or the rows to the left side or the right side of the pixel of interest. In FIG. 29, the selection range of pixels indicates the position of pixels to be selected in the vertical direction, as the pixel at a position closest to the set straight line as to the pixel of interest.

Figure 30:
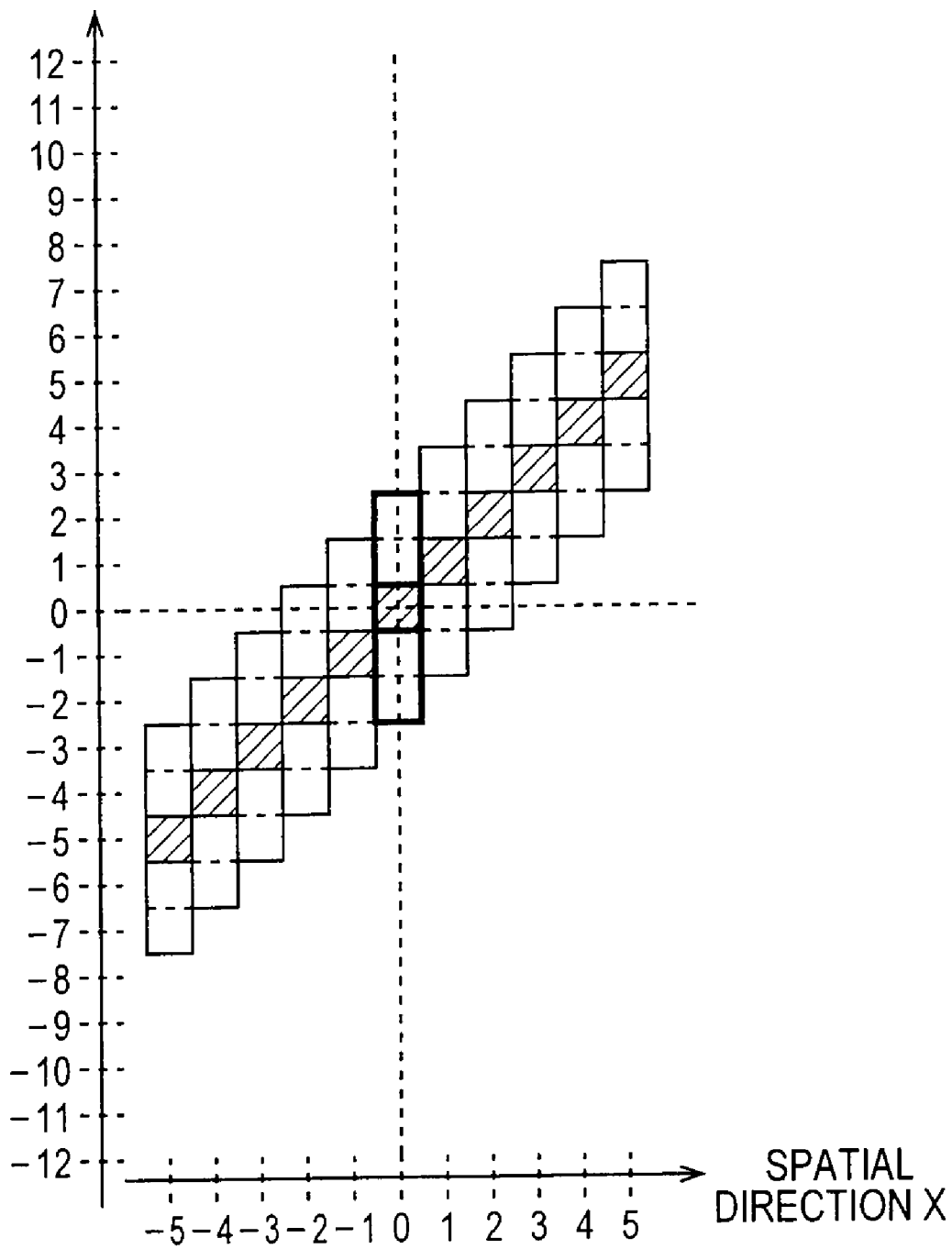
FIG. 30 is a diagram for describing the number of pixel sets and the number of pixels per pixel set.

As shown in FIG. 30, for example, in the event that the angle of the set straight line is 45 degrees, the pixel selecting unit 421-1 selects five pixels centered on the pixel of interest from one vertical row of pixels as to the pixel of interest, as a pixel set, and also selects as pixel sets five pixels each from pixels belonging to one row of pixels each on the left side and the right side of the pixel of interest within five pixels therefrom in the horizontal direction. That is to say, the pixel selecting unit 421-1 selects 11 pixel sets each made up of five pixels, from the input image. In this case, of the pixels selected as the pixels at the closest position to the set straight line the pixel which is at the farthest position from the pixel of interest is at a position five pixels in the vertical direction as to the pixel of interest.

Note that in FIG. 30 through FIG. 37, the squares represented by dotted lines (single grids separated by dotted lines) indicate single pixels, and squares represented by solid lines indicate pixel sets. In FIG. 30 through FIG. 37, the coordinate of the pixel of interest in the spatial direction X is 0, and the coordinate of the pixel of interest in the spatial direction Y is 0.

Also, in FIG. 30 through FIG. 37, the hatched squares indicate the pixel of interest or the pixels at positions closest to the set straight line. In FIG. 30 through FIG. 37, the squares represented by heavy lines indicate the set of pixels selected with the pixel of interest as the center.

Figure 31:
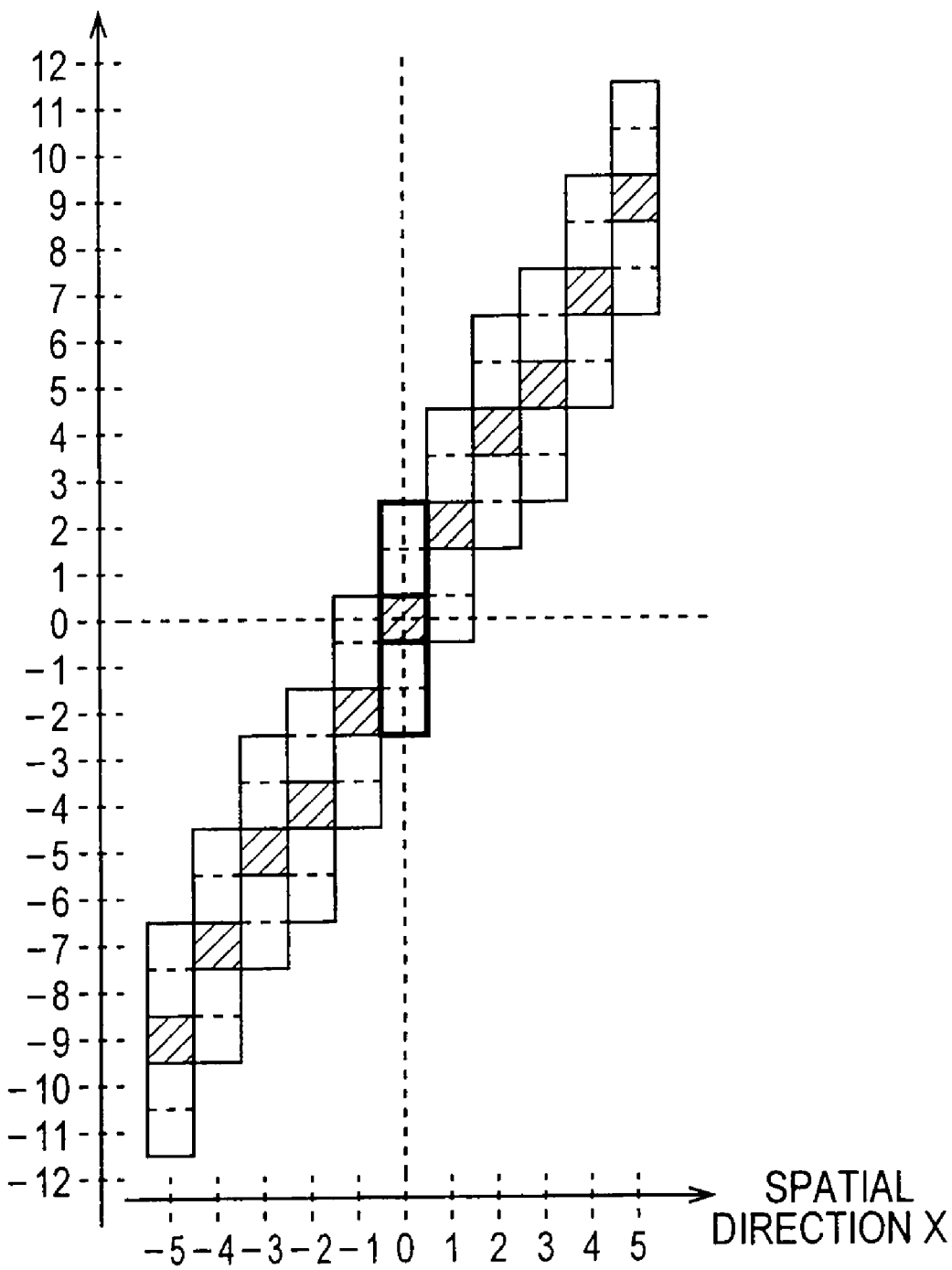
FIG. 31 is a diagram for describing the number of pixel sets and the number of pixels per pixel set.

As shown in FIG. 31, for example, in the event that the angle of the set straight line is 60.9 degrees, the pixel selecting unit 421-2 selects five pixels centered on the pixel of interest from one vertical row of pixels as to the pixel of interest, as a pixel set, and also selects as pixel sets five pixels each from pixels belonging to one vertical row of pixels each on the left side and the right side of the pixel of interest within five pixels therefrom in the horizontal direction. That is to say, the pixel selecting unit 421-2 selects 11 pixel sets each made up of five pixels, from the input image. In this case, of the pixels selected as the pixels at the closest position to the set straight line the pixel which is at the farthest position from the pixel of interest is at a position nine pixels in the vertical direction as to the pixel of interest.

For example, as shown in FIG. 28 and FIG. 29, in the event that the angle of the set straight line is 63.4 degrees or greater but smaller than 71.6 degrees (the range indicated by B in FIG. 28 and FIG. 29), the pixel selecting unit 421-1 through pixel selecting unit 421-L select seven pixels centered on the pixel of interest from one vertical row of pixels as to the pixel of interest, as a pixel set, and also select as pixel sets seven pixels each from pixels belonging to one row of pixels each on the left side and the right side of the pixel of interest within four pixels therefrom in the horizontal direction.

That is to say, in the event that the angle of the set straight line is 63.4 degrees or greater but smaller than 71.6 degrees the pixel selecting unit 421-1 through pixel selecting unit 421-L select nine pixel sets each made up of seven pixels, from the input image. In this case, the pixel selected as the pixel which is at the closest position to the set straight line is at a position eight pixels to 11 pixels in the vertical direction as to the pixel of interest.

Figure 32:
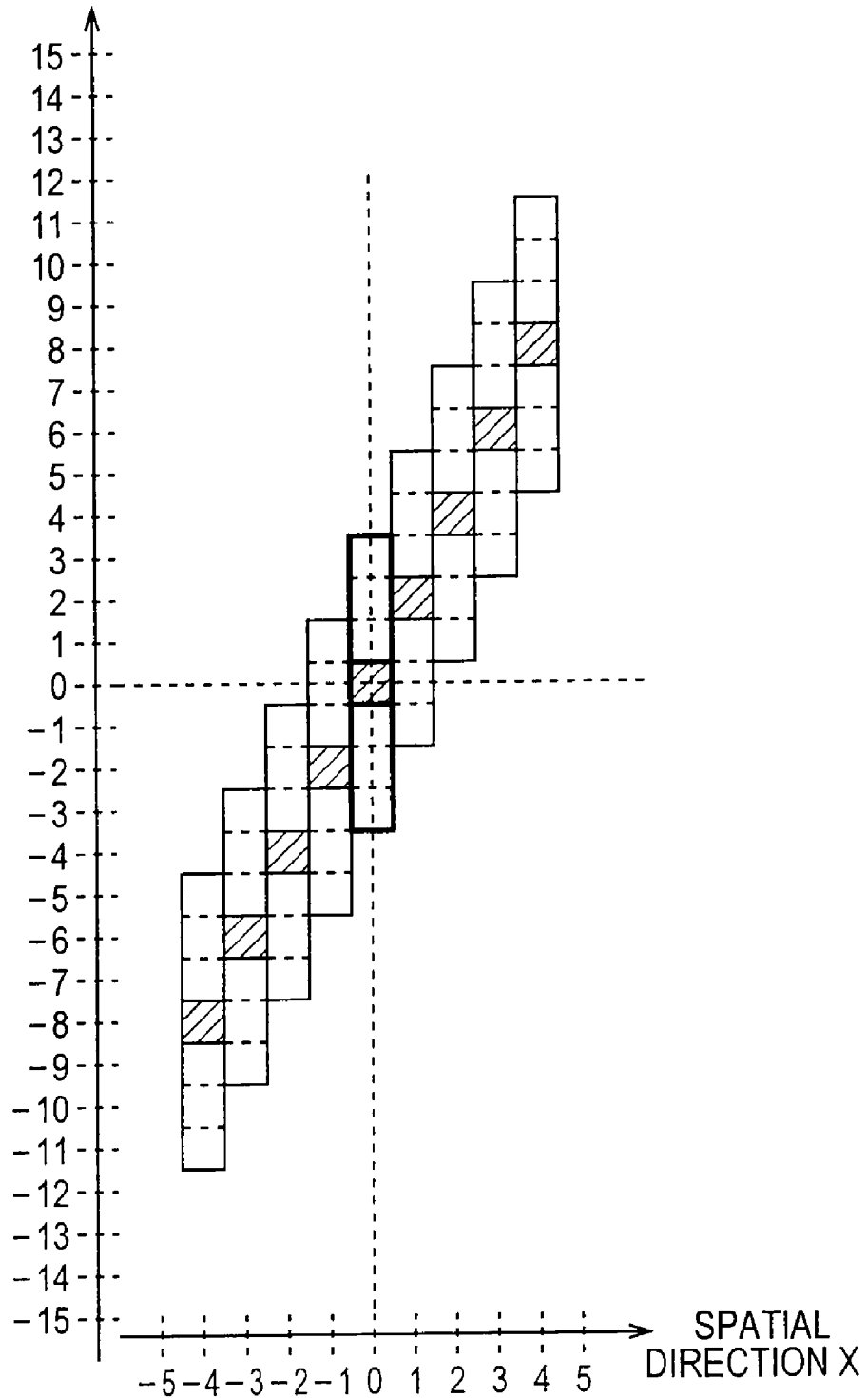
FIG. 32 is a diagram for describing the number of pixel sets and the number of pixels per pixel set.

As shown in FIG. 32, for example, in the event that the angle of the set straight line is 63.4 degrees, the pixel selecting unit 421-3 selects seven pixels centered on the pixel of interest from one vertical row of pixels as to the pixel of interest, as a pixel set, and also selects as pixel sets seven pixels each from pixels belonging to one row of pixels each on the left side and the right side of the pixel of interest within four pixels therefrom in the horizontal direction. That is to say, the pixel selecting unit 421-3 selects nine pixel sets each made up of seven pixels, from the input image. In this case, of the pixels selected as the pixels at the closest position to the set straight line the pixel which is at the farthest position from the pixel of interest is at a position eight pixels in the vertical direction as to the pixel of interest.

Figure 33:
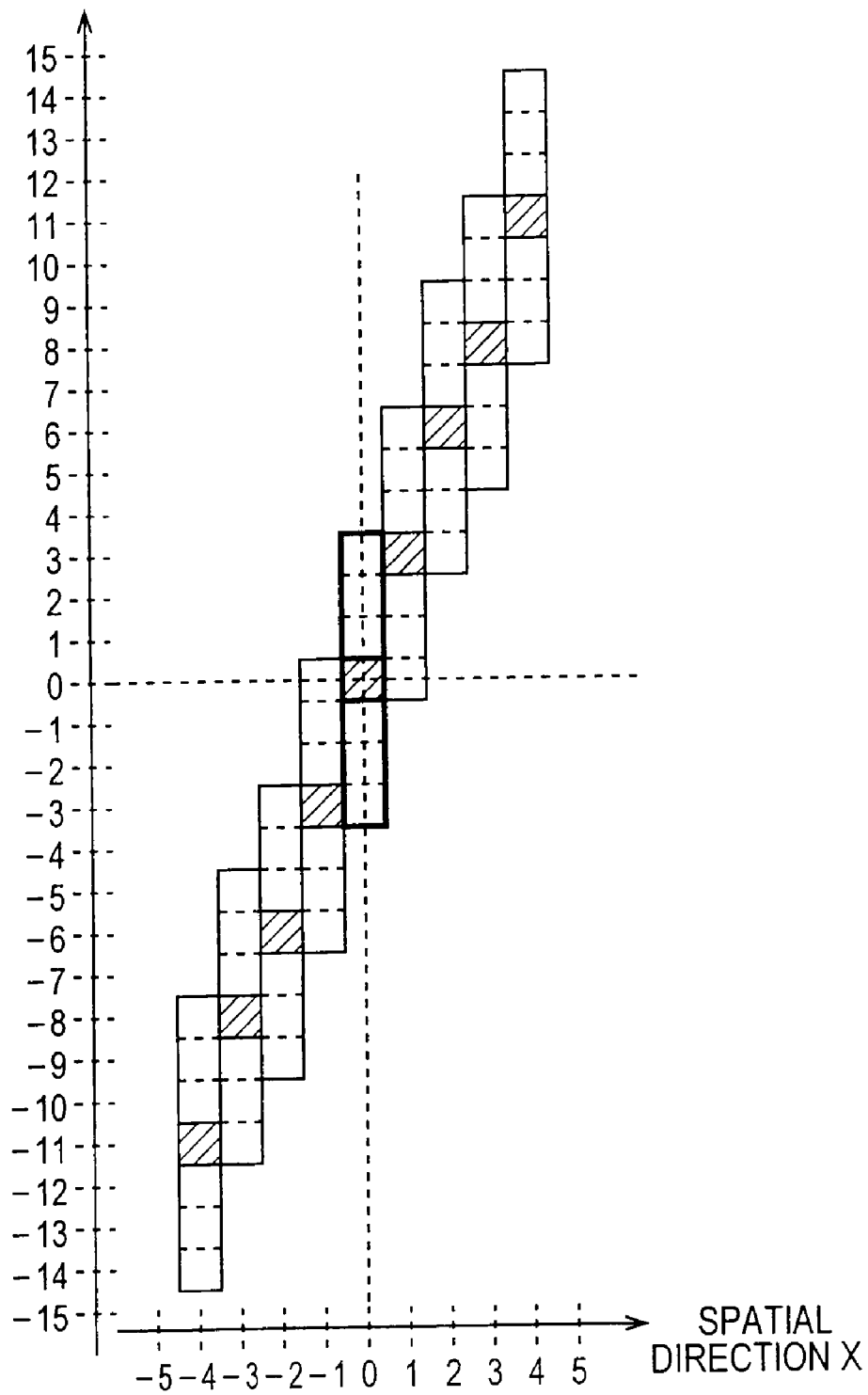
FIG. 33 is a diagram for describing the number of pixel sets and the number of pixels per pixel set.

As shown in FIG. 33, for example, in the event that the angle of the set straight line is 70.0 degrees, the pixel selecting unit 421-4 selects seven pixels centered on the pixel of inter- est from one vertical row of pixels as to the pixel of interest, as a pixel set, and also selects as pixel sets seven pixels each from pixels belonging to one row of pixels each on the left side and the right side of the pixel of interest within four pixels therefrom in the horizontal direction. That is to say, the pixel selecting unit 421-4 selects nine pixel sets each made up of seven pixels, from the input image. In this case, of the pixels selected as the pixels at the closest position to the set straight line the pixel which is at the farthest position from the pixel of interest is at a position 11 pixels in the vertical direction as to the pixel of interest.

For example, as shown in FIG. 28 and FIG. 29, in the event that the angle of the set straight line is 71.6 degrees or greater but smaller than 76.0 degrees (the range indicated by C in FIG. 28 and FIG. 29), the pixel selecting unit 421-1 through pixel selecting unit 421-L select nine pixels centered on the pixel of interest from one vertical row of pixels as to the pixel of interest, as a pixel set, and also select as pixel sets nine pixels each from pixels belonging to one row of pixels each on the left side and the right side of the pixel of interest within three pixels therefrom in the horizontal direction.

That is to say, in the event that the angle of the set straight line is 71.6 degrees or greater but smaller than 76.0 degrees, the pixel selecting unit 421-1 through pixel selecting unit 421-L select seven pixel sets each made up of nine pixels, from the input image. In this case, the pixel selected as the pixel which is at the closest position to the set straight line is at a position nine pixels to 11 pixels in the vertical direction as to the pixel of interest.

Figure 34:
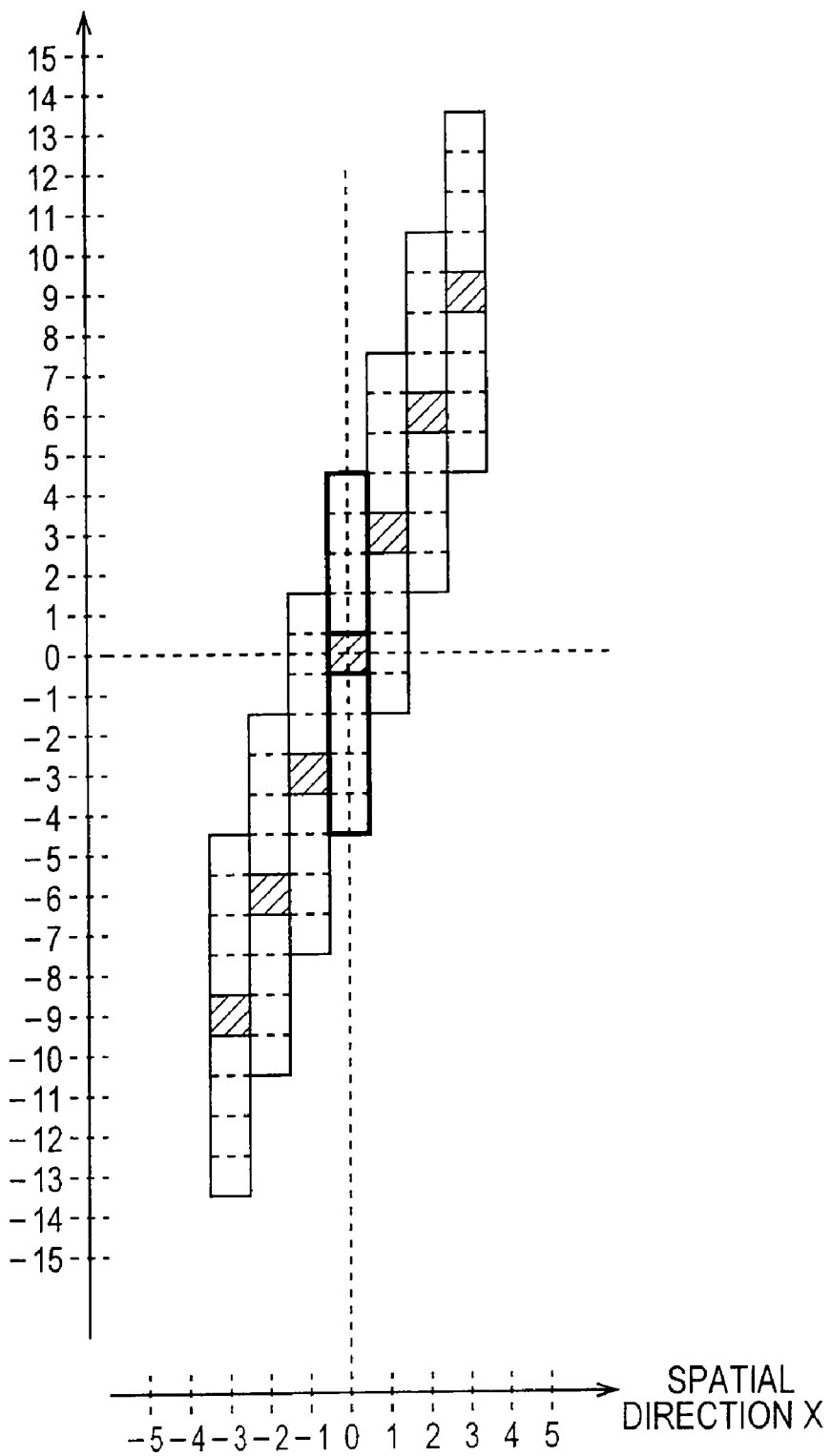
FIG. 34 is a diagram for describing the number of pixel sets and the number of pixels per pixel set.

As shown in FIG. 34, for example, in the event that the angle of the set straight line is 71.6 degrees, the pixel selecting unit 421-5 selects nine pixels centered on the pixel of interest from one vertical row of pixels as to the pixel of interest, as a pixel set, and also selects as pixel sets nine pixels each from pixels belonging to one row of pixels each on the left side and the right side of the pixel of interest within three pixels therefrom in the horizontal direction. That is to say, the pixel selecting unit 421-5 selects seven pixel sets each made up of nine pixels, from the input image. In this case, of the pixels selected as the pixels at the closest position to the set straight line the pixel which is at the farthest position from the pixel of interest is at a position nine pixels in the vertical direction as to the pixel of interest.

Figure 35:
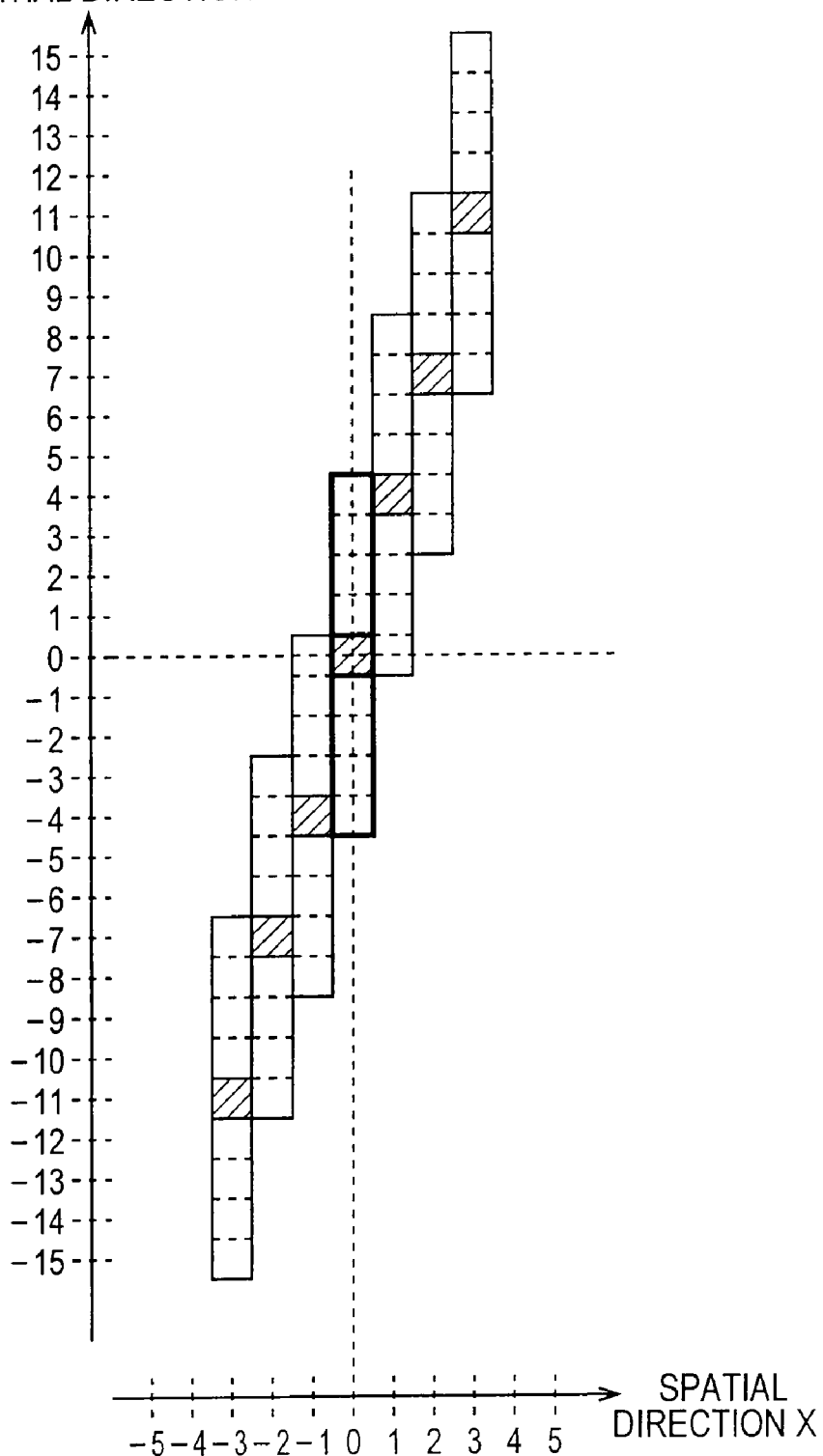
FIG. 35 is a diagram for describing the number of pixel sets and the number of pixels per pixel set.

Also, As shown in FIG. 35, for example, in the event that the angle of the set straight line is 74.7 degrees, the pixel selecting unit 421-6 selects nine pixels centered on the pixel of interest from one vertical row of pixels as to the pixel of interest, as a pixel set, and also selects as pixel sets nine pixels each from pixels belonging to one row of pixels each on the left side and the right side of the pixel of interest within three pixels therefrom in the horizontal direction. That is to say, the pixel selecting unit 421-6 selects seven pixel sets each made up of nine pixels, from the input image. In this case, of the pixels selected as the pixels at the closest position to the set straight line the pixel which is at the farthest position from the pixel of interest is at a position 11 pixels in the vertical direction as to the pixel of interest.

For example, as shown in FIG. 28 and FIG. 29, in the event that the angle of the set straight line is 76.0 degrees or greater but smaller than 87.7 degrees (the range indicated by D in FIG. 28 and FIG. 29), the pixel selecting unit 421-1 through pixel selecting unit 421-L select 11 pixels centered on the pixel of interest from one vertical row of pixels as to the pixel of interest, as a pixel set, and also select as pixel sets 11 pixels each from pixels belonging to one row of pixels each on the left side and the right side of the pixel of interest within two pixels therefrom in the horizontal direction. That is to say, in the event that the angle of the set straight line is 76.0 degrees or greater but smaller than 87.7 degrees, the pixel selecting unit 421-1 through pixel selecting unit 421-L select five pixel sets each made up of 11 pixels, from the input image. In this case, the pixel selected as the pixel which is at the closest position to the set straight line is at a position eight pixels to 50 pixels in the vertical direction as to the pixel of interest.

Figure 36:
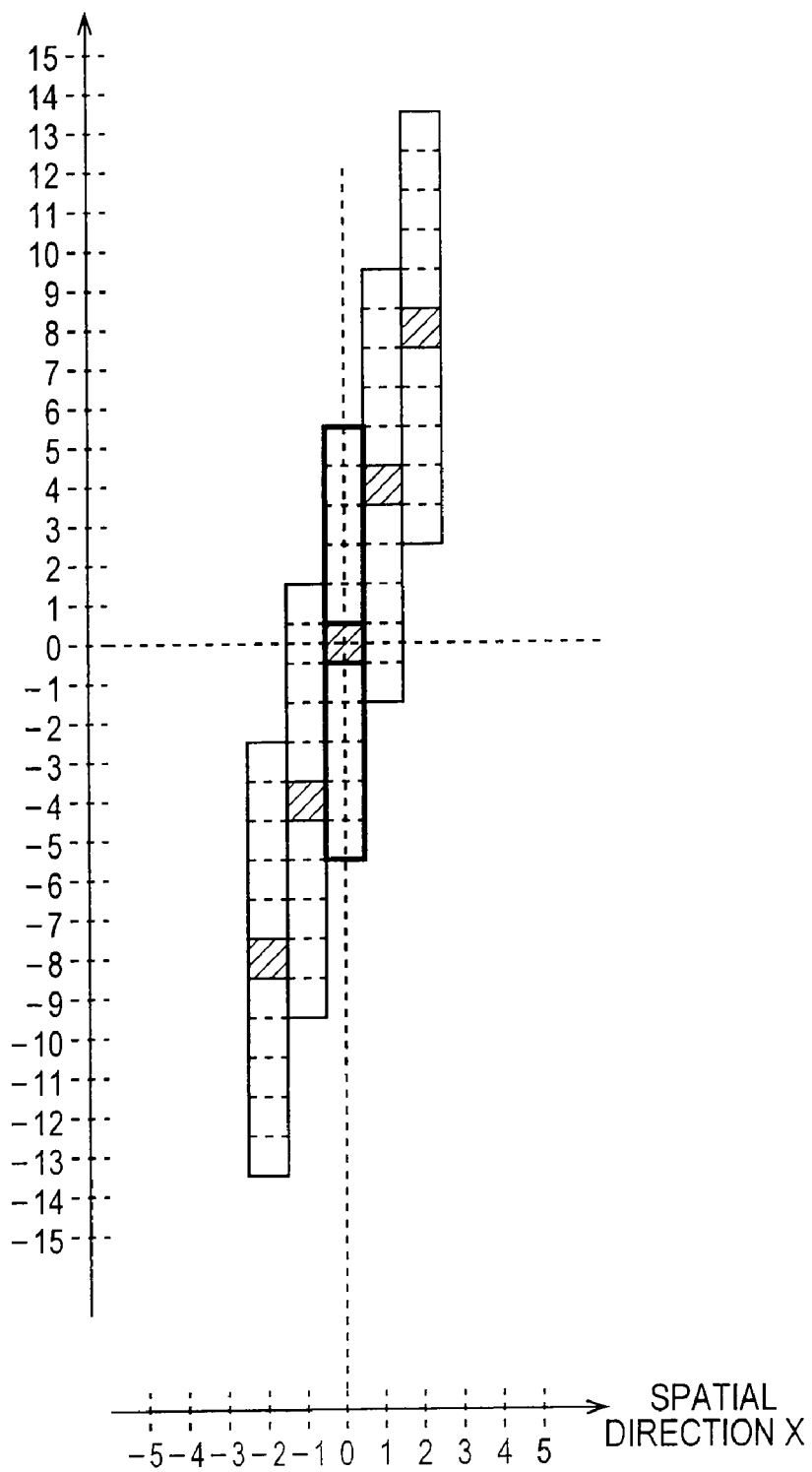
FIG. 36 is a diagram for describing the number of pixel sets and the number of pixels per pixel set.

As shown in FIG. 36, for example, in the event that the angle of the set straight line is 76.0 degrees, the pixel selecting unit 421-7 selects 11 pixels centered on the pixel of interest from one vertical row of pixels as to the pixel of interest, as a pixel set, and also selects as pixel sets 11 pixels each from pixels belonging to one row of pixels each on the left side and the right side of the pixel of interest within two pixels therefrom in the horizontal direction. That is to say, the pixel selecting unit 421-7 selects five pixel sets each made up of 11 pixels, from the input image. In this case, of the pixels selected as the pixels at the closest position to the set straight line the pixel which is at the farthest position from the pixel of interest is at a position eight pixels in the vertical direction as to the pixel of interest.

Figure 37:
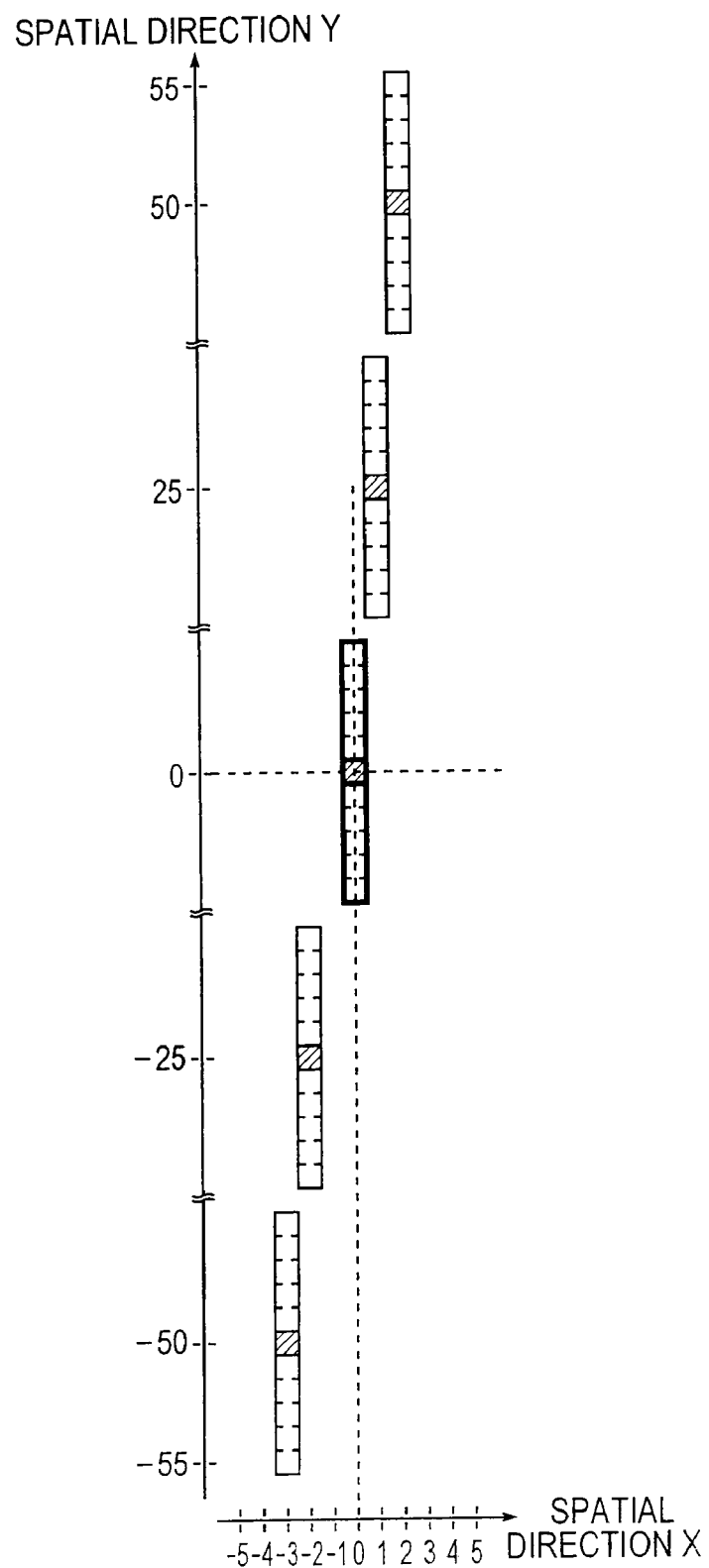
FIG. 37 is a diagram for describing the number of pixel sets and the number of pixels per pixel set.

Also, as shown in FIG. 37, for example, in the event that the angle of the set straight line is 87.7 degrees, the pixel selecting unit 421-8 selects 11 pixels centered on the pixel of interest from one vertical row of pixels as to the pixel of interest, as a pixel set, and also selects as pixel sets 11 pixels each from pixels belonging to one row of pixels each on the left side and the right side of the pixel of interest within two pixels therefrom in the horizontal direction. That is to say, the pixel selecting unit 421-8 selects five pixel sets each made up of 11 pixels, from the input image. In this case, of the pixels selected as the pixels at the closest position to the set straight line the pixel which is at the farthest position from the pixel of interest is at a position 50 pixels in the vertical direction as to the pixel of interest.

Thus, the pixel selecting unit 421-1 through pixel selecting unit 421-L each select a predetermined number of pixels sets corresponding to the range of the angle, made up of a predetermined number of pixels corresponding to the range of the angle.

The pixel selecting unit 421-1 supplies the selected pixel sets to an estimated error calculating unit 422-1, and the pixel selecting unit 421-2 supplies the selected pixel sets to an estimated error calculating unit 422-2. In the same way, the pixel selecting unit 421-3 through pixel selecting unit 421-L supply the selected pixel sets to estimated error calculating unit 422-3 through estimated error calculating unit 422-L.

The estimated error calculating unit 422-1 through estimated error calculating unit 422-L detect the correlation of pixel values of the pixels at corresponding positions in the multiple sets supplied from each of the pixel selecting unit 421-1 through pixel selecting unit 421-L. For example, the estimated error calculating unit 422-1 through estimated error calculating unit 422-L calculate the sum of absolute values of difference between the pixel values of the pixels of the pixel set including the pixel of interest, and of the pixel values of the pixels at corresponding positions in the other multiple sets, supplied from each of the pixel selecting unit 421-1 through pixel selecting unit 421-L, and divides the calculated sum by the number of pixels contained in the pixel sets other than the pixel set containing the pixel of interest. The reason for dividing the calculated sum by the number of pixels contained in sets other than the set containing the pixel of interest is to normalize the value indicating the correlation, since the number of pixels selected differs according to the angle of the straight line that has been set.

The estimated error calculating unit 422-1 through estimated error calculating unit 422-L supply the detected information indicating correlation to the smallest error angle selecting unit 413. For example, the estimated error calculating unit 422-1 through estimated error calculating unit 422-L supply the normalized sum of difference of the pixel values to the smallest error angle selecting unit 413.

Next, the processing of the pixel selecting unit 421-1 through pixel selecting unit 421-L in the event that the angle of the data continuity indicated by activity information is any value 0 degrees to 45 degrees and 135 degrees to 180 degrees, will be described.

The pixel selecting unit 421-1 through pixel selecting unit 421-L set straight lines of mutually differing predetermined angles which pass through the pixel of interest with the axis indicating the spatial direction X as a reference, in the range of 0 degrees to 45 degrees or 135 degrees to 180 degrees.

The pixel selecting unit 421-1 through pixel selecting unit 421-L select, from pixels belonging to one horizontal row of pixels to which the pixel of interest belongs, pixels to the left side of the pixel of interest of a number corresponding to the range of angle of the set line, pixels to the right side of the pixel of interest of a number corresponding to the range of angle of the set line, and the selected pixel, as a pixel set.

The pixel selecting unit 421-1 through pixel selecting unit 421-L select, from pixels belonging to one horizontal line each above and below as to the one horizontal row of pixels to which the pixel of interest belongs, a predetermined distance away therefrom in the vertical direction with the pixel as a reference, pixels closest to the straight lines set for each, and selects, from one horizontal row of pixels as to the selected pixel, pixels to the left side of the selected pixel of a number corresponding to the range of angle of the set line, pixels to the right side of the selected pixel of a number corresponding to the range of angle of the set line, and the selected pixel, as a pixel set.

That is to say, the pixel selecting unit 421-1 through pixel selecting unit 421-L select pixels of a number corresponding to the range of angle of the set line as pixel sets. The pixel selecting unit 421-1 through pixel selecting unit 421-L select pixels sets of a number corresponding to the range of angle of the set line.

The pixel selecting unit 421-1 supplies the selected set of pixels to the estimated error calculating unit 422-1, and the pixel selecting unit 421-2 supplies the selected set of pixels to the estimated error calculating unit 422-2. In the same way, each pixel selecting unit 421-3 through pixel selecting unit 421-L supplies the selected set of pixels to each estimated error calculating unit 422-3 through estimated error calculating unit 422-L.

The estimated error calculating unit 422-1 through estimated error calculating unit 422-L detect the correlation of pixel values of the pixels at corresponding positions in the multiple sets supplied from each of the pixel selecting unit 421-1 through pixel selecting unit 421-L.

The estimated error calculating unit 422-1 through estimated error calculating unit 422-L supply the detected information indicating correlation to the smallest error angle selecting unit 413.

Figure 38:
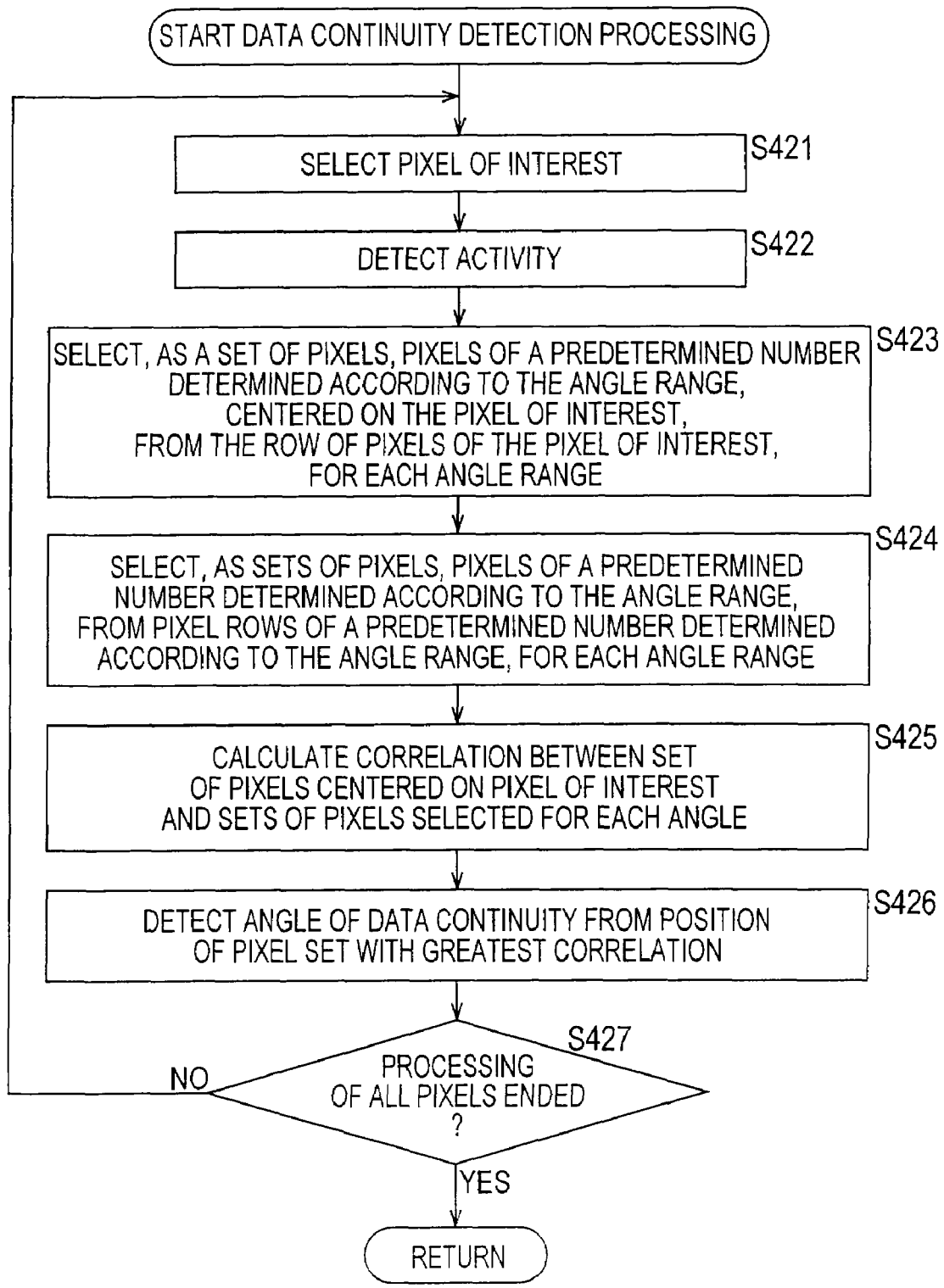
FIG. 38 is a flowchart for describing processing for detecting data continuity.

Next, the processing for data continuity detection with the data continuity detecting unit 101 of which the configuration is shown in FIG. 26, corresponding to the processing in step S101, will be described with reference to the flowchart shown in FIG. 38.

The processing of step S421 and step S422 is the same as the processing of step S401 and step S402, so description thereof will be omitted.

In step S423, the data selecting unit 402 selects, from a row of pixels containing a pixel of interest, a number of pixels predetermined with regard to the range of the angle which are centered on the pixel of interest, as a set of pixels, for each angle of a range corresponding to the activity detected in the processing in step S422. For example, the data selecting unit 402 selects from pixels belonging to one vertical or horizontal row of pixels, pixels of a number determined by the range of angle, for the angle of the straight line to be set, above or to the left of the pixel of interest, below or to the right of the pixel of interest, and the pixel of interest, as a pixel set.

In step S424, the data selecting unit 402 selects, from pixel rows of a number determined according to the range of angle, pixels of a number determined according to the range of angle, as a pixel set, for each predetermined angle range, based on the activity detected in the processing in step S422. For example, the data selecting unit 402 sets a straight line passing through the pixel of interest with an angle of a predetermined range, taking an axis representing the spatial direction X as a reference axis, selects a pixel closest to the straight line while being distanced from the pixel of interest in the horizontal direction or the vertical direction by a predetermined range according to the range of angle of the straight line to be set, and selects pixels of a number corresponding to the range of angle of the straight line to be set from above or to the left side of the selected pixel, pixels of a number corresponding to the range of angle of the straight line to be set from below or to the right side of the selected pixel, and the pixel closest to the selected line, as a pixel set. The data selecting unit 402 selects a set of pixels for each angle.

The data selecting unit 402 supplies the selected pixel sets to the error estimating unit 403.

In step S425, the error estimating unit 403 calculates the correlation between the pixel set centered on the pixel of interest, and the pixel set selected for each angle. For example, the error estimating unit 403 calculates the sum of absolute values of difference between the pixel values of pixels of the set including the pixel of interest and the pixel values of pixels at corresponding positions in the other sets, and divides the sum of absolute values of difference between the pixel values by the number of pixels belonging to the other sets, thereby calculating the correlation.

An arrangement may be made wherein the data continuity angle is detected based on the mutual correlation between the pixel sets selected for each angle.

The error estimating unit 403 supplies the information indicating the calculated correlation to the continuity direction derivation unit 404.

The processing of step S426 and step S427 is the same as the processing of step S406 and step S407, so description thereof will be omitted.

Thus, the data continuity detecting unit 101 can detect the angle of data continuity based on a reference axis in the image data, corresponding to the lost actual world light signal continuity, more accurately and precisely. With the data continuity detecting unit 101 of which the configuration is shown in FIG. 26, the correlation of a greater number of pixels where the fine line image has been projected can be evaluated particularly in the event that the data continuity angle is around 45 degrees, so the angle of data continuity can be detected with higher precision.

Note that an arrangement may be made with the data continuity detecting unit 101 of which the configuration is shown in FIG. 26 as well, wherein activity in the spatial direction of the input image is detected for a certain pixel of interest which is the pixel of interest in a frame of interest which is the frame of interest, and from sets of pixels of a number determined according to the spatial angle range in one vertical row or one horizontal row, pixels of a number corresponding to the spatial angle range are extracted, from the frame of interest and frames previous to or following the frame of interest timewise, for each angle and movement vector based on the pixel of interest and the reference axis in the spatial direction, according to the detected activity, the correlation of the extracted pixel sets is detected, and the data continuity angle in the time direction and the spatial direction in the input image is detected based on the correlation.

Figure 39:
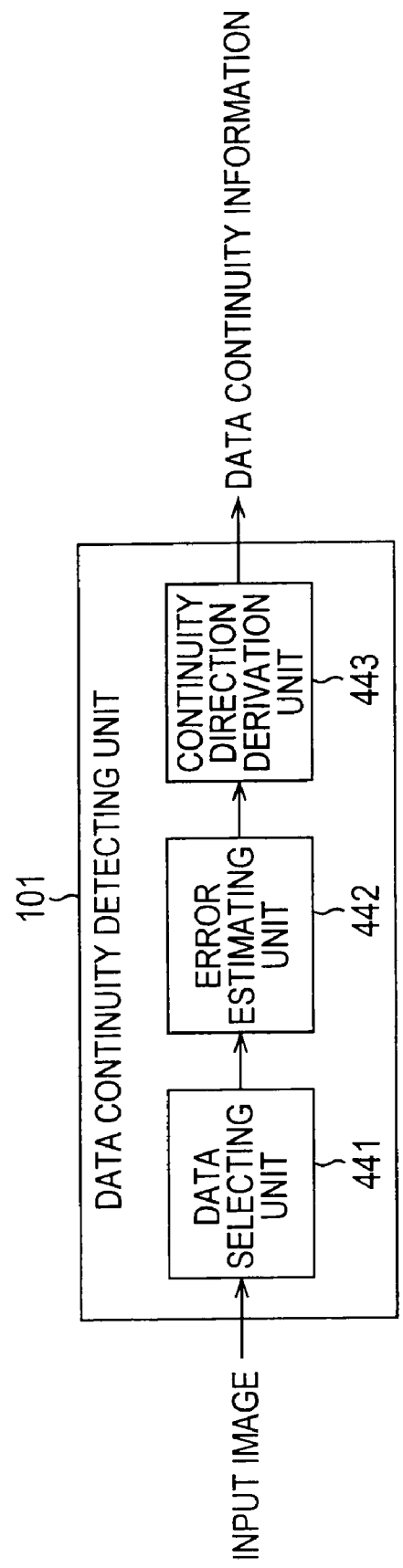
FIG. 39 is a block diagram illustrating still another configuration of the data continuity detecting unit.

FIG. 39 is a block diagram illustrating yet another configuration of the data continuity detecting unit 101.

With the data continuity detecting unit 101 of which the configuration is shown in FIG. 39, with regard to a pixel of interest which is the pixel of interest, a block made up of a predetermined number of pixels centered on the pixel of interest, and multiple blocks each made up of a predetermined number of pixels around the pixel of interest, are extracted, the correlation of the block centered on the pixel of interest and the surrounding blocks is detected, and the angle of data continuity in the input image based on a reference axis is detected, based on the correlation.

A data selecting unit 441 sequentially selects the pixel of interest from the pixels of the input image, extracts the block made of the predetermined number of pixels centered on the pixel of interest and the multiple blocks made up of the predetermined number of pixels surrounding the pixel of interest, and supplies the extracted blocks to an error estimating unit 442.

For example, the data selecting unit 441 extracts a block made up of 5×5 pixels centered on the pixel of interest, and two blocks made up of 5×5 pixels from the surroundings of the pixel of interest for each predetermined angle range based on the pixel of interest and the reference axis.

The error estimating unit 442 detects the correlation between the block centered on the pixel of interest and the blocks in the surroundings of the pixel of the interest supplied from the data selecting unit 441, and supplies correlation information indicating the detected correlation to a continuity direction derivation unit 443.

For example, the error estimating unit 442 detects the correlation of pixel values with regard to a block made up of 5×5 pixels centered on the pixel of interest for each angle range, and two blocks made up of 5×5 pixels corresponding to one angle range.

From the position of the block in the surroundings of the pixel of interest with the greatest correlation based on the correlation information supplied from the error estimating unit 442, the continuity direction derivation unit 443 detects the angle of data continuity in the input image based on the reference axis, that corresponds to the lost actual world light signal continuity, and outputs data continuity information indicating this angle. For example, the continuity direction derivation unit 443 detects the range of the angle regarding the two blocks made up of 5×5 pixels from the surroundings of the pixel of interest which have the greatest correlation with the block made up of 5×5 pixels centered on the pixel of interest, as the angle of data continuity, based on the correlation information supplied from the error estimating unit 442, and outputs data continuity information indicating the detected angle.

Figure 40:
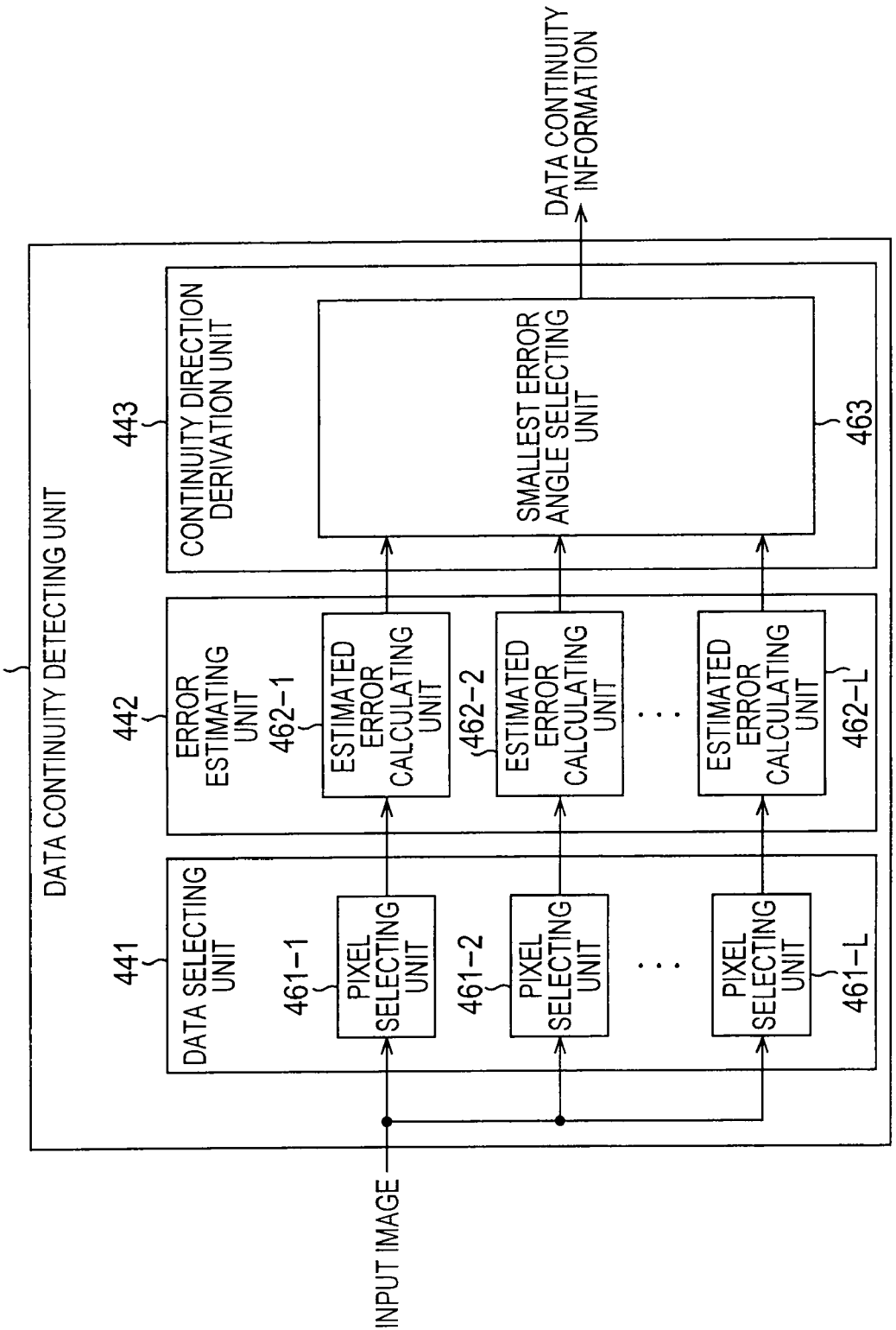
FIG. 40 is a block diagram illustrating a further detailed configuration of the data continuity detecting unit.

FIG. 40 is a block diagram illustrating a more detailed configuration of the data continuity detecting unit 101 shown in FIG. 39.

The data selecting unit 441 includes pixel selecting unit 461-1 through pixel selecting unit 461-L. The error estimating unit 442 includes estimated error calculating unit 462-1 through estimated error calculating unit 462-L. The continuity direction derivation unit 443 includes a smallest error angle selecting unit 463.

For example, the data selecting unit 441 has pixel selecting unit 461-1 through pixel selecting unit 461-8. The error estimating unit 442 has estimated error calculating unit 462-1 through estimated error calculating unit 462-8.

Each of the pixel selecting unit 461-1 through pixel selecting unit 461-L extracts a block made up of a predetermined number of pixels centered on the pixel of interest, and two blocks made up of a predetermined number of pixels according to a predetermined angle range based on the pixel of interest and the reference axis.

Figure 41:
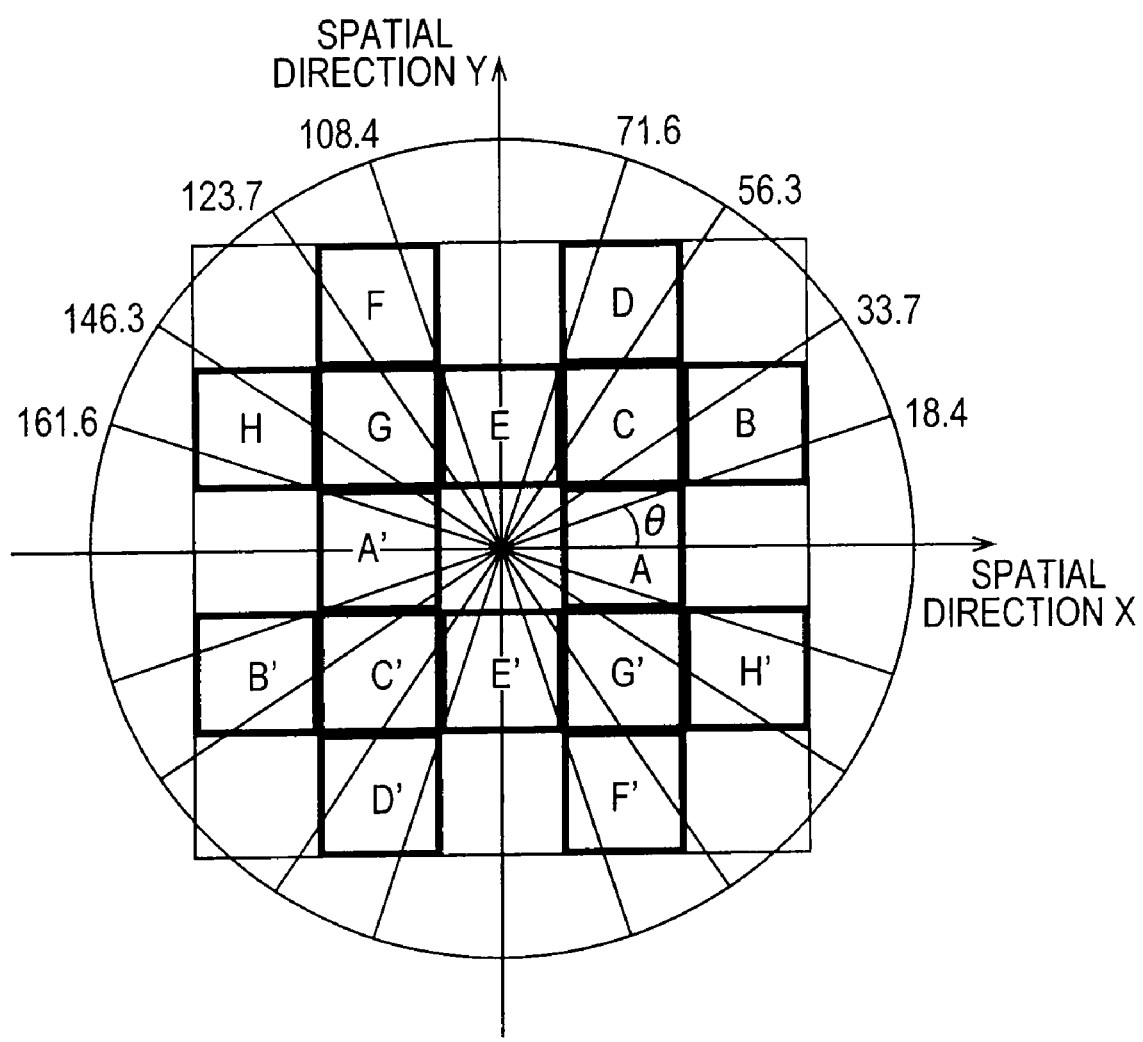
FIG. 41 is a diagram illustrating an example of a block.

FIG. 41 is a diagram for describing an example of a 5×5 pixel block extracted by the pixel selecting unit 461-1 through pixel selecting unit 461-L. The center position in FIG. 41 indicates the position of the pixel of interest.

Note that a 5×5 pixel block is only an example, and the number of pixels contained in a block do not restrict the present invention.

For example, the pixel selecting unit 461-1 extracts a 5×5 pixel block centered on the pixel of interest, and also extracts a 5×5 pixel block (indicated by A in FIG. 41) centered on a pixel at a position shifted five pixels to the right side from the pixel of interest, and extracts a 5×5 pixel block (indicated by A' in FIG. 41) centered on a pixel at a position shifted five pixels to the left side from the pixel of interest, corresponding to 0 degrees to 18.4 degrees and 161.6 degrees to 180.0 degrees. The pixel selecting unit 461-1 supplies the three extracted 5×5 pixel blocks to the estimated error calculating unit 462-1.

The pixel selecting unit 461-2 extracts a 5×5 pixel block centered on the pixel of interest, and also extracts a 5×5 pixel block (indicated by B in FIG. 41) centered on a pixel at a position shifted 10 pixels to the right side from the pixel of interest and five pixels upwards, and extracts a 5×5 pixel block (indicated by B' in FIG. 41) centered on a pixel at a position shifted 10 pixels to the left side from the pixel of interest and five pixels downwards, corresponding to the range of 18.4 degrees through 33.7 degrees. The pixel selecting unit 461-2 supplies the three extracted 5×5 pixel blocks to the estimated error calculating unit 462-2.

The pixel selecting unit 461-3 extracts a 5×5 pixel block centered on the pixel of interest, and also extracts a 5×5 pixel block (indicated by C in FIG. 41) centered on a pixel at a position shifted five pixels to the right side from the pixel of interest and five pixels upwards, and extracts a 5×5 pixel block (indicated by C' in FIG. 41) centered on a pixel at a position shifted five pixels to the left side from the pixel of interest and five pixels downwards, corresponding to the range of 33.7 degrees through 56.3 degrees. The pixel selecting unit 461-3 supplies the three extracted 5×5 pixel blocks to the estimated error calculating unit 462-3.

The pixel selecting unit 461-4 extracts a 5×5 pixel block centered on the pixel of interest, and also extracts a 5×5 pixel block (indicated by D in FIG. 41) centered on a pixel at a position shifted five pixels to the right side from the pixel of interest and 10 pixels upwards, and extracts a 5×5 pixel block (indicated by D' in FIG. 41) centered on a pixel at a position shifted five pixels to the left side from the pixel of interest and 10 pixels downwards, corresponding to the range of 56.3 degrees through 71.6 degrees. The pixel selecting unit 461-4 supplies the three extracted 5×5 pixel blocks to the estimated error calculating unit 462-4.

The pixel selecting unit 461-5 extracts a 5×5 pixel block centered on the pixel of interest, and also extracts a 5×5 pixel block (indicated by E in FIG. 41) centered on a pixel at a position shifted five pixels upwards from the pixel of interest, and extracts a 5×5 pixel block (indicated by E' in FIG. 41) centered on a pixel at a position shifted five pixels downwards from the pixel of interest, corresponding to the range of 71.6 degrees through 108.4 degrees. The pixel selecting unit 461-5 supplies the three extracted 5×5 pixel blocks to the estimated error calculating unit 462-5.

The pixel selecting unit 461-6 extracts a 5×5 pixel block centered on the pixel of interest, and also extracts a 5×5 pixel block (indicated by F in FIG. 41) centered on a pixel at a position shifted five pixels to the left side from the pixel of interest and 10 pixels upwards, and extracts a 5×5 pixel block (indicated by F' in FIG. 41) centered on a pixel at a position shifted five pixels to the right side from the pixel of interest and 10 pixels downwards, corresponding to the range of 108.4 degrees through 123.7 degrees. The pixel selecting unit 461-6 supplies the three extracted 5×5 pixel blocks to the estimated error calculating unit 462-6.

The pixel selecting unit 461-7 extracts a 5×5 pixel block centered on the pixel of interest, and also extracts a 5×5 pixel block (indicated by G in FIG. 41) centered on a pixel at a position shifted five pixels to the left side from the pixel of interest and five pixels upwards, and extracts a 5×5 pixel block (indicated by G' in FIG. 41) centered on a pixel at a position shifted five pixels to the right side from the pixel of interest and five pixels downwards, corresponding to the range of 123.7 degrees through 146.3 degrees. The pixel selecting unit 461-7 supplies the three extracted 5×5 pixel blocks to the estimated error calculating unit 462-7.

The pixel selecting unit 461-8 extracts a 5×5 pixel block centered on the pixel of interest, and also extracts a 5×5 pixel block (indicated by H in FIG. 41) centered on a pixel at a position shifted 10 pixels to the left side from the pixel of interest and five pixels upwards, and extracts a 5×5 pixel block (indicated by H' in FIG. 41) centered on a pixel at a position shifted 10 pixels to the right side from the pixel of interest and five pixels downwards, corresponding to the range of 146.3 degrees through 161.6 degrees. The pixel selecting unit 461-8 supplies the three extracted 5×5 pixel blocks to the estimated error calculating unit 462-8.

Hereafter, a block made up of a predetermined number of pixels centered on the pixel of interest will be called a block of interest.

Hereafter, a block made up of a predetermined number of pixels corresponding to a predetermined range of angle based on the pixel of interest and reference axis will be called a reference block.

In this way, the pixel selecting unit 461-1 through pixel selecting unit 461-8 extract a block of interest and reference blocks from a range of 25×25 pixels, centered on the pixel of interest, for example.

The estimated error calculating unit 462-1 through estimated error calculating unit 462-L detect the correlation between the block of interest and the two reference blocks supplied from the pixel selecting unit 461-1 through pixel selecting unit 461-L, and supplies correlation information indicating the detected correlation to the smallest error angle selecting unit 463.

For example, the estimated error calculating unit 462-1 calculates the absolute value of difference between the pixel values of the pixels contained in the block of interest and the pixel values of the pixels contained in the reference block, with regard to the block of interest made up of 5×5 pixels centered on the pixel of interest, and the 5×5 pixel reference block centered on a pixel at a position shifted five pixels to the right side from the pixel of interest, extracted corresponding to 0 degrees to 18.4 degrees and 161.6 degrees to 180.0 degrees.

Figure 42:
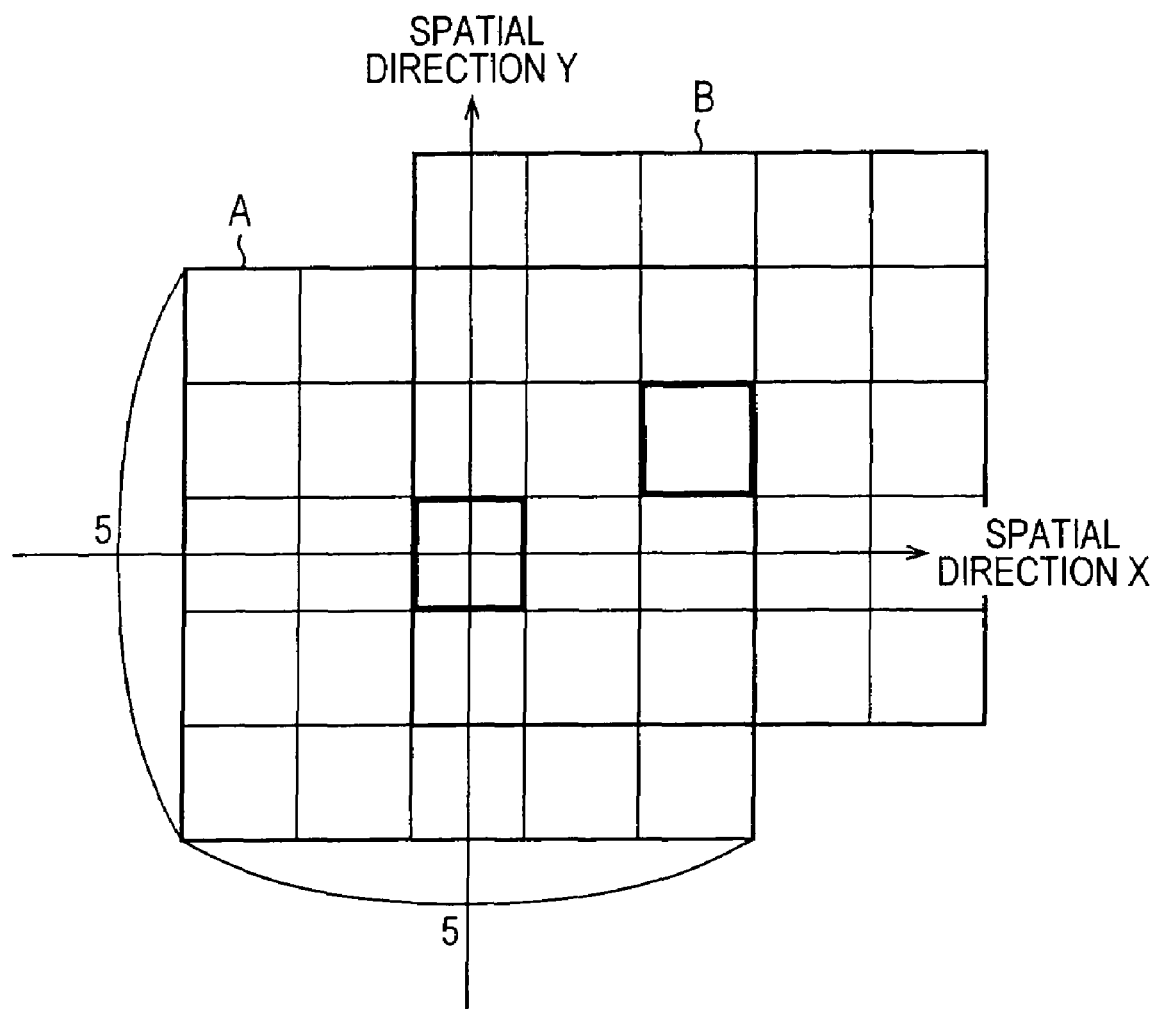
FIG. 42 is a diagram describing the processing for calculating the absolute value of difference of pixel values between a block of interest and a reference block.

In this case, as shown in FIG. 42, in order for the pixel value of the pixel of interest to be used on the calculation of the absolute value of difference of pixel values, with the position where the center pixel of the block of interest and the center pixel of the reference block overlap as a reference, the estimated error calculating unit 462-1 calculates the absolute value of difference of pixel values of pixels at positions overlapping in the event that the position of the block of interest is shifted to any one of two pixels to the left side through two pixels to the right side and any one of two pixels upwards through two pixels downwards as to the reference block. This means that the absolute value of difference of the pixel values of pixels at corresponding positions in 25 types of positions of the block of interest and the reference block. In other words, in a case wherein the absolute values of difference of the pixel values are calculated, the range formed of the block of interest moved relatively and the reference block is 9×9 pixels.

In FIG. 42, the square represent pixels, A represents the reference block, and B represents the block of interest. In FIG. 42, the heavy lines indicate the pixel of interest. That is to say, FIG. 42 is a diagram illustrating a case wherein the block of interest has been shifted two pixels to the right side and one pixel upwards, as to the reference block.

Further, the estimated error calculating unit 462-1 calculates the absolute value of difference between the pixel values of the pixels contained in the block of interest and the pixel values of the pixels contained in the reference block, with regard to the block of interest made up of 5×5 pixels centered on the pixel of interest, and the 5×5 pixel reference block centered on a pixel at a position shifted five pixels to the left side from the pixel of interest, extracted corresponding to 0 degrees to 18.4 degrees and 161.6 degrees to 180.0 degrees.

The estimated error calculating unit 462-1 then obtains the sum of the absolute values of difference that have been calculated, and supplies the sum of the absolute values of difference to the smallest error angle selecting unit 463 as correlation information indicating correlation.

The estimated error calculating unit 462-2 calculates the absolute value of difference between the pixel values with regard to the block of interest made up of 5×5 pixels and the two 5×5 reference pixel blocks extracted corresponding to the range of 18.4 degrees to 33.7 degrees, and further calculates sum of the absolute values of difference that have been calculated. The estimated error calculating unit 462-1 supplies the sum of the absolute values of difference that has been calculated to the smallest error angle selecting unit 463 as correlation information indicating correlation.

In the same way, the estimated error calculating unit 462-3 through estimated error calculating unit 462-8 calculate the absolute value of difference between the pixel values with regard to the block of interest made up of 5×5 pixels and the two 5×5 pixel reference blocks extracted corresponding to the predetermined angle ranges, and further calculate sum of the absolute values of difference that have been calculated. The estimated error calculating unit 462-3 through estimated error calculating unit 462-8 each supply the sum of the absolute values of difference to the smallest error angle selecting unit 463 as correlation information indicating correlation.

The smallest error angle selecting unit 463 detects, as the data continuity angle, the angle corresponding to the two reference blocks at the reference block position where, of the sums of the absolute values of difference of pixel values serving as correlation information supplied from the estimated error calculating unit 462-1 through estimated error calculating unit 462-8, the smallest value indicating the strongest correlation has been obtained, and outputs data continuity information indicating the detected angle.

Now, description will be made regarding the relationship between the position of the reference blocks and the range of angle of data continuity.

In a case of approximating an approximation function f(x) for approximating actual world signals with an n-order one-dimensional polynomial, the approximation function f(x) can be expressed by Expression (15).

$$f(x) = w_0 x^n + w_1 x^{n-1} + \ldots + w_{n-1} x + w_n \quad (15)$$
$$= \sum_{i=0}^{n} w_i x^{n-i}$$

In the event that the waveform of the signal of the actual world approximated by the approximation function f(x) has a certain gradient (angle) as to the spatial direction Y, the approximation function (x, y) for approximating actual world signals is expressed by Expression (16) which has been obtained by taking x in Expression (15) as x+γy.

$$f(x, y) = w_0 (x + \gamma y)^n + w_1 (x + \gamma y)^{n-1} + \ldots + w_{n-1} (x + \gamma y) + w_n \quad (16)$$
$$= \sum_{i=0}^{n} w_i (x + \gamma y)^{n-i}$$

γ represents the ratio of change in position in the spatial direction X as to the change in position in the spatial direction Y. Hereafter, γ will also be called amount of shift.

Figure 43:
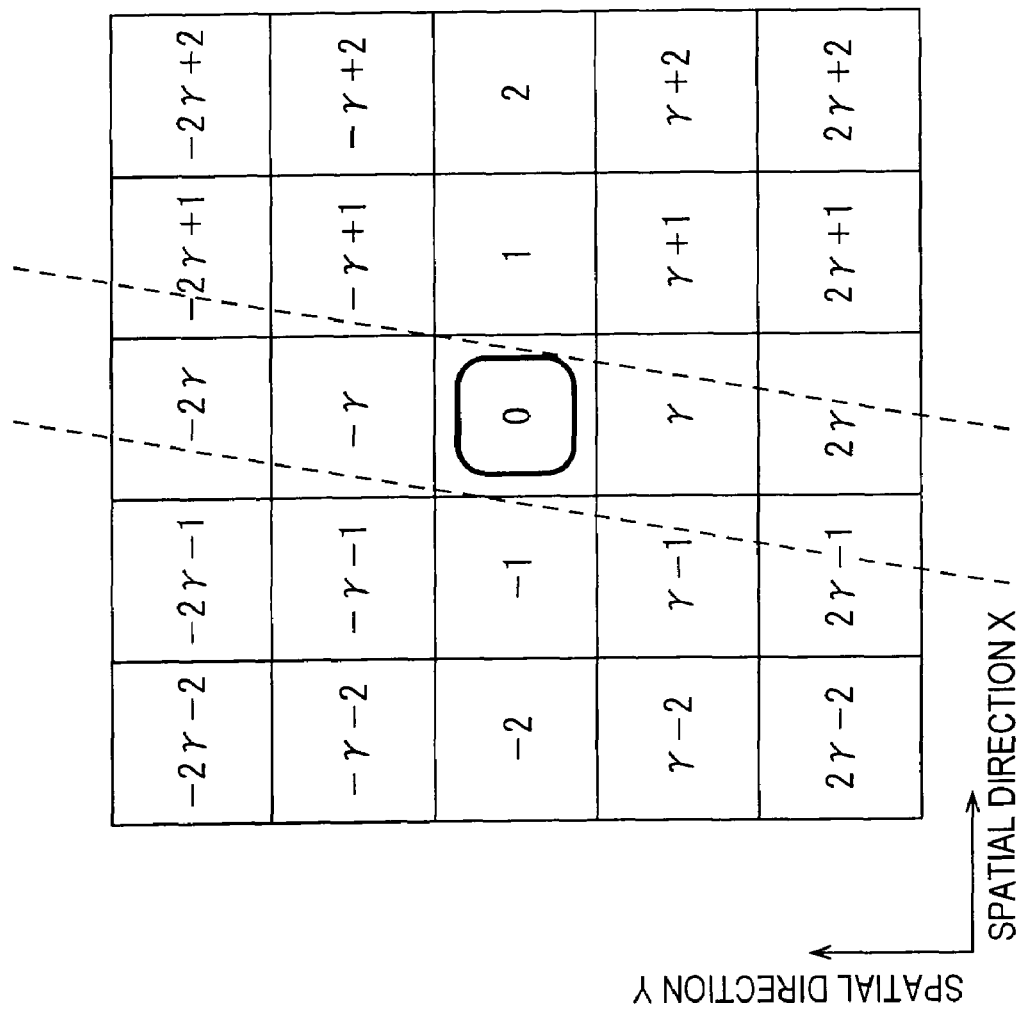
FIG. 43 is a diagram describing the distance in the spatial direction X between the position of a pixel in the proximity of the pixel of interest, and a straight line having an angle $\theta$.

FIG. 43 is a diagram illustrating the distance to a straight line having an angle θ in the spatial direction X from the position of surrounding pixels of the pixel of interest in a case wherein the distance in the spatial direction X between the position of the pixel of interest and the straight line having the angle θ is 0, i.e., wherein the straight line passes through the pixel of interest. Here, the position of the pixel is the center of the pixel. Also, in the event that the position is to the left side of the straight line, the distance between the position and the straight line is indicated by a negative value, and in the event that the position is to the right side of the straight line, is indicated by a positive value.

For example, the distance in the spatial direction X between the position of the pixel adjacent to the pixel of interest on the right side, i.e., the position where the coordinate x in the spatial direction X increases by 1, and the straight line having the angle θ, is 1, and the distance in the spatial direction X between the position of the pixel adjacent to the pixel of interest on the left side, i.e., the position where the coordinate x in the spatial direction X decreases by 1, and the straight line having the angle θ, is −1. The distance in the spatial direction X between the position of the pixel adjacent to the pixel of interest above, i.e., the position where the coordinate y in the spatial direction Y increases by 1, and the straight line having the angle θ, is −γ, and the distance in the spatial direction X between the position of the pixel adjacent to the pixel of interest below, i.e., the position where the coordinate y in the spatial direction Y decreases by 1, and the straight line having the angle θ, is γ.

Figure 44:
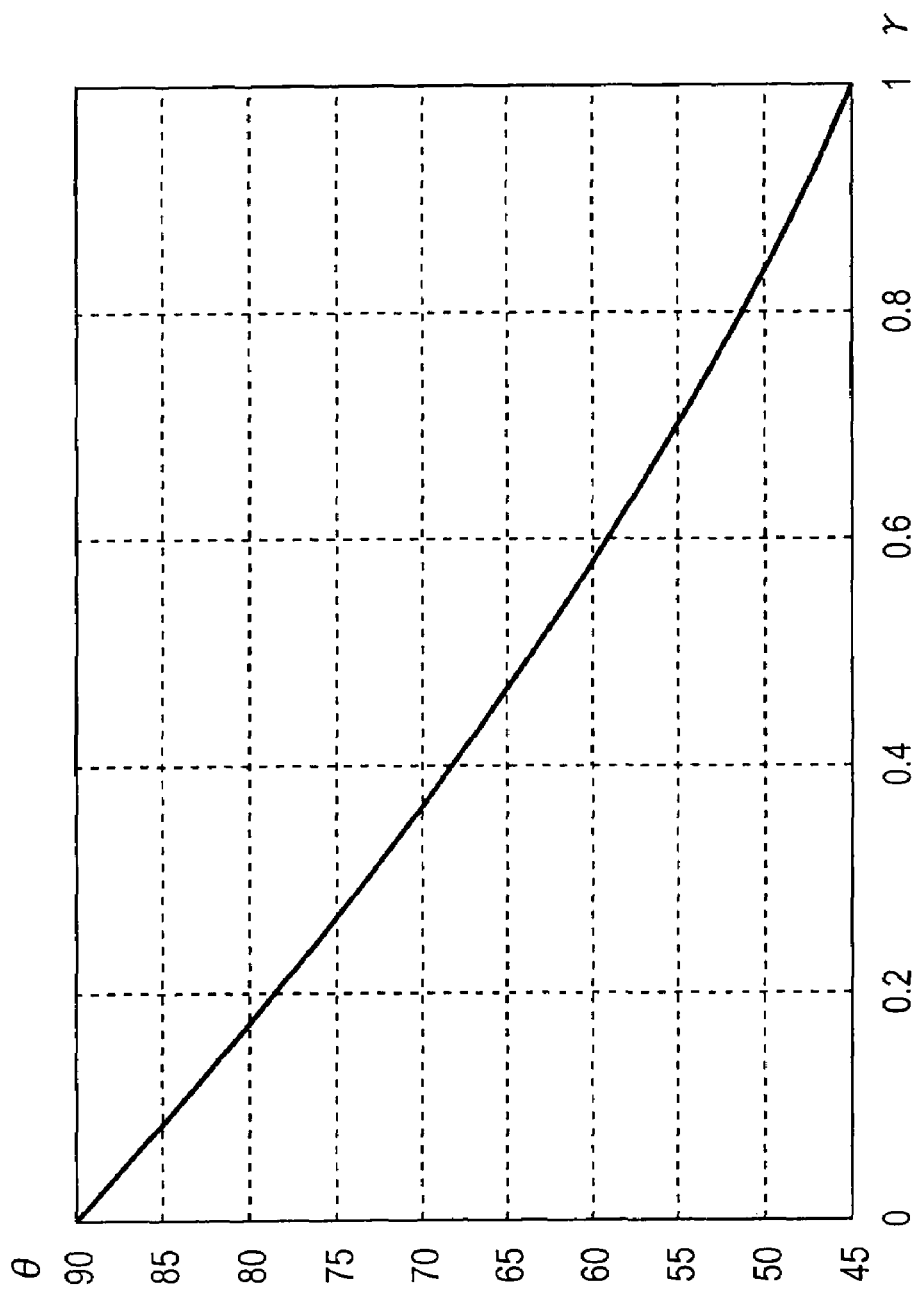
FIG. 44 is a diagram illustrating the relationship between the shift amount $\gamma$ and angle $\theta$.

In the event that the angle θ exceeds 45 degrees but is smaller than 90 degrees, and the amount of shift γ exceeds 0 but is smaller than 1, the relational expression of γ=1/tan θ holds between the amount of shift γ and the angle θ. FIG. 44 is a diagram illustrating the relationship between the amount of shift γ and the angle θ.

Now, let us take note of the change in distance in the spatial direction X between the position of a pixel nearby the pixel of interest, and the straight line which passes through the pixel of interest and has the angle θ, as to change in the amount of shift γ.

Figure 45:
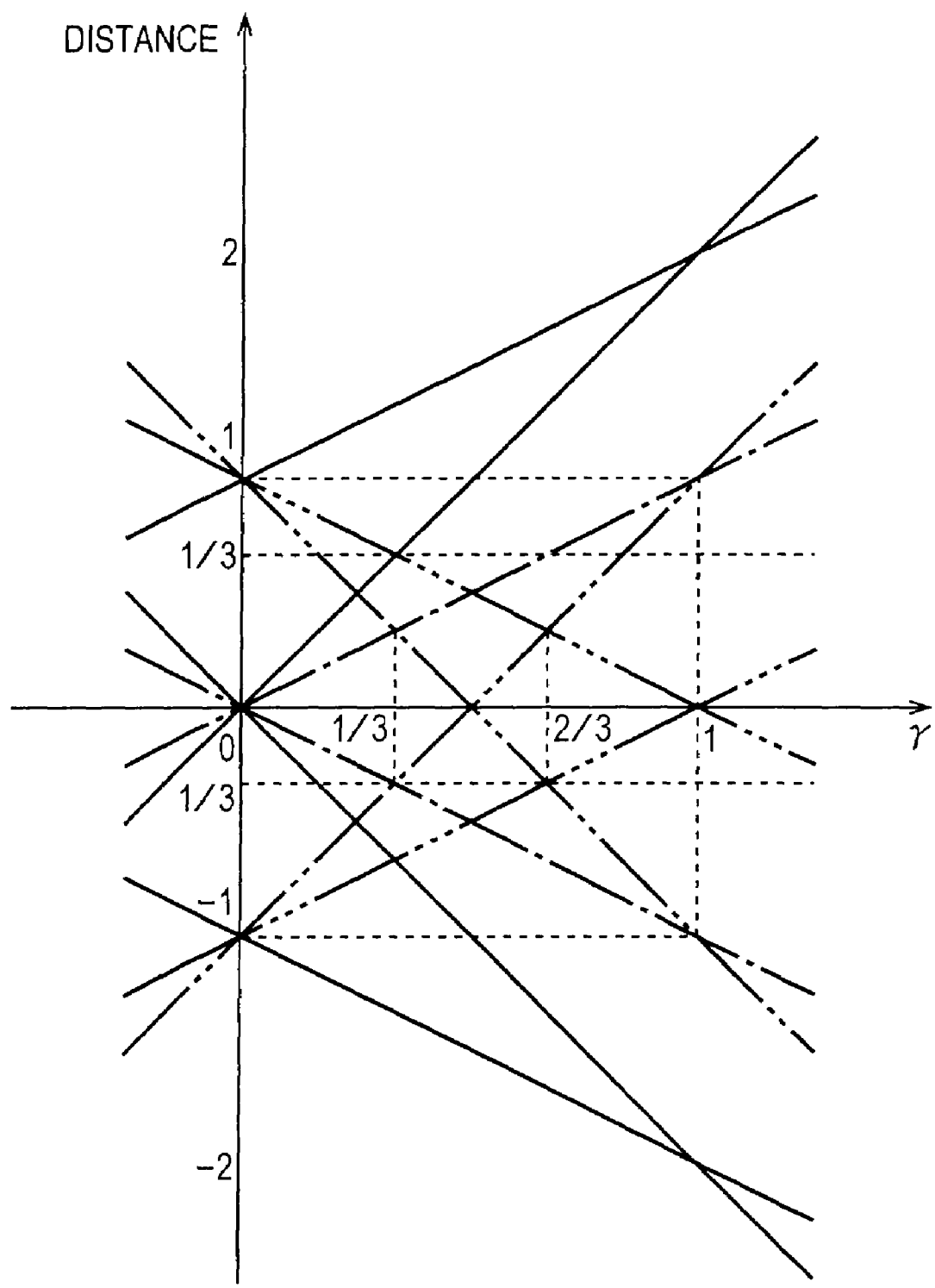
FIG. 45 is a diagram illustrating the distance in the spatial direction X between the position of a pixel in the proximity of the pixel of interest and a straight line which passes through the pixel of interest and has an angle of $\theta$, as to the shift amount $\gamma$.

FIG. 45 is a diagram illustrating the distance in the spatial direction X between the position of a pixel nearby the pixel of interest and the straight line which passes through the pixel of interest and has the angle θ, as to the amount of shift γ. In FIG. 45, the single-dot broken line which heads toward the upper right indicates the distance in the spatial direction X between the position of a pixel adjacent to the pixel of interest on the bottom side, and the straight line, as to the amount of shift γ. The single-dot broken line which heads toward the lower left indicates the distance in the spatial direction X between the position of a pixel adjacent to the pixel of interest on the top side, and the straight line, as to the amount of shift γ.

In FIG. 45, the two-dot broken line which heads toward the upper right indicates the distance in the spatial direction X between the position of a pixel two pixels below the pixel of interest and one to the left, and the straight line, as to the amount of shift γ; the two-dot broken line which heads toward the lower left indicates the distance in the spatial direction X between the position of a pixel two pixels above the pixel of interest and one to the right, and the straight line, as to the amount of shift γ.

In FIG. 45, the three-dot broken line which heads toward the upper right indicates the distance in the spatial direction X between the position of a pixel one pixel below the pixel of interest and one to the left, and the straight line, as to the amount of shift γ; the three-dot broken line which heads toward the lower left indicates the distance in the spatial direction X between the position of a pixel one pixel above the pixel of interest and one to the right, and the straight line, as to the amount of shift γ.

The pixel with the smallest distance as to the amount of shift γ can be found from FIG. 45.

That is to say, in the event that the amount of shift γ is 0 through ⅓, the distance to the straight line is minimal from a pixel adjacent to the pixel of interest on the top side and from a pixel adjacent to the pixel of interest on the bottom side. That is to say, in the event that the angle θ is 71.6 degrees to 90 degrees, the distance to the straight line is minimal from the pixel adjacent to the pixel of interest on the top side and from the pixel adjacent to the pixel of interest on the bottom side.

In the event that the amount of shift γ is ⅓ through ⅔, the distance to the straight line is minimal from a pixel two pixels above the pixel of interest and one to the right and from a pixel two pixels below the pixel of interest and one to the left. That is to say, in the event that the angle θ is 56.3 degrees to 71.6 degrees, the distance to the straight line is minimal from the pixel two pixels above the pixel of interest and one to the right and from a pixel two pixels below the pixel of interest and one to the left.

In the event that the amount of shift γ is ⅔ through 1, the distance to the straight line is minimal from a pixel one pixel above the pixel of interest and one to the right and from a pixel one pixel below the pixel of interest and one to the left. That is to say, in the event that the angle θ is 45 degrees to 56.3 degrees, the distance to the straight line is minimal from the pixel one pixel above the pixel of interest and one to the right and from a pixel one pixel below the pixel of interest and one to the left.

The relationship between the straight line in a range of angle θ from 0 degrees to 45 degrees and a pixel can also be considered in the same way.

The pixels shown in FIG. 43 can be replaced with the block of interest and reference block, to consider the distance in the spatial direction X between the reference block and the straight line.

FIG. 46 shows the reference blocks wherein the distance to the straight line which passes through the pixel of interest and has an angle θ as to the axis of the spatial direction X is the smallest.

A through H and A' through H' in FIG. 46 represent the reference blocks A through H and A' through H' in FIG. 41.

That is to say, of the distances in the spatial direction X between a straight line having an angle θ which is any of 0 degrees through 18.4 degrees and 161.6 degrees through 180.0 degrees which passes through the pixel of interest with the axis of the spatial direction X as a reference, and each of the reference blocks A through H and A' through H', the distance between the straight line and the reference blocks A and A' is the smallest. Accordingly, following reverse logic, in the event that the correlation between the block of interest and the reference blocks A and A' is the greatest, this means that a certain feature is repeatedly manifested in the direction connecting the block of interest and the reference blocks A and A', so it can be said that the angle of data continuity is within the ranges of 0 degrees through 18.4 degrees and 161.6 degrees through 180.0 degrees.

Of the distances in the spatial direction X between a straight line having an angle θ which is any of 18.4 degrees through 33.7 degrees which passes through the pixel of interest with the axis of the spatial direction X as a reference, and each of the reference blocks A through H and A' through H', the distance between the straight line and the reference blocks B and B' is the smallest. Accordingly, following reverse logic, in the event that the correlation between the block of interest and the reference blocks B and B' is the greatest, this means that a certain feature is repeatedly manifested in the direction connecting the block of interest and the reference blocks B and B', so it can be said that the angle of data continuity is within the range of 18.4 degrees through 33.7 degrees.

Of the distances in the spatial direction X between a straight line having an angle θ which is any of 33.7 degrees through 56.3 degrees which passes through the pixel of interest with the axis of the spatial direction X as a reference, and each of the reference blocks A through H and A' through H', the distance between the straight line and the reference blocks C and C' is the smallest. Accordingly, following reverse logic, in the event that the correlation between the block of interest and the reference blocks C and C' is the greatest, this means that a certain feature is repeatedly manifested in the direction connecting the block of interest and the reference blocks C and C', so it can be said that the angle of data continuity is within the range of 33.7 degrees through 56.3 degrees.

Of the distances in the spatial direction X between a straight line having an angle θ which is any of 56.3 degrees through 71.6 degrees which passes through the pixel of interest with the axis of the spatial direction X as a reference, and each of the reference blocks A through H and A' through H', the distance between the straight line and the reference blocks D and D' is the smallest. Accordingly, following reverse logic, in the event that the correlation between the block of interest and the reference blocks D and D' is the greatest, this means that a certain feature is repeatedly manifested in the direction connecting the block of interest and the reference blocks D and D', so it can be said that the angle of data continuity is within the range of 56.3 degrees through 71.6 degrees.

Of the distances in the spatial direction X between a straight line having an angle θ which is any of 71.6 degrees through 108.4 degrees which passes through the pixel of interest with the axis of the spatial direction X as a reference, and each of the reference blocks A through H and A' through H', the distance between the straight line and the reference blocks E and E' is the smallest. Accordingly, following reverse logic, in the event that the correlation between the block of interest and the reference blocks E and E' is the greatest, this means that a certain feature is repeatedly manifested in the direction connecting the block of interest and the reference blocks E and E', so it can be said that the angle of data continuity is within the range of 71.6 degrees through 108.4 degrees.

Of the distances in the spatial direction X between a straight line having an angle θ which is any of 108.4 degrees through 123.7 degrees which passes through the pixel of interest with the axis of the spatial direction X as a reference, and each of the reference blocks A through H and A' through H', the distance between the straight line and the reference blocks F and F' is the smallest. Accordingly, following reverse logic, in the event that the correlation between the block of interest and the reference blocks F and F' is the greatest, this means that a certain feature is repeatedly manifested in the direction connecting the block of interest and the reference blocks F and F', so it can be said that the angle of data continuity is within the range of 108.4 degrees through 123.7 degrees.

Of the distances in the spatial direction X between a straight line having an angle θ which is any of 123.7 degrees through 146.3 degrees which passes through the pixel of interest with the axis of the spatial direction X as a reference, and each of the reference blocks A through H and A' through H', the distance between the straight line and the reference blocks G and G' is the smallest. Accordingly, following reverse logic, in the event that the correlation between the block of interest and the reference blocks G and G' is the greatest, this means that a certain feature is repeatedly manifested in the direction connecting the block of interest and the reference blocks G and G', so it can be said that the angle of data continuity is within the range of 123.7 degrees through 146.3 degrees.

Of the distances in the spatial direction X between a straight line having an angle θ which is any of 146.3 degrees through 161.6 degrees which passes through the pixel of interest with the axis of the spatial direction X as a reference, and each of the reference blocks A through H and A' through H', the distance between the straight line and the reference blocks H and H' is the smallest. Accordingly, following reverse logic, in the event that the correlation between the block of interest and the reference blocks H and H' is the greatest, this means that a certain feature is repeatedly manifested in the direction connecting the block of interest and the reference blocks H and H', so it can be said that the angle of data continuity is within the range of 146.3 degrees through 161.6 degrees.

Thus, the data continuity detecting unit 101 can detect the data continuity angle based on the correlation between the block of interest and the reference blocks.

Note that with the data continuity detecting unit 101 of which the configuration is shown in FIG. 39, an arrangement may be made wherein the angle range of data continuity is output as data continuity information, or an arrangement may be made wherein a representative value representing the range of angle of the data continuity is output as data continuity information. For example, the median value of the range of angle of the data continuity may serve as a representative value.

Further, with the data continuity detecting unit 101 of which the configuration is shown in FIG. 39, using the correlation between the block of interest and the reference blocks with the greatest correlation allows the angle range of data continuity to be detected to be halved, i.e., for the resolution of the angle of data continuity to be detected to be doubled.

Figure 47:
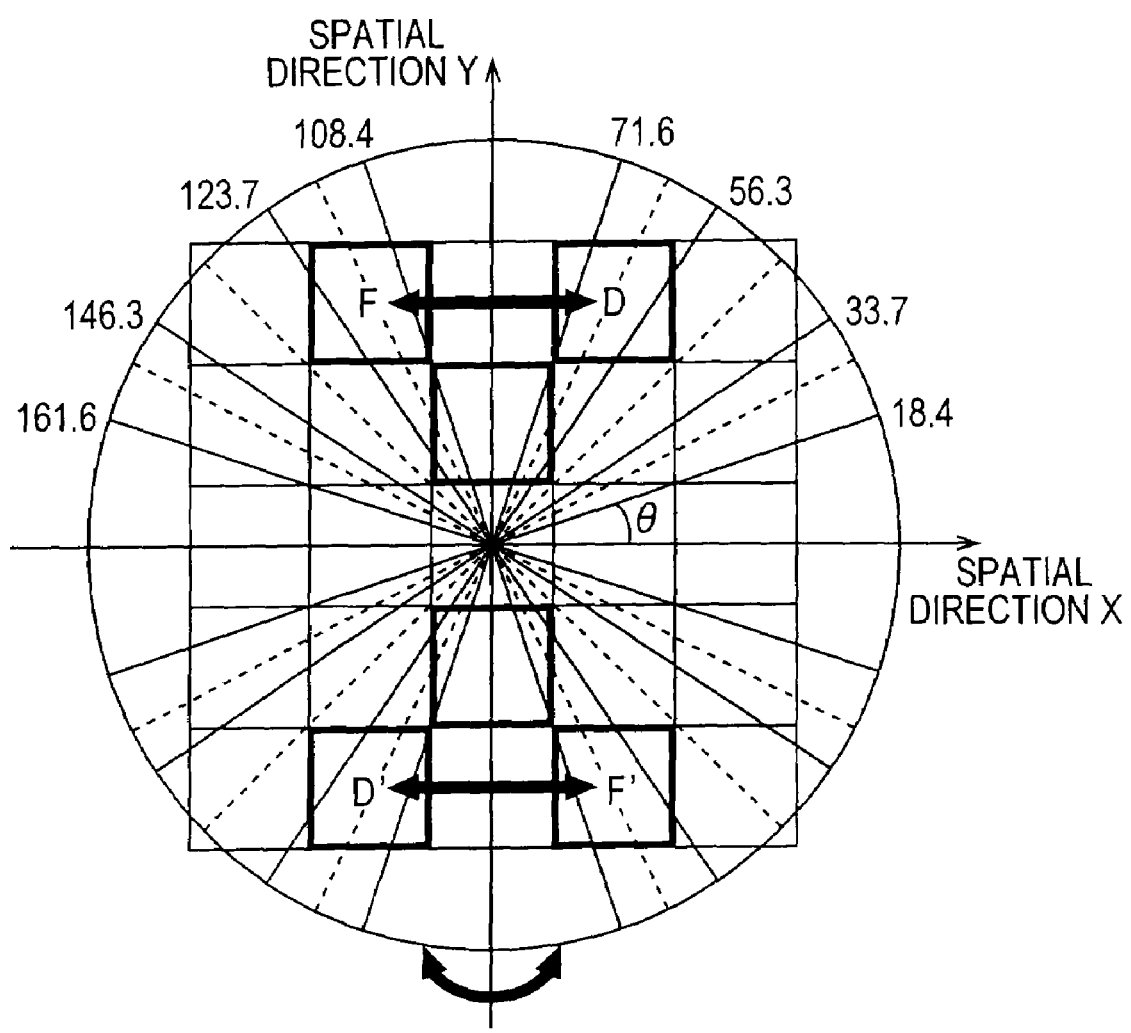
FIG. 47 is a diagram for describing processing for halving the range of angle of continuity of data to be detected.

For example, when the correlation between the block of interest and the reference blocks E and E' is the greatest, the smallest error angle selecting unit 463 compares the correlation of the reference blocks D and D' as to the block of interest with the correlation of the reference blocks F and F' as to the block of interest, as shown in FIG. 47. In the event that the correlation of the reference blocks D and D' as to the block of interest is greater than the correlation of the reference blocks F and F' as to the block of interest, the smallest error angle selecting unit 463 sets the range of 71.6 degrees to 90 degrees for the data continuity angle. Or, in this case, the smallest error angle selecting unit 463 may set 81 degrees for the data continuity angle as a representative value.

In the event that the correlation of the reference blocks F and F' as to the block of interest is greater than the correlation of the reference blocks D and D' as to the block of interest, the smallest error angle selecting unit 463 sets the range of 90 degrees to 108.4 degrees for the data continuity angle. Or, in this case, the smallest error angle selecting unit 463 may set 99 degrees for the data continuity angle as a representative value.

The smallest error angle selecting unit 463 can halve the range of the data continuity angle to be detected for other angle ranges as well, with the same processing.

The technique described with reference to FIG. 47 is also called simplified 16-directional detection.

Thus, the data continuity detecting unit 101 of which the configuration is shown in FIG. 39 can detect the angle of data continuity in narrower ranges, with simple processing.

Figure 48:
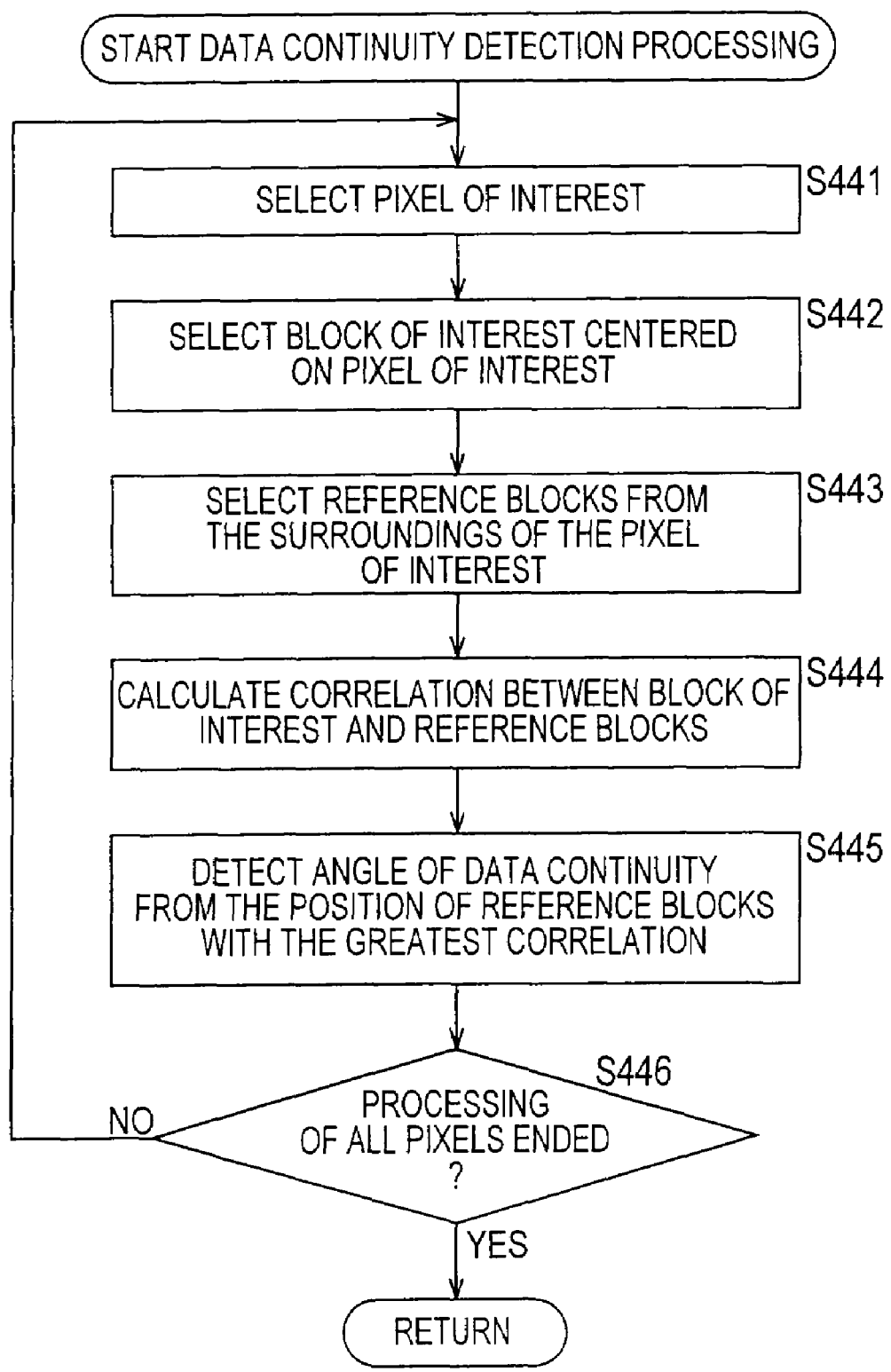
FIG. 48 is a flowchart for describing the processing for detection of data continuity.

Next, the processing for detecting data continuity with the data continuity detecting unit 101 of which the configuration is shown in FIG. 39, corresponding to the processing in step S101, will be described with reference to the flowchart shown in FIG. 48.

In step S441, the data selecting unit 441 selects the pixel of interest which is a pixel of interest from the input image. For example, the data selecting unit 441 selects the pixel of interest in raster scan order from the input image.

In step S442, the data selecting unit 441 selects a block of interest made up of a predetermined number of pixels centered on the pixel of interest. For example, the data selecting unit 441 selects a block of interest made up of 5×5 pixels centered on the pixel of interest.

In step S443, the data selecting unit 441 selects reference blocks made up of a predetermined number of pixels at predetermined positions at the surroundings of the pixel of interest. For example, the data selecting unit 441 selects reference blocks made up of 5×5 pixels centered on pixels at predetermined positions based on the size of the block of interest, for each predetermined angle range based on the pixel of interest and the reference axis.

The data selecting unit 441 supplies the block of interest and the reference blocks to the error estimating unit 442.

In step S444, the error estimating unit 442 calculates the correlation between the block of interest and the reference blocks corresponding to the range of angle, for each predetermined angle range based on the pixel of interest and the reference axis. The error estimating unit 442 supplies the correlation information indicating the calculated correlation to the continuity direction derivation unit 443.

In step S445, the continuity direction derivation unit 443 detects the angle of data continuity in the input image based on the reference axis, corresponding to the image continuity which is the lost actual world light signals, from the position of the reference block which has the greatest correlation as to the block of interest.

The continuity direction derivation unit 443 outputs the data continuity information which indicates the detected data continuity angle.

In step S446, the data selecting unit 441 determines whether or not processing of all pixels has ended, and in the event that determination is made that processing of all pixels has not ended, the flow returns to step S441, a pixel of interest is selected from pixels not yet selected as the pixel of interest, and the above-described processing is repeated.

In step S446, in the event that determination is made that processing of all pixels has ended, the processing ends.

Thus, the data continuity detecting unit 101 of which the configuration is shown in FIG. 39 can detect the data continuity angle in the image data based on the reference axis, corresponding to the lost actual world light signal continuity with easier processing. Also, the data continuity detecting unit 101 of which the configuration is shown in FIG. 39 can detect the angle of data continuity using pixel values of pixels of a relatively narrow range in the input image, so the angle of data continuity can be detected more accurately even in the event that noise and the like is in the input image.

Note that an arrangement may be made with the data continuity detecting unit 101 of which the configuration is shown in FIG. 39, wherein, with regard to a pixel of interest which is the pixel of interest in a frame of interest which is the frame of interest, in addition to extracting a block centered on the pixel of interest and made up of a predetermined number of pixels in the frame of interest, and multiple blocks each made up of a predetermined number of pixels from the surroundings of the pixel of interest, also extracting, from frames previous to or following the frame of interest time-wise, a block centered on a pixel at a position corresponding to the pixel of interest and made up of a predetermined number of pixels, and multiple blocks each made up of a predetermined number of pixels from the surroundings of the pixel centered on the pixel corresponding to the pixel of interest, and detecting the correlation between the block centered on the pixel of interest and blocks in the surroundings thereof space-wise or time-wise, so as to detect the angle of data continuity in the input image in the temporal direction and spatial direction, based on the correlation.

Figure 49:
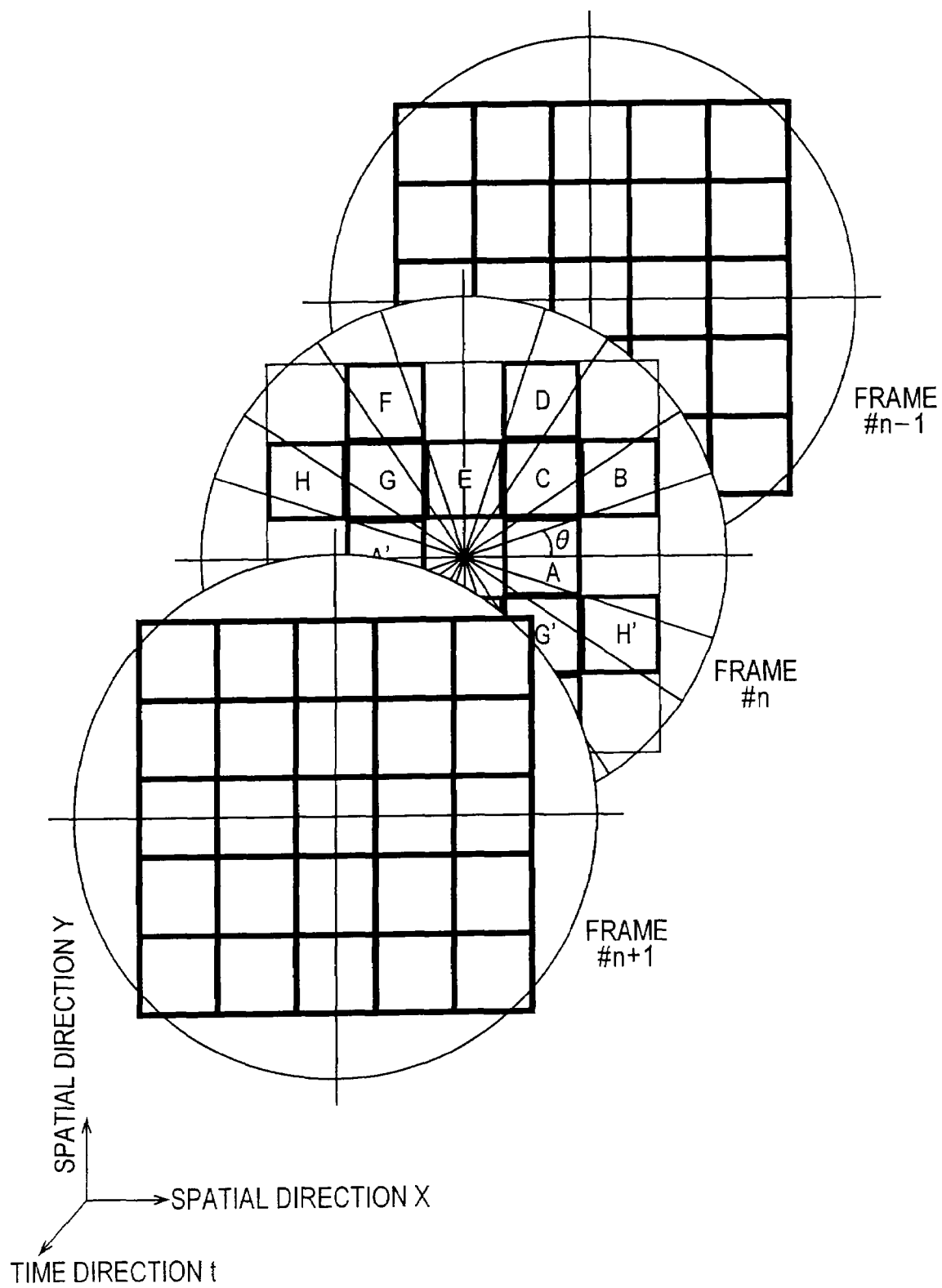
FIG. 49 is a diagram illustrating a block which is extracted at the time of detecting the angle of data continuity in the space direction and time direction.

For example, as shown in FIG. 49, the data selecting unit 441 sequentially selects the pixel of interest from the frame #n which is the frame of interest, and extracts from the frame #n a block centered on the pixel of interest and made up of a predetermined number of pixels and multiple blocks each made up of a predetermined number of pixels from the surroundings of the pixel of interest. Also, the data selecting unit 441 extracts from the frame #n−1 and frame #n+1 a block centered on the pixel at a position corresponding to the position of the pixel of interest and made up of a predetermined number of pixels and multiple blocks each made up of a predetermined number of pixels from the surroundings of a pixel at a position corresponding to the pixel of interest. The data selecting unit 441 supplies the extracted blocks to the error estimating unit 442.

The error estimating unit 442 detects the correlation between the block centered on the pixel of interest and the blocks in the surroundings thereof space-wise or time-wise, supplied from the data selecting unit 441, and supplies correlation information indicated the detected correlation to the continuity direction derivation unit 443. Based on the correlation information from the error estimating unit 442, the continuity direction derivation unit 443 detects the angle of data continuity in the input image in the space direction or time direction, corresponding to the lost actual world light signal continuity, from the position of the block in the surroundings thereof space-wise or time-wise which has the greatest correlation, and outputs the data continuity information which indicates the angle.

Also, the data continuity detecting unit 101 can perform data continuity detection processing based on component signals of the input image.

Figure 50:
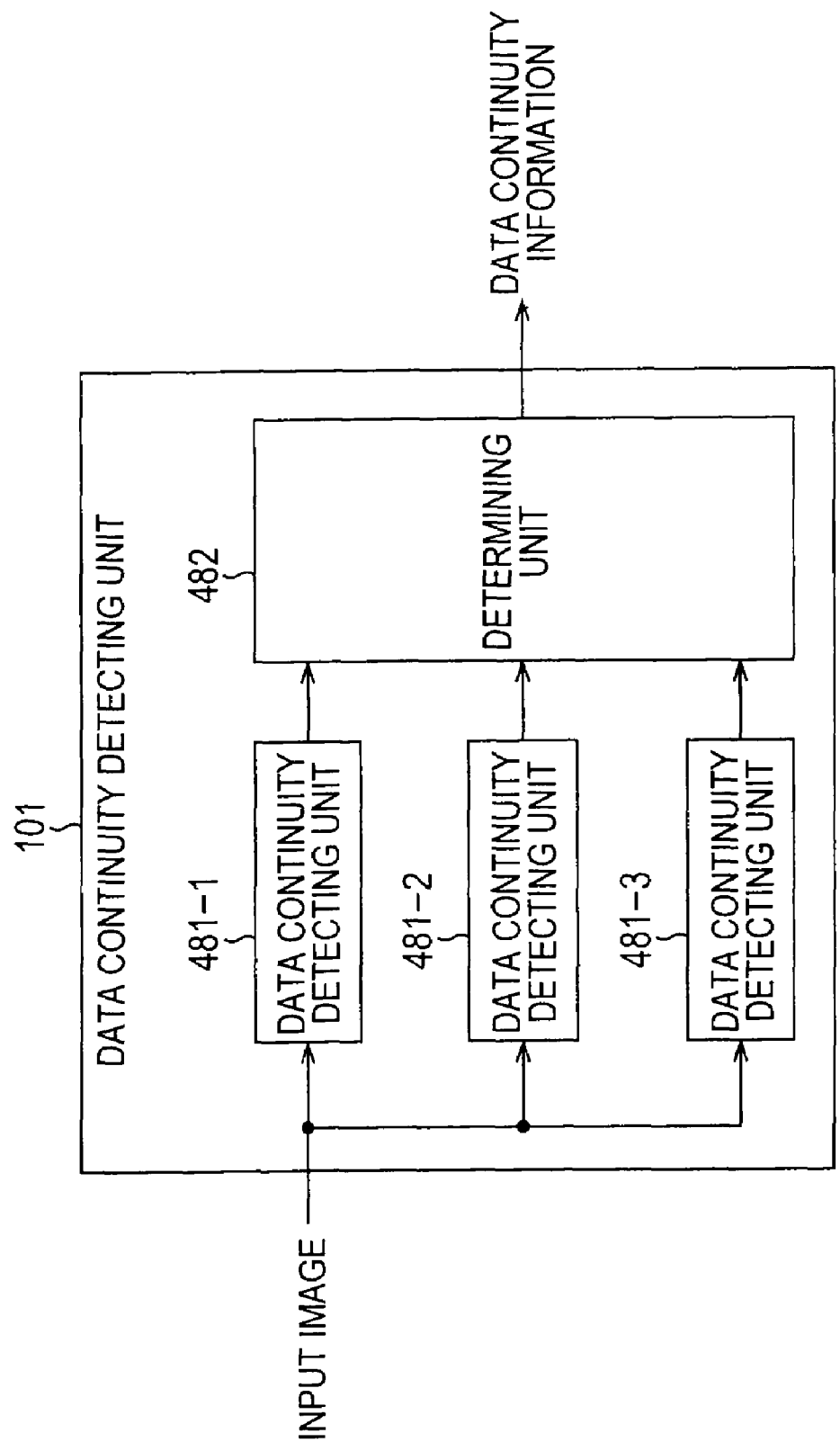
FIG. 50 is a block diagram illustrating the configuration of the data continuity detecting unit which executes processing for detection of data continuity, based on components signals of an input image.

FIG. 50 is a block diagram illustrating the configuration of the data continuity detecting unit 101 for performing data continuity detection processing based on component signals of the input image.

Each of data continuity detecting units 481-1 through 481-3 have the same configuration as the above-described and or later-described data continuity detecting unit 101, and executes the above-described or later-described processing on each component signals of the input image.

The data continuity detecting unit 481-1 detects the data continuity based on the first component signal of the input image, and supplies information indicating the continuity of the data detected from the first component signal to a determining unit 482. For example, the data continuity detecting unit 481-1 detects data continuity based on the brightness signal of the input image, and supplies information indicating the continuity of the data detected from the brightness signal to the determining unit 482.

The data continuity detecting unit 481-2 detects the data continuity based on the second component signal of the input image, and supplies information indicating the continuity of the data detected from the second component signal to the determining unit 482. For example, the data continuity detecting unit 481-2 detects data continuity based on the I signal which is color difference signal of the input image, and supplies information indicating the continuity of the data detected from the I signal to the determining unit 482.

The data continuity detecting unit 481-3 detects the data continuity based on the third component signal of the input image, and supplies information indicating the continuity of the data detected from the third component signal to the determining unit 482. For example, the data continuity detecting unit 481-2 detects data continuity based on the Q signal which is the color difference signal of the input image, and supplies information indicating the continuity of the data detected from the Q signal to the determining unit 482.

The determining unit 482 detects the final data continuity of the input image based on the information indicating data continuity that has been detected from each of the component signals supplied from the data continuity detecting units 481-1 through 481-3, and outputs data continuity information indicating the detected data continuity.

For example, the detecting unit 482 takes as the final data continuity the greatest data continuity of the data continuities detected from each of the component signals supplied from the data continuity detecting units 481-1 through 481-3. Or, for example, the detecting unit 482 takes as the final data continuity the smallest data continuity of the data continuities detected from each of the component signals supplied from the data continuity detecting units 481-1 through 481-3.

Further, for example, the detecting unit 482 takes as the final data continuity the average data continuity of the data continuities detected from each of the component signals supplied from the data continuity detecting units 481-1 through 481-3. The determining unit 482 may be arranged so as to taken as the final data continuity the median (median value) of the data continuities detected from each of the component signals supplied from the data continuity detecting units 481-1 through 481-3.

Also, for example, based on signals externally input, the detecting unit 482 takes as the final data continuity the data continuity specified by the externally input signals of the data continuities detected from each of the component signals supplied from the data continuity detecting units 481-1 through 481-3. The determining unit 482 may be arranged so as to taken as the final data continuity a predetermined data continuity of the data continuities detected from each of the component signals supplied from the data continuity detecting units 481-1 through 481-3.

Moreover, the detecting unit 482 may be arranged so as to determine the final data continuity based on the error obtained in the processing for detecting the data continuity of the component signals supplied from the data continuity detecting units 481-1 through 481-3. The error which can be obtained in the processing for data continuity detection will be described later.

Figure 51:
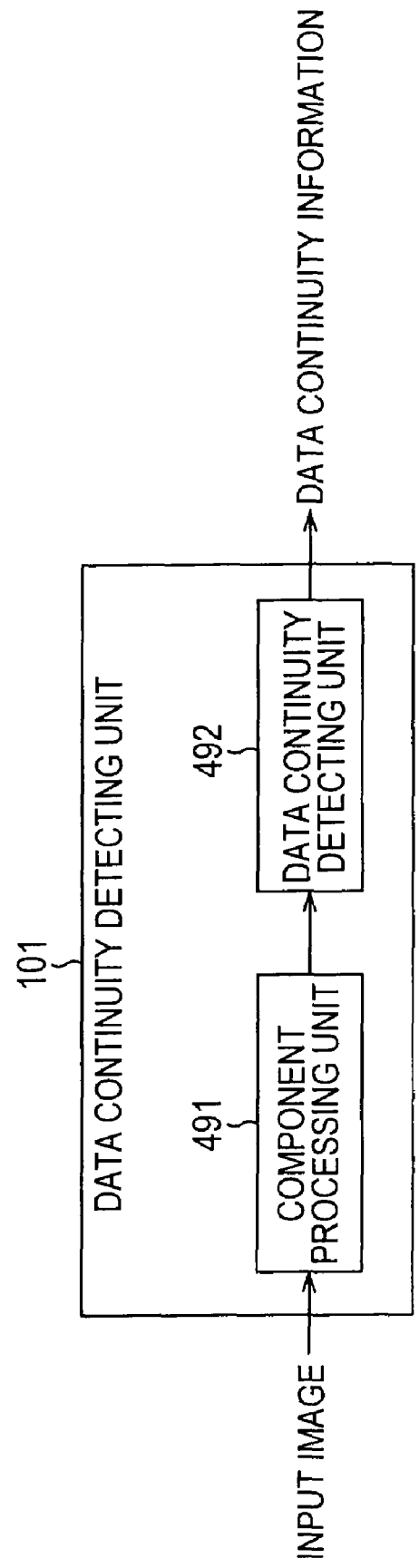
FIG. 51 is a block diagram illustrating the configuration of the data continuity detecting unit which executes processing for detection of data continuity, based on components signals of an input image.

FIG. 51 is a diagram illustrating another configuration of the data continuity detecting unit 101 for performing data continuity detection based on components signals of the input image.

A component processing unit 491 generates one signal based on the component signals of the input image, and supplies this to a data continuity detecting unit 492. For example, the component processing unit 491 adds values of each of the component signals of the input image for a pixel at the same position on the screen, thereby generating a signal made up of the sum of the component signals.

For example, the component processing unit 491 averages the pixel values in each of the component signals of the input image with regard to a pixel at the same position on the screen, thereby generating a signal made up of the average values of the pixel values of the component signals.

The data continuity detecting unit 492 detects the data continuity in the input image, based on the signal input from the component processing unit 491, and outputs data continuity information indicating the detected data continuity.

The data continuity detecting unit 492 has the same configuration as the above-described and or later-described data continuity detecting unit 101, and executes the above-described or later-described processing on the signals supplied from the component processing unit 491.

Thus, the data continuity detecting unit 101 can detect data continuity by detecting the data continuity of the input image based on component signals, so the data continuity can be detected more accurately even in the event that noise and the like is in the input image. For example, the data continuity detecting unit 101 can detect data continuity angle (gradient), mixture ratio, and regions having data continuity more precisely, by detecting data continuity of the input image based on component signals.

Note that the component signals are not restricted to brightness signals and color difference signals, and may be other component signals of other formats, such as RGB signals, YUV signals, and so forth.

As described above, with an arrangement wherein light signals of the real world are projected, the angle as to the reference axis is detected of data continuity corresponding to the continuity of real world light signals that has dropped out from the image data having continuity of real world light signals of which a part has dropped out, and the light signals are estimated by estimating the continuity of the real world light signals that has dropped out based on the detected angle, processing results which are more accurate and more precise can be obtained.

Also, with an arrangement wherein multiple sets are extracted of pixel sets made up of a predetermined number of pixels for each angle based on a pixel of interest which is the pixel of interest and the reference axis with image data wherein light signals of the real world are projected in which a part of the continuity of the real world light signals has dropped out, the correlation of the pixel values of pixels at corresponding positions in multiple sets which have been extracted for each angle is detected, the angle of data continuity in the image data, based on the reference axis, corresponding to the real world light signal continuity which has dropped out, is detected based on the detected correlation and the light signals are estimated by estimating the continuity of the real world light signals that has dropped out, based on the detected angle of the data continuity as to the reference axis in the image data, processing results which are more accurate and more precise as to the real world events can be obtained.

Figure 52:
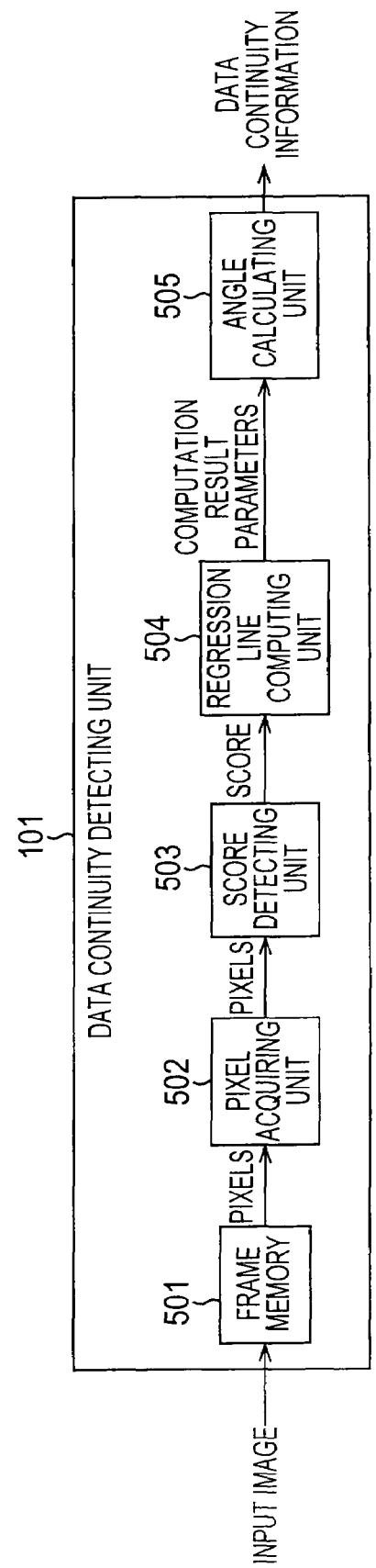
FIG. 52 is a block diagram illustrating still another configuration of the data continuity detecting unit.

FIG. 52 is a block diagram illustrating yet another configuration of the data continuity detecting unit 101.

With the data continuity detecting unit 101 shown in FIG. 52, light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the data continuity of the image data corresponding to the continuity of the real world light signals which has dropped out.

Frame memory 501 stores input images in increments of frames, and supplies the pixel values of the pixels making up stored frames to a pixel acquiring unit 502. The frame memory 501 can supply pixel values of pixels of frames of an input image which is a moving image to the pixel acquiring unit 502, by storing the current frame of the input image in one page, supplying the pixel values of the pixel of the frame one frame previous (in the past) as to the current frame stored in another page to the pixel acquiring unit 502, and switching pages at the switching point-in-time of the frames of the input image.

The pixel acquiring unit 502 selects the pixel of interest which is a pixel of interest based on the pixel values of the pixels supplied from the frame memory 501, and selects a region made up of a predetermined number of pixels corresponding to the selected pixel of interest. For example, the pixel acquiring unit 502 selects a region made up of 5×5 pixels centered on the pixel of interest.

The size of the region which the pixel acquiring unit 502 selects does not restrict the present invention.

The pixel acquiring unit 502 acquires the pixel values of the pixels of the selected region, and supplies the pixel values of the pixels of the selected region to a score detecting unit 503.

Based on the pixel values of the pixels of the selected region supplied from the pixel acquiring unit 502, the score detecting unit 503 detects the score of pixels belonging to the region, by setting a score based on correlation for pixels wherein the correlation value of the pixel value of the pixel of interest and the pixel value of a pixel belonging to the selected region is equal to or greater than a threshold value. The details of processing for setting score based on correlation at the score detecting unit 503 will be described later.

The score detecting unit 503 supplies the detected score to a regression line computing unit 504.

The regression line computing unit 504 computes a regression line based on the score supplied from the score detecting unit 503. For example, the regression line computing unit 504 computes a regression line based on the score supplied from the score detecting unit 503. Also, for example, the regression line computing unit 504 computes a regression line which is a predetermined curve, based on the score supplied from the score detecting unit 503. The regression line computing unit 504 supplies computation result parameters indicating the computed regression line and the results of computation to an angle calculating unit 505. The computation results which the computation parameters indicate include later-described variation and covariation.

The angle calculating unit 505 detects the continuity of the data of the input image which is image data, corresponding to the continuity of the light signals of the real world that has dropped out, based on the regression line indicated by the computation result parameters supplied from the regression line computing unit 504. For example, based on the regression line indicated by the computation result parameters supplied from the regression line computing unit 504, the angle calculating unit 505 detects the angle of data continuity in the input image based on the reference axis, corresponding to the dropped actual world light signal continuity. The angle calculating unit 505 outputs data continuity information indicating the angle of the data continuity in the input image based on the reference axis.

The angle of the data continuity in the input image based on the reference axis will be described with reference to FIG. 53 through FIG. 55.

Figure 53:
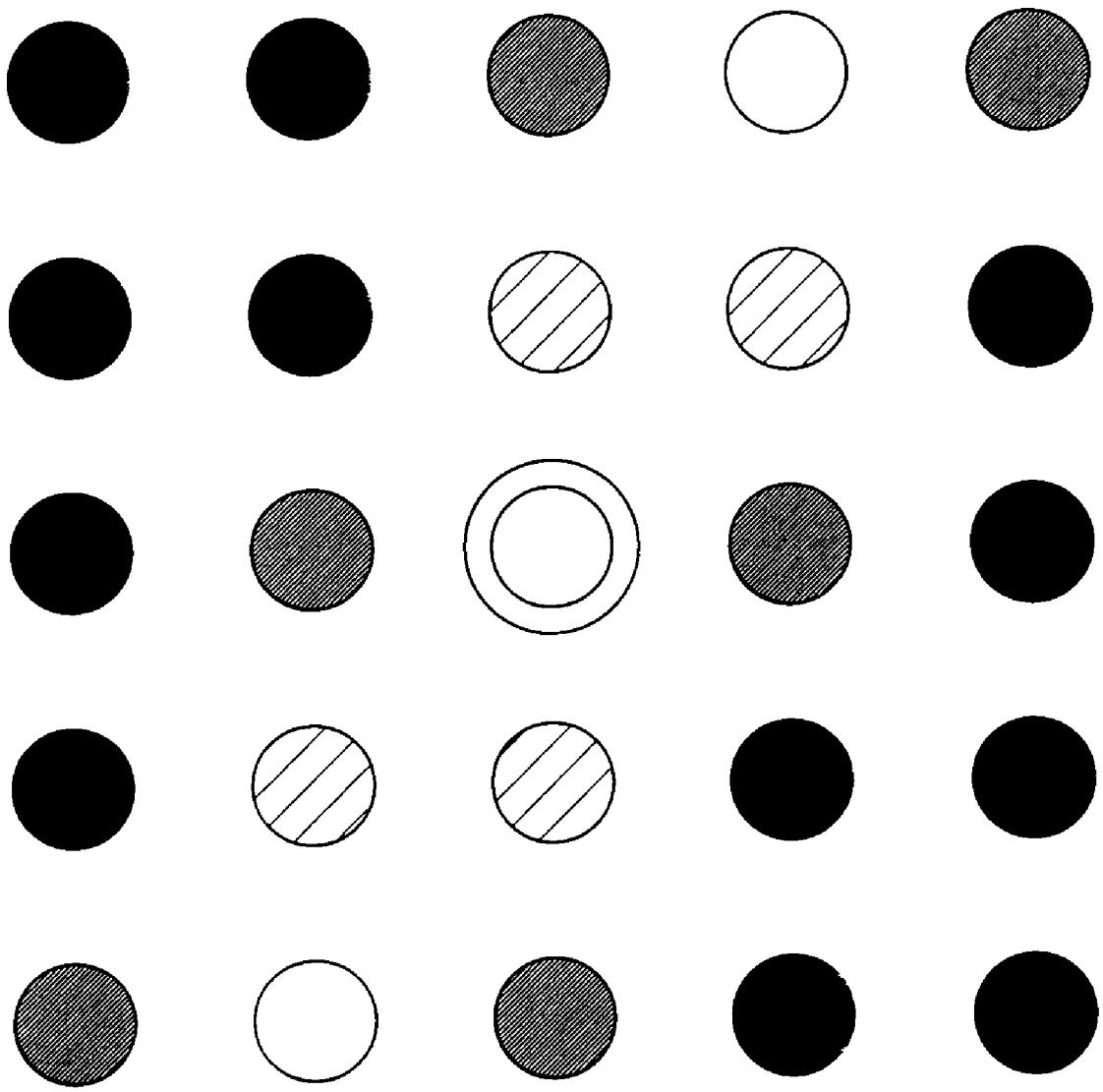
FIG. 53 is a diagram for describing the angle of data continuity with a reference axis as a reference, in the input image.

In FIG. 53, each circle represents a single pixel, and the double circle represents the pixel of interest. The colors of the circles schematically represent the pixel values of the pixels, with the lighter colors indicating greater pixel values. For example, black represents a pixel value of 30, while white indicates a pixel value of 120.

In the event that a person views the image made up of the pixels shown in FIG. 53, the person who sees the image can recognize that a straight line is extending in the diagonally upper right direction.

Upon inputting an input image made up of the pixels shown in FIG. 53, the data continuity detecting unit 101 of which the configuration is shown in FIG. 52 detects that a straight line is extending in the diagonally upper right direction.

Figure 54:
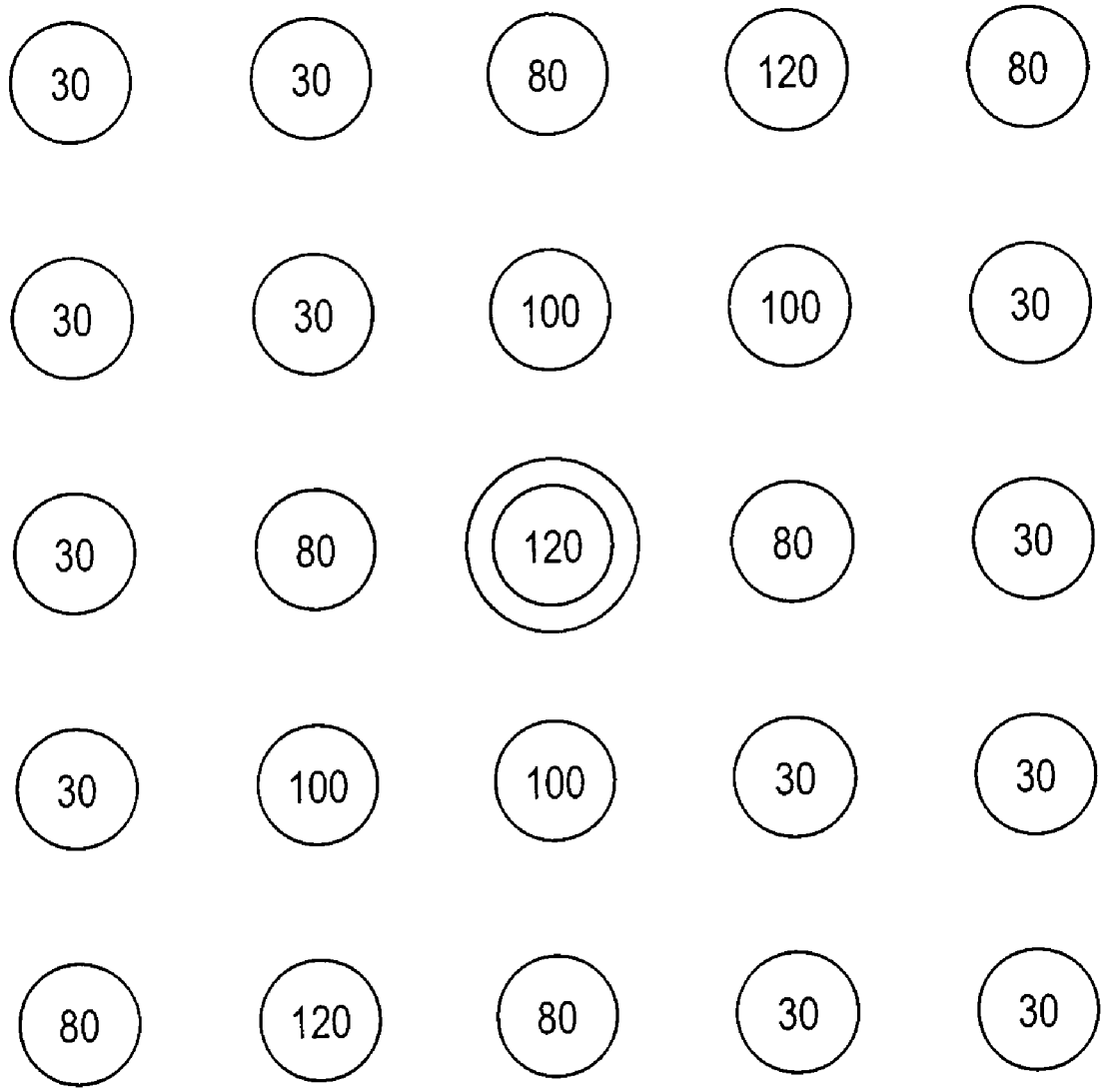
FIG. 54 is a diagram for describing the angle of data continuity with a reference axis as a reference, in the input image.

FIG. 54 is a diagram illustrating the pixel values of the pixels shown in FIG. 53 with numerical values. Each circle represents one pixel, and the numerical values in the circles represent the pixel values.

For example, the pixel value of the pixel of interest is 120, the pixel value of the pixel above the pixel of interest is 100, and the pixel value of the pixel below the pixel of interest is 100. Also, the pixel value of the pixel to the left of the pixel of interest is 80, and the pixel value of the pixel to the right of the pixel of interest is 80. In the same way, the pixel value of the pixel to the lower left of the pixel of interest is 100, and the pixel value of the pixel to the upper right of the pixel of interest is 100. The pixel value of the pixel to the upper left of the pixel of interest is 30, and the pixel value of the pixel to the lower right of the pixel of interest is 30.

Figure 55:
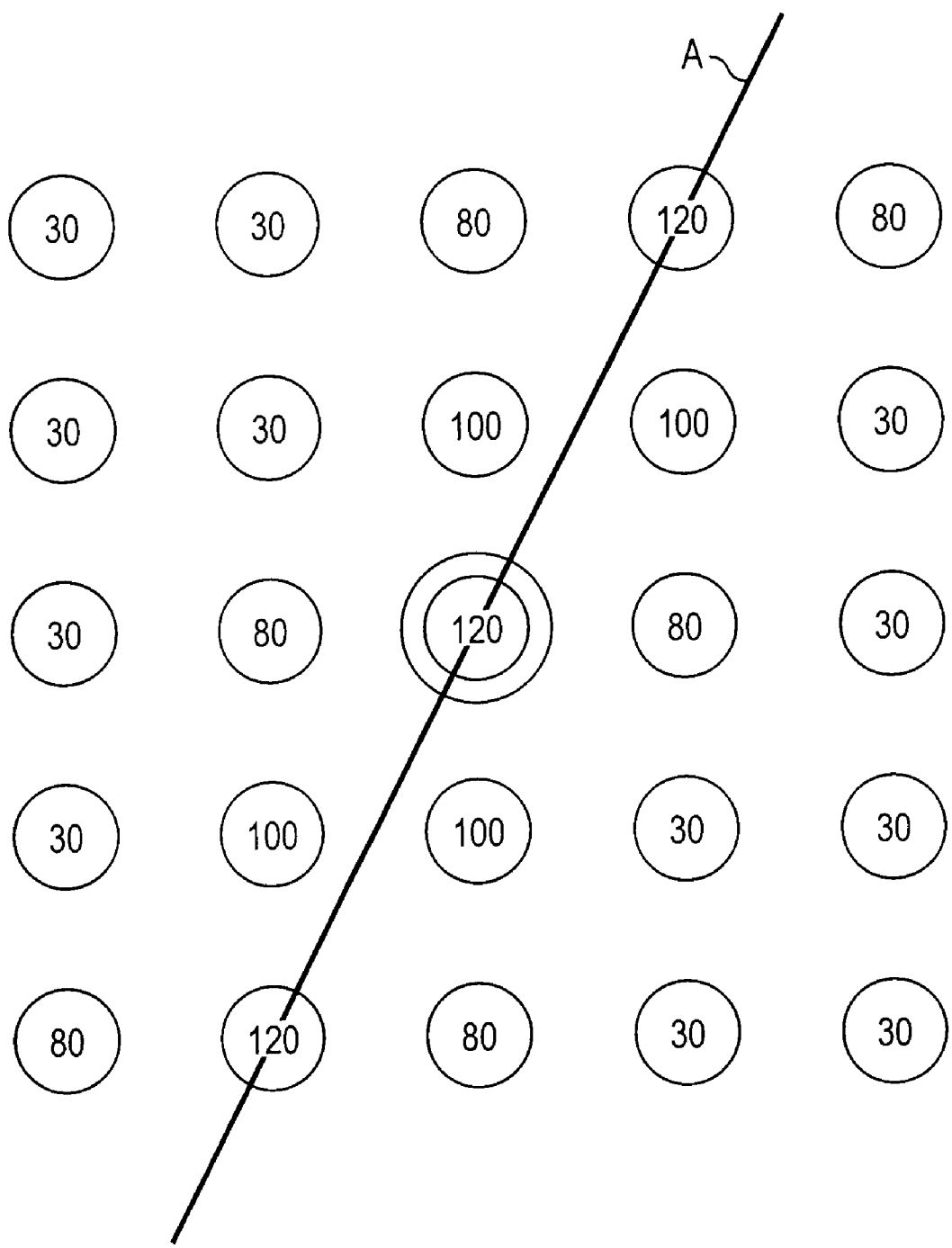
FIG. 55 is a diagram for describing the angle of data continuity with a reference axis as a reference, in the input image.

The data continuity detecting unit 101 of which the configuration is shown in FIG. 52 plots a regression line A as to the input image shown in FIG. 54, as shown in FIG. 55.

Figure 56:
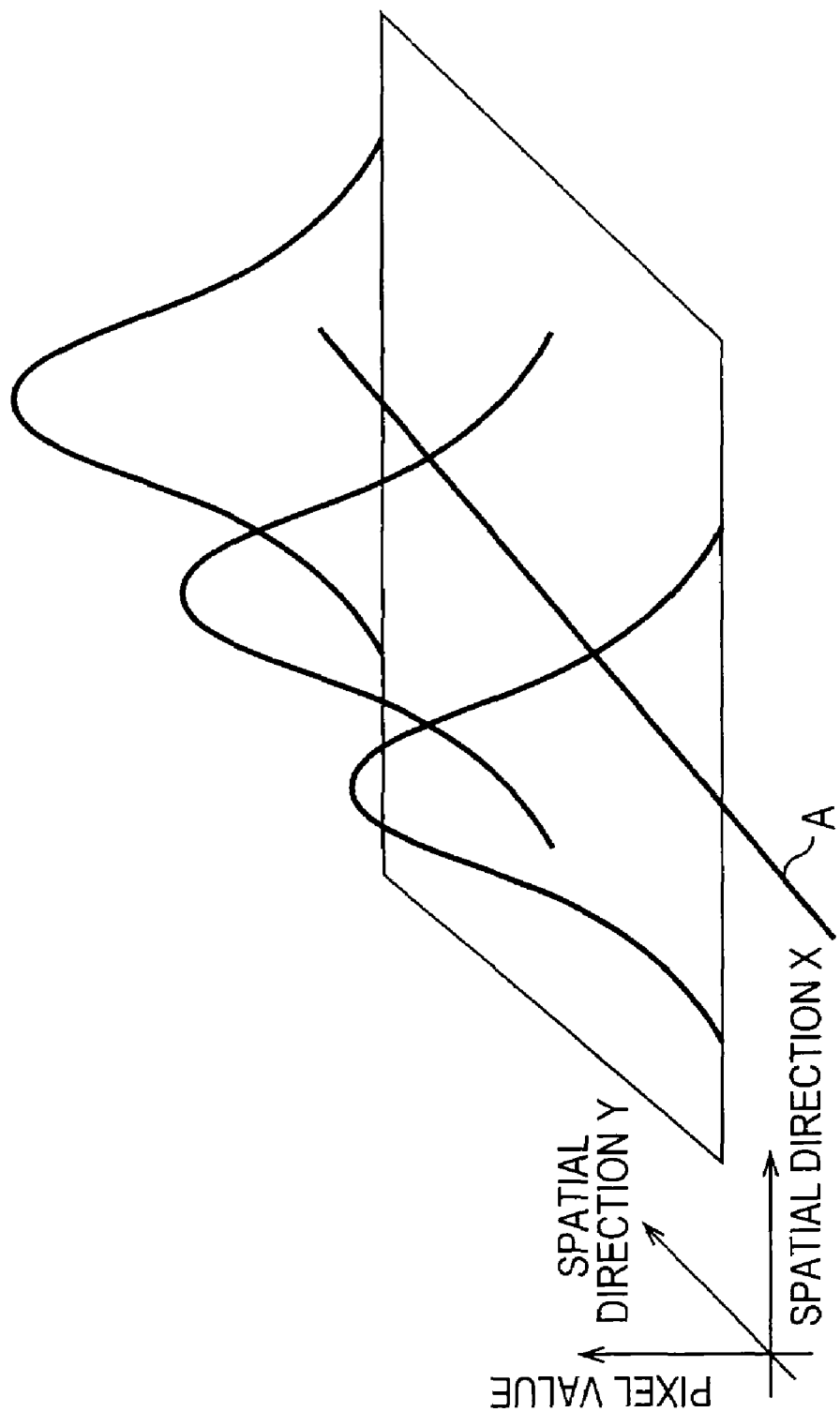
FIG. 56 is a diagram illustrating the relationship between the change in pixel values as to the position of pixels in the spatial direction, and a regression line, in the input image.

FIG. 56 is a diagram illustrating the relation between change in pixel values in the input image as to the position of the pixels in the spatial direction, and the regression line A. The pixel values of pixels in the region having data continuity change in the form of a crest, for example, as shown in FIG. 56.

The data continuity detecting unit 101 of which the configuration is shown in FIG. 52 plots the regression line A by least-square, weighted with the pixel values of the pixels in the region having data continuity. The regression line A obtained by the data continuity detecting unit 101 represents the data continuity in the neighborhood of the pixel of interest.

Figure 57:
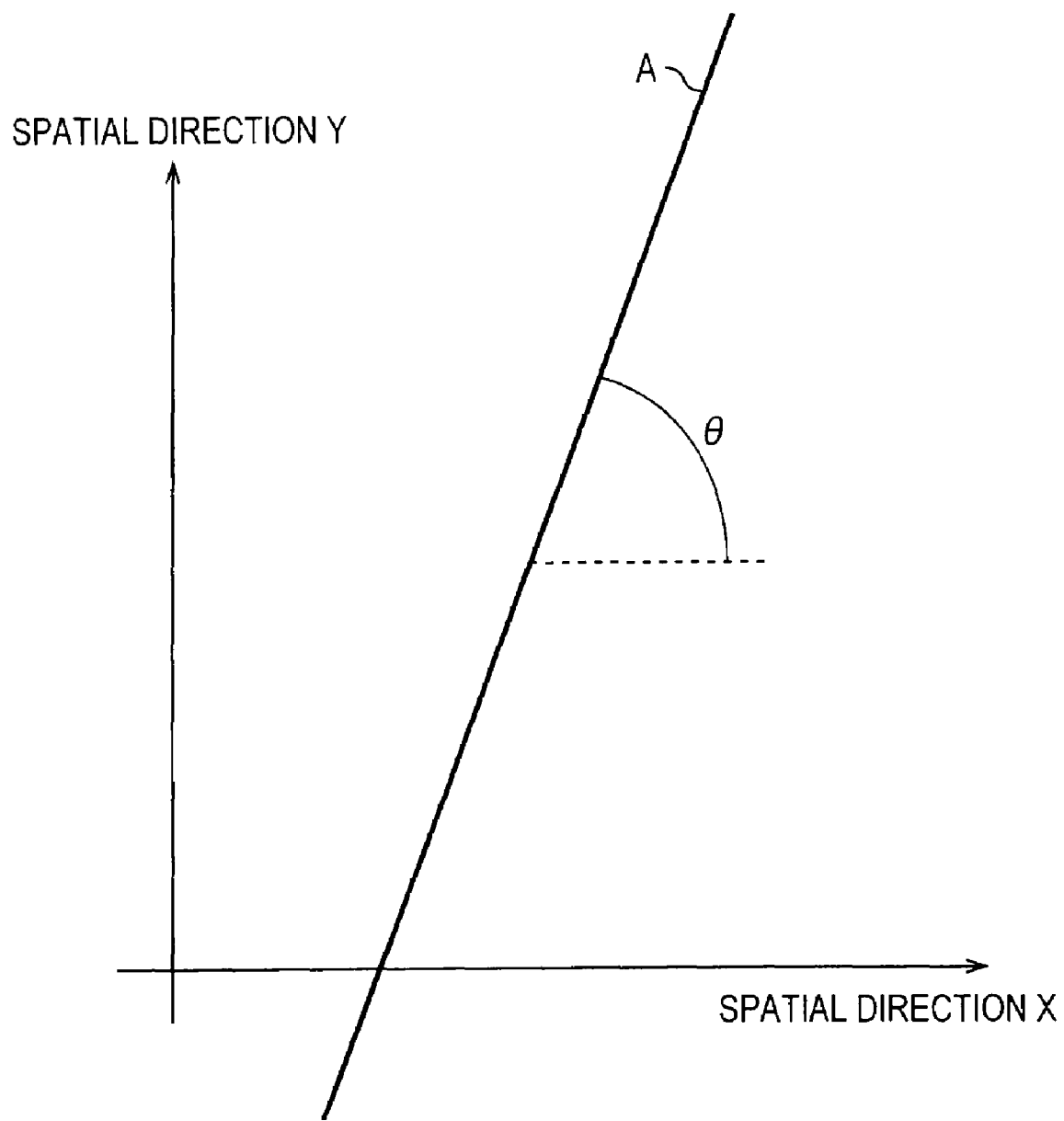
FIG. 57 is a diagram for describing the angle between the regression line A, and an axis indicating the spatial direction X, which is a reference axis, for example.

The angle of data continuity in the input image based on the reference axis is detected by obtaining the angle θ between the regression line A and an axis indicating the spatial direction X which is the reference axis for example, as shown in FIG. 57.

Next, a specific method for calculating the regression line with the data continuity detecting unit 101 of which the configuration is shown in FIG. 52.

From the pixel values of pixels in a region made up of 9 pixels in the spatial direction X and 5 pixels in the spatial direction Y for a total of 45 pixels, centered on the pixel of interest, supplied from the pixel acquiring unit 502, for example, the score detecting unit 503 detects the score corresponding to the coordinates of the pixels belonging to the region.

For example, the score detecting unit 503 detects the score $L_{i,j}$ of the coordinates $(x_i, y_j)$ belonging to the region, by calculating the score with the computation of Expression (17).

$$L_{i,j} = \begin{cases} \exp(0.050(255 - |P_{0,0} - P_{i,j}|) - 1) & (|P_{0,0} - P_{i,j}|) \le Th) \\ 0 & (|P_{0,0} - P_{i,j}|) > Th) \end{cases} \quad (17)$$

In Expression (17), $P_{0,0}$ represents the pixel value of the pixel of interest, and $P_{i,j}$ represents the pixel values of the pixel at the coordinates $(x_i, y_j)$. Th represents a threshold value.

i represents the order of the pixel in the spatial direction X in the region wherein $1 \le i \le k$. j represents the order of the pixel in the spatial direction Y in the region wherein $1 \le j \le l$.

k represents the number of pixels in the spatial direction X in the region, and l represents the number of pixels in the spatial direction Y in the region. For example, in the event of a region made up of 9 pixels in the spatial direction X and 5 pixels in the spatial direction Y for a total of 45 pixels, K is 9 and l is 5.

Figure 58:
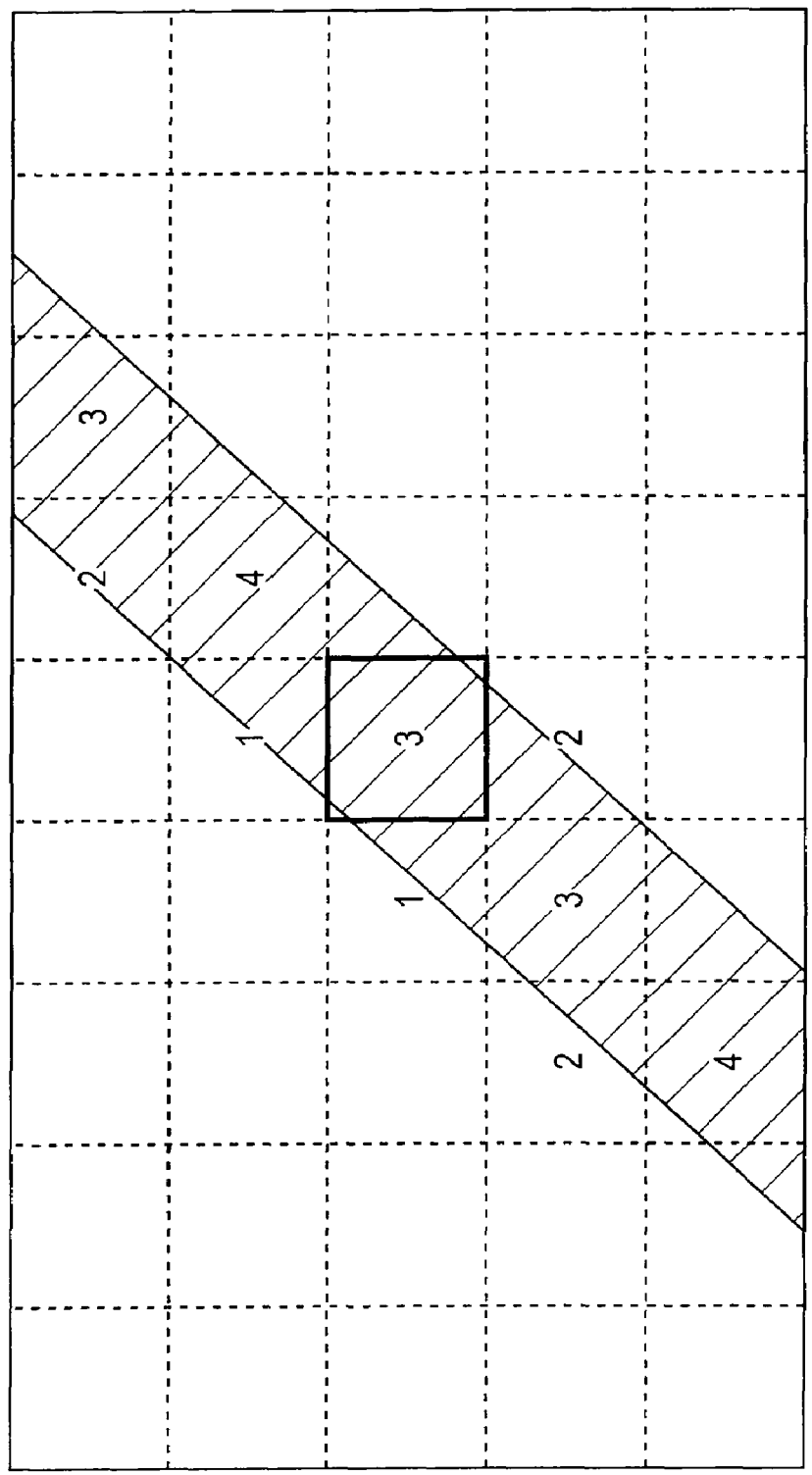
FIG. 58 is a diagram illustrating an example of a region.

FIG. 58 is a diagram illustrating an example of a region acquired by the pixel acquiring unit 502. In FIG. 58, the dotted squares each represent one pixel.

For example, as shown in FIG. 58, in the event that the region is made up of 9 pixels centered on the pixel of interest in the spatial direction X, and is made up of 5 pixels centered on the pixel of interest in the spatial direction Y, with the coordinates (x, y) of the pixel of interest being (0, 0), the coordinates (x, y) of the pixel at the upper left of the region are (−4, 2), the coordinates (x, y) of the pixel at the upper right of the region are (4, 2), the coordinates (x, y) of the pixel at the lower left of the region are (−4, −2), and the coordinates (x, y) of the pixel at the lower right of the region are (4, −2).

The order i of the pixels at the left side of the region in the spatial direction X is 1, and the order i of the pixels at the right side of the region in the spatial direction X is 9. The order j of the pixels at the lower side of the region in the spatial direction Y is 1, and the order j of the pixels at the upper side of the region in the spatial direction Y is 5.

That is to say, with the coordinates $(x_5, y_3)$ of the pixel of interest as (0, 0), the coordinates $(x_1, y_5)$ of the pixel at the upper left of the region are (−4, 2), the coordinates $(x_9, y_5)$ of the pixel at the upper right of the region are (4, 2), the coordinates $(x_1, y_1)$ of the pixel at the lower left of the region are (−4, −2), and the coordinates $(x_9, y_1)$ of the pixel at the lower right of the region are (4, −2).

The score detecting unit 503 calculates the absolute values of difference of the pixel value of the pixel of interest and the pixel values of the pixels belonging to the region as a correlation value with Expression (17), so this is not restricted to a region having data continuity in the input image where a fine line image of the actual world has been projected, rather, score can be detected representing the feature of spatial change of pixel values in the region of the input image having two-valued edge data continuity, wherein an image of an object in the actual world having a straight edge and which is of a monotone color different from that of the background has been projected.

Note that the score detecting unit 503 is not restricted to the absolute values of difference of the pixel values of pixels, and may be arranged to detect the score based on other correlation values such as correlation coefficients and so forth.

Also, the reason that an exponential function is applied in Expression (17) is to exaggerate difference in score as to difference in pixel values, and an arrangement may be made wherein other functions are applied.

The threshold value Th may be an optional value. For example, the threshold value Th may be 30.

Thus, the score detecting unit 503 sets a score to pixels having a correlation value with a pixel value of a pixel belonging to a selected region, based on the correlation value, and thereby detects the score of the pixels belonging to the region.

Also, the score detecting unit 503 performs the computation of Expression (18), thereby calculating the score, whereby the score $L_{i,j}$ of the coordinates $(x_i, y_j)$ belonging to the region is detected.

$$L_{i,j} = \begin{cases} 255 - |P_{0,0} - P_{i,j}| & (|P_{0,0} - P_{i,j}|) \le Th) \\ 0 & (|P_{0,0} - P_{i,j}|) > Th) \end{cases} \quad (18)$$

With the score of the coordinates $(x_i, y_j)$ as $L_{i,j}$ ($1 \le i \le k$, $1 \le j \le l$), the sum $q_i$ of the score $L_{i,j}$ of the coordinate $x_i$ in the spatial direction Y is expressed by Expression (19), and the sum $h_j$ of the score $L_{i,j}$ of the coordinate $y_j$ in the spatial direction X is expressed by Expression (20).

$$q_i = \sum_{j=1}^{l} L_{i,j} \quad (19)$$

$$h_j = \sum_{i=1}^{k} L_{i,j} \quad (20)$$

The summation u of the scores is expressed by Expression (21).

$$u = \sum_{i=1}^{k} \sum_{j=1}^{l} L_{i,j} \quad (21)$$

-continued $$= \sum_{i=1}^{k} q_i$$

$$= \sum_{j=1}^{l} h_j$$

In the example shown in FIG. 58, the score $L_{5,3}$ of the coordinate of the pixel of interest is 3, the score $L_{5,4}$ of the coordinate of the pixel above the pixel of interest is 1, the score $L_{6,4}$ of the coordinate of the pixel to the upper right of the pixel of interest is 4, the score $L_{6,5}$ of the coordinate of the pixel two pixels above and one pixel to the right of the pixel of interest is 2, and the score $L_{7,5}$ of the coordinate of the pixel two pixels above and two pixels to the right of the pixel of interest is 3. Also, the score $L_{5,2}$ of the coordinate of the pixel below the pixel of interest is 2, the score $L_{4,3}$ of the coordinate of the pixel to the left of the pixel of interest is 1, the score $L_{4,2}$ of the coordinate of the pixel to the lower left of the pixel of interest is 3, the score $L_{3,2}$ of the coordinate of the pixel one pixel below and two pixels to the left of the pixel of interest is 2, and the score $L_{3,1}$ of the coordinate of the pixel two pixels below and two pixels to the left of the pixel of interest is 4. The score of all other pixels in the region shown in FIG. 58 is 0, and description of pixels which have a score of 0 are omitted from FIG. 58.

In the region shown in FIG. 58, the sum $q_1$ of the scores in the spatial direction Y is 0, since all scores L wherein i is 1 are 0, and $q_2$ is 0 since all scores L wherein i is 2 are 0. $q_3$ is 6 since $L_{3,2}$ is 2 and $L_{3,1}$ is 4. In the same way, $q_4$ is 4, $q_5$ is 6, $q_6$ is 6, $q_7$ is 3, $q_8$ is 0, and $q_9$ is 0.

In the region shown in FIG. 58, the sum $h_1$ of the scores in the spatial direction X is 4, since $L_{3,1}$ is 4. $h_2$ is 7 since $L_{3,2}$ is 2, $L_{4,2}$ is 3, and $L_{5,2}$ is 2. In the same way, $h_3$ is 4, $h_4$ is 5, and $h_5$ is 5.

In the region shown in FIG. 58, the summation u of scores is 25.

The sum $T_x$ of the results of multiplying the sum $q_i$ of the scores $L_{i,j}$ in the spatial direction Y by the coordinate $x_i$ is shown in Expression (22).

$$T_x = q_1 x_1 + q_2 x_2 + \ldots + q_k x_k \qquad (22)$$

$$= \sum_{i=1}^{k} q_i x_i$$

The sum $T_y$ of the results of multiplying the sum $h_j$ of the scores $L_{i,j}$ in the spatial direction X by the coordinate $y_j$ is shown in Expression (22).

$$T_y = h_1 y_1 + h_2 y_2 + \ldots + h_l y_l \qquad (23)$$

$$= \sum_{j=1}^{l} h_j y_j$$

For example, in the region shown in FIG. 58, $q_1$ is 0 and $x_1$ is −4, so $q_1 x_1$ is 0, and $q_2$ is 0 and $x_2$ is −3, so $q_2 x_2$ is 0. In the same way, $q_3$ is 6 and $x_3$ is −2, so $q_3 x_3$ is −12; $q_4$ is 4 and $x_4$ is −1, so $q_4 x_4$ is −4; $q_5$ is 6 and $x_5$ is 0, so $q_5 x_5$ is 0; $q_6$ is 6 and $x_6$ is 1, so $q_6 x_6$ is 6; $q_7$ is 3 and $x_7$ is 2, so $q_7 x_7$ is 6; $q_8$ is 0 and $x_8$ is 3, so $q_8 x_8$ is 0; and $q_9$ is 0 and $x_9$ is 4, so $q_9 x_9$ is 0. Accordingly, $T_x$ which is the sum of $q_1 x_1$ through $q_9 x_9$ is −4.

For example, in the region shown in FIG. 58, $h_1$ is 4 and $y_1$ is −2, so $h_1 y_1$ is −8, and $h_2$ is 7 and $y_2$ is −1, so $h_2 y_2$ is −7. In the same way, $h_3$ is 4 and $y_3$ is 0, so $h_3 y_3$ is 0; $h_4$ is 5 and $y_4$ is 1, so $h_4 y_4$ is 5; and $h_5$ is 5 and $y_5$ is 2, so $h_5 y_5$ is 10. Accordingly, $T_y$ which is the sum of $h_1 y_1$ through $h_5 y_5$ is 0.

Also, $Q_i$ is defined as follows.

$$Q_i = \sum_{j=1}^{l} L_{i,j} y_j \qquad (24)$$

The variation $S_x$ of x is expressed by Expression (25).

$$S_x = \sum_{i=1}^{k} q_i x_i^2 - T_x^2 / u \qquad (25)$$

The variation $S_y$ of y is expressed by Expression (26)

$$S_y = \sum_{j=1}^{l} h_j y_j^2 - T_y^2 / u \qquad (26)$$

The covariation $s_{xy}$ is expressed by Expression (27).

$$S_{xy} = \sum_{i=1}^{k} \sum_{j=1}^{l} L_{i,j} x_i y_j - T_x T_y / u \qquad (27)$$

$$= \sum_{i=1}^{k} Q_i x_i - T_x T_y / u$$

Let us consider obtaining the primary regression line shown in Expression (28).

$$y = ax + b \qquad (28)$$

The gradient a and intercept b can be obtained as follows by the least-square method.

$$a = \frac{u \sum_{i=1}^{k} \sum_{j=1}^{l} L_{i,j} x_i y_j - T_x T_y}{u \sum_{i=1}^{k} q_i x_i^2 - T_x^2} \qquad (29)$$

$$= \frac{S_{xy}}{S_x}$$

$$b = \frac{T_y \sum_{i=1}^{k} q_i x_i^2 - T_x \sum_{i=1}^{k} \sum_{j=1}^{l} L_{i,j} x_i y_j}{u \sum_{i=1}^{k} q_i x_i^2 - T_x^2} \qquad (30)$$

However, it should be noted that the conditions necessary for obtaining a correct regression line is that the scores $L_{i,j}$ are distributed in a Gaussian distribution as to the regression line. To put this the other way around, there is the need for the score detecting unit 503 to convert the pixel values of the pixels of the region into the scores $L_{i,j}$ such that the scores $L_{i,j}$ have a Gaussian distribution.

The regression line computing unit 504 performs the computation of Expression (29) and Expression (30) to obtain the regression line.

The angle calculating unit 505 performs the computation of Expression (31) to convert the gradient a of the regression line to an angle θ as to the axis in the spatial direction X, which is the reference axis.

$$\theta = \tan^{-1}(a) \qquad (31)$$

Now, in the case of the regression line computing unit 504 computing a regression line which is a predetermined curve, the angle calculating unit 505 obtains the angle θ of the regression line at the position of the pixel of interest as to the reference axis.

Here, the intercept b is unnecessary for detecting the data continuity for each pixel. Accordingly, let us consider obtaining the primary regression line shown in Expression (32).

$$y = ax \qquad (32)$$

In this case, the regression line computing unit 504 can obtain the gradient a by the least-square method as in Expression (33).

$$a = \frac{\sum_{i=1}^{k}\sum_{j=1}^{l} L_{i,j} x_i y_j}{\sum_{i=1}^{k} q_i x_i^2} \qquad (33)$$

Figure 59:
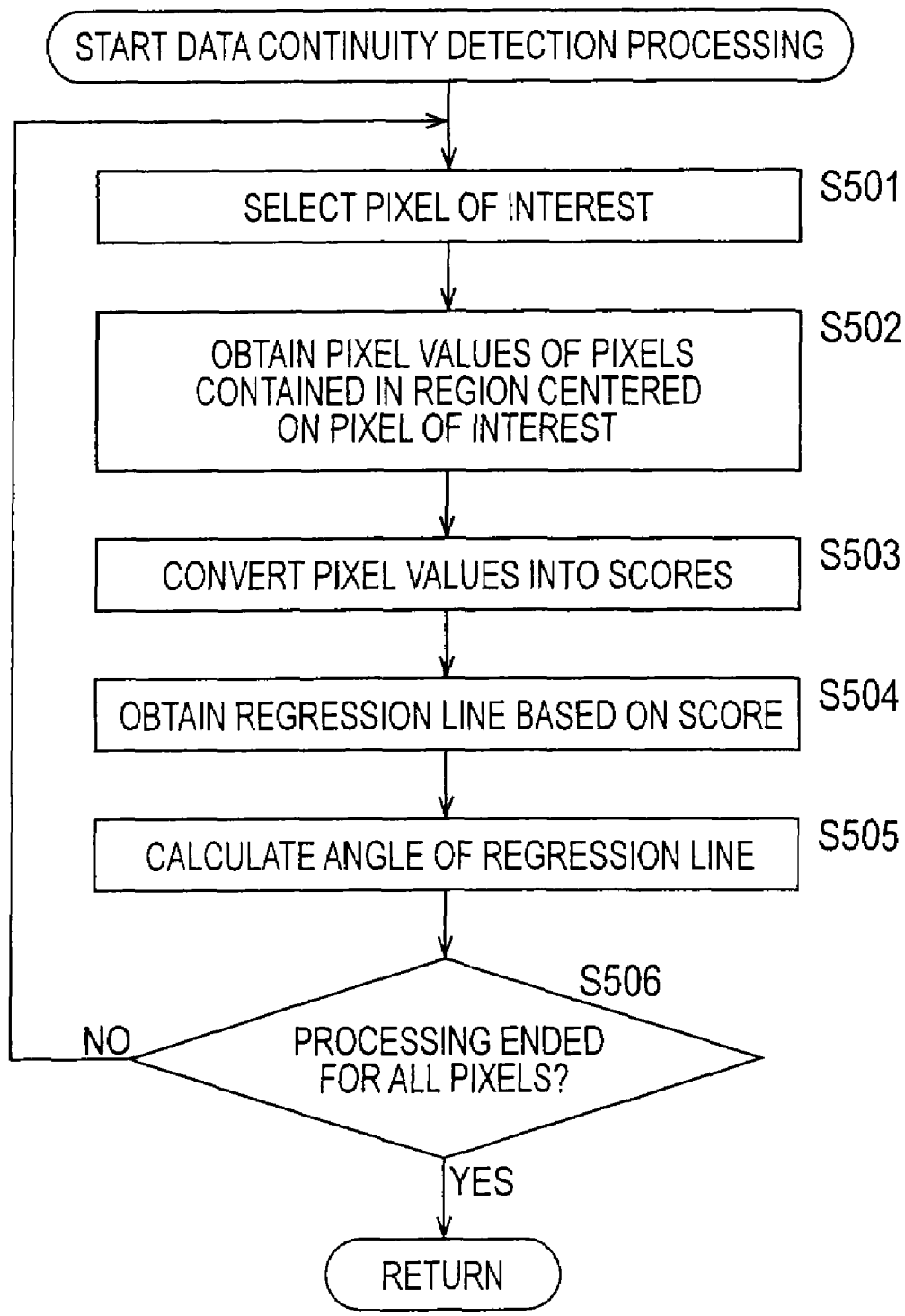
FIG. 59 is a flowchart for describing the processing for detection of data continuity with the data continuity detecting unit of which the configuration is illustrated in FIG. 52.

The processing for detecting data continuity with the data continuity detecting unit 101 of which the configuration is shown in FIG. 52, corresponding to the processing in step S101, will be described with reference to the flowchart shown in FIG. 59.

In step S501, the pixel acquiring unit 502 selects a pixel of interest from pixels which have not yet been taken as the pixel of interest. For example, the pixel acquiring unit 502 selects the pixel of interest in raster scan order. In step S502, the pixel acquiring unit 502 acquires the pixel values of the pixel contained in a region centered on the pixel of interest, and supplies the pixel values of the pixels acquired to the score detecting unit 503. For example, the pixel acquiring unit 502 selects a region made up of 9×5 pixels centered on the pixel of interest, and acquires the pixel values of the pixels contained in the region.

In step S503, the score detecting unit 503 converts the pixel values of the pixels contained in the region into scores, thereby detecting scores. For example, the score detecting unit 503 converts the pixel values into scores $L_{i,j}$ by the computation shown in Expression (17). In this case, the score detecting unit 503 converts the pixel values of the pixels of the region into the scores $L_{i,j}$ such that the scores $L_{i,j}$ have a Gaussian distribution. The score detecting unit 503 supplies the converted scores to the regression line computing unit 504.

In step S504, the regression line computing unit 504 obtains a regression line based on the scores supplied from the score detecting unit 503. For example, the regression line computing unit 504 obtains the regression line based on the scores supplied from the score detecting unit 503. More specifically, the regression line computing unit 504 obtains the regression line by executing the computation shown in Expression (29) and Expression (30). The regression line computing unit 504 supplies computation result parameters indicating the regression line which is the result of computation, to the angle calculating unit 505.

In step S505, the angle calculating unit 505 calculates the angle of the regression line as to the reference axis, thereby detecting the data continuity of the image data, corresponding to the continuity of the light signals of the real world that has dropped out. For example, the angle calculating unit 505 converts the gradient a of the regression line into the angle θ as to the axis of the spatial direction X which is the reference axis, by the computation of Expression (31).

Note that an arrangement may be made wherein the angle calculating unit 505 outputs data continuity information indicating the gradient a.

In step S506, the pixel acquiring unit 502 determines whether or not the processing of all pixels has ended, and in the event that determination is made that the processing of all pixels has not ended, the flow returns to step S501, a pixel of interest is selected from the pixels which have not yet been taken as a pixel of interest, and the above-described processing is repeated.

In the event that determination is made in step S506 that the processing of all pixels has ended, the processing ends.

Thus, the data continuity detecting unit 101 of which the configuration is shown in FIG. 52 can detect the angle of data continuity in the image data based on the reference axis, corresponding to the dropped continuity of the actual world light signals.

Particularly, the data continuity detecting unit 101 of which the configuration is shown in FIG. 52 can obtain angles smaller than pixels, based on the pixel values of pixels in a relatively narrow region.

As described above, in a case wherein light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the data continuity of the image data corresponding to the continuity of the real world light signals which has dropped out, and subsequently estimating the light signals by estimating the continuity of the dropped real world light signal based on the detected data of the image data, processing results which are more accurate and more precise as to events in the real world can be obtained.

Note that with the data continuity detecting unit 101 of which the configuration is shown in FIG. 52, an arrangement wherein the pixel values of pixels in a predetermined region of the frame of interest where the pixel of interest belongs and in frames before and after the frame of interest time-wise are converted into scores, and a regression plane is obtained based on the scores, allows the angle of time-directional data continuity to be detected along with the angle of the data continuity in the spatial direction.

Figure 60:
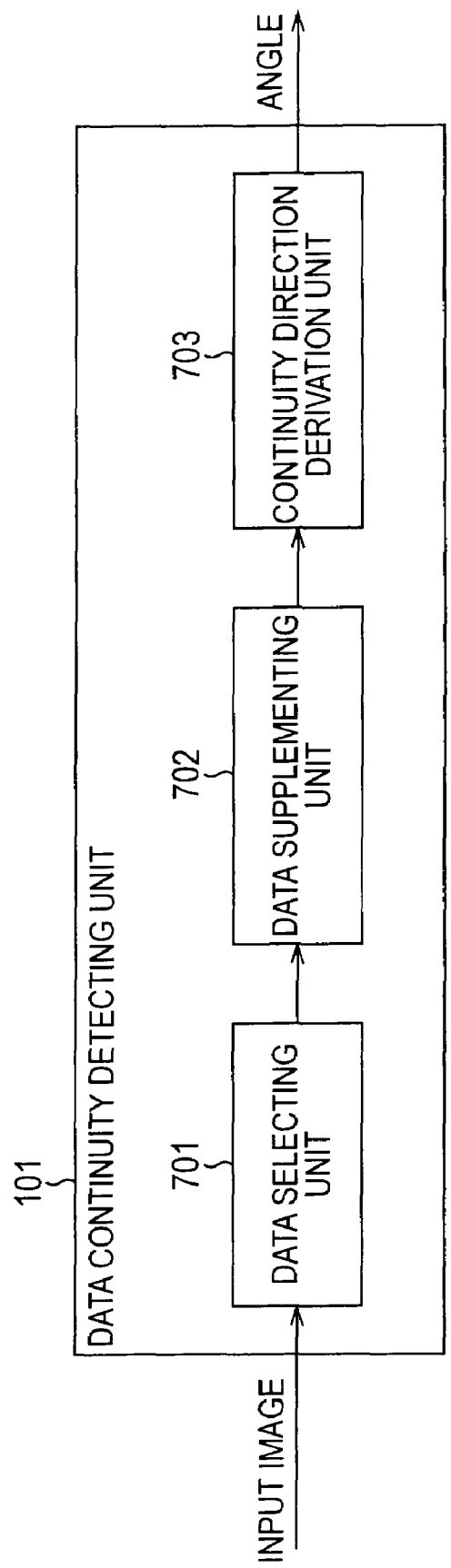
FIG. 60 is a block diagram illustrating the configuration of the data continuity detecting unit for detecting the angle of a fine line or a two-valued edge, as data continuity information, to which the present invention has been applied.

FIG. 60 illustrates the configuration of another form of the data continuity detecting unit 101.

The data continuity detecting unit 101 shown in FIG. 60 comprises a data selecting unit 701, a data supplementing unit 702, and a continuity direction derivation unit 703.

The data selecting unit 701 takes each pixel of the input image as the pixel of interest, selects pixel value data of pixels corresponding to each pixel of interest, and outputs this to the data supplementing unit 702.

The data supplementing unit 702 performs least-square supplementation computation based on the data input from the data selecting unit 701, and outputs the supplementation computation results of the continuity direction derivation unit 703. The supplementation computation by the data supplementing unit 702 is computation regarding the summation item used in the later-described least-square computation, and the computation results thereof can be said to be the feature of the image data for detecting the angle of continuity.

The continuity direction derivation unit 703 computes the continuity direction, i.e., the angle as to the reference axis which the data continuity has (e.g., the gradient or direction of a fine line or two-valued edge) from the supplementation computation results input by the data supplementing unit 702, and outputs this as data continuity information.

Next, the overview of the operations of the data continuity detecting unit 101 in detecting continuity (direction or angle) will be described with reference to FIG. 61. Portions in FIG. 61 which correspond with those in FIG. 62 are denoted with the same symbols, and description thereof in the following will be omitted as suitable.

Figure 61:
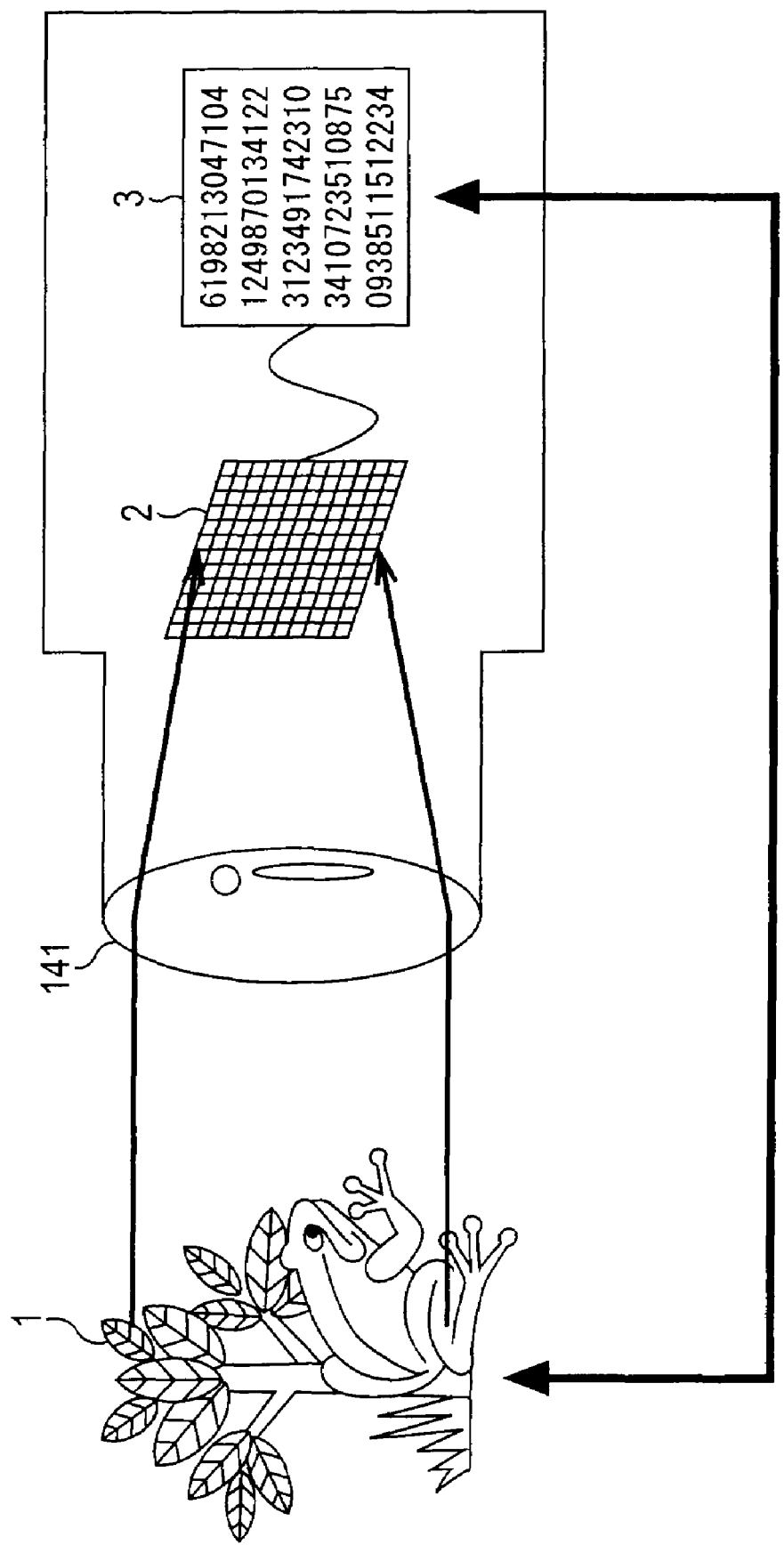
FIG. 61 is a diagram for describing a detection method for data continuity information.

As shown in FIG. 61, signals of the actual world (e.g., an image), are imaged on the photoreception face of a sensor (e.g., a CCD (Charge Coupled Device) or CMOS (Complementary Metal-Oxide Semiconductor)), by an optical system 141 (made up of lenses, an LPF (Low Pass Filter), and the like, for example). The sensor is configured of a device having integration properties, such as a CCD or CMOS, for example. Due to this configuration, the image obtained from the data output from the sensor is an image differing from the image of the actual world (difference as to the image of the actual world occurs).

Figure 62:
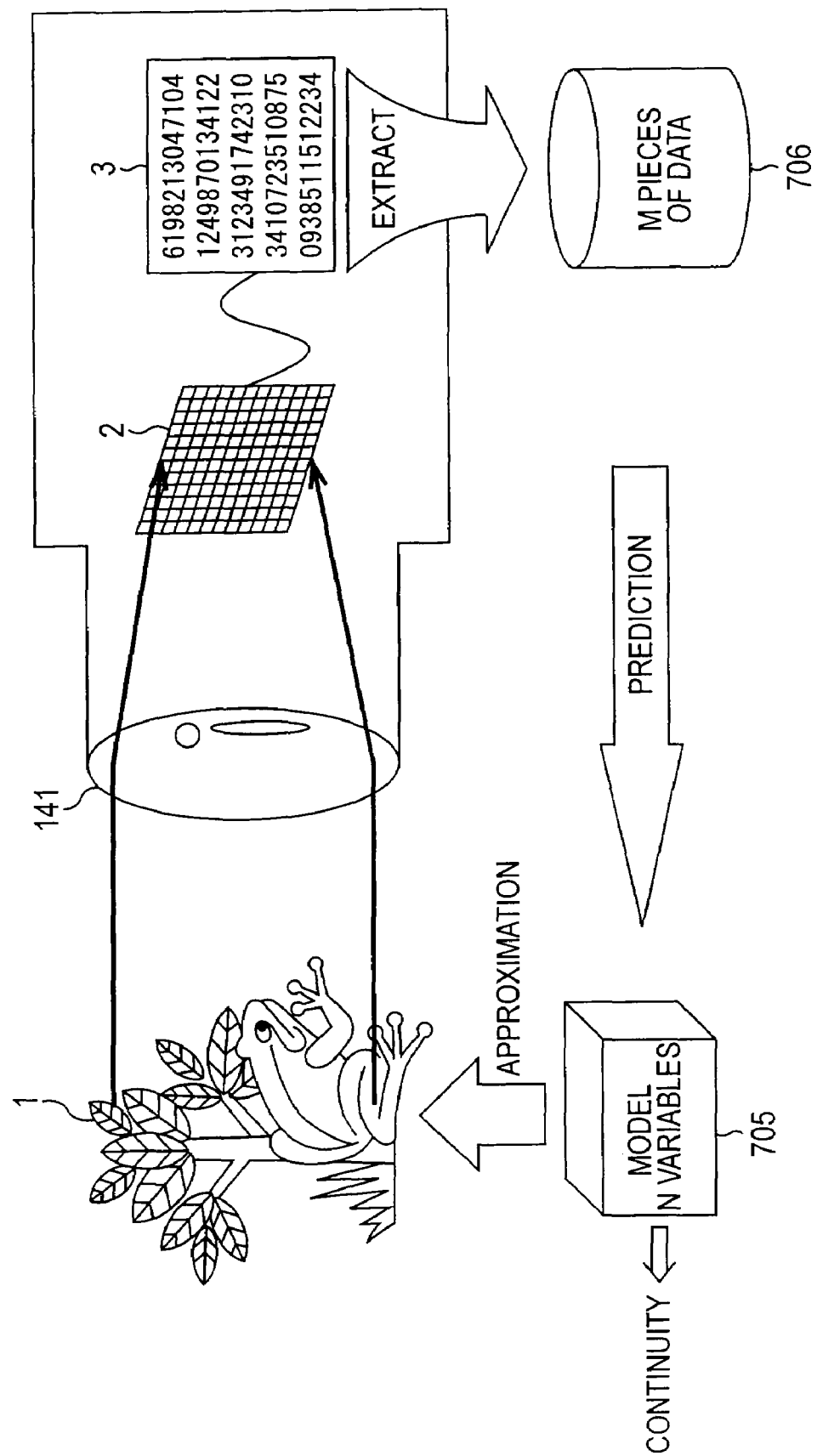
FIG. 62 is a diagram for describing a detection method for data continuity information.

Accordingly, as shown in FIG. 62, the data continuity detecting unit 101 uses a model 705 to describe in an approximate manner the actual world by an approximation expression and extracts the data continuity from the approximation expression. The model 705 is represented by, for example, N variables. More accurately, the model 705 approximates (describes) signals of the actual world.

In order to predict the model 705, the data continuity detecting unit 101 extracts M pieces of data 706 from the data. Consequently, the model 705 is constrained by the continuity of the data.

That is to say, the model 705 approximates the (information (signals) indicating) events of the actual world having continuity (constant characteristics in a predetermined dimensional direction), which generates the data continuity in the data when obtained with the sensor.

Now, in the event that the number M of the data 706 is N, which is the number N of variables of the model 705, or more, the model 705 represented by the N variables can be predicted from M pieces of data 706.

Further, by predicting the model 705 approximating (describing) the signals of) the actual world, the data continuity detecting unit 101 derives the data continuity contained in the signals which are information of the actual world as, for example, fine line or two-valued edge direction (the gradient, or the angle as to an axis in a case wherein a predetermined direction is taken as an axis), and outputs this as data continuity information.

Next, the data continuity detecting unit 101 which outputs the direction (angle) of a fine line from the input image as data continuity information will be described with reference to FIG. 63.

The data selecting unit 701 is configured of a horizontal/vertical determining unit 711, and a data acquiring unit 712. The horizontal/vertical determining unit 711 determines, from the difference in pixel values between the pixel of interest and the surrounding pixels, whether the angle as to the horizontal direction of the fine line in the input image is a fine line closer to the horizontal direction or is a fine line closer to the vertical direction, and outputs the determination results to the data acquiring unit 712 and data supplementing unit 702.

Figure 64:
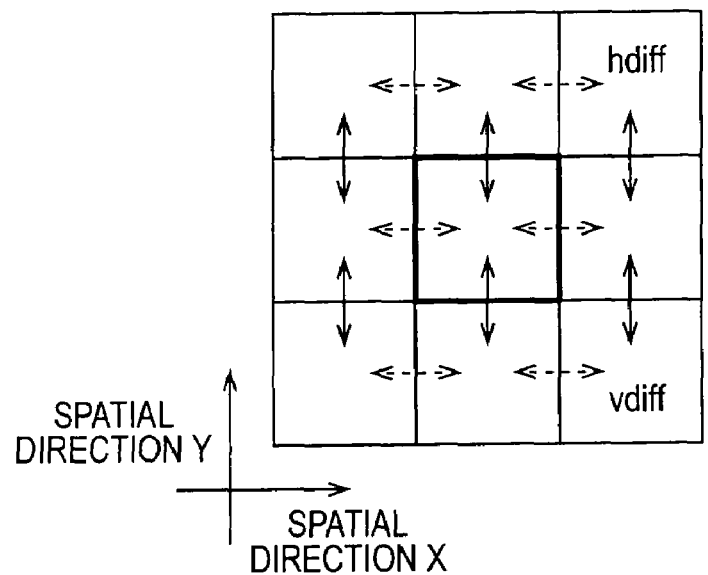
FIG. 64 is a diagram for describing horizontal/vertical determination processing.

In more detail, for example, in the sense of this technique, other techniques may be used as well. For example, simplified 16-directional detection may be used. As shown in FIG. 64, of the difference between the pixel of interest and the surrounding pixels (difference in pixel values between the pixels), the horizontal/vertical determining unit 711 obtains the difference between the sum of difference (activity) between pixels in the horizontal direction (hdiff) and the sum of difference (activity) between pixels in the vertical direction (vdiff), and determines whether the sum of difference is greater between the pixel of interest and pixels adjacent thereto in the vertical direction, or between the pixel of interest and pixels adjacent thereto in the horizontal direction. Now, in FIG. 64, each grid represents a pixel, and the pixel at the center of the diagram is the pixel of interest. Also, the differences between pixels indicated by the dotted arrows in the diagram are the differences between pixels in the horizontal direction, and the sum thereof is indicated by hdiff. Also, the differences between pixels indicated by the solid arrows in the diagram are the differences between pixels in the vertical direction, and the sum thereof is indicated by vdiff.

Figure 65:
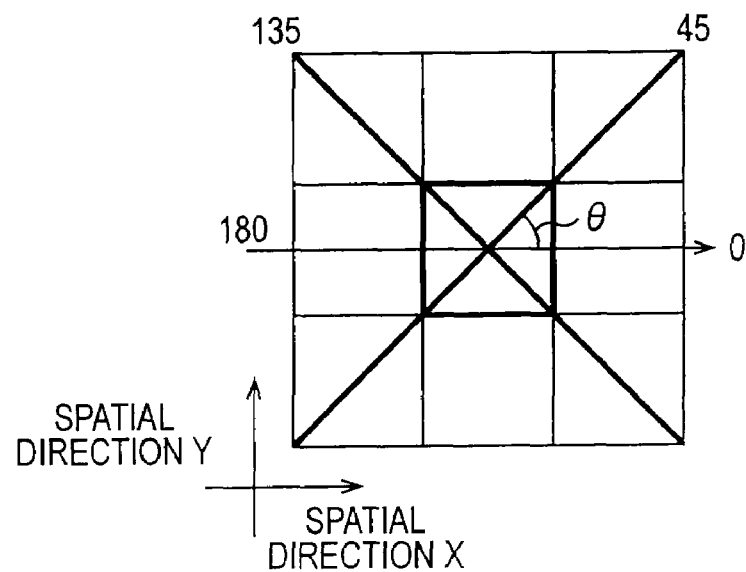
FIG. 65 is a diagram for describing horizontal/vertical determination processing.

Based on the sum of differences hdiff of the pixel values of the pixels in the horizontal direction, and the sum of differences vdiff of the pixel values of the pixels in the vertical direction, that have been thus obtained, in the event that (hdiff minus vdiff) is positive, this means that the change (activity) of pixel values between pixels is greater in the horizontal direction than the vertical direction, so in a case wherein the angle as to the horizontal direction is represented by θ (0 degrees degrees $\leq θ \leq$ 180 degrees degrees) as shown in FIG. 65, the horizontal/vertical determining unit 711 determines that the pixels belong to a fine line which is 45 degrees degrees<θ$\leq$135 degrees degrees, i.e., an angle closer to the vertical direction, and conversely, in the event that this is negative, this means that the change (activity) of pixel values between pixels is greater in the vertical direction, so the horizontal/vertical determining unit 711 determines that the pixels belong to a fine line which is 0 degrees degrees$\leq$θ<45 degrees degrees or 135 degrees degrees<θ$\leq$180 degrees degrees, i.e., an angle closer to the horizontal direction (pixels in the direction (angle) in which the fine line extends each are pixels representing the fine line, so change (activity) between those pixels should be smaller).

Also, the horizontal/vertical determining unit 711 has a counter (not shown) for identifying individual pixels of the input image, and can be used whenever suitable or necessary.

Also, while description has been made in FIG. 64 regarding an example of comparing the sum of difference of pixel values between pixels in the vertical direction and horizontal direction in a 3 pixel×3 pixel range centered on the pixel of interest, to determine whether the fine line is closer to the vertical direction or closer to the horizontal direction, but the direction of the fine line can be determined with the same technique using a greater number of pixels, for example, determination may be made based on blocks of 5 pixels×5 pixels centered on the pixel of interest, 7 pixels×7 pixels, and so forth, i.e., a greater number of pixels.

Based on the determination results regarding the direction of the fine line input from the horizontal/vertical determining unit 711, the data acquiring unit 712 reads out (acquires) pixel values in increments of blocks made up of multiple pixels arrayed in the horizontal direction corresponding to the pixel of interest, or in increments of blocks made up of multiple pixels arrayed in the vertical direction, and along with data of difference between pixels adjacent in the direction according to the determination results from the horizontal/vertical determining unit 711 between multiple corresponding pixels for each pixel of interest read out (acquired), maximum value and minimum value data of pixel values of the pixels contained in blocks of a predetermined number of pixels is output to the data supplementing unit 702. Hereafter, a block made up of multiple pixels obtained corresponding to the pixel of interest by the data acquiring unit 712 will be referred to as an acquired block (of the multiple pixels (each represented by a grid) shown in FIG. 78 described later for example, with the pixel indicated by the black square as the pixel of interest, an acquired block is the three pixels above and below, and one pixel to the right and left, for a total of 15 pixels. More specifically, of the multiple pixels, with the difference data of pixel values between a pixel i adjacent to the direction determined by the horizontal/vertical determining unit 711 and the pixel (i+1) as yi, and in a case wherein the acquired block corresponding to the pixel of interest made up of n pixels, the difference supplementing unit 721 supplements $(y1)^2+(y2)^2+(y1)^2+\ldots$ for each horizontal direction or vertical direction and performs computation, and outputs to the continuity direction derivation unit 703.

The difference supplementing unit 721 of the data supplementing unit 702 detects the difference data input from the data selecting unit 701, executes supplementing processing necessary for solution of the later-described least-square method, based on the determination results of horizontal direction or vertical direction input from the horizontal/vertical determining unit 711 of the data selecting unit 701, and outputs the supplementing results to the continuity direction derivation unit 703. More specifically, of the multiple pixels, the data of difference in the pixel values between the pixel i adjacent in the direction determined by the horizontal/vertical determining unit 711 and the pixel (i+1) is taken as yi, and in the event that the acquired block corresponding to the pixel of interest is made up of n pixels, the difference supplementing unit 721 computes supplementing of $(y1)^2+(y2)^2+(y3)^2+\ldots$ for each horizontal direction or vertical direction, and outputs to the continuity direction derivation unit 703.

Upon obtaining the maximum value and minimum value of pixel values of pixels contained in a block set for each of the pixels contained in the acquired block corresponding to the pixel of interest input from the data selecting unit 701 (hereafter referred to as a dynamic range block (of the pixels in the acquired block indicated in FIG. 78 which will be described later, a dynamic range block of the three pixels above and below the pixel pix12 for a total of 7 pixels, illustrated as the dynamic range block B1 surrounded with a black solid line)), a MaxMin acquiring unit 722 computes (detects) from the difference thereof a dynamic range Dri (the difference between the maximum value and minimum value of pixel values of pixels contained in the dynamic range block corresponding to the i'th pixel in the acquired block), and outputs this to a difference supplementing unit 723.

The difference supplementing unit 723 detects the dynamic range Dri input from the MaxMin acquiring unit 722 and the difference data input from the data selecting unit 701, supplements each horizontal direction or vertical direction input from the horizontal/vertical determining unit 711 of the data selecting unit 701 with a value obtained by multiplying the dynamic range Dri and the difference data yi based on the dynamic range Dri and the difference data which have been detected, and outputs the computation results to the continuity direction derivation unit 703. That is to say, the computation results which the difference supplementing unit 723 outputs is $y1 \times Dr1 + y2 \times Dr2 + y3 \times Dr3 + \ldots$ in each horizontal direction or vertical direction.

The continuity direction computation unit 731 of the continuity direction derivation unit 703 computes the angle (direction) of the fine line based on the supplemented computation results in each horizontal direction or vertical direction input from the data supplementing unit 702, and outputs the computed angle as continuity information.

Now, the method for computing the direction (gradient or angle of the fine line) of the fine line will be described.

Figure 66A:
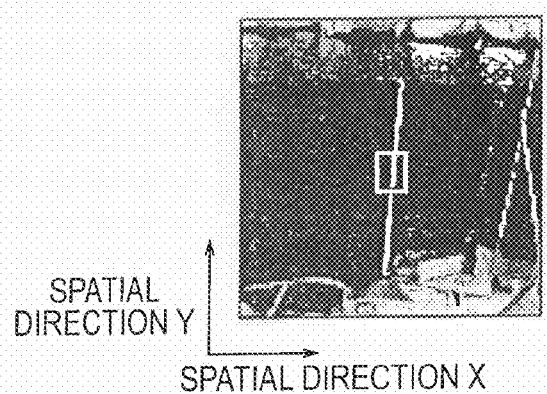
FIG. 66A is a diagram for describing the relationship between a fine line in the real world and a fine line imaged by a sensor.
Figure 66B:
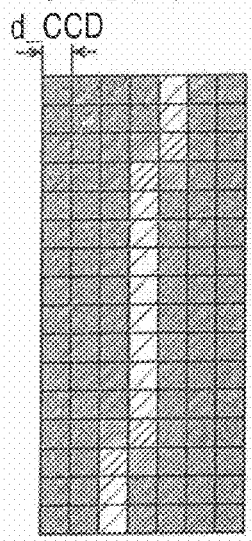
FIG. 66B is a diagram for describing the relationship between a fine line in the real world and a fine line imaged by a sensor.
Figure 66C:
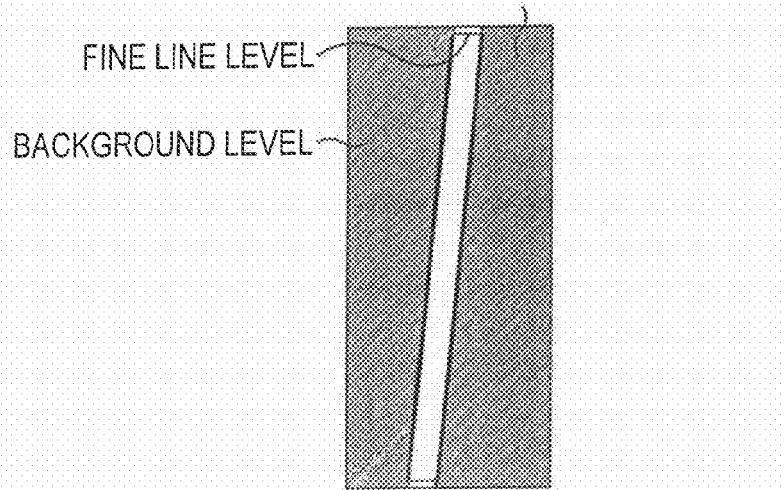
FIG. 66C is a diagram for describing the relationship between a fine line in the real world and a fine line imaged by a sensor.

Enlarging the portion surrounded by the white line in an input image such as shown in FIG. 66A shows that the fine line (the white line extending diagonally in the upwards right direction in the drawing) is actually displayed as in FIG. 66B. That is to say, in the real world, the image is such that as shown in FIG. 66C, the two levels of fine-line level (the lighter hatched portion in FIG. 66C) and the background level form boundaries, and no other levels exist. Conversely, the image taken with the sensor, i.e., the image imaged in increments of pixels, is an image wherein, as shown in FIG. 66B, there is a repeated array in the fine line direction of blocks which are made up of multiple pixels with the background level and the fine line level spatially mixed due to the integration effects, arrayed in the vertical direction so that the ratio (mixture ratio) thereof changes according to a certain pattern. Note that in FIG. 66B, each square-shaped grid represents one pixel of the CCD, and we will say that the length of each side thereof is d_CCD. Also, the portions of the grids filled in lattice-like are the minimum value of the pixel values, equivalent to the background level, and the other portions filled in hatched have a greater pixel value the less dense the shading is (accordingly, white grids with no shading have the maximum value of the pixel values).

Figure 67A:
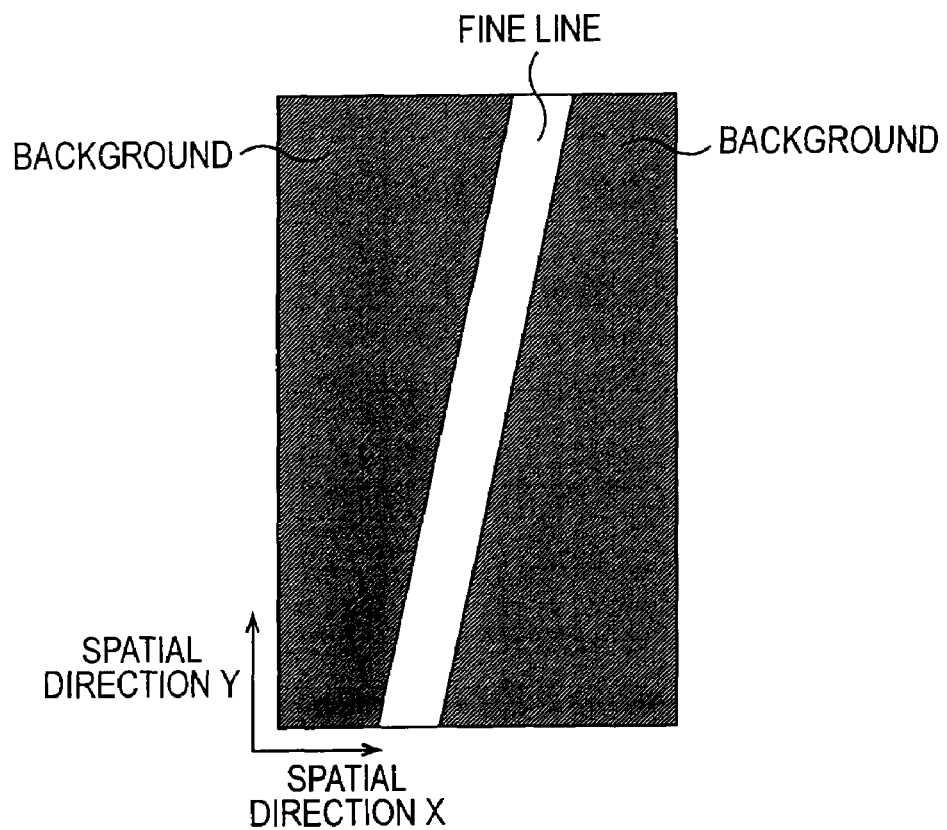
FIG. 67A is a diagram for describing the relationship between a fine line in the real world and the background.
Figure 67B:
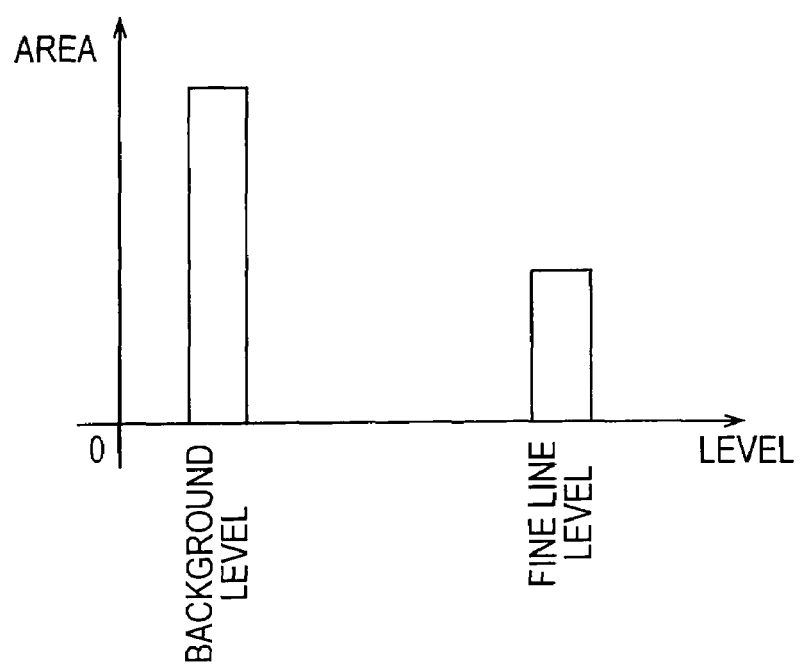
FIG. 67B is a diagram for describing the relationship between a fine line in the real world and the background.

In the event that a fine line exists on the background in the real world as shown in FIG. 67A, the image of the real world can be represented as shown in FIG. 67B with the level as the horizontal axis and the area in the image of the portion corresponding to that level as the vertical axis, which shows that there is a relation in area occupied in the image between the area corresponding to the background in the image and the area of the portion corresponding to the fine line.

Figure 68A:
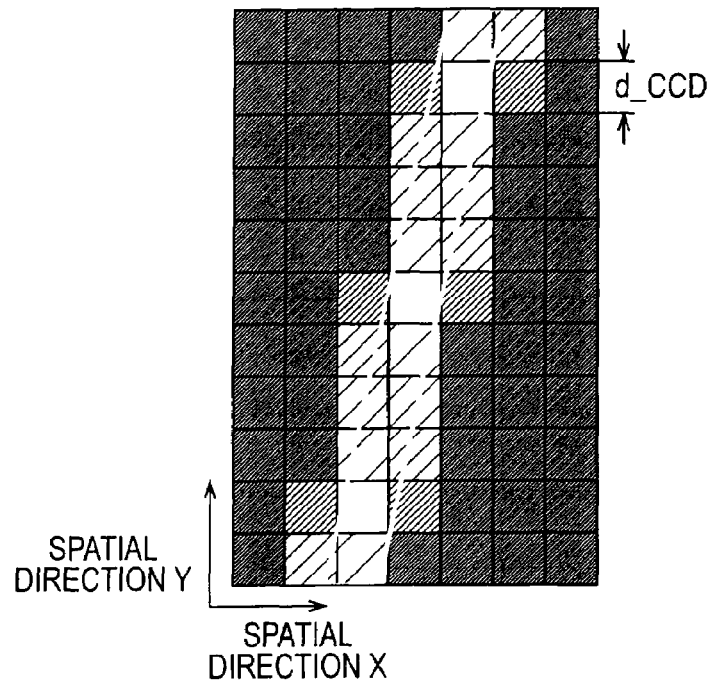
FIG. 68A is a diagram for describing the relationship between a fine line in an image imaged by a sensor and the background.
Figure 68B:
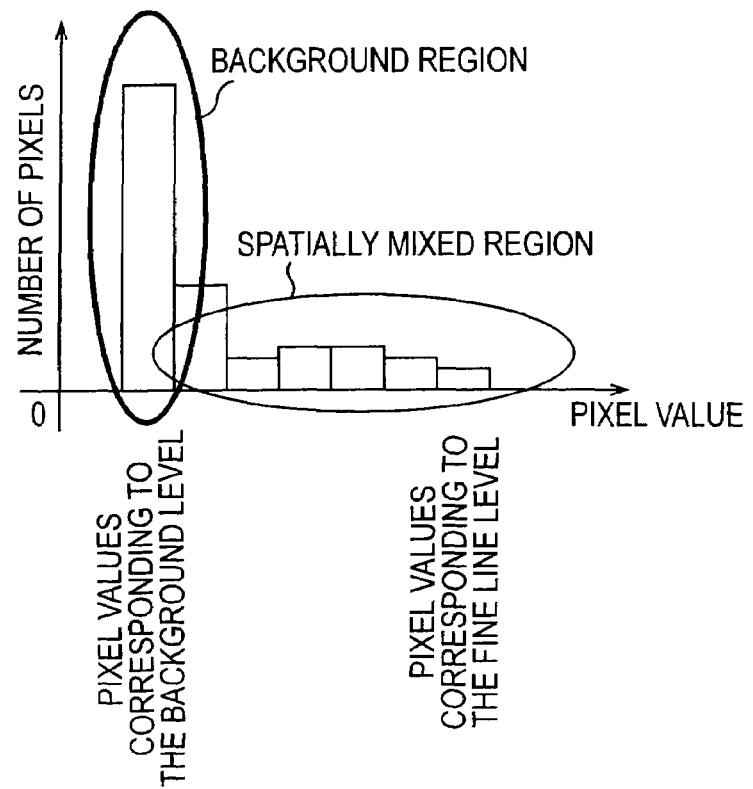
FIG. 68B is a diagram for describing the relationship between a fine line in an image imaged by a sensor and the background.

In the same way, as shown in FIG. 68A, the image taken with the sensor is an image wherein there is a repeated array in the direction in which the fine line exists of blocks which are made up of pixels with the background level and the fine line level mixed arrayed in the vertical direction in the pixel of the background level, so that the mixture ratio thereof changes according to a certain pattern, and accordingly, a mixed space region made up of pixels occurring as the result of spatially mixing the background and the fine line, of a level partway between the region which is the background level (background region) and the fine line level, as shown in FIG. 68B. Now, while the vertical axis in FIG. 68B is the number of pixels, the area of one pixel is $(d\_CCD)^2$, so it can be said that the relation between the level of pixel values and the number of pixels in FIG. 68B is the same as the relation between the level of pixel values and distribution of area.

Figure 69A:
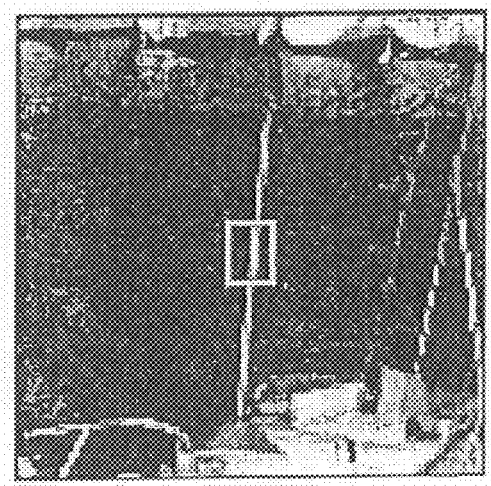
FIG. 69A is a diagram for describing an example of the relationship between a fine line in an image imaged by a sensor and the background.
Figure 69B:
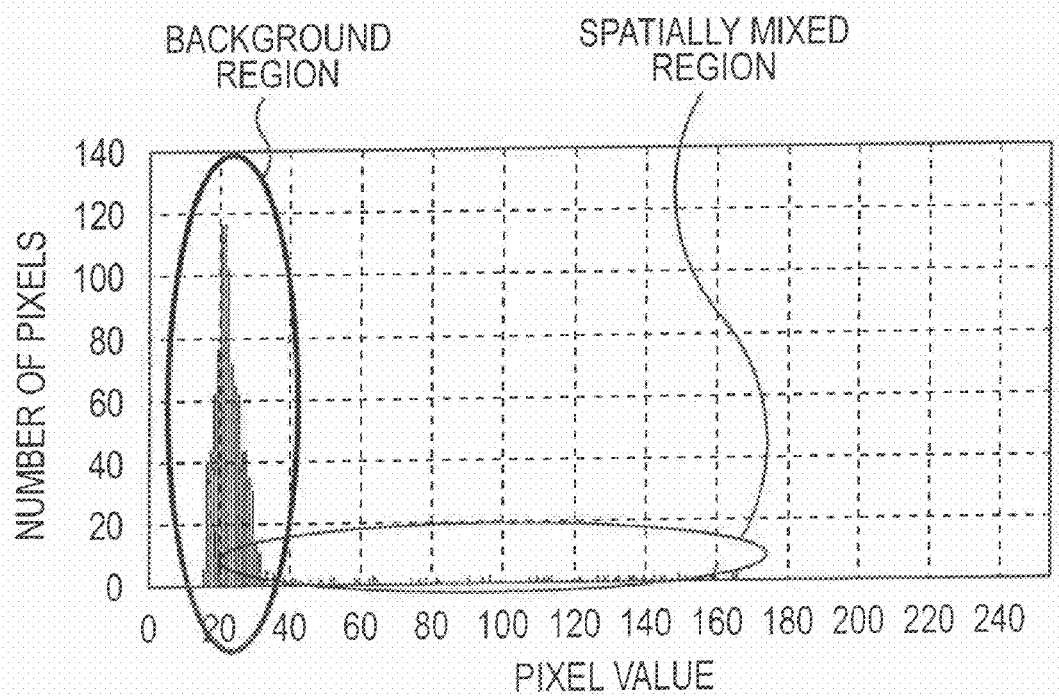
FIG. 69B is a diagram for describing an example of the relationship between a fine line in an image imaged by a sensor and the background.

The same results are obtained regarding the portion enclosed with the white line in the actual image shown in FIG. 69A (an image 31 pixels×31 pixels), as shown in FIG. 69B. As shown in FIG. 69B, the background portions shown in FIG. 69A (the portions which appear black in FIG. 69A) has distribution of a great number of pixels with low pixel value level (with pixel values around 20), and these portions with little change make up the image of the background region. Conversely, the portion wherein the pixel value level in FIG. 69B is not low, i.e., pixels with pixel value level distribution of around 40 to around 160 are pixels belonging to the spatial mixture region which make up the image of the fine line, and while the number of pixels for each pixel value is not great, these are distributed over a wide range of pixel values.

Figure 70A:
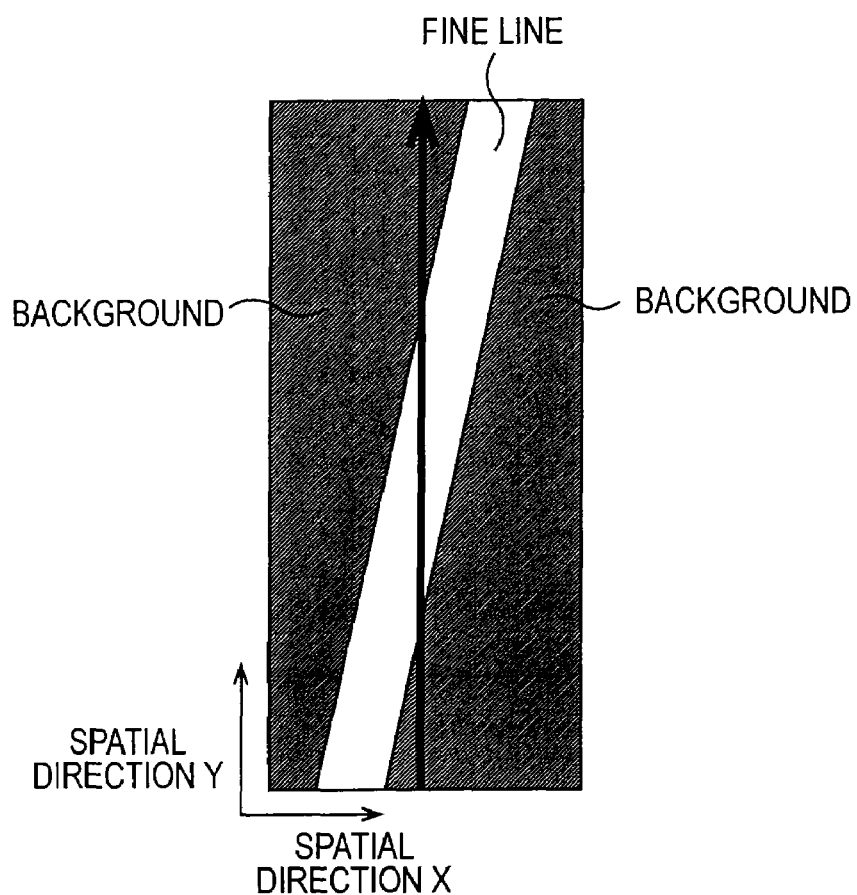
FIG. 70A is a diagram for describing the relationship between a fine line in an image in the real world and the background.
Figure 70B:
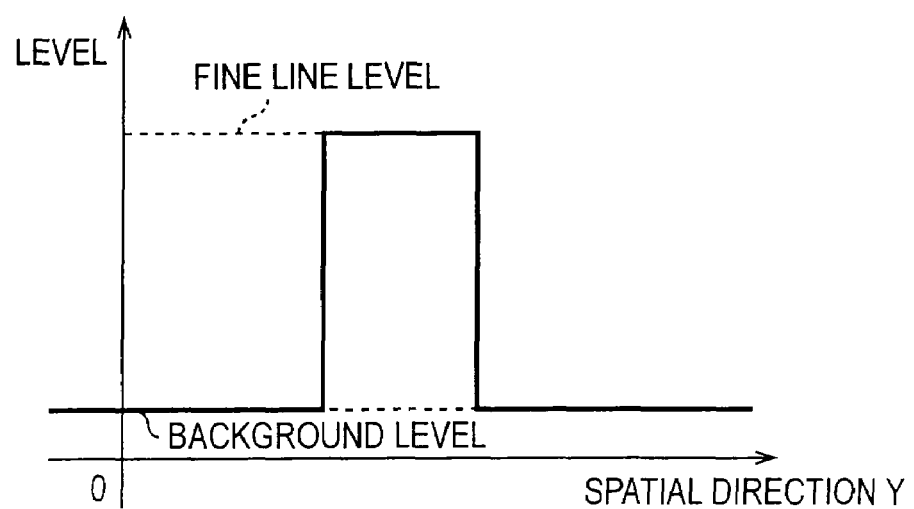
FIG. 70B is a diagram for describing the relationship between a fine line in an image in the real world and the background.

Now, viewing the levels of each of the background and the fine line in the real world image along the arrow direction (Y-coordinate direction) shown in FIG. 70A for example, change occurs as shown in FIG. 70B. That is to say, the background region from the start of the arrow to the fine line has a relatively low background level, and the fine line region has the fine line level which is a high level, and passing the fine line region and returning to the background region returns to the background level which is a low level. As a result, this forms a pulse-shaped waveform where only the fine line region is high level.

Figure 71A:
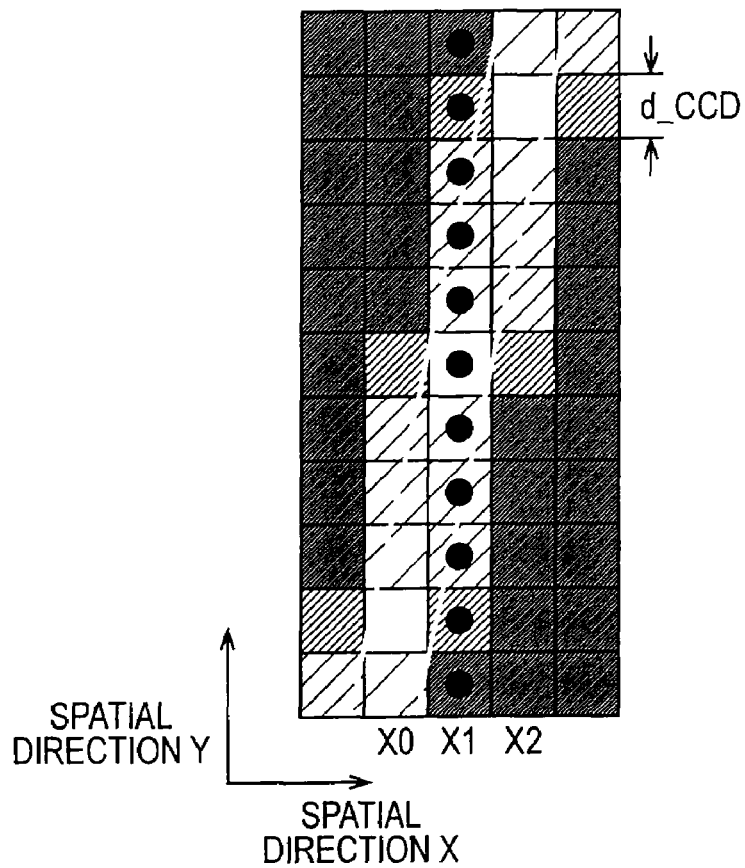
FIG. 71A is a diagram for describing the relationship between a fine line in an image imaged by a sensor and the background.
Figure 71B:
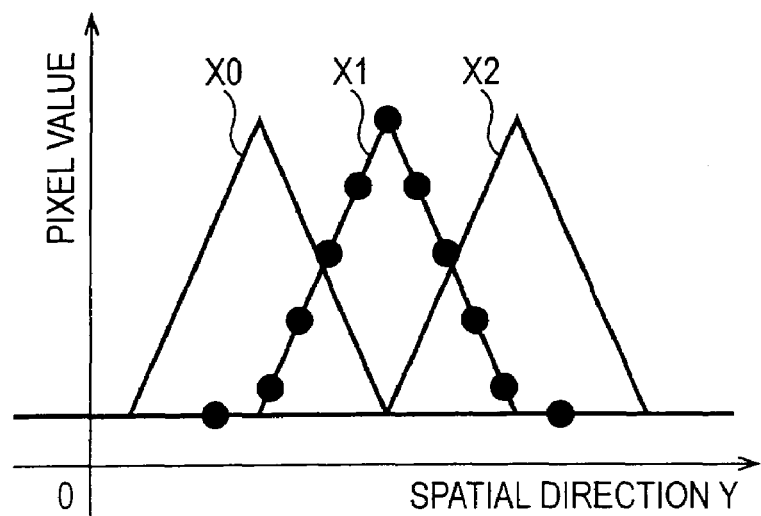
FIG. 71B is a diagram for describing the relationship between a fine line in an image imaged by a sensor and the background.

Conversely, in the image taken with the sensor, the relationship between the pixel values of the pixels of the spatial direction X=X1 in FIG. 71A corresponding to the arrow in FIG. 70A (the pixels indicated by black dots in FIG. 71A) and the spatial direction Y of these pixels is as shown in FIG. 71B. Note that in FIG. 71A, between the two white lines extending toward the upper right represents the fine line in the image of the real world.

That is to say, as shown in FIG. 71B, the pixel corresponding to the center pixel in FIG. 71A has the highest pixel value, so the pixel values of the pixels increases as the position of the spatial direction Y moves from the lower part of the figure toward the center pixel, and then gradually decreases after passing the center position. As a result, as shown in FIG. 71B, peak-shaped waveforms are formed. Also, the change in pixel values of the pixels corresponding to the spatial directions X=X0 and X2 in FIG. 71A also have the same shape, although the position of the peak in the spatial direction Y is shifted according to the gradient of the fine line.

Figure 72A:
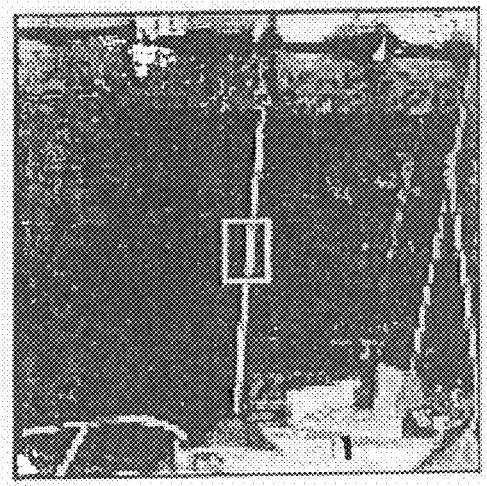
FIG. 72A is a diagram for describing an example of the relationship between a fine line in an image imaged by a sensor and the background.
Figure 72B:
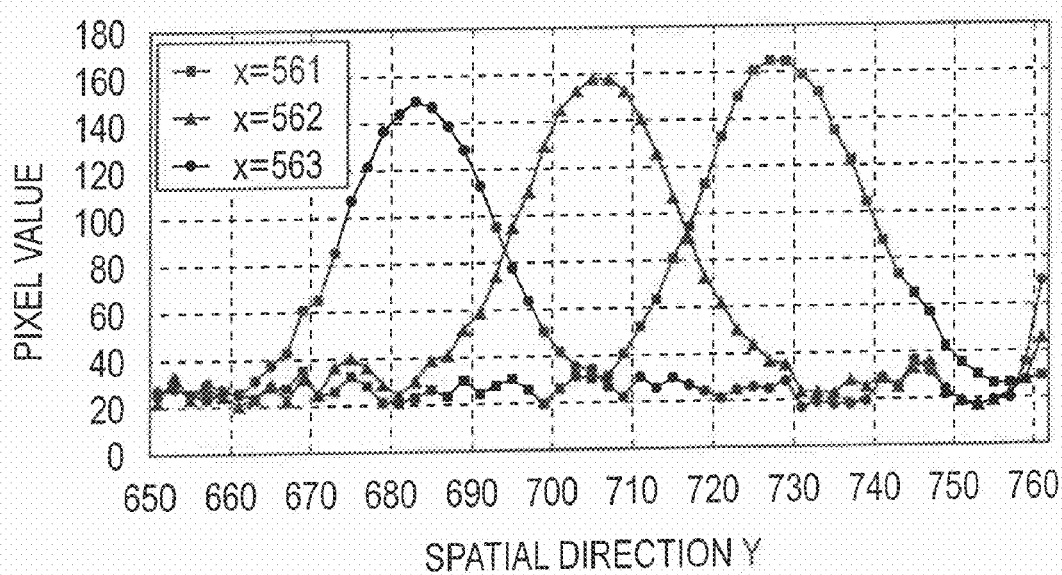
FIG. 72B is a diagram for describing an example of the relationship between a fine line in an image imaged by a sensor and the background.

Even in a case of an image actually taken with the sensor as shown in FIG. 72A for example, the same sort of results are obtained, as shown in FIG. 72B. That is to say, FIG. 72B shows the change in pixel values corresponding to the spatial direction Y for each predetermined spatial direction X (in the figure, X=561, 562, 563) of the pixel values around fine line in the range enclosed by the white lines in the image in FIG. 72A. In this way, the image taken with the actual sensor also has waveforms wherein X=561 peaks at Y=730, X=562 at Y=705, and X=563 at Y=685.

Thus, while the waveform indicating change of level near the fine line in the real world image exhibits a pulse-like waveform, the waveform indicating change of pixel values in the image taken by the sensor exhibits peak-shaped waveforms.

That is to say, in other words, the level of the real world image should be a waveform as shown in FIG. 70B, but distortion occurs in the change in the imaged image due to having been taken by the sensor, and accordingly it can be said that this has changed into a waveform which is different from the real world image (wherein information of the real world has dropped out), as shown in FIG. 71B.

Figure 73:
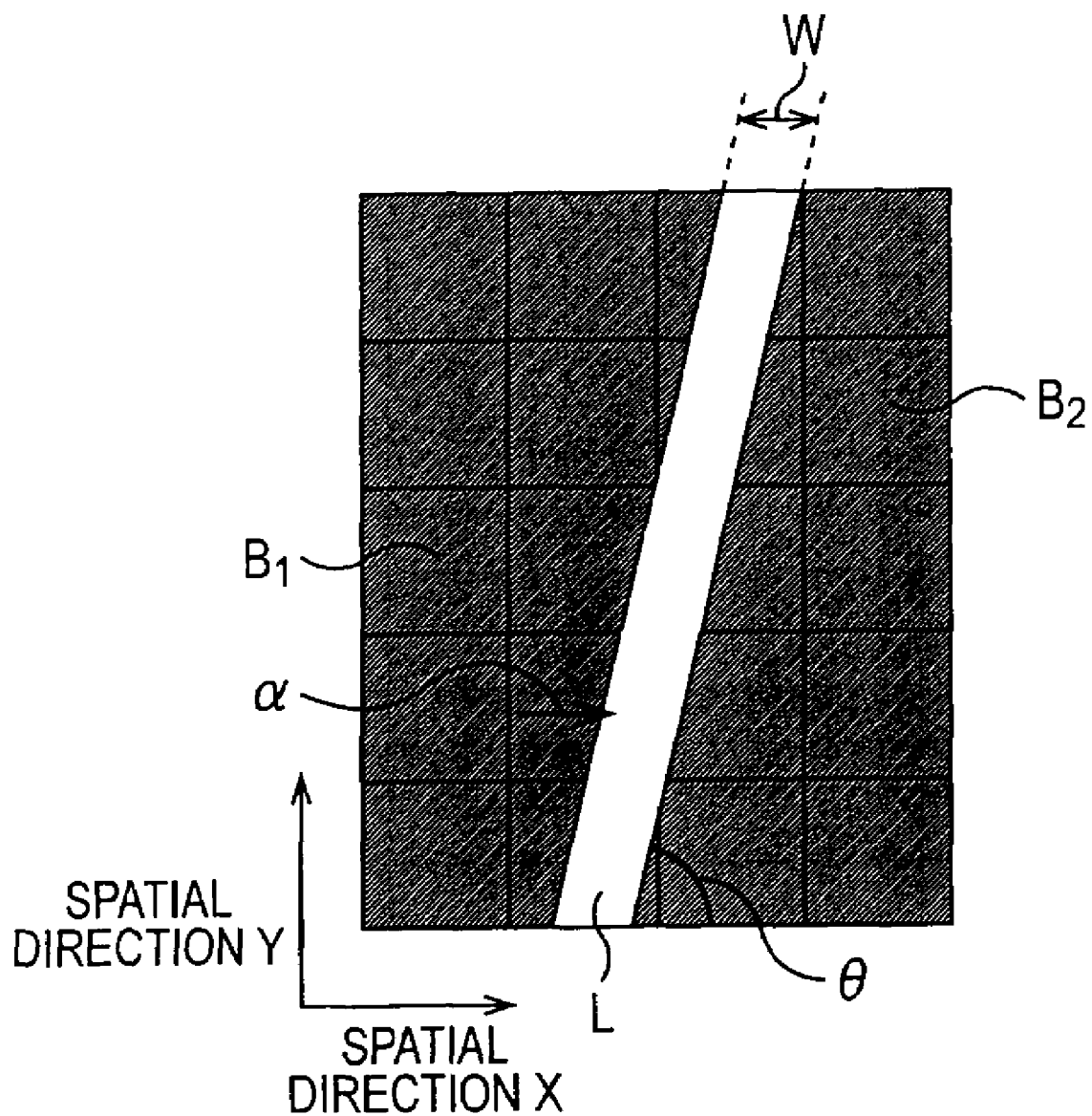
FIG. 73 is a diagram illustrating a model for obtaining the angle of a fine line.

Accordingly, a model (equivalent to the model 705 in FIG. 62) for approximately describing the real world from the image data obtained from the sensor is set, in order to obtain continuity information of the real world image from the image taken by the sensor. For example, in the case of a fine line, the real world image is set, as shown in FIG. 73. That is to say, parameters are set with the level of the background portion at the left part of the image as B1, the background portion at the right part of the image as B2, the level of the fine line portion as L, the mixture ratio of the fine line as $\alpha$, the width of the fine line as W, and the angle of the fine line as to the horizontal direction as $\theta$, this is formed into a model, a function approximately expressing the real world is set, an approximation function which approximately expresses the real world is obtained by obtaining the parameters, and the direction (gradient or angle as to the reference axis) of the fine line is obtained from the approximation function.

Figure 74:
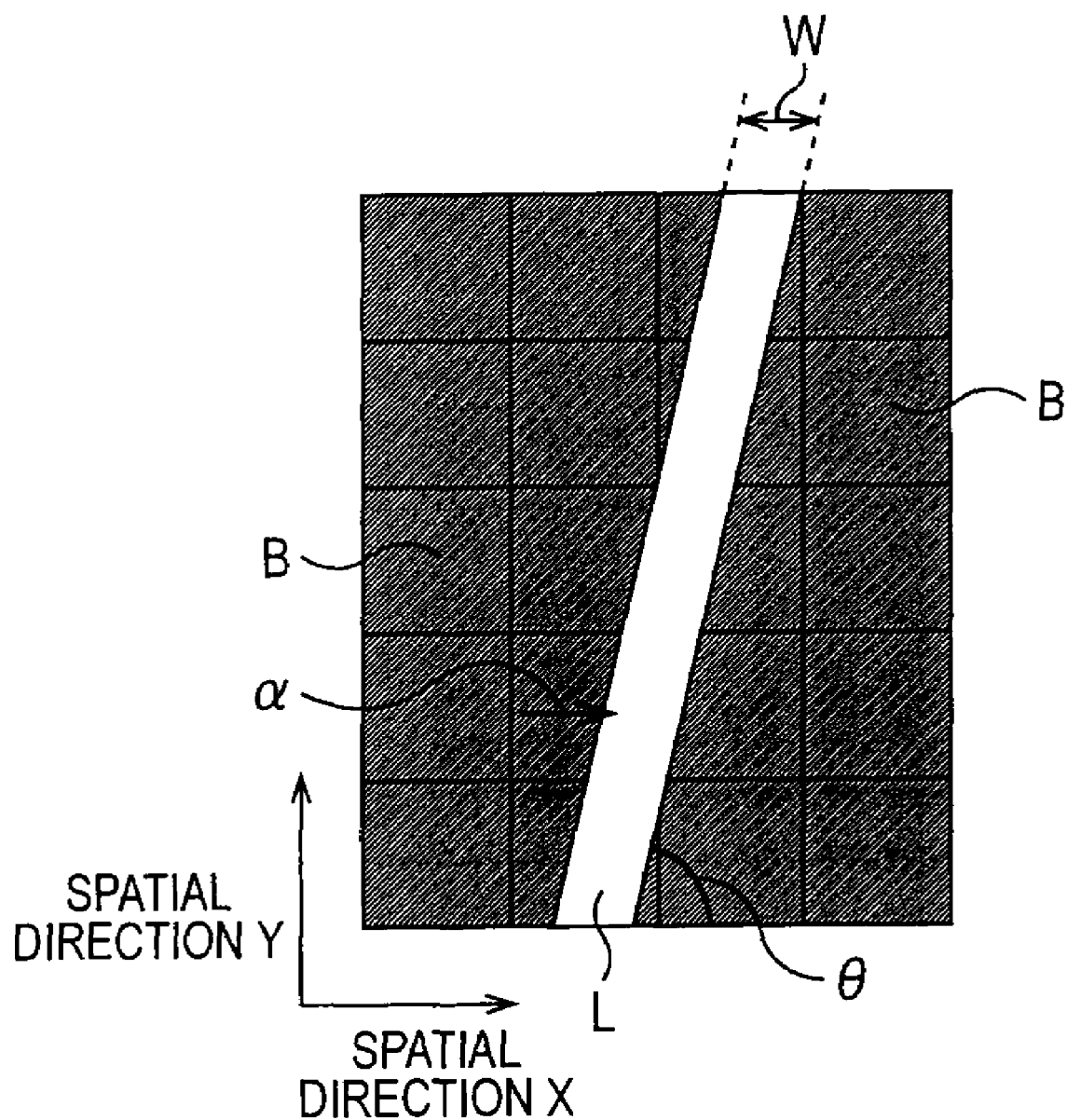
FIG. 74 is a diagram illustrating a model for obtaining the angle of a fine line.
Figure 75A:
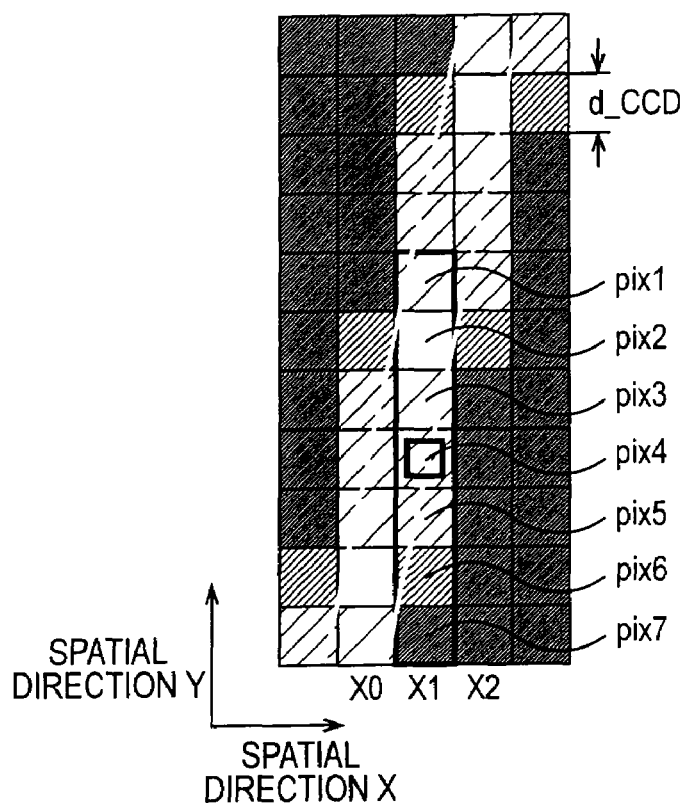
FIG. 75A is a diagram for describing the maximum value and minimum value of pixel values in a dynamic range block corresponding to a pixel of interest.

At this time, the left part and right part of the background region can be approximated as being the same, and accordingly are integrated into B (=B1=B2) as shown in FIG. 74. Also, the width of the fine line is to be one pixel or more. At the time of taking the real world thus set with the sensor, the taken image is imaged as shown in FIG. 75A. Note that in FIG. 75A, the space between the two white lines extending towards the upper right represents the fine line on the real world image.

That is to say, pixels existing in a position on the fine line of the real world are of a level closest to the level of the fine line, so the pixel value decreases the further away from the fine line in the vertical direction (direction of the spatial direction Y), and the pixel values of pixels which exist at positions which do not come into contact with the fine line region, i.e., background region pixels, have pixel values of the background value. At this time, the pixel values of the pixels existing at positions straddling the fine line region and the background region have pixel values wherein the pixel value B of the background level and the pixel value L of the fine line level L are mixed with a mixture ratio $\alpha$.

In the case of taking each of the pixels of the imaged image as the pixel of interest in this way, the data acquiring unit 712 extracts the pixels of an acquired block corresponding to the pixel of interest, extracts a dynamic range block for each of the pixels making up the extracted acquired block, and extracts from the pixels making up the dynamic range block a pixel with a pixel value which is the maximum value and a pixel with a pixel value which is the minimum value. That is to say, as shown in FIG. 75A, in the event of extracting pixels of a dynamic range block (e.g., the 7 pixels of pix1 through 7 surrounded by the black solid line in the drawing) corresponding to a predetermined pixel in the acquired block (the pixel pix4 regarding which a square is described with a black solid line in one grid of the drawing), as shown in FIG. 75A, the image of the real world corresponding to each pixel is as shown in FIG. 75B.

Figure 75B:
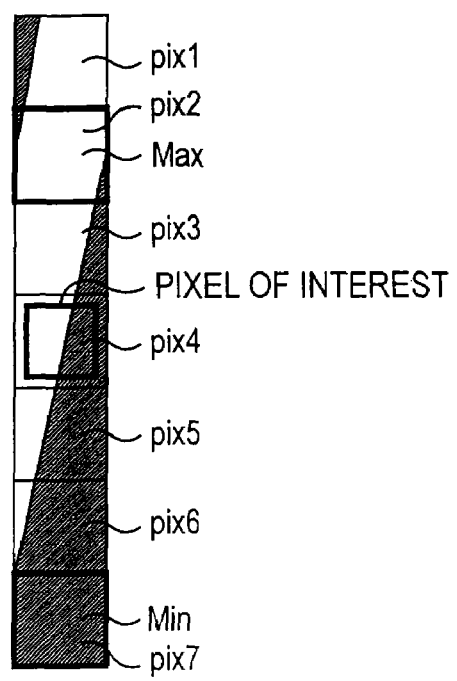
FIG. 75B is a diagram for describing the maximum value and minimum value of pixel values in a dynamic range block corresponding to a pixel of interest.

That is to say, as shown in FIG. 75B, with the pixel pix1, the portion taking up generally ⅛ of the area to the left is the background region, and the portion taking up generally ⅞ of the area to the right is the fine line region. With the pixel pix2, generally the entire region is the fine line region. With the pixel pix3, the portion taking up generally ⅞ of the area to the left is the fine line region, and the portion taking up generally ⅛ of the area to the right is the background region. With the pixel pix4, the portion taking up generally ⅔ of the area to the left is the fine line region, and the portion taking up generally ⅓ of the area to the right is the background region. With the pixel pix5, the portion taking up generally ⅓ of the area to the left is the fine line region, and the portion taking up generally ⅔ of the area to the right is the background region. With the pixel pix6, the portion taking up generally ⅛ of the area to the left is the fine line region, and the portion taking up generally ⅞ of the area to the right is the background region. Further, with the pixel pix7, the entire region is the background region.

As a result, the pixel values of the pixels pix1 through 7 of the dynamic range block shown in FIG. 75B are pixel values wherein the background level and the fine line level are mixed at a mixture ratio corresponding to the ratio of the fine line region and the background region.

That is to say, the mixture ratio of background level: foreground level is generally 1:7 for pixel pix1, generally 0:1 for pixel pix2, generally 1:7 for pixel pix3, generally 1:2 for pixel pix4, generally 2:1 for pixel pix5, generally 7:1 for pixel pix6, and generally 1:0 for pixel pix7.

Accordingly, of the pixel values of the pixels pix1 through 7 of the dynamic range block that has been extracted, pixel pix2 is the highest, followed by pixels pix1 and 3, and then in the order of pixel value, pixels pix4, 5, 6, and 7. Accordingly, with the case shown in FIG. 75B, the maximum value is the pixel value of the pixel pix2, and the minimum value is the pixel value of the pixel pix7.

Figure 76A:
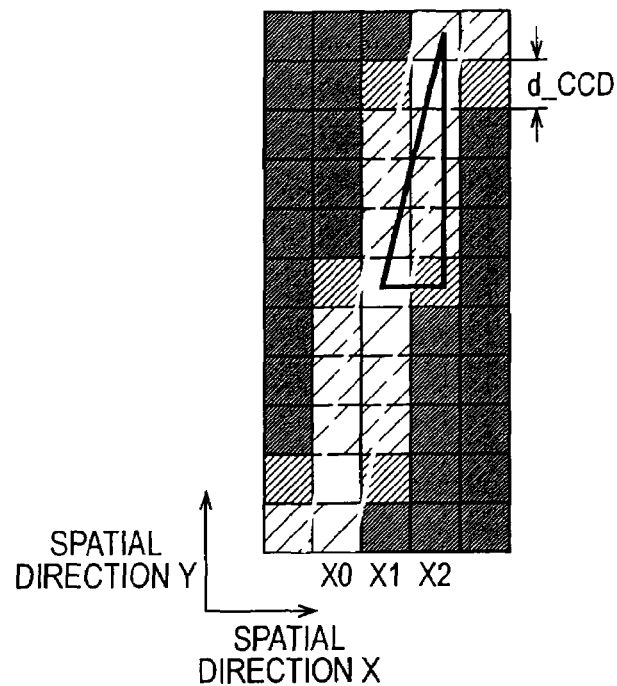
FIG. 76A is a diagram for describing how to obtain the angle of a fine line.

Also, as shown in FIG. 76A, the direction of the fine line can be said to be the direction in which pixels with maximum pixel values continue, so the direction in which pixels with the maximum value are arrayed is the direction of the fine line.

Now, the gradient $G_{fl}$ indicating the direction of the fine line is the ratio of change in the spatial direction Y (change in distance) as to the unit distance in the spatial direction X, so in the case of an illustration such as in FIG. 76A, the distance of the spatial direction Y as to the distance of one pixel in the spatial direction X in the drawing is the gradient $G_{fl}$.

Figure 76B:
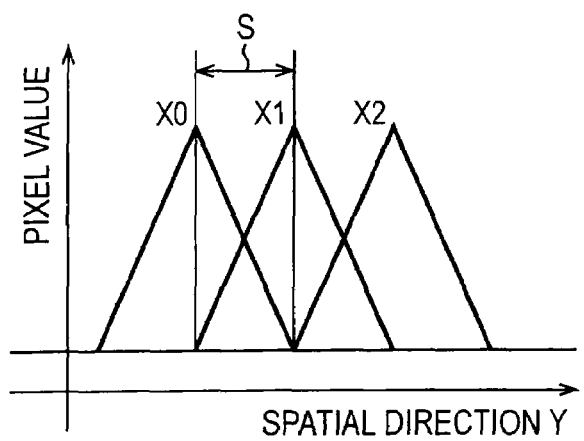
FIG. 76B is a diagram for describing how to obtain the angle of a fine line.
Figure 76C:
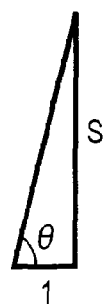
FIG. 76C is a diagram for describing how to obtain the angle of a fine line.

Change of pixel values in the spatial direction Y of the spatial directions X0 through X2 is such that the peak waveform is repeated at predetermined intervals for each spatial direction X, as shown in FIG. 76B. As described above, the direction of the fine line is the direction in which pixels with maximum value continue in the image taken by the sensor, so the interval S in the spatial direction Y where the maximum values in the spatial direction X are is the gradient $G_{fl}$ of the fine line. That is to say, as shown in FIG. 76C, the amount of change in the vertical direction as to the distance of one pixel in the horizontal direction is the gradient $G_{fl}$. Accordingly, with the horizontal direction corresponding to the gradient thereof as the reference axis, and the angle of the fine line thereto expressed as θ, as shown in FIG. 76C, the gradient $G_{fl}$ (corresponding to the angle with the horizontal direction as the reference axis) of the fine line can be expressed in the relation shown in the following Expression (34).

$$\theta = \mathrm{Tan}^{-1}(G_{fl})(=\mathrm{Tan}^{-1}(S)) \quad (34)$$

Also, in the case of setting a model such as shown in FIG. 74, and further assuming that the relationship between the pixel values of the pixels in the spatial direction Y is such that the waveform of the peaks shown in FIG. 76B is formed of perfect triangles (an isosceles triangle waveform where the leading edge or trailing edge change linearly), and, as shown in FIG. 77, with the maximum value of pixel values of the pixels existing in the spatial direction Y, in the spatial direction X of a predetermined pixel of interest as Max=L (here, a pixel value corresponding to the level of the fine line in the real world), and the minimum value as Min=B (here, a pixel value corresponding to the level of the background in the real world), the relationship illustrated in the following Expression (35) holds.

$$L - B = G_{fl} \times d\_y \quad (35)$$

Here, d_y indicates the difference in pixel values between pixels in the spatial direction Y.

That is to say, the greater the gradient $G_{fl}$ in the spatial direction is, the closer the fine line is to being vertical, so the waveform of the peaks is a waveform of isosceles triangles with a great base, and conversely, the smaller the gradient S is, the smaller the base of the isosceles triangles of the waveform is. Consequently, the greater the gradient $G_{fl}$ is, the smaller the difference d_y of the pixel values between pixels in the spatial direction Y is, and the smaller the gradient S is, the greater the difference d_y of the pixel values between pixels in the spatial direction Y is.

Accordingly, obtaining the gradient $G_{fl}$ where the above Expression (35) holds allows the angle θ of the fine line as to the reference axis to be obtained. Expression (35) is a single-variable function wherein $G_{fl}$ is the variable, so this could be obtained using one set of difference d_y of the pixel values between pixels (in the vertical direction) around the pixel of interest, and the difference between the maximum value and minimum value (L−B), however, as described above, this uses an approximation expression assuming that the change of pixel values in the spatial direction Y assumes a perfect triangle, so dynamic range blocks are extracted for each of the pixels of the extracted block corresponding to the pixel of interest, and further the dynamic range Dr is obtained from the maximum value and the minimum value thereof, as well as statistically obtaining by the least-square method, using the difference d_y of pixel values between pixels in the spatial direction Y for each of the pixels in the extracted block.

Now, before starting description of statistical processing by the least-square method, first, the extracted block and dynamic range block will be described in detail.

Figure 78:
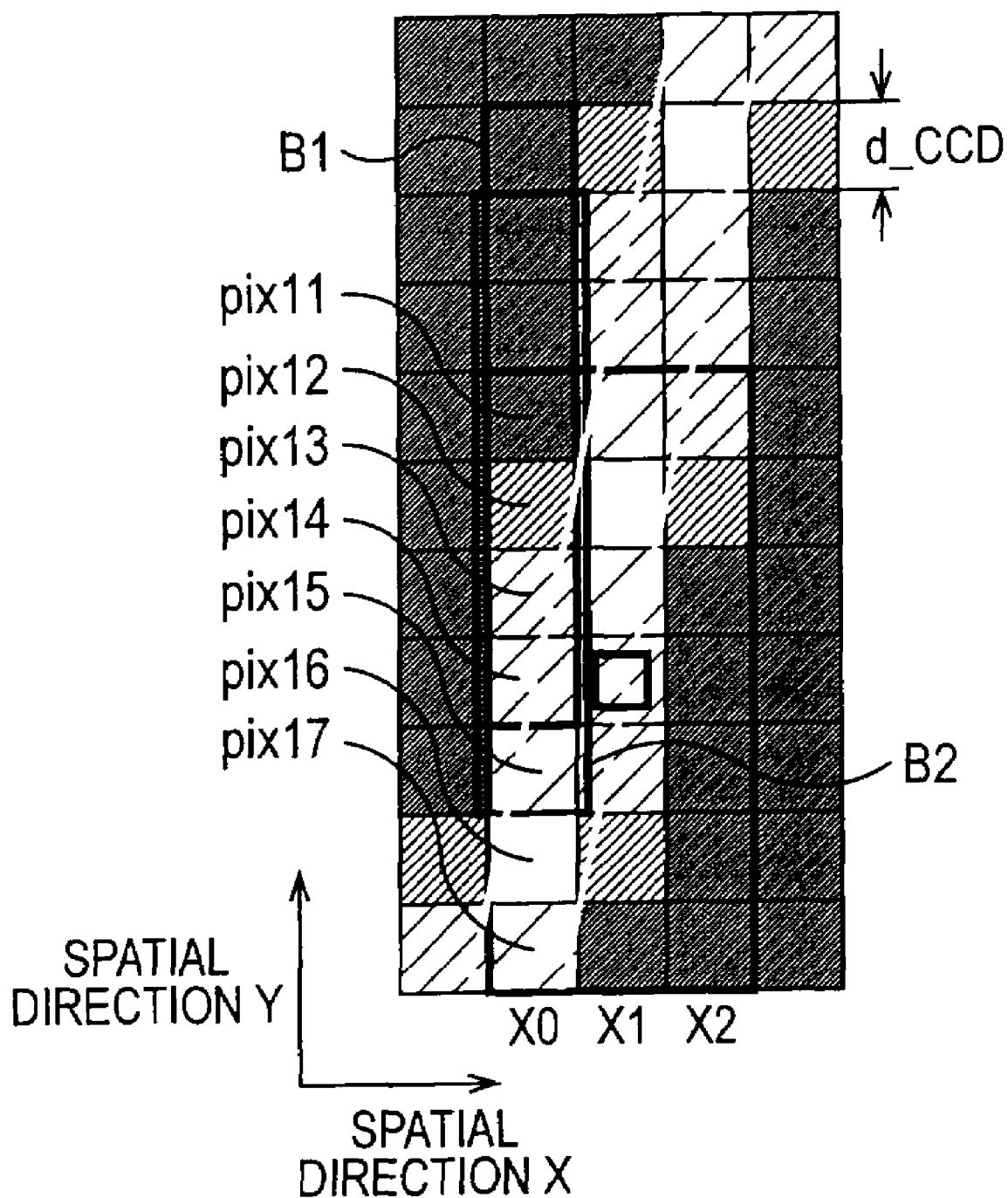
FIG. 78 is a diagram for describing an extracted block and dynamic range block.

As shown in FIG. 78 for example, the extracted block may be three pixels above and below the pixel of interest (the pixel of the grid where a square is drawn with black solid lines in the drawing) in the spatial direction Y, and one pixel to the right and left in the spatial direction X, for a total of 15 pixels, or the like. Also, in this case, for the difference d_y of pixel values between each of the pixels in the extracted block, with difference corresponding to pixel pix11 being expressed as d_y11 for example, in the case of spatial direction X=X0, differences d_y11 through d_y16 are obtained for the pixel values between the pixels pix11 and pix12, pix12 and pix13, pix13 and pix14, pix15 and pix16, and pix16 and pix17. At this time, the difference of pixel values between pixels is obtained in the same way for spatial direction X=X1 and X2, as well. As a result, there are 18 differences d_y of pixel values between the pixels.

Further, with regard to the pixels of the extracted block, determination has been made for this case based on the determination results of the horizontal/vertical determining unit 711 that the pixels of the dynamic range block are, with regard to pix11 for example, in the vertical direction, so as shown in FIG. 78, the pixel pix11 is taken along with three pixels in both the upwards and downwards direction which is the vertical direction (spatial direction Y) so that the range of the dynamic range block B1 is 7 pixels, the maximum value and minimum value of the pixel values of the pixels in this dynamic range block B1 is obtained, and further, the dynamic range obtained from the maximum value and the minimum value is taken as dynamic range Dr11. In the same way, the dynamic range Dr12 is obtained regarding the pixel pix12 of the extracted block from the 7 pixels of the dynamic range block B2 shown in FIG. 78 in the same way. Thus, the gradient $G_{fl}$ is statistically obtained using the least-square method, based on the combination of the 18 pixel differences d_yi in the extracted block and the corresponding dynamic ranges Dri.

Next, the single-variable least-square solution will be described. Let us assume here that the determination results of the horizontal/vertical determining unit 711 are the vertical direction.

Figure 79:
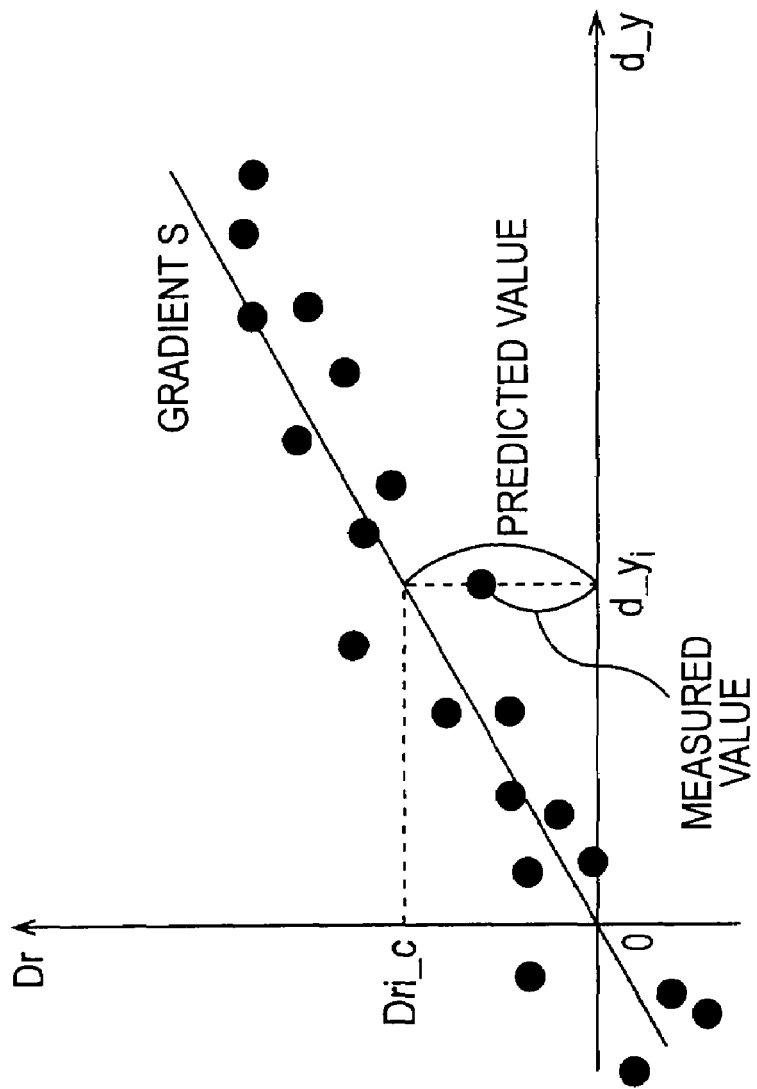
FIG. 79 is a diagram for describing a least-square solution.

The single-variable least-square solution is for obtaining, for example, the gradient $G_{fl}$ of the straight line made up of prediction values Dri_c wherein the distance to all of the actual measurement values indicated by black dots in FIG. 79 is minimal. Thus, the gradient S is obtained from the following technique based on the relationship indicated in the above-described Expression (35).

That is to say, with the difference between the maximum value and the minimum value as the dynamic range Dr, the above Expression (35) can be described as in the following Expression (36).

$$Dr = G_{fl} \times d\_y \quad (36)$$

Thus, the dynamic range Dri_c can be obtained by substituting the difference d_yi between each of the pixels in the extracted block into the above Expression (36). Accordingly, the relation of the following Expression (37) is satisfied for each of the pixels.

$$Dri\_c = G_{fl} \times d\_yi \quad (37)$$

Here, the difference d_yi is the difference in pixel values between pixels in the spatial direction Y for each of the pixels i (for the example, the difference in pixel values between pixels adjacent to a pixel i in the upward direction or the downward direction, and Dri_c is the dynamic range obtained when the Expression (70) holds regarding the pixel i.

As described above, the least-square method as used here is a method for obtaining the gradient $G_{fl}$ wherein the sum of squared differences Q of the dynamic range Dri_c for the pixel i of the extracted block and the dynamic range Dri_r which is the actual measured value of the pixel i, obtained with the method described with reference to FIG. 75A and FIG. 75B, is the smallest for all pixels within the image. Accordingly, the sum of squared differences Q can be obtained by the following Expression (38).

$$Q = \sum_{i=1}^{n} \{Dr_i\_r - Dr_i\_c\}^2 \quad (38)$$
$$= \sum_{i=1}^{n} \{Dr_i\_r - G_{fl} \times d\_y_i\}^2$$

Figure 80:
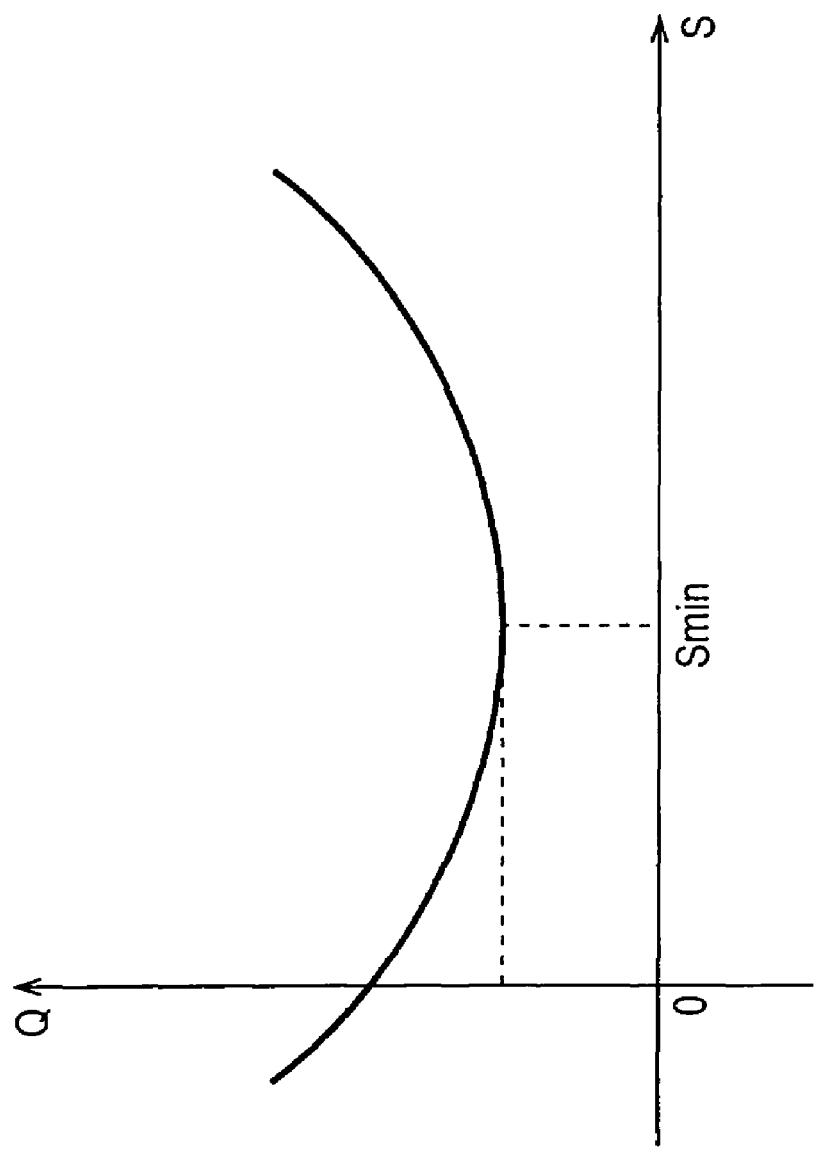
FIG. 80 is a diagram for describing a least-square solution.

The sum of squared differences Q shown in Expression (38) is a quadratic function, which assumes a downward-convex curve as shown in FIG. 80 regarding the variable $G_{fl}$ (gradient $G_{fl}$), so $G_{fl}$min where the gradient $G_{fl}$ is the smallest is the solution of the least-square method.

Differentiating the sum of squared differences Q shown in Expression (38) with the variable $G_{fl}$ yields $dQ/dG_{fl}$ shown in the following Expression (39).

$$\frac{\partial Q}{\partial G_{fl}} = \sum_{i=1}^{n} 2(-d\_y_i)(Dr_i\_r - G_{fl} \times d\_y_i) \quad (39)$$

With Expression (39), 0 is the $G_{fl}$min assuming the minimal value of the sum of squared differences Q shown in FIG. 80, so expanding the Expression wherein Expression (39) is 0 yields the gradient $G_{fl}$ with the following Expression (40).

$$G_{fl} = \frac{\sum_{i=1}^{n} Dr_i\_r \times d\_y_i}{\sum_{i=1}^{n} (d\_y_i)^2} \quad (40)$$

The above Expression (40) is a so-called single-variable (gradient $G_{fl}$) normal equation.

Thus, substituting the obtained gradient $G_{fl}$ into the above Expression (34) yields the angle θ of the fine line with the horizontal direction as the reference axis, corresponding to the gradient $G_{fl}$ of the fine line.

Now, in the above description, description has been made regarding a case wherein the pixel of interest is a pixel on the fine line which is within a range of angle θ of 45 degrees degrees≦θ<135 degrees degrees with the horizontal direction as the reference axis, but in the event that the pixel of interest is a pixel on the fine line closer to the horizontal direction, within a range of angle θ of 0 degrees degrees≦θ<45 degrees degrees or 135 degrees degrees≦θ<108 degrees degrees with the horizontal direction as the reference axis for example, the difference of pixel values between pixels adjacent to the pixel i in the horizontal direction is d_xi, and in the same way, at the time of obtaining the maximum value or minimum value of pixel values from the multiple pixels corresponding to the pixel i, the pixels of the dynamic range block to be extracted are selected from multiple pixels existing in the horizontal direction as to the pixel i. With the processing in this case, the relationship between the horizontal direction and vertical direction in the above description is simply switched, so description thereof will be omitted.

Also, similar processing can be used to obtain the angle corresponding to the gradient of a two-valued edge.

Figure 81A:
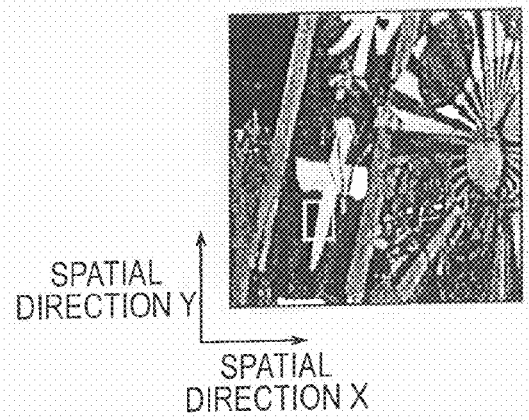
FIG. 81A is a diagram for describing a two-valued edge.
Figure 81B:
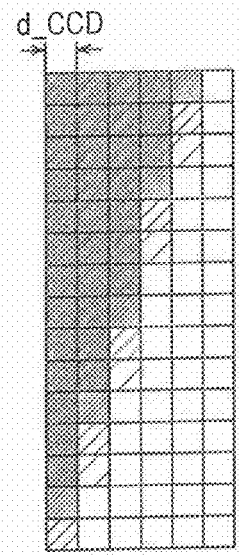
FIG. 81B is a diagram for describing a two-valued edge.
Figure 81C:
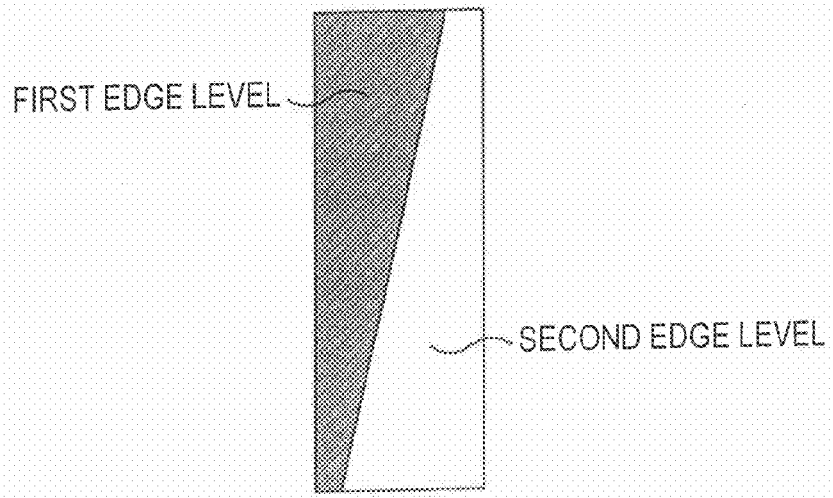
FIG. 81C is a diagram for describing a two-valued edge.

That is to say, enlarging the portion in an input image such as that enclosed by the white lines as illustrated in FIG. 81A shows that the edge portion in the image (the lower part of the cross-shaped character written in white on a black banner in the figure) (hereafter, an edge portion in an image made up of two value levels will also be called a two-valued edge) is actually displayed as shown in FIG. 81B. That is to say, in the real world, as illustrated in FIG. 81C, the image has a boundary formed of the two types of levels of a first level (the field level of the banner) and a second level (the level of the character (the hatched portion with low concentration in FIG. 81C)), and no other levels exist. Conversely, with the image taken by the sensor, i.e., the image taken in increments of pixels, as illustrated in FIG. 81B, a portion where first level pixels are arrayed and a portion where second level pixels are arrayed border on a region wherein there is a repeated array in the direction in which the edge exists of blocks which are made up of pixels occurring as the result of spatially mixing the first level and the second level, arrayed in the vertical direction, so that the ratio (mixture ratio) thereof changes according to a certain pattern.

Figure 82A:
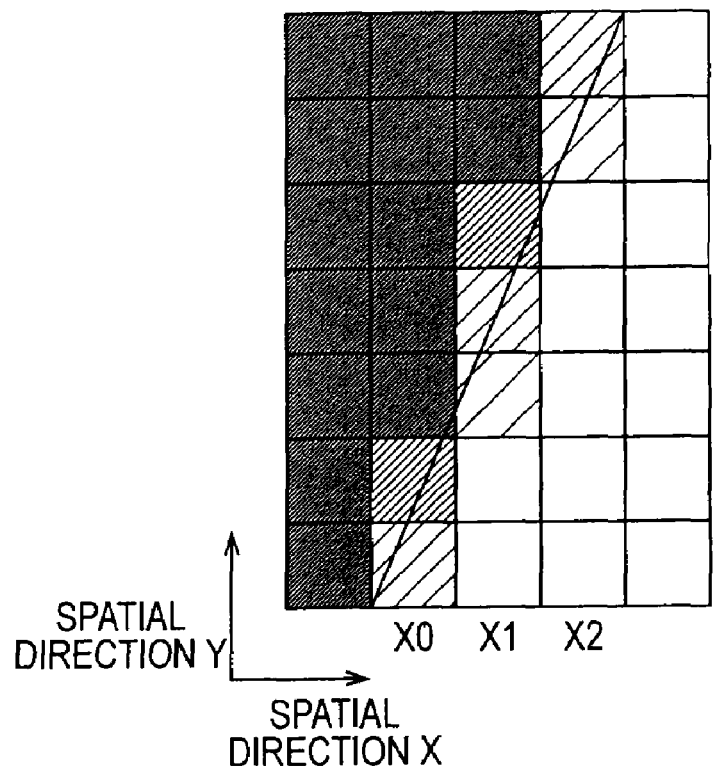
FIG. 82A is a diagram for describing a two-valued edge of an image imaged by a sensor.
Figure 82B:
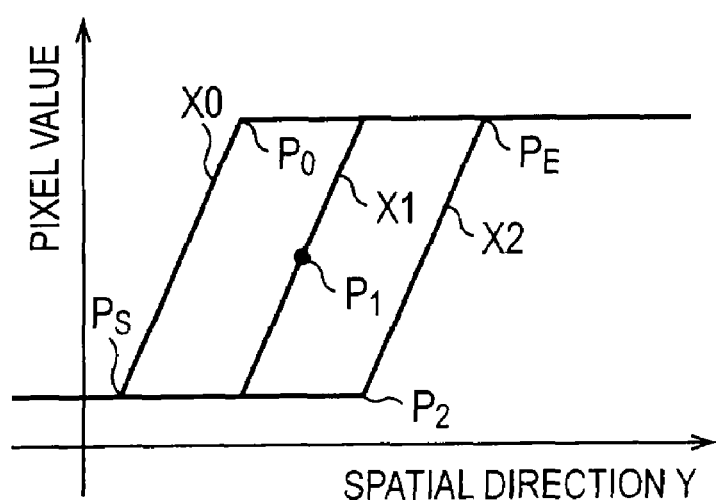
FIG. 82B is a diagram for describing a two-valued edge of an image imaged by a sensor.

That is to say, as shown in FIG. 82A, with regard to the spatial direction X=X0, X1, and X2, the respective change of pixel values in the spatial direction Y is such that as shown in FIG. 82B, the pixel values are a predetermined minimum value pixel value from the bottom of the figure to near to the two-valued edge (the straight line in FIG. 82A which heads toward the upper right) boundary, but the pixel value gradually increases near the two-valued edge boundary, and at the point $P_E$ in the drawing past the edge the pixel value reaches a predetermined maximum value. More specifically, the change of the spatial direction X=X0 is such that the pixel value gradually increases after passing the point $P_S$ which is the minimum value of the pixel value, and reaches the point P0 where the pixel value is the maximum value, as shown in FIG. 82B. In comparison with this, the change of pixel values of the pixels in the spatial direction X=X1 exhibits a waveform offset in the spatial direction, and accordingly increases to the maximum value of the pixel value via the point P1 in the drawing, with the position where the pixel value gradually increases from the minimum value of pixel values being a direction offset in the positive direction of the spatial direction Y as shown in FIG. 82B. Further, change of pixel values in the spatial direction Y at the spatial direction X=X2 decreases via a point P2 in the drawing which is even further shifted in the positive direction of the spatial direction Y, and goes from the maximum value of the pixel value to the minimum value.

Figure 83A:
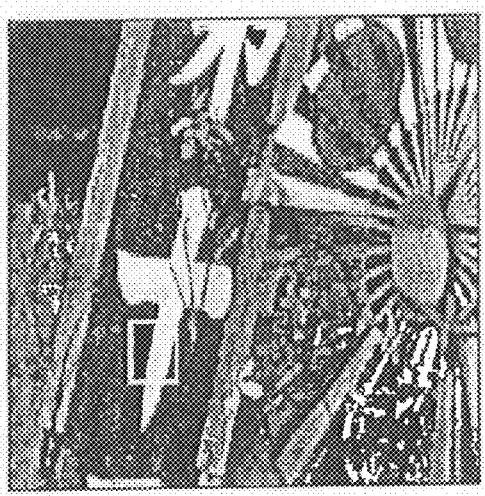
FIG. 83A is a diagram for describing an example of a two-valued edge of an image imaged by a sensor.
Figure 83B:
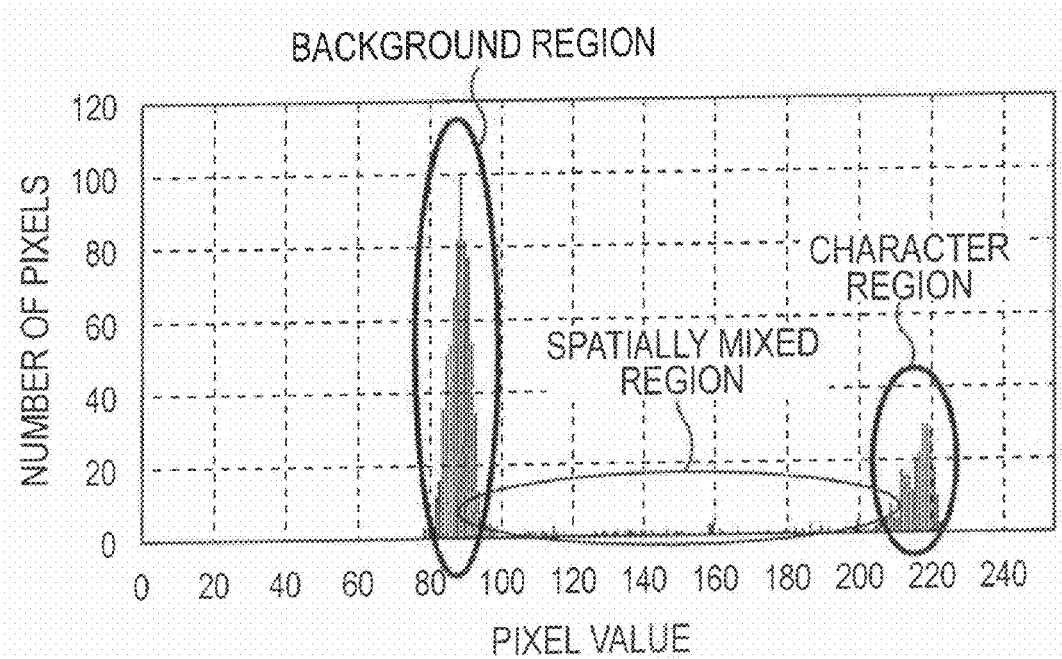
FIG. 83B is a diagram for describing an example of a two-valued edge of an image imaged by a sensor.

A similar tendency can be observed at the portion enclosed with the white line in the actual image, as well. That is to say, in the portion enclosed with the white line in the actual image in FIG. 83A (a 31 pixel×31 pixel image), the background portion (the portion which appears black in FIG. 83A) has distribution of a great number of pixels with low pixel values (pixel value around 90) as shown in FIG. 83B, and these portions with little change form the image of the background region. Conversely, the portion in FIG. 83B wherein the pixel values are not low, i.e., pixels with pixel values distributed around 100 to 200 are a distribution of pixels belonging to the spatially mixed region between the character region and the background region, and while the number of pixels per pixel value is small, the distribution is over a wide range of pixel values. Further, a great number of pixels of the character region with high pixel values (the portion which appears white in FIG. 83A) are distributed around the pixel value shown as 220.

Figure 84A:
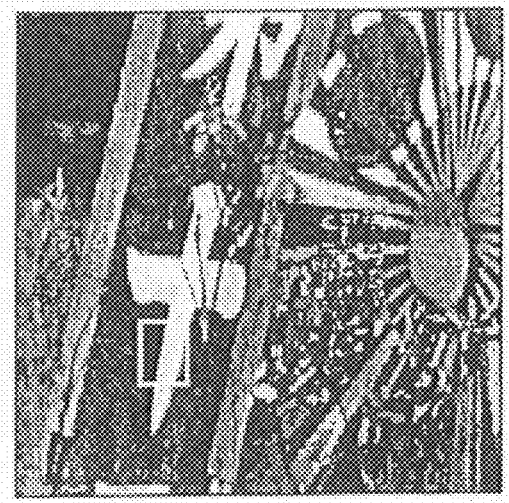
FIG. 84A is a diagram for describing a two-valued edge of an image imaged by a sensor.
Figure 84B:
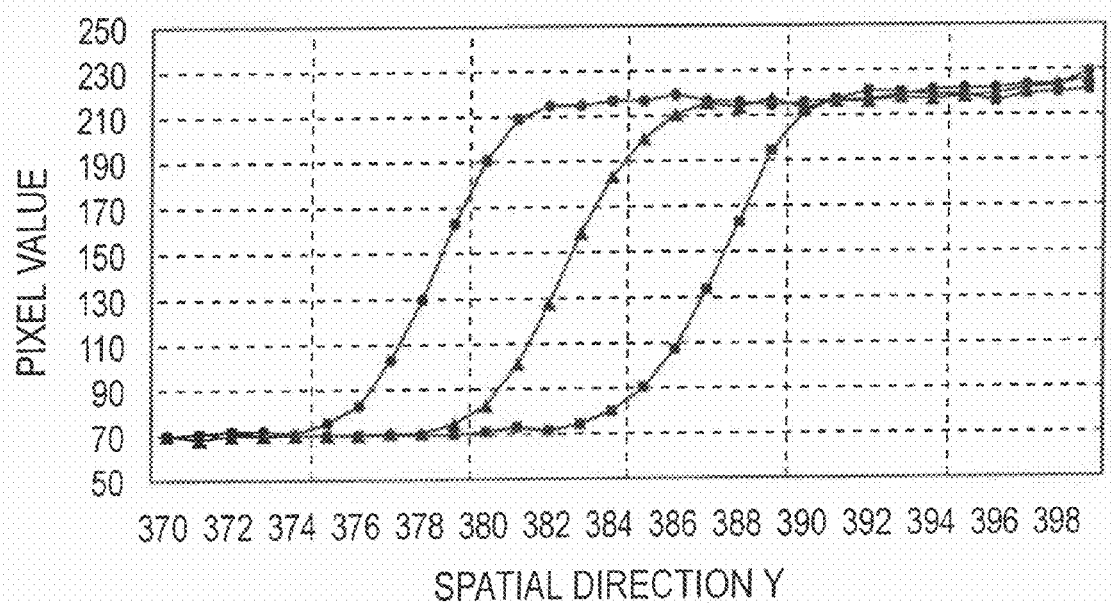
FIG. 84B is a diagram for describing a two-valued edge of an image imaged by a sensor.

As a result, the change of pixel values in the spatial direction Y as to the predetermined spatial direction X in the edge image shown in FIG. 84A is as shown in FIG. 84B.

That is, FIG. 84B illustrates the change of pixel values corresponding to the spatial direction Y, for each predetermined spatial direction X (in the drawing, X=658, 659, 660) regarding the pixel values near the edge within the range enclosed by the white lines in the image in FIG. 84A. As can be seen here, in the image taken by the actual sensor as well, with X=658, the pixel value begins to increase around Y=374 (the distribution indicated by black circles in the drawing), and reaches the maximum value around X=382. Also, with X=659, the pixel value begins to increase around Y=378 which is shifted in the positive direction as to the spatial direction Y (the distribution indicated by black triangles in the drawing), and reaches the maximum pixel value around X=386. Further, with X=660, the pixel value begins to increase around Y=382 which is shifted even further in the positive direction as to the spatial direction Y (the distribution indicated by black squares in the drawing), and reaches the maximum value around X=390.

Figure 85:
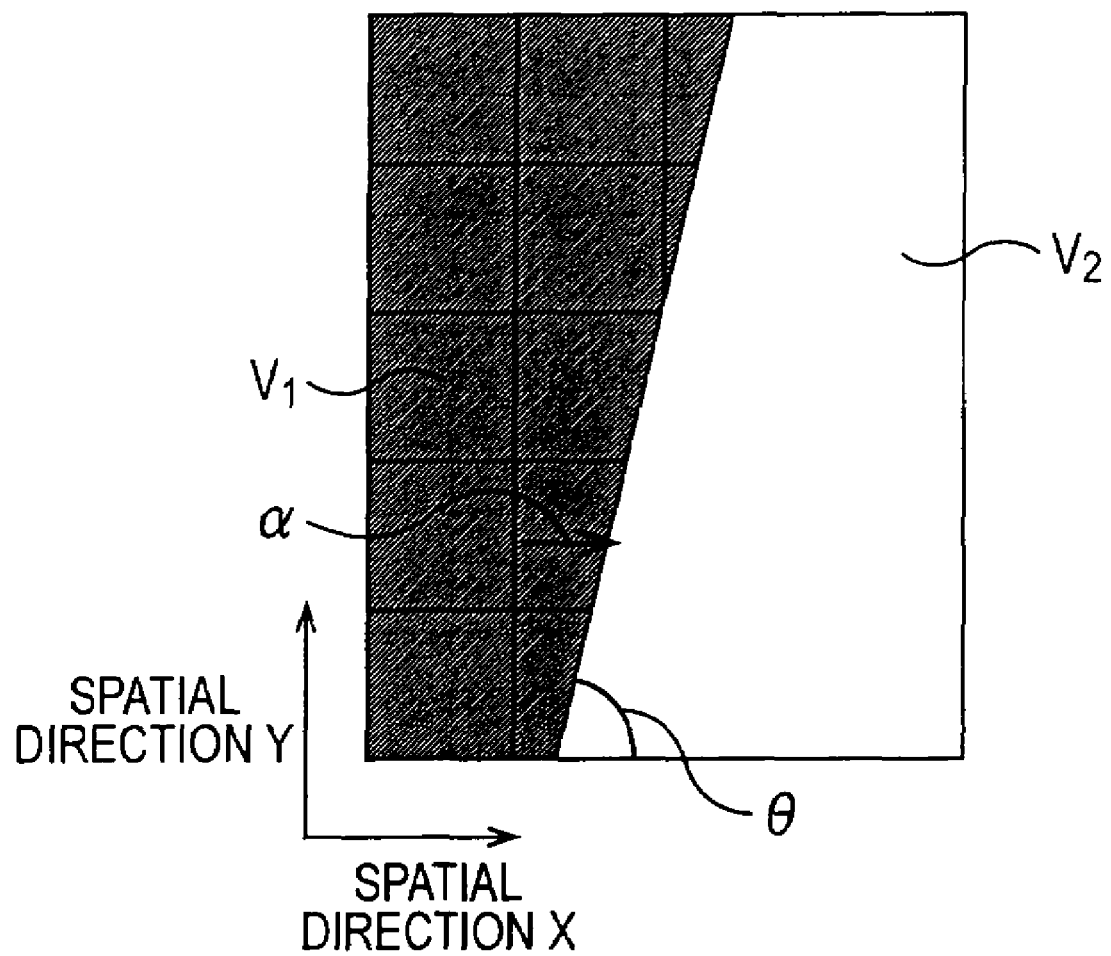
FIG. 85 is a diagram illustrating a model for obtaining the angle of a two-valued edge.

Accordingly, in order to obtain continuity information of the real world image from the image taken by the sensor, a model is set to approximately describe the real world from the image data acquired by the sensor. For example, in the case of a two-valued edge, a real world image is set, as shown in FIG. 85. That is to say, parameters are set with the background portion level to the left in the figure as V1, the character portion level to the right side in the figure as V2, the mixture ratio between pixels around the two-valued edge as α, and the angle of the edge as to the horizontal direction as θ, this is formed into a model, a function which approximately expresses the real world is set, the parameters are obtained so as to obtain a function which approximately expresses the real world, and the direction (gradient, or angle as to the reference axis) of the edge is obtained from the approximation function.

Figure 86A:
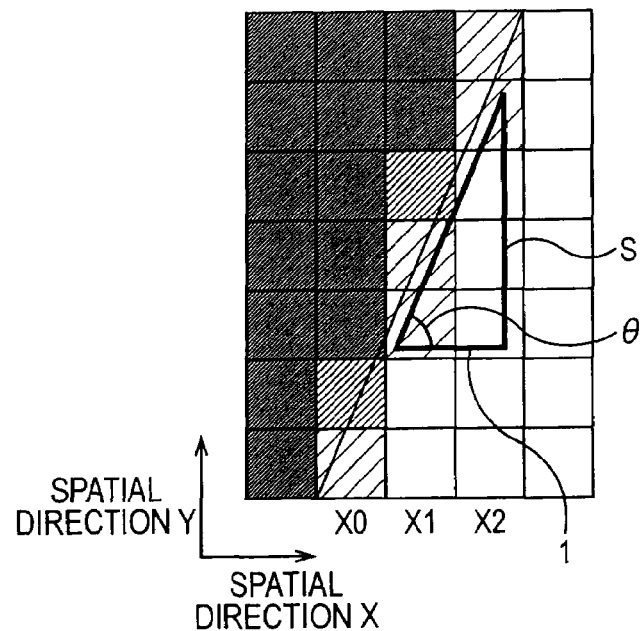
FIG. 86A is a diagram illustrating a method for obtaining the angle of a two-valued edge.

Now, the gradient indicating the direction of the edge is the ratio of change in the spatial direction Y (change in distance) as to the unit distance in the spatial direction X, so in a case such as shown in FIG. 86A, the distance in the spatial direction Y as to the distance of one pixel in the spatial direction X in the drawing is the gradient.

Figure 86B:
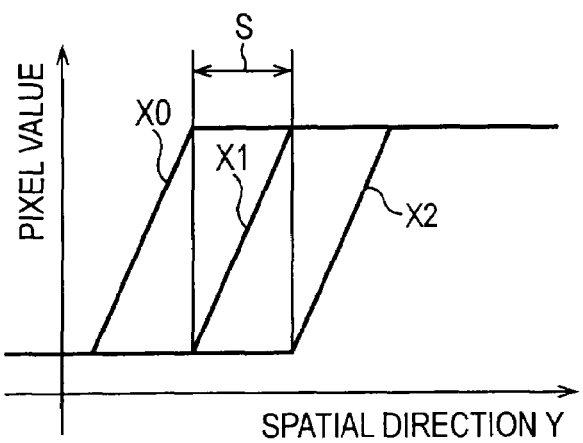
FIG. 86B is a diagram illustrating a method for obtaining the angle of a two-valued edge.
Figure 86C:
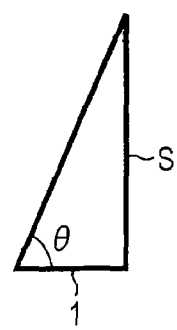
FIG. 86C is a diagram illustrating a method for obtaining the angle of a two-valued edge.

The change in pixel values as to the spatial direction Y for each of the spatial directions X0 through X2 is such that the same waveforms are repeated at predetermined intervals for each of the spatial directions X, as shown in FIG. 86B. As described above, the edge in the image taken by the sensor is the direction in which similar pixel value change (in this case, change in pixel values in a predetermined spatial direction Y, changing from the minimum value to the maximum value) spatially continues, so the intervals S of the position where change of pixel values in the spatial direction Y begins, or the spatial direction Y which is the position where change ends, for each of the spatial directions X, is the gradient $G_{fe}$ of the edge. That is to say, as shown in FIG. 86C, the amount of change in the vertical direction as to the distance of one pixel in the horizontal direction, is the gradient $G_{fe}$.

Figure 87:
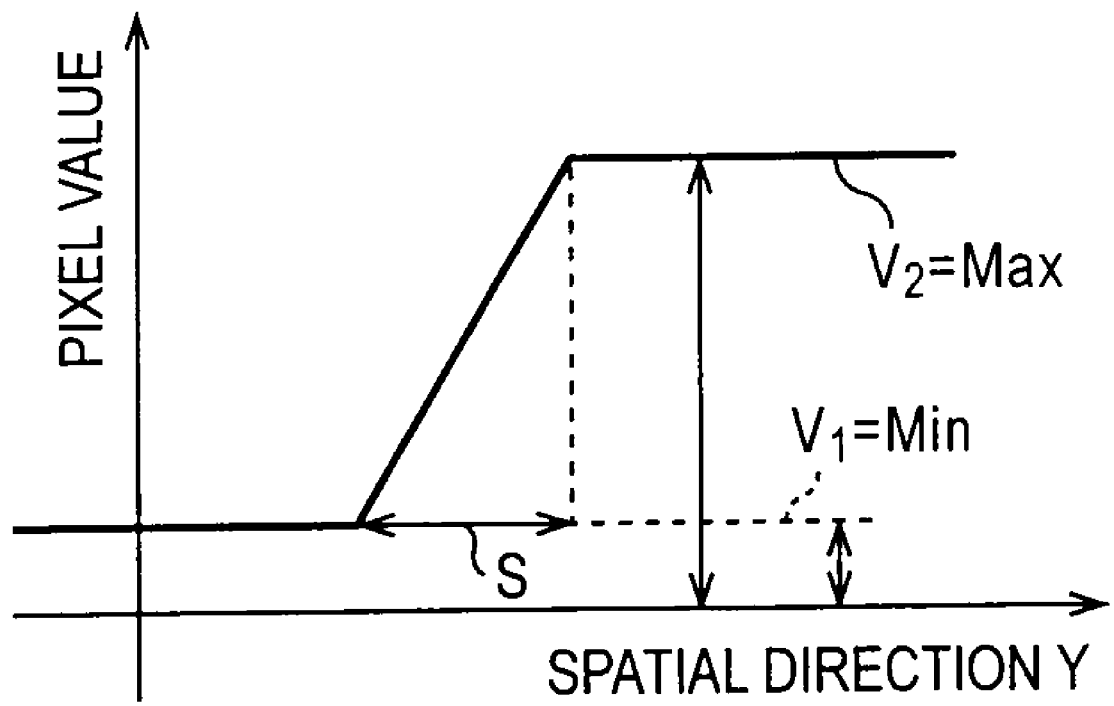
FIG. 87 is a diagram illustrating a method for obtaining the angle of a two-valued edge.

Now, this relationship is the same as the relationship regarding the gradient $G_{fl}$ of the fine line described above with reference to FIG. 76A through 76C. Accordingly, the relational expression is the same. That is to say, the relational expression in the case of a two-valued edge is that shown in FIG. 87, with the pixel value of the background region as V1, and the pixel value of the character region as V2, each as the minimum value and the maximum value. Also, with the mixture ratio of pixels near the edge as α, and the edge gradient as $G_{fe}$, relational expressions which hold will be the same as the above Expression (34) through Expression (36) (with $G_{fl}$ replaced with $G_{fe}$).

Figure 63:
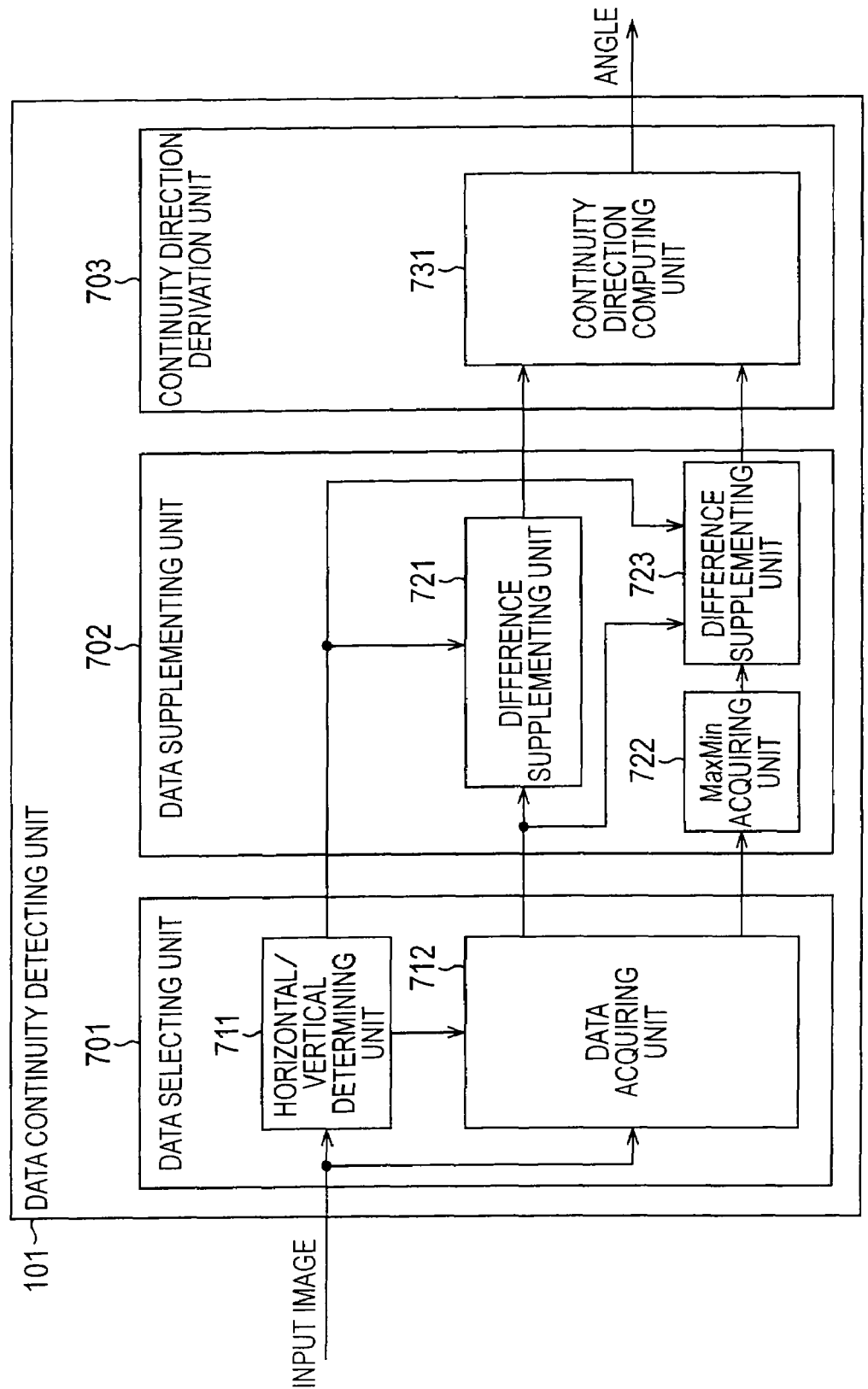
FIG. 63 is a diagram illustrating a further detailed configuration of the data continuity detecting unit in FIG. 60.

Accordingly, the data continuity detecting unit 101 shown in FIG. 63 can detect the angle corresponding to the gradient of the fine line, and the angle corresponding to the gradient of the edge, as data continuity information with the same processing. Accordingly, in the following, gradient will collectively refer to the gradient of the fine line and the gradient of the two-valued edge, and will be called gradient $G_f$. Also, the gradient $G_{fl}$ in the above Expression (38) through Expression (40) may be $G_{fe}$, and consequently, will be considered to be substitutable with $G_f$.

Next, the processing for detecting data continuity will be described with reference to the flowchart in FIG. 88.

In step S701, the horizontal/vertical determining unit 711 initializes a counter T which identifies each of the pixels of the input image.

In step S702, the horizontal/vertical determining unit 711 performs processing for extracting data necessary in later steps.

Figure 89:
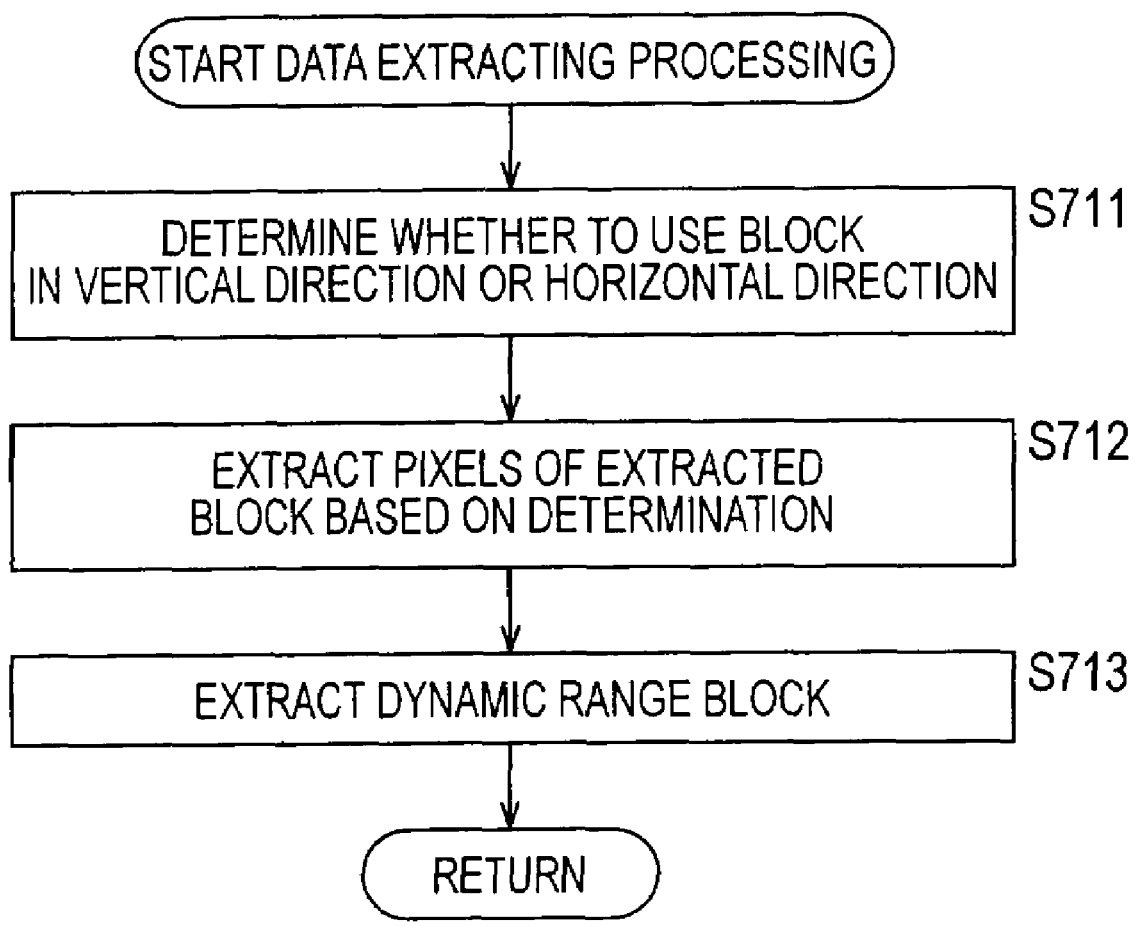
FIG. 89 is a flowchart for describing data extracting processing.

Now, the processing for extracting data will be described with reference to the flowchart in FIG. 89.

In step S711, the horizontal/vertical determining unit 711 of the data selecting unit 701 computes, for each pixel of interest T, as described with reference to FIG. 64, the sum of difference (activity) of the pixel values of the pixel values between the pixels in the horizontal direction (hdiff) and the sum of difference (activity) between pixels in the vertical direction (vdiff), with regard to nine pixels adjacent in the horizontal, vertical, and diagonal directions, and further obtains the difference thereof the difference (hdiff minus vdiff); in the event that (hdiff minus vdiff)≧0, and with the pixel of interest T taking the horizontal direction as the reference axis, determination is made that it is a pixel near a fine line or two-valued edge closer to the vertical direction, wherein the angle θ as to the reference axis is 45 degrees degrees≦θ<135 degrees degrees, and determination results indicating that the extracted block to be used corresponds to the vertical direction are output to the data acquiring unit 712 and the data supplementing unit 702.

On the other hand, in the event that (hdiff minus vdiff)<0, and with the pixel of interest taking the horizontal direction as the reference axis, determination is made by the horizontal/vertical determining unit 711 that it is a pixel near a fine line or edge closer to the horizontal direction, wherein the angle θ of the fine line or the two-valued edge as to the reference axis is 0 degrees degrees≦θ<45 degrees degrees or 135 degrees degrees≦θ<180 degrees degrees, and determination results indicating that the extracted block to be used corresponds to the horizontal direction are output to the data acquiring unit 712 and the data supplementing unit 702.

That is, the gradient of the fine line or two-valued edge being closer to the vertical direction means that, as shown in FIG. 70A for example, the portion of the fine line which intersects with the arrow in the drawing is greater, so extracted blocks with an increased number of pixels in the vertical direction are set (vertically long extracted blocks are set). In the same way, with the case of fine lines having a gradient closer to the horizontal direction, extracted blocks with an increased number of pixels in the horizontal direction are set (horizontally long extracted blocks are set). Thus, accurate maximum values and minimum values can be computed without increasing the amount of unnecessary calculations.

In step S712, the data acquiring unit 712 extracts pixels of an extracted block corresponding to the determination results input from the horizontal/vertical determining unit 711 indicating the horizontal direction or the vertical direction for the pixel of interest. That is to say, as shown in FIG. 78 for example, (three pixels in the horizontal direction)×(seven pixels in the vertical direction) for a total of 21 pixels, centered on the pixel of interest, are extracted as the extracted block, and stored.

In step S713, the data acquiring unit 712 extracts the pixels of dynamic range blocks corresponding to the direction corresponding to the determination results of the horizontal/vertical determining unit 711 for each of the pixels in the extracted block, and stores these. That is to say, as described above with reference to FIG. 78, in this case, with regard to the pixel pix11 of the extracted block for example, the determination results of the horizontal/vertical determining unit 711 indicate the vertical direction, so the data acquiring unit 712 extracts the dynamic range block B1 in the vertical direction, and extracts the dynamic range block B2 for the pixel pix12 in the same way. Dynamic range blocks are extracted for the other extracted blocks in the same way.

That is to say, information of pixels necessary for computation of the normal equation regarding a certain pixel of interest T is stored in the data acquiring unit 712 with this data extracting processing (a region to be processed is selected).

Figure 88:
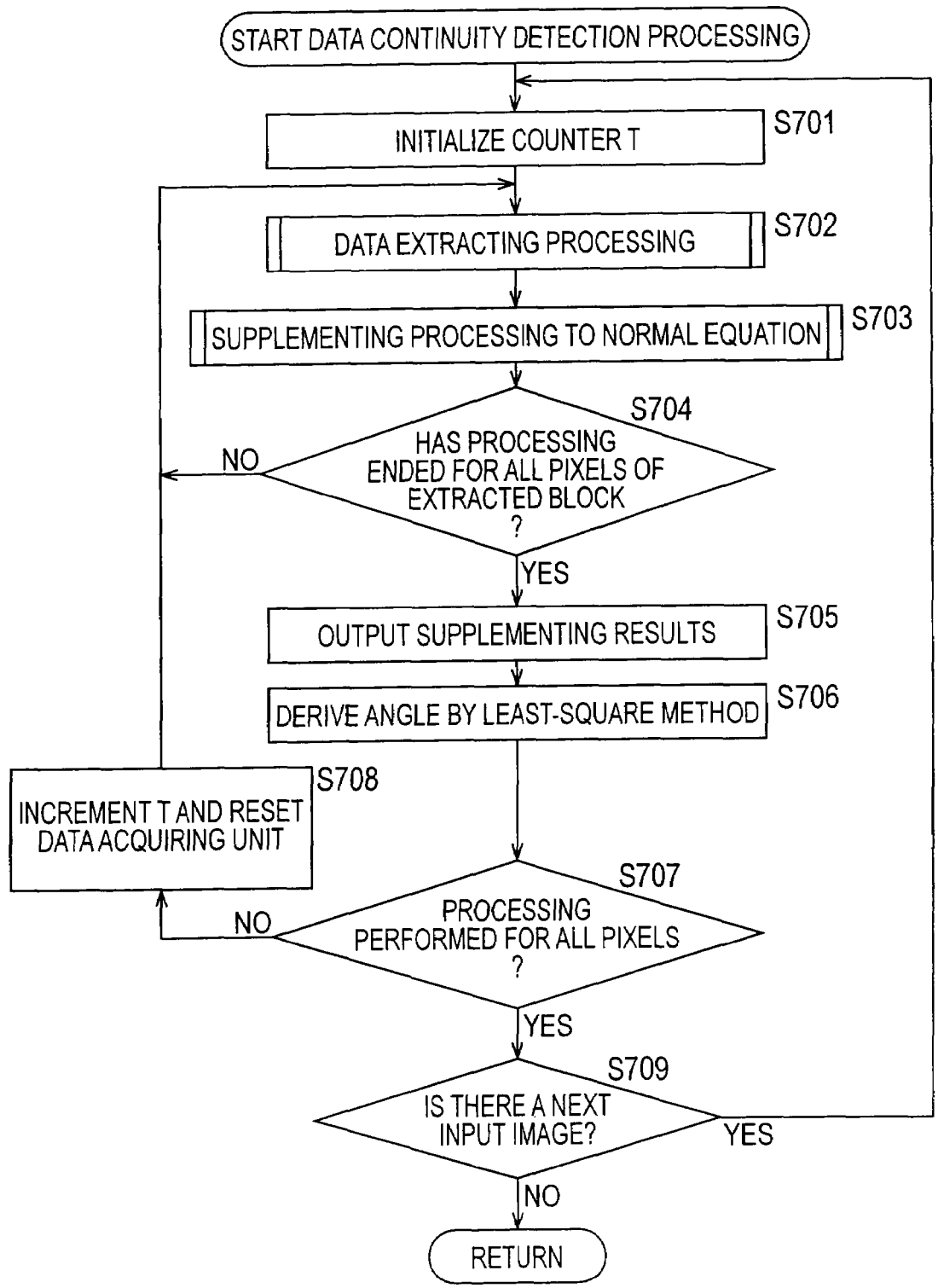
FIG. 88 is a flowchart for describing the processing for detecting the angle of a fine line or a two-valued edge as data continuity.

Now, let us return to the flowchart in FIG. 88.

In step S703, the data supplementing unit 702 performs processing for supplementing the values necessary for each of the items in the normal equation (Expression (74) here).

Now, the supplementing process to the normal equation will be described with reference to the flowchart in FIG. 90.

In step S721, the difference supplementing unit 721 obtains (detects) the difference of pixel values between the pixels of the extracted block stored in the data acquiring unit 712, according to the determination results of the horizontal/vertical determining unit 711 of the data selecting unit 701, and further raises these to the second power (squares) and supplements. That is to say, in the event that the determination results of the horizontal/vertical determining unit 711 are the vertical direction, the difference supplementing unit 721 obtains the difference of pixel values between pixels adjacent to each of the pixels of the extracted block in the vertical direction, and further squares and supplements these. In the same way, in the event that the determination results of the horizontal/vertical determining unit 711 are the horizontal direction, the difference supplementing unit 721 obtains the difference of pixel values between pixels adjacent to each of the pixels of the extracted block in the horizontal direction, and further squares and supplements these. As a result, the difference supplementing unit 721 generates the sum of squared difference of the items to be the denominator in the above-described Expression (40) and stores.

In step S722, the MaxMin acquiring unit 722 obtains the maximum value and minimum value of the pixel values of the pixels contained in the dynamic range block stored in the data acquiring unit 712, and in step S723, obtains (detects) the dynamic range from the maximum value and minimum value, and outputs this to the difference supplementing unit 723. That is to say, in the case of a 7-pixel dynamic range block made up of pixels pix1 through 7 as illustrated in FIG. 75B, the pixel value of pix2 is detected as the maximum value, the pixel value of pix7 is detected as the minimum value, and the difference of these is obtained as the dynamic range.

In step S724, the difference supplementing unit 723 obtains (detects), from the pixels in the extracted block stored in the data acquiring unit 712, the difference in pixel values between pixel adjacent in the direction corresponding to the determination results of the horizontal/vertical determining unit 711 of the data selecting unit 701, and supplements values multiplied by the dynamic range input from the MaxMin acquiring unit 722. That is to say, the difference supplementing unit 721 generates a sum of items to serve as the numerator in the above-described Expression (40), and stores this.

Now, let us return to description of the flowchart in FIG. 88.

In step S704, the difference supplementing unit 721 determines whether or not the difference in pixel values between pixels (the difference in pixel values between pixels adjacent in the direction corresponding to the determination results of the horizontal/vertical determining unit 711) has been supplemented for all pixels of the extracted block, and in the event that determination is made that, for example, the difference in pixel values between pixels has not been supplemented for all pixels of the extracted block, the flow returns to step S702, and the subsequent processing is repeated. That is to say, the processing of step S702 through S704 is repeated until determination is made that the difference in pixel values between pixels has been supplemented for all pixels of the extracted block.

In the event that determination is made in step S704 that the difference in pixel values between pixels has been supplemented for all pixels of the extracted block, in step S705, the difference supplementing units 721 and 723 output the supplementing results stored therein to the continuity direction derivation unit 703.

In step S706, the continuity direction computation unit 731 solves the normal equation given in the above-described Expression (40), based on: the sum of squared difference in pixel values between pixels adjacent in the direction corresponding to the determination results of the horizontal/vertical determining unit 711, of the pixels in the acquired block input from the difference supplementing unit 721 of the data supplementing unit 702; the difference in pixel values between pixels adjacent in the direction corresponding to the determination results of the horizontal/vertical determining unit 711, of the pixels in the acquired block input from the difference supplementing unit 723; and the sum of products of the dynamic ranges corresponding to the pixels of the obtained block; thereby statistically computing and outputting the angle indicating the direction of continuity (the angle indicating the gradient of the fine line or two-valued edge), which is the data continuity information of the pixel of interest, using the least-square method.

In step S707, the data acquiring unit 712 determines whether or not processing has been performed for all pixels of the input image, and in the event that determination is made that processing has not been performed for all pixels of the input image for example, i.e., that information of the angle of the fine line or two-valued edge has not been output for all pixels of the input image, the counter T is incremented by 1 in step S708, and the process returns to step S702. That is to say, the processing of steps S702 through S708 is repeated until pixels of the input image to be processed are changed and processing is performed for all pixels of the input image. Change of pixel by the counter T may be according to raster scan or the like for example, or may be sequential change according to other rules.

In the event that determination is made in step S707 that processing has been performed for all pixels of the input image, in step S709 the data acquiring unit 712 determines whether or not there is a next input image, and in the event that determination is made that there is a next input image, the processing returns to step S701, and the subsequent processing is repeated.

In the event that determination is made in step S709 that there is no next input image, the processing ends.

According to the above processing, the angle of the fine line or two-valued edge is detected as continuity information and output.

Figure 91A:
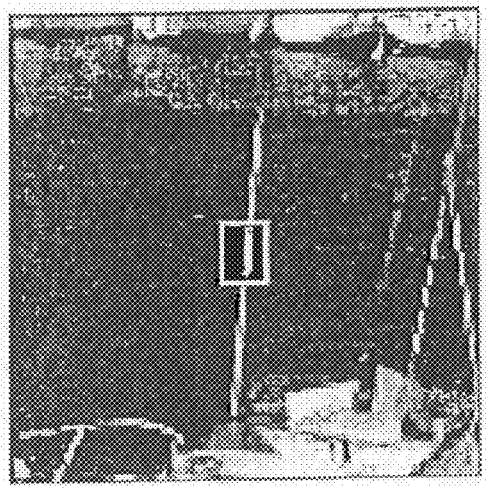
FIG. 91A is a diagram for comparing the gradient of a fine line obtained by application of the present invention, and the angle of a fine line obtained using correlation.
Figure 91B:
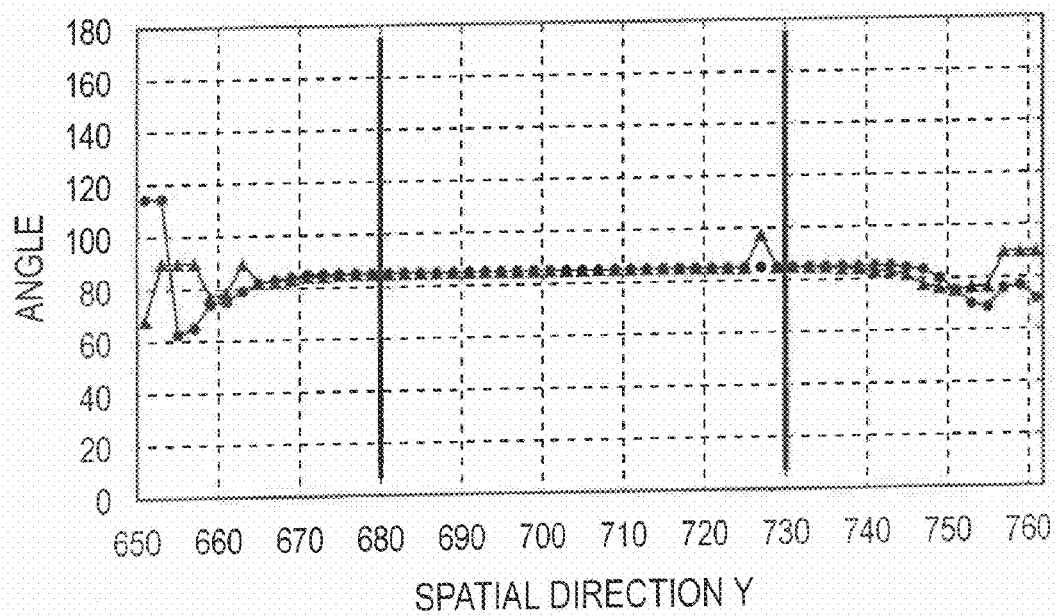
FIG. 91B is a diagram for comparing the gradient of a fine line obtained by application of the present invention, and the angle of a fine line obtained using correlation.

The angle of the fine line or two-valued edge obtained by this statistical processing approximately matches the angle of the fine line or two-valued edge obtained using correlation. That is to say, with regard to the image of the range enclosed by the white lines in the image shown in FIG. 91A, as shown in FIG. 91B, the angle indicating the gradient of the fine line obtained by the method using correlation (the black circles in the figure) and the angle of the fine line obtained by statistical processing with the data continuity detecting unit 101 shown in FIG. 63 (the black triangles in the figure) approximately agree at the spatial direction Y coordinates near the fine line, with regard to change in gradient in the spatial direction Y at predetermined coordinates in the horizontal direction on the fine line. Note that in FIG. 91B, the spatial directions Y=680 through 730 between the black lines in the figure are the coordinates on the fine line.

Figure 92A:
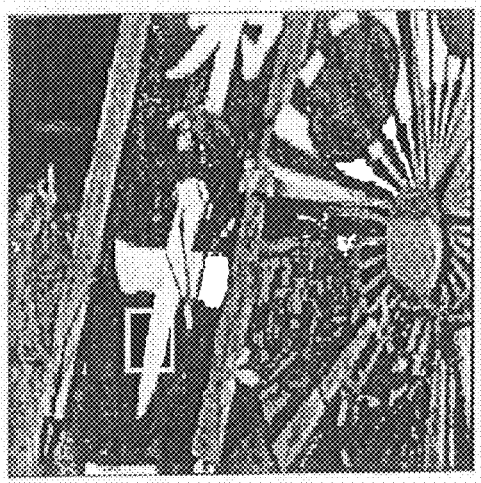
FIG. 92A is a diagram for comparing the gradient of a two-valued edge obtained by application of the present invention, and the angle of a fine line obtained using correlation.
Figure 92B:
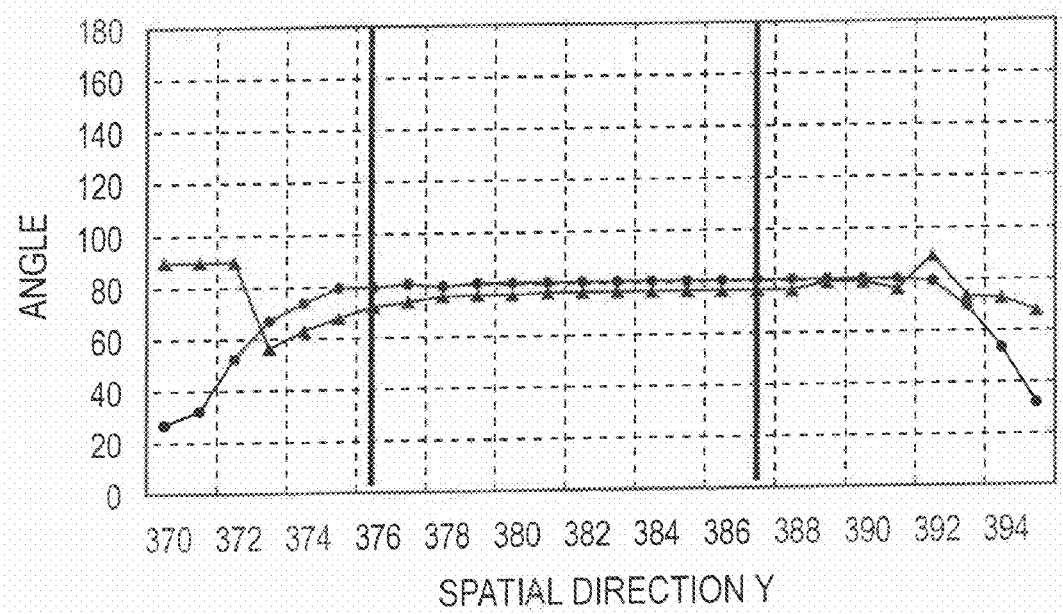
FIG. 92B is a diagram for comparing the gradient of a two-valued edge obtained by application of the present invention, and the angle of a fine line obtained using correlation.

In the same way, with regard to the image of the range enclosed by the white lines in the image shown in FIG. 92A, as shown in FIG. 92B, the angle indicating the gradient of the two-valued edge obtained by the method using correlation (the black circles in the figure) and the angle of the two-valued edge obtained by statistical processing with the data continuity detecting unit 101 shown in FIG. 63 (the black triangles in the figure) approximately agree at the spatial direction Y coordinates near the fine line, with regard to change in gradient in the spatial direction Y at predetermined coordinates in the horizontal direction on the two-valued edge. Note that in FIG. 92B, the spatial directions Y=(around) 376 through (around) 388 are the coordinates on the fine line.

Consequently, the data continuity detecting unit 101 shown in FIG. 63 can statistically obtain the angle indicating the gradient of the fine line or two-valued edge (the angle with the horizontal direction as the reference axis here) using information around each pixel for obtaining the angle of the fine line or two-valued edge as the data continuity, unlike the method using correlation with blocks made up of predetermined pixels, and accordingly, there is no switching according to predetermined angle ranges as observed with the method using correlation, thus, the angle of the gradients of all fine lines or two-valued edges can be obtained with the same processing, thereby enabling simplification of the processing.

Also, while description has been made above regarding an example of the data continuity detecting unit 101 outputting the angle between the fine line or two-valued edge and a predetermined reference axis as the continuity information, but it is conceivable that depending on the subsequent processing, outputting the angle as such may improve processing efficiency. In such a case, the continuity direction derivation unit 703 and continuity direction computation unit 731 of the data continuity detecting unit 101 may output the gradient $G_f$ of the fine line or two-valued edge obtained by the least-square method as continuity information, without change.

Further, while description has been made above regarding a case wherein the dynamic range Dri_r in Expression (40) is computed having been obtained regarding each of the pixels in the extracted block, but setting the dynamic range block sufficiently great, i.e., setting the dynamic range for a great number of pixels of interest and a great number of pixels therearound, the maximum value and minimum value of pixel values of pixels in the image should be selected at all times for the dynamic range. Accordingly, an arrangement may be made wherein computation is made for the dynamic range Dri_r with the dynamic range Dri_r as a fixed value obtained as the dynamic range from the maximum value and minimum value of pixels in the extracted block or in the image data without computing each pixel of the extracted block.

That is to say, an arrangement may be made to obtain the angle θ (gradient $G_f$) of the fine line by supplementing only the difference in pixel values between the pixels, as in the following Expression (41). Fixing the dynamic range in this way allows the computation processing to be simplified, and processing can be performed at high speed.

$$G_f = \frac{Dr \times \sum_{i=1}^{n} d\_y_i}{\sum_{i=1}^{n} (d\_y_i)^2} \quad (41)$$

Next, description will be made regarding the data continuity detecting unit 101 for detecting the mixture ratio of the pixels as data continuity information with reference to FIG. 93.

Figure 93:
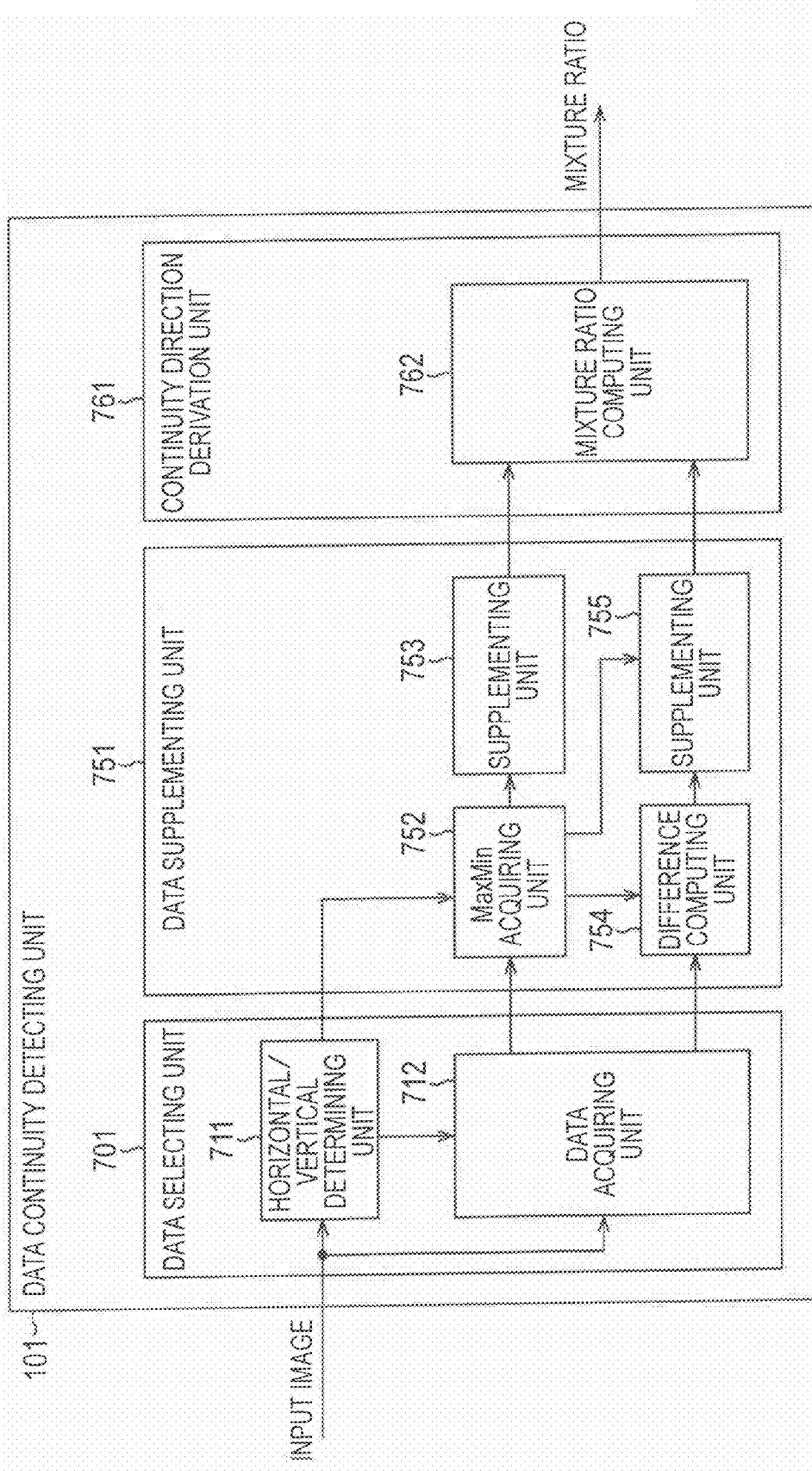
FIG. 93 is a block diagram illustrating the configuration of the data continuity detecting unit for detecting a mixture ratio under application of the present invention as data continuity information.

Note that with the data continuity detecting unit 101 shown in FIG. 93, portions which correspond to those of the data continuity detecting unit 101 shown in FIG. 63 are denoted with the same symbols, and description thereof will be omitted as appropriate.

With the data continuity detecting unit 101 shown in FIG. 93, what differs from the data continuity detecting unit 101 shown in FIG. 63 is the point that a data supplementing unit 751 and mixture ratio derivation unit 761 are provided instead of the data supplementing unit 702 and continuity direction derivation unit 703.

A MaxMin acquiring unit 752 of the data supplementing unit 751 performs the same processing as the MaxMin acquiring unit 722 in FIG. 63, and the maximum value and minimum value of the pixel values of the pixels in the dynamic range block are obtained, the difference (dynamic range) of the maximum value and minimum value is obtained, and output to supplementing units 753 and 755 as well as outputting the maximum value to a difference computing unit 754.

The supplementing unit 753 squares the value obtained by the MaxMin acquiring unit, performs supplementing for all pixels of the extracted block, obtains the sum thereof, and outputs to the mixture ratio derivation unit 761.

The difference computing unit 754 obtains the difference between each pixel in the acquired block of the data acquiring unit 712 and the maximum value of the corresponding dynamic range block, and outputs this to the supplementing unit 755.

The supplementing unit 755 multiplies the difference between the maximum value and minimum value (dynamic range) of each pixel of the acquired block input from the MaxMin acquiring unit 752 with the difference between the pixel value of each of the pixels in the acquired block input from the difference computing unit 754 and the maximum value of the corresponding dynamic range block, obtains the sum thereof, and outputs to the mixture ratio derivation unit 761.

A mixture ratio calculating unit 762 of the mixture ratio derivation unit 761 statistically obtains the mixture ratio of the pixel of interest by the least-square method, based on the values input from the supplementing units 753 and 755 of the data supplementing unit, and outputs this as data continuity information.

Next, the mixture ratio derivation method will be described.

Figure 94A:
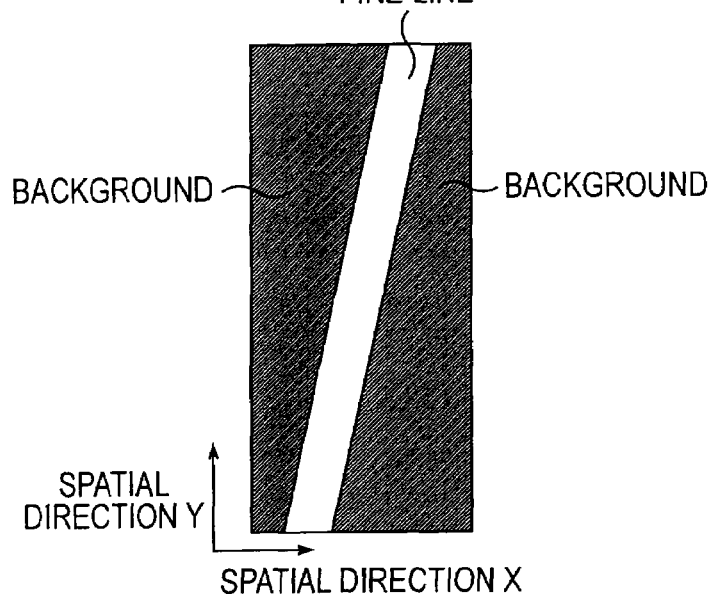
FIG. 94A is a diagram for describing how to obtain the mixture ratio.
Figure 94B:
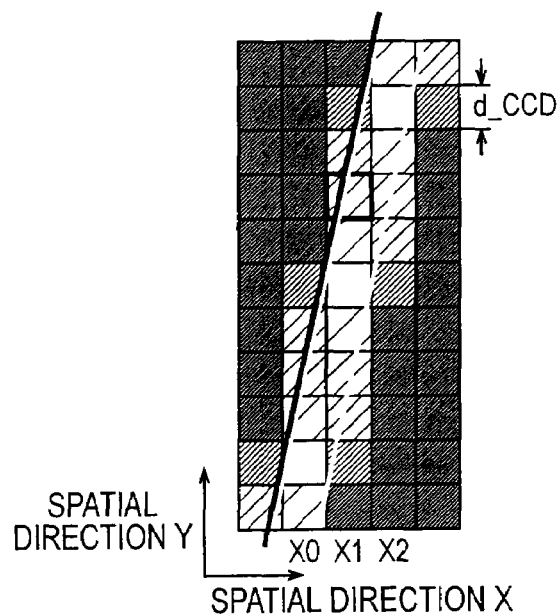
FIG. 94B is a diagram for describing how to obtain the mixture ratio.

As shown in FIG. 94A, in the event that a fine line exists on the image, the image taken with the sensor is an image such as shown in FIG. 94B. In this image, let us hold in interest the pixel enclosed by the black solid lines on the spatial direction X=X1 in FIG. 94B. Note that the range between the white lines in FIG. 94B indicates the position corresponding to the fine line region. The pixel value M of this pixel should be an intermediate color between the pixel value B corresponding to the level of the background region, and the pixel value L corresponding to the level of the fine line region, and in further detail, this pixel value $P_S$ should be a mixture of each level according to the area ratio between the background region and fine line region. Accordingly, the pixel value $P_S$ can be expressed by the following Expression (42).

$$P_S = \alpha \times B + (1-\alpha) \times L \qquad (42)$$

Here, α is the mixture ratio, and more specifically, indicates the ratio of area which the background region occupies in the pixel of interest. Accordingly, (1−α) can be said to indicate the ratio of area which the fine line region occupies. Now, pixels of the background region can be considered to be the component of an object existing in the background, and thus can be said to be a background object component. Also, pixels of the fine line region can be considered to be the component of an object existing in the foreground as to the background object, and thus can be said to be a foreground object component.

Consequently, the mixture ratio α can be expressed by the following Expression (43) by expanding the Expression (42).

$$\alpha = (P_S - L)/(B - L) \qquad (43)$$

Further, in this case, we are assuming that the pixel value exists at a position straddling the first pixel value (pixel value B) region and the second pixel value (pixel value L) region, and accordingly, the pixel value L can be substituted with the maximum value Max of the pixel values, and further, the pixel value B can be substituted with the minimum value of the pixel value. Accordingly, the mixture ratio α can also be expressed by the following Expression (44).

$$\alpha = (P_S - \text{Max})/(\text{Min} - \text{Max}) \qquad (44)$$

As a result of the above, the mixture ratio α can be obtained from the dynamic range (equivalent to (Min−Max)) of the dynamic range block regarding the pixel of interest, and the difference between the pixel of interest and the maximum value of pixels within the dynamic range block, but in order to further improve precision, the mixture ratio α will here be statistically obtained by the least-square method.

That is to say, expanding the above Expression (44) yields the following Expression (45).

$$(P_S - \text{Max}) = \alpha \times (\text{Min} - \text{Max}) \qquad (45)$$

As with the case of the above-described Expression (36), this Expression (45) is a single-variable least-square equation. That is to say, in Expression (36), the gradient $G_f$ was obtained by the least-square method, but here, the mixture ratio α is obtained. Accordingly, the mixture ratio α can be statistically obtained by solving the normal equation shown in the following Expression (46).

$$\alpha = \frac{\sum_{i=1}^{n}((\text{Min}_i - \text{Max}_i)(P_{si} - \text{Max}_i))}{\sum_{i=1}^{n}((\text{Min}_i - \text{Max}_i)(\text{Min}_i - \text{Max}_i))} \qquad (46)$$

Here, i is for identifying the pixels of the extracted block. Accordingly, in Expression (46), the number of pixels in the extracted block is n.

Next, the processing for detecting data continuity with the mixture ratio as data continuity will be described with reference to the flowchart in FIG. 95.

In step S731, the horizontal/vertical determining unit 711 initializes the counter U which identifies the pixels of the input image.

In step S732, the horizontal/vertical determining unit 711 performs processing for extracting data necessary for subsequent processing. Note that the processing of step S732 is the same as the processing described with reference to the flowchart in FIG. 89, so description thereof will be omitted.

In step S733, the data supplementing unit 751 performs processing for supplementing values necessary of each of the items for computing the normal equation (Expression (46) here).

Figure 96:
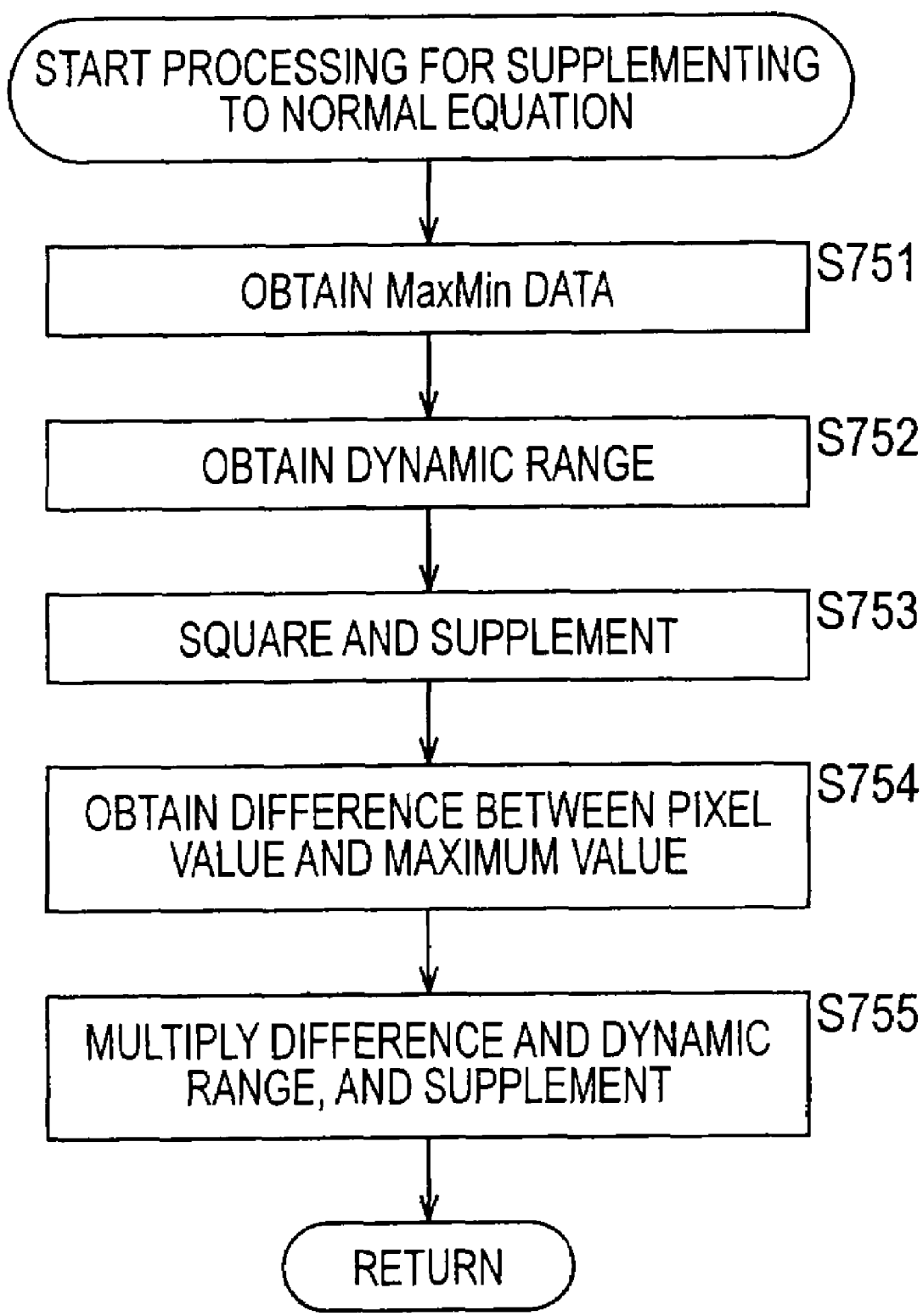
FIG. 96 is a flowchart for describing supplementing processing to a normal equation.

Now, the processing for supplementing to the normal equation will be described with reference to the flowchart in FIG. 96.

In step S751, the MaxMin acquiring unit 752 obtains the maximum value and minimum value of the pixels values of the pixels contained in the dynamic range block stored in the data acquiring unit 712, and of these, outputs the minimum value to the difference computing unit 754.

In step S752, the MaxMin acquiring unit 752 obtains the dynamic range from the difference between the maximum value and the minimum value, and outputs this to the difference supplementing units 753 and 755.

In step S753, the supplementing unit 753 squares the dynamic range (Max−Min) input from the MaxMin acquiring unit 752, and supplements. That is to say, the supplementing unit 753 generates by supplementing a value equivalent to the denominator in the above Expression (46).

In step S754, the difference computing unit 754 obtains the difference between the maximum value of the dynamic range block input from the MaxMin acquiring unit 752 and the pixel values of the pixels currently being processed in the extracted block, and outputs to the supplementing unit 755.

In step S755, the supplementing unit 755 multiplies the dynamic range input from the MaxMin acquiring unit 752 with the difference between the pixel values of the pixels currently being processed input from the difference computing unit 754 and the maximum value of the pixels of the dynamic range block, and supplements. That is to say, the supplementing unit 755 generates values equivalent to the numerator item of the above Expression (46).

As described above, the data supplementing unit 751 performs computation of the items of the above Expression (46) by supplementing.

Figure 95:
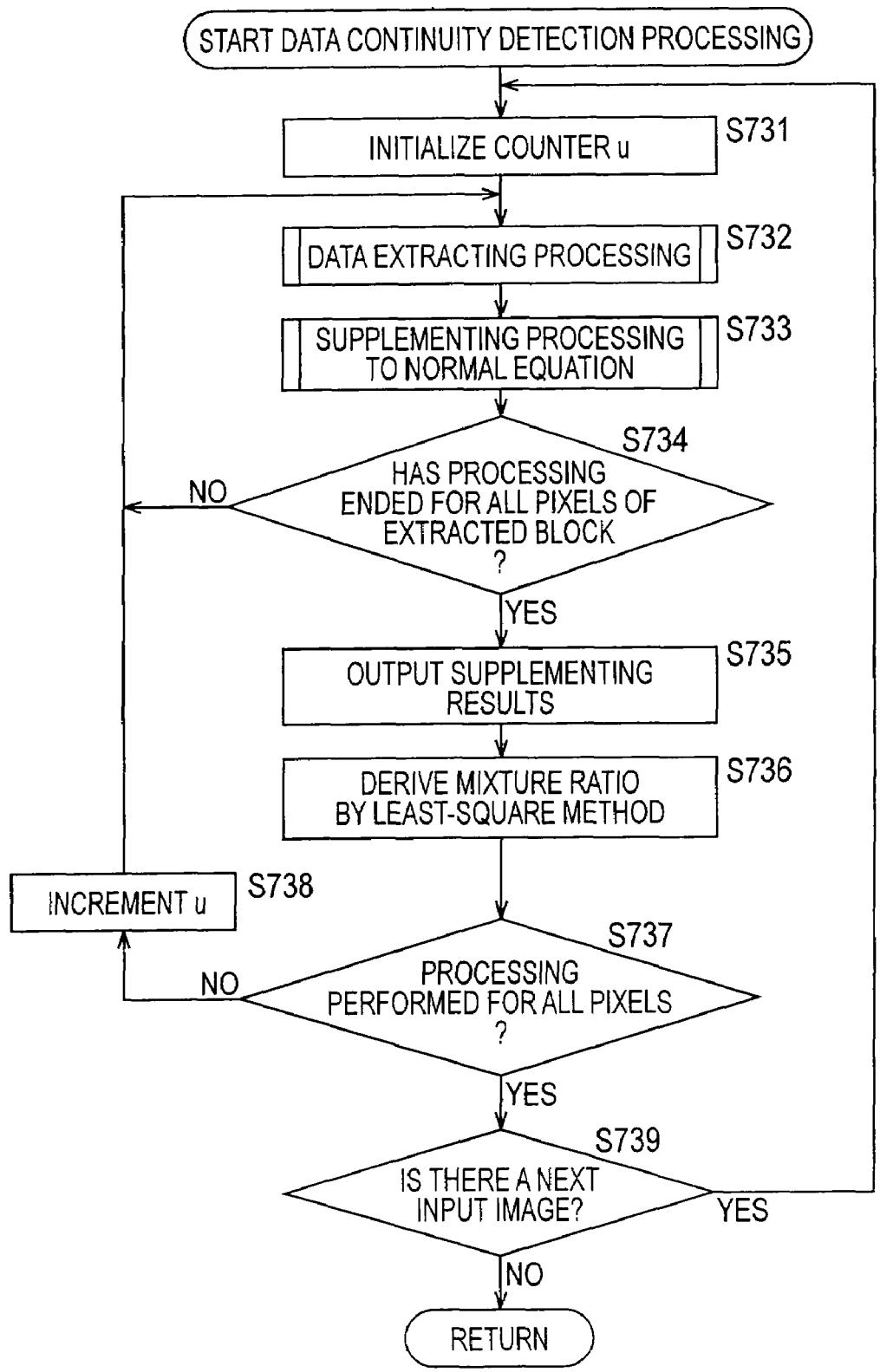
FIG. 95 is a flowchart for describing processing for detecting the mixture ratio as data continuity.

Now, let us return to the description of the flowchart in FIG. 95.

In step S734, the difference supplementing unit 721 determines whether or not supplementing has ended for all pixels of the extracted block, and in the event that determination is made that supplementing has not ended for all pixels of the extracted block for example, the processing returns to step S732, and the subsequent processing is repeated. That is to say, the processing of steps S732 through S734 is repeated until determination is made that supplementing has ended for all pixels of the extracted block.

In step S734, in the event that determination is made that supplementing has ended for all pixels of the extracted block, in step S735 the supplementing units 753 and 755 output the supplementing results stored therein to the mixture ratio derivation unit 761.

In step S736, the mixture ratio calculating unit 762 of the mixture ratio derivation unit 761 statistically computes, by the least-square method, and outputs, the mixture ratio of the pixel of interest which is the data continuity information, by solving the normal equation shown in Expression (46), based on the sum of squares of the dynamic range, and the sum of multiplying the difference between the pixel values of the pixels of the extracted block and the maximum value of the dynamic block by the dynamic range, input from the supplementing units 753 and 755 of the data supplementing unit 751.

In step S737, the data acquiring unit 712 determines whether or not processing has been performed for all pixels in the input image, and in the event that determination is made that, for example, processing has not been performed for all pixels in the input image, i.e., in the event that determination is made that the mixture ratio has not been output for all pixels of the input image, in step S738 the counter U is incremented by 1, and the processing returns to step S732.

That is to say, the processing of steps S732 through S738 is repeated until pixels to be processed within the input image are changed and the mixture ratio is computed for all pixels of the input image. Change of pixel by the counter U may be according to raster scan or the like for example, or may be sequential change according to other rules.

In the event that determination is made in step S737 that processing has been performed for all pixels of the input image, in step S739 the data acquiring unit 712 determines whether or not there is a next input image, and in the event that determination is made that there is a next input image, the processing returns to step S731, and the subsequent processing is repeated.

In the event that determination is made in step S739 that there is no next input image, the processing ends.

Due to the above processing, the mixture ratio of the pixels is detected as continuity information, and output.

Figure 97A:
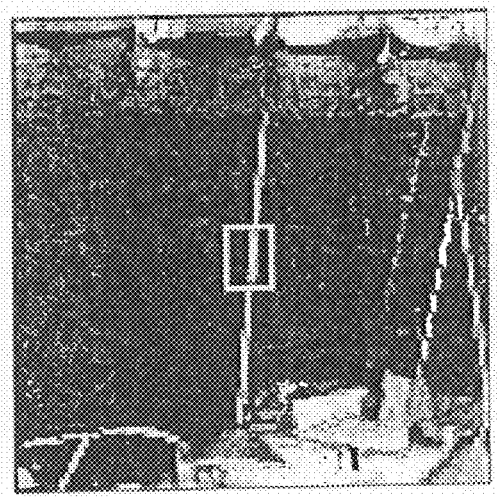
FIG. 97A is a diagram illustrating an example of distribution of the mixture ratio of a fine line.
Figure 97B:
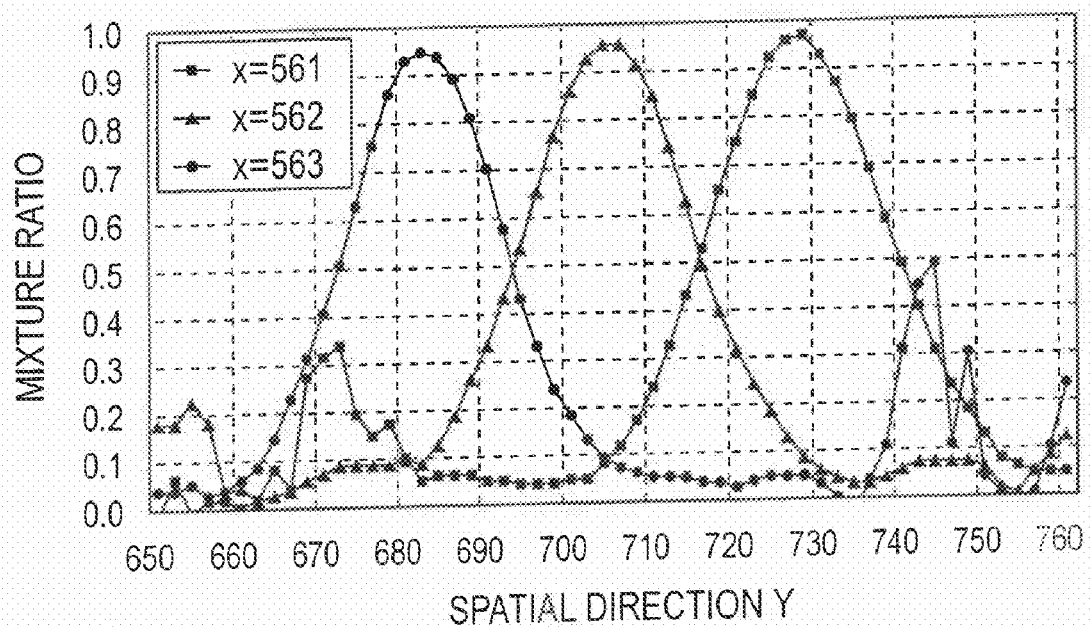

FIG. 97B illustrates the change in the mixture ratio on predetermined spatial directions X (=561, 562, 563) with regard to the fine line image within the white lines in the image shown in FIG. 97A, according to the above technique, for example. As shown in FIG. 97B, the change in the mixture ratio in the spatial direction Y which is continuous in the horizontal direction is such that, respectively, in the case of the spatial direction X=563, the mixture ratio starts rising at around the spatial direction Y=660, peaks at around Y=685, and drops to Y=710. Also, in the case of the spatial direction X=562, the mixture ratio starts rising at around the spatial direction Y=680, peaks at around Y=705, and drops to Y=735. Further, in the case of the spatial direction X=561, the mixture ratio starts rising at around the spatial direction Y=705, peaks at around Y=725, and drops to Y=755.

Thus, as shown in FIG. 97B, the change of each of the mixture ratios in the continuous spatial directions X is the same change as the change in pixel values changing according to the mixture ratio (the change in pixel values shown in FIG. 72B), and is cyclically continuous, so it can be understood that the mixture ratio of pixels near the fine line are being accurately represented.

Figure 98A:
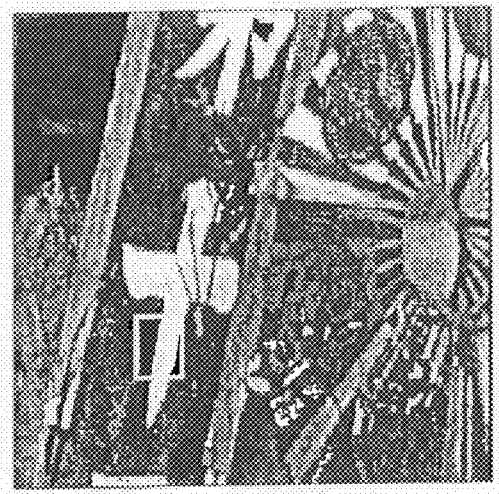
Figure 98B:
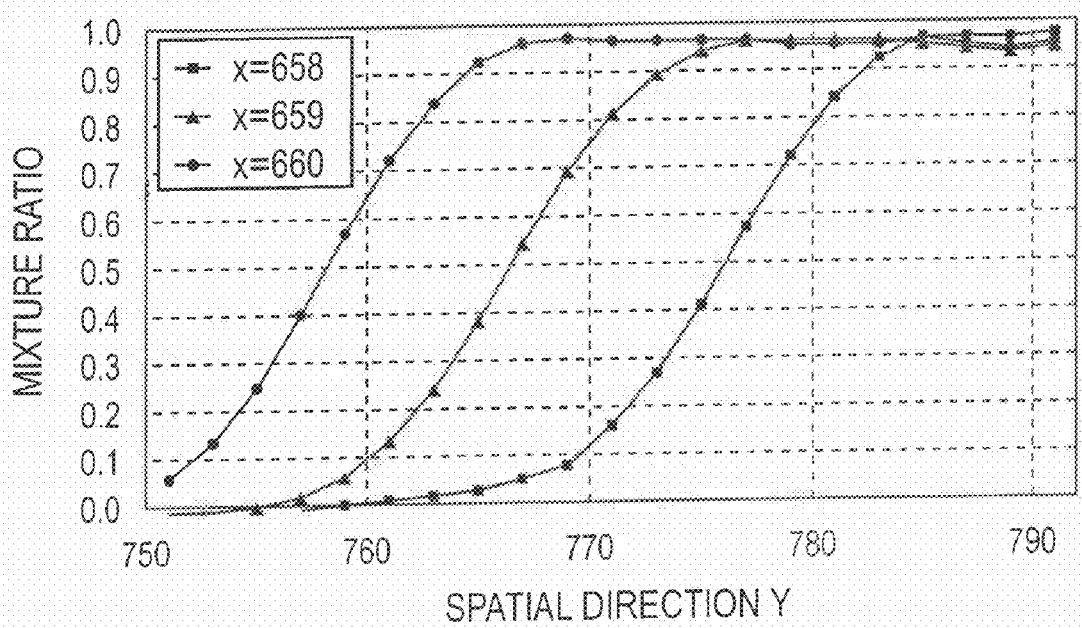

Also, in the same way, FIG. 98B illustrates the change in the mixture ratio on predetermined spatial directions X (=658, 659, 660) with regard to the two-valued edge image within the white lines in the image shown in FIG. 98A. As shown in FIG. 98B, the change in the mixture ratio in the spatial direction Y which is continuous in the horizontal direction is such that, respectively, in the case of the spatial direction X=660, the mixture ratio starts rising at around the spatial direction Y=750, and peaks at around Y=765. Also, in the case of the spatial direction X=659, the mixture ratio starts rising at around the spatial direction Y=760, and peaks at around Y=775. Further, in the case of the spatial direction X=658, the mixture ratio starts rising at around the spatial direction Y=770, and peaks at around Y=785.

Thus, as shown in FIG. 98B, the change of each of the mixture ratios of the two-valued edge is approximately the same as change which is the same change as the change in pixel values changing according to the mixture ratio (the change in pixel values shown in FIG. 84B), and is cyclically continuous, so it can be understood that the mixture ratio of pixel values near the two-valued edge are being accurately represented.

According to the above, the mixture ratio of each pixel can be statistically obtained as data continuity information by the least-square method. Further, the pixel values of each of the pixels can be directly generated based on this mixture ratio.

Also, if we say that the change in mixture ratio has continuity, and further, the change in the mixture ratio is linear, the relationship such as indicated in the following Expression (47) holds.

$$\alpha = m \times y + n \quad (47)$$

Here, m represents the gradient when the mixture ratio $\alpha$ changes as to the spatial direction Y, and also, n is equivalent to the intercept when the mixture ratio $\alpha$ changes linearly.

Figure 99:
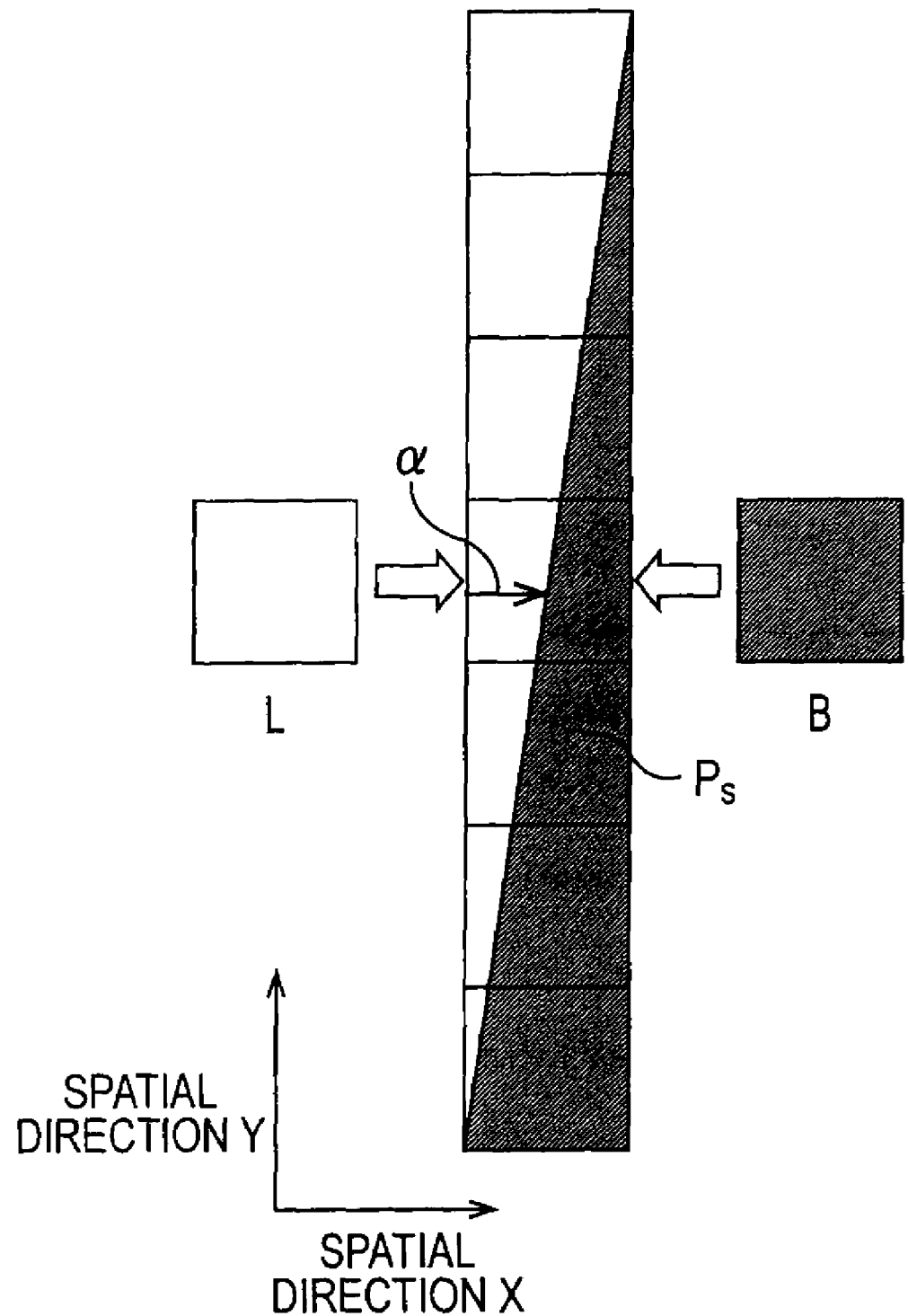

That is, as shown in FIG. 99, the straight line indicating the mixture ratio is a straight line indicating the boundary between the pixel value B equivalent to the background region level and the level L equivalent to the fine line level, and in this case, the amount in change of the mixture ratio upon progressing a unit distance with regard to the spatial direction Y is the gradient m.

Accordingly, substituting Expression (47) into Expression (42) yields the following Expression (48).

$$M = (m \times y + n) \times B + (1 - (m \times y + n)) \times L \quad (48)$$

Further, expanding this Expression (48) yields the following Expression (49).

$$M - L = (y \times B - y \times L) \times m + (B - L) \times n \quad (49)$$

In Expression (49), the first item m represents the gradient of the mixture ratio in the spatial direction, and the second item is the item representing the intercept of the mixture ratio. Accordingly, an arrangement may be made wherein a normal equation is generated using the least-square of two variables to obtain m and n in Expression (49) described above.

However, the gradient m of the mixture ratio α is the above-described gradient of the fine line or two-valued edge (the above-described gradient $G_f$) itself, so an arrangement may be made wherein the above-described method is used to obtain the gradient $G_f$ of the fine line or two-valued edge beforehand, following which the gradient is used and substituted into Expression (49), thereby making for a single-variable function with regard to the item of the intercept, and obtaining with the single-variable least-square method the same as the technique described above.

While the above example has been described regarding a data continuity detecting unit 101 for detecting the angle (gradient) or mixture ratio of a fine line or two-valued edge in the spatial direction as data continuity information, an arrangement may be made wherein that corresponding to the angle in the spatial direction obtained by replacing one of the spatial-direction axes (spatial directions X and Y), for example, with the time-direction (frame direction) T axis. That is to say, that which corresponds to the angle obtained by replacing one of the spatial-direction axes (spatial directions X and Y) with the time-direction (frame direction) T axis, is a vector of movement of an object (movement vector direction).

Figure 100A:
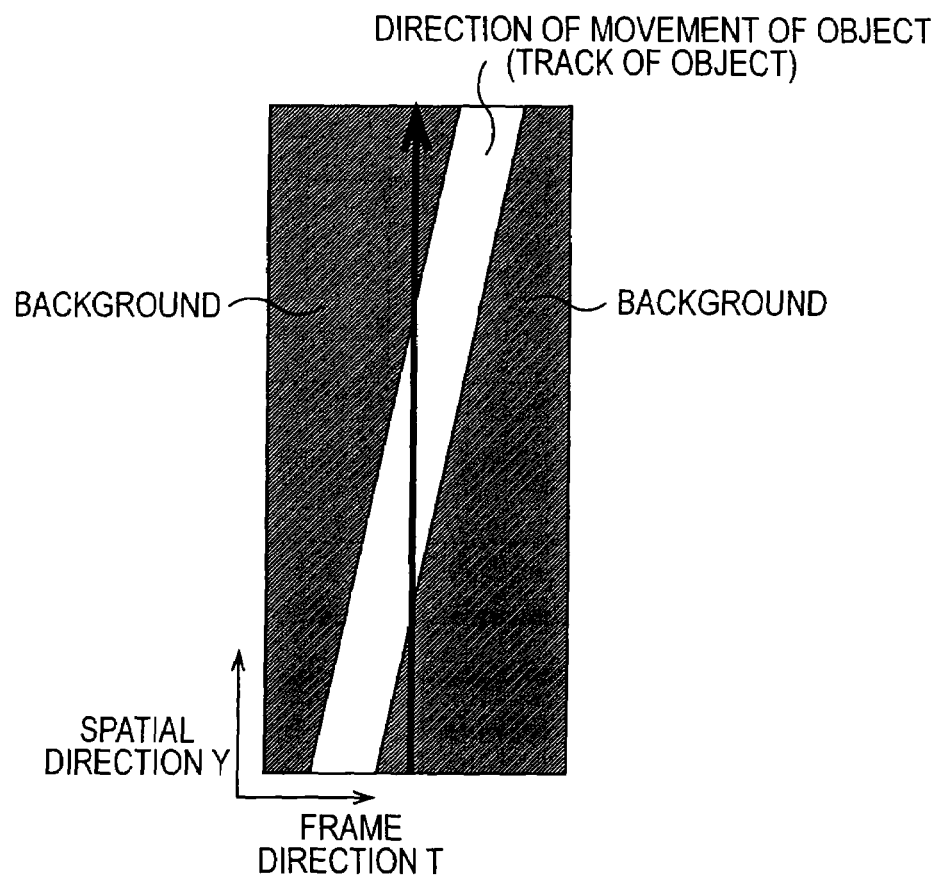
Figure 100B:
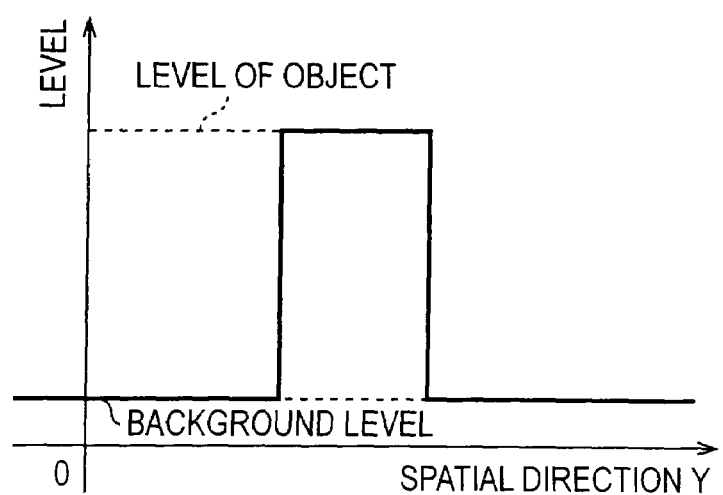

More specifically, as shown in FIG. 100A, in the event that an object is moving upwards in the drawing with regard to the spatial direction Y over time, the track of movement of the object is manifested at the portion equivalent to the fine line in the drawing (in comparison with that in FIG. 70A). Accordingly, the gradient at the fine line in the time direction T represents the direction of movement of the object (angle indicating the movement of the object) (is equivalent to the direction of the movement vector) in FIG. 100A. Accordingly, in the real world, in a frame of a predetermined point-in-time indicated by the arrow in FIG. 100A, a pulse-shaped waveform wherein the portion to be the track of the object is the level of (the color of) the object, and other portions are the background level, as shown in FIG. 100B, is obtained.

Figure 101A:
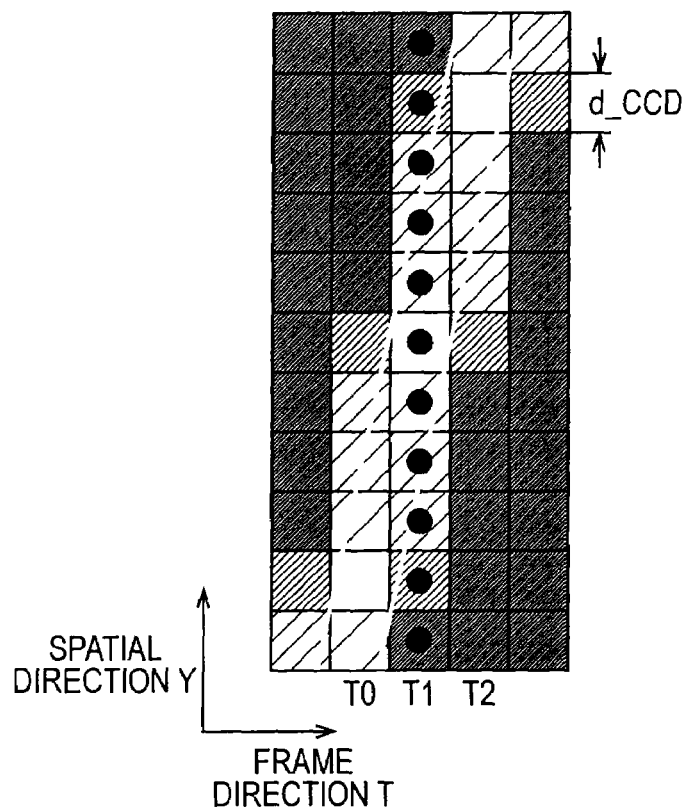
Figure 101B:
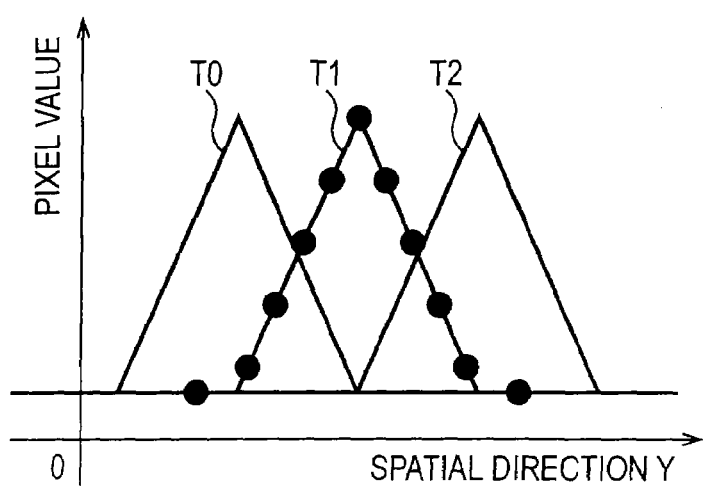

In this way, in the case of imaging an object with movement with the sensor, as shown in FIG. 101A, the distribution of pixel values of each of the pixels of the frames from point-in-time T1 through T3 each assumes a peak-shaped waveform in the spatial direction Y, as shown in FIG. 101B. This relationship can be thought to be the same as the relationship in the spatial directions X and Y, described with reference to FIG. 71A and FIG. 71B. Accordingly, in the event that the object has movement in the frame direction T, the direction of the movement vector of the object can be obtained as data continuity information in the same way as with the information of the gradient of the fine line or the angle (gradient) of the two-valued edge described above. Note that in FIG. 101B, each grid in the frame direction T (time direction T) is the shutter time making up the image of one frame.

Figure 102A:
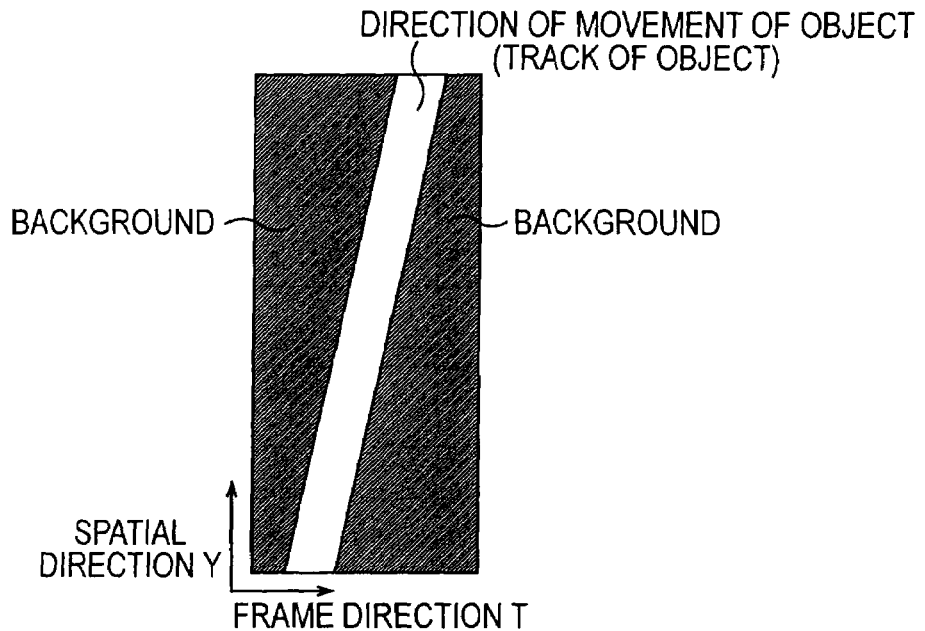
Figure 102B:
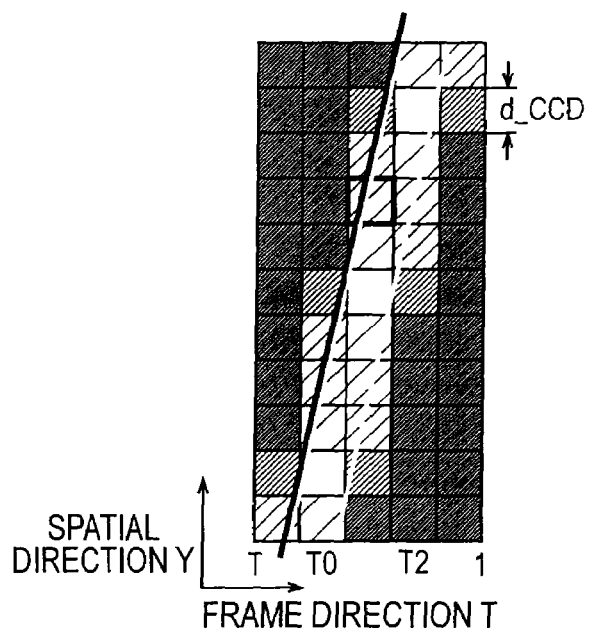
Figure 102C:
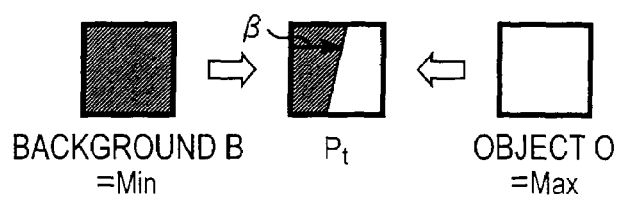

Also, in the same way, in the event that there is movement of an object in the spatial direction Y for each frame direction T as shown in FIG. 102A, each pixel value corresponding to the movement of the object as to the spatial direction Y on a frame corresponding to a predetermined point-in-time T1 can be obtained as shown in FIG. 102B. At this time, the pixel value of the pixel enclosed by the black solid lines in FIG. 102B is a pixel value wherein the background level and the object level are mixed in the frame direction at a mixture ratio β, corresponding to the movement of the object, as shown in FIG. 102C, for example.

Figure 94C:
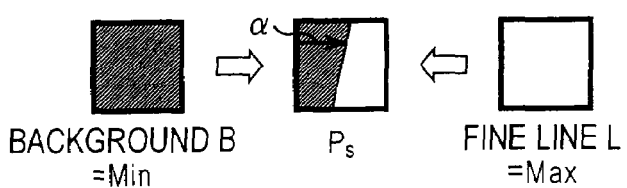
FIG. 94C is a diagram for describing how to obtain the mixture ratio.

This relationship is the same as the relationship described with reference to FIG. 94A, FIG. 94B, and FIG. 94C.

Figure 103:
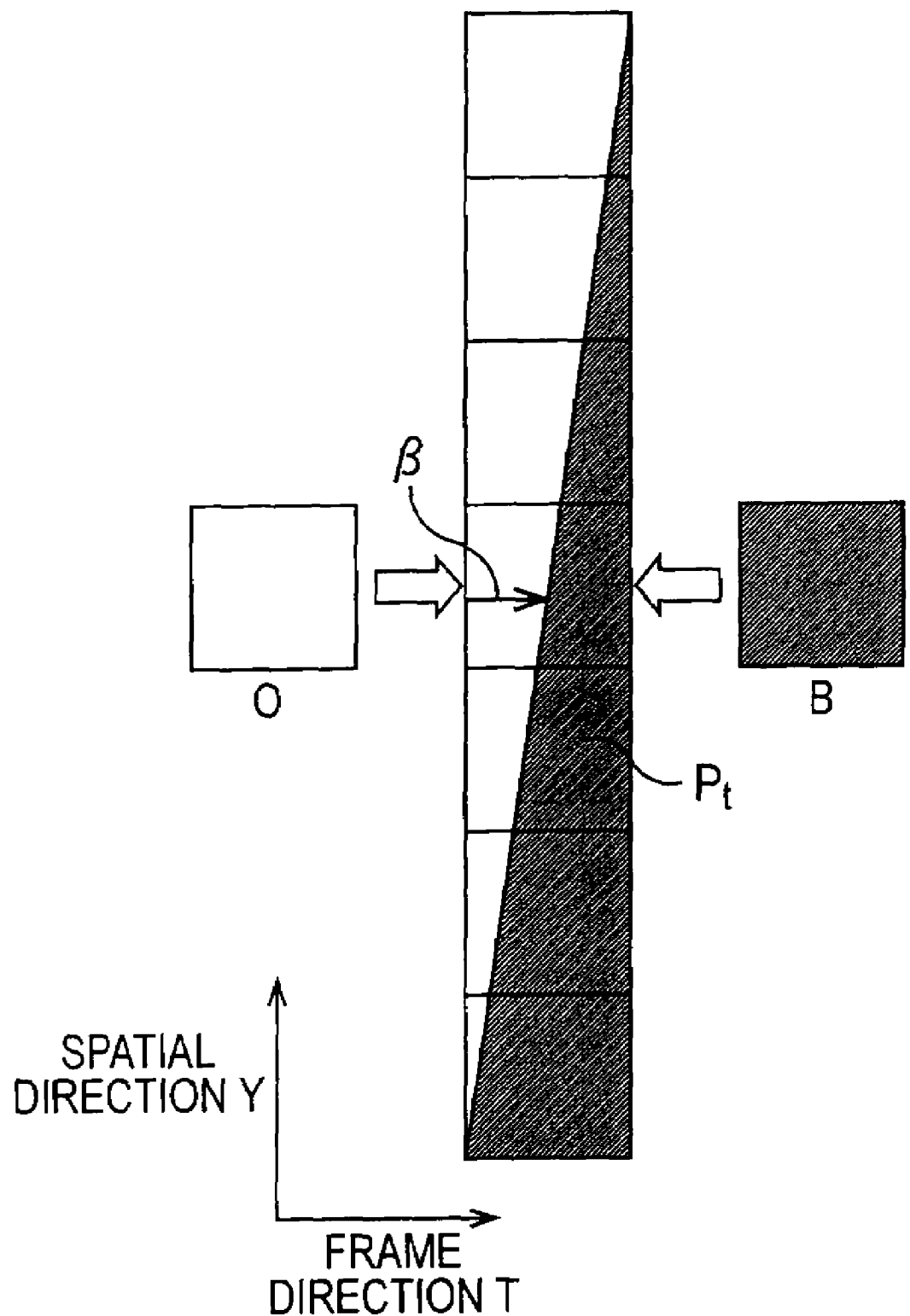

Further, as shown in FIG. 103, the level O of the object and the level B of the background can also be made to be linearly approximated by the mixture ratio β in the frame direction (time direction). This relationship is the same relationship as the linear approximation of mixture ratio in the spatial direction, described with reference to FIG. 99.

Accordingly, the mixture ratio β in the time (frame) direction can be obtained as data continuity information with the same technique as the case of the mixture ratio α in the spatial direction.

Also, an arrangement may be made wherein the frame direction, or one dimension of the spatial direction, is selected, and the data continuity angle or the movement vector direction is obtained, and in the same way, the mixture ratios α and β may be selectively obtained.

According to the above, light signals of the real world are projected, a region, corresponding to a pixel of interest in the image data of which a part of the continuity of the real world light signals has dropped out, is selected, features for detecting the angle as to a reference axis of the image data continuity corresponding to the lost real world light signal continuity are detected in the selected region, the angle is statistically detected based on the detected features, and light signals are estimated by estimating the lost real world light signal continuity based on the detected angle of the continuity of the image data as to the reference axis, so the angle of continuity (direction of movement vector) or (a time-space) mixture ratio can be obtained.

Thus, the data continuity detecting unit 101 detects data continuity corresponding to real world light signal continuity of multiple perimeter pixels in an input image corresponding to a pixel of interest.

Returning to FIG. 6, in step S101, the data continuity detected by the data continuity detecting unit 101 is either a part of continuity of the image in the actual world that is contained in the input image, or continuity resulting from continuity of the actual world signals having changed.

For example, the data continuity detecting unit 101 detects data continuity by detecting the angle (gradient) in spatial direction exhibiting arrays of the same shapes.

Note that data continuity information can be used as features indicating the characteristics of the data.

In step S102, the class tap extracting unit 102 selects a pixel of interest, which is an HD pixel of interest in the HD image which is to be created. The class tap extracting unit 102 extracts multiple perimeter pixels from the input image corresponding to the pixel of interest, based on the data continuity detected by the data continuity detecting unit 101, and takes the extracted multiple perimeter pixels in the input image as a class tap. The class tap is supplied to the features detecting unit 103, and the procedures proceed to step S103. For example, the class tap extracting unit 102 extracts, from the input image, multiple pixel values which are spatially or temporally close to the position of the pixel of interest, based on the data continuity detected by the data continuity detecting unit 101, as a class tap, and generates a class tap.

Processing for the class tap extracting unit 102 to extract the multiple perimeter pixels of the input image corresponding to the pixel of interest, based on the data continuity, will be described with reference to FIG. 104 through FIG. 108.

FIG. 104 is a diagram describing the processing for class tap extracting in conventional class classification adaptation processing for creating a frame of an image with higher resolution in the time direction, based on a movement vector v.

In FIG. 104, the horizontal direction represents the spatial direction of the image, and the vertical direction represents the time direction. Frame #1 is a frame following frame #0, i.e., a frame which is after frame #0 timewise. The frame of interest is situated between frame #0 and frame #1.

In FIG. 104, the black circle represents the pixel of interest, and the white circles represent the perimeter pixels which are to be extracted.

With conventional class classification adaptation processing, a movement vector v corresponding to the pixel of interest is detected, and the detected movement vector v is positioned so as to pass through the pixel of interest, with the starting point thereof situated at the frame #0 and the ending point thereof situated at the frame #1. A pixel $x^{(2)}$, situated at the starting point of the movement vector v thus disposed, and a pixel $x^{(5)}$, situated at the ending point of the movement vector v, are extracted as a class tap.

Further, in the conventional class classification adaptation processing, a pixel $x^{(1)}$ and a pixel $x^{(3)}$ adjacent to the pixel $x^{(2)}$ in frame #0 are extracted as a class tap, and also, a pixel $x^{(4)}$ and a pixel $x^{(6)}$ adjacent to the pixel $x^{(5)}$ in frame #1 are extracted as a class tap.

FIG. 105 is a diagram for describing the processing of extracting class taps, with the image processing device according to the present invention, based on the data continuity direction C.

In the following description, the increment of pixels will be based on pixels of the input image.

Now, at the upper side of FIG. 105, the coordinate values of the spatial direction Y increase (positive side), and at the lower side of FIG. 105, the coordinate values of the spatial direction Y decrease (negative side). Also, at the right side of FIG. 105, the coordinate values of the spatial direction X increase (positive side), and at the left side of FIG. 105, the coordinate values of the spatial direction X decrease (negative side).

In the data continuity direction C indicated in FIG. 105, the amount of change in the spatial direction Y as to the distance of 1 pixel in the spatial direction X is 3.25 pixels.

For example, the pixel $x^{(5)}$ which is −0.25 pixels in the spatial direction X and −0.75 pixels in the spatial direction Y as to the pixel of interest (indicated by black circle) belonging to the region having data continuity, the pixel $x^{(4)}$ which is −0.25 pixels in the spatial direction X and +0.25 pixels in the spatial direction Y, and the pixel $x^{(6)}$ which is −0.25 pixels in the spatial direction X and −1.75 pixels in the spatial direction Y, are extracted as a class tap.

Also, the pixel $x^{(2)}$ which is +0.75 pixels in the spatial direction X and +2.75 pixels in the spatial direction Y as to the pixel of interest belonging to the region having data continuity, the pixel $x^{(1)}$ which is +0.75 pixels in the spatial direction X and +3.75 pixels in the spatial direction Y, and the pixel $x^{(3)}$ which is +0.75 pixels in the spatial direction X and +1.75 pixels in the spatial direction Y, are extracted as a class tap.

Further, the pixel $x^{(8)}$ which is −1.25 pixels in the spatial direction X and −3.75 pixels in the spatial direction Y as to the pixel of interest belonging to the region having data continuity, the pixel $x^{(7)}$ which is −1.25 pixels in the spatial direction X and −2.75 pixels in the spatial direction Y, and the pixel $x^{(9)}$ which is −1.25 pixels in the spatial direction X and −4.75 pixels in the spatial direction Y, are extracted as a class tap.

Determining the position of pixels to be extracted as class taps, based on the data continuity, will be described with reference to FIG. 106 and FIG. 107.

In FIG. 106 and FIG. 107, the × marks represent HD pixels, and the ○ marks represent SD pixels.

In the following, a position which is a pixels in the spatial direction X and b pixels in the spatial direction Y from a predetermined reference position such as the pixel of interest or the like will be represented as (a, b).

For example, the positions of: three perimeter pixels which are one row of pixels in the spatial direction Y containing an input pixel at a position corresponding to the pixel of interest (a corresponding pixel), the row being centered on a center pixel determined from the corresponding pixel, and made up of pixels adjacent to the center pixel in the spatial direction Y; and also six perimeter pixels which are adjacent to the three perimeter pixels in the spatial direction X; are determined as a reference beforehand.

Note that the position of the reference for perimeter pixels can be determined arbitrarily, such as every other pixel in the spatial direction X, every other pixel in the spatial direction Y, and so forth.

The corresponding pixel is situated within a range −0.25 pixels to +0.25 pixels in the spatial direction X and −0.25 pixels to +0.25 pixels in the spatial direction Y as to the pixel of interest.

There are cases wherein the center pixel is the same as the corresponding pixel, and cases wherein the center pixel is not the same as the corresponding pixel. That is to say, the center pixel is not necessarily the same as the corresponding pixel.

For example, as shown in FIG. 106, in the event that the position of an HD pixel $y_1$ which is the pixel of interest is (−0.25, +0.25) with the corresponding pixel $x_{11}$ as a reference, the distance in the spatial direction X between a pixel $x_{12}$ which is at a position 1 pixel in the spatial direction X from the corresponding pixel $x_1$, and the pixel of interest $y_1$ is 1.25 pixels, i.e., 5/4 pixels.

In the event that the amount of change in the spatial direction Y as to 1 pixel distance in the spatial direction X in the data continuity is 1 pixel (in the event that the gradient of the data continuity is 1), an input pixel which is the closest to a position 1.25 pixels in the spatial direction X and 1.25 pixels in the spatial direction Y from the pixel of interest $y_1$ (the distance 1.25 having been obtained by multiplying the distance 1.25 in the spatial direction X by 1 in gradient), e.g., the input pixel $x_6$, is selected as a class tap.

Then, with the selected input pixel $x_6$ as a reference, input pixels which are in one row in the spatial direction Y as to the input pixel $x_6$ and which are at predetermined positions to the input pixel $x_6$ are selected as a class tap. For example, the input pixel $x_3$ and the input pixel $x_9$ which are adjacent to the selected input pixel $x_6$ in the spatial direction Y are selected as a class tap.

In the event that the amount of change in the spatial direction Y as to 1 pixel distance in the spatial direction X in the data continuity is 2 pixels (in the event that the gradient of the data continuity is 2), an input pixel which is the closest to a position 1.25 pixels in the spatial direction X and 2.50 pixels (the distance 2.50 having been obtained by multiplying the distance 1.25 in the spatial direction X by 2 in gradient) in the spatial direction Y from the pixel of interest $y_1$, e.g., the input pixel $x_3$, is selected as a class tap, as shown in FIG. 106.

Then, with the selected input pixel $x_3$ as a reference, input pixels which are in one row in the spatial direction Y as to the input pixel $x_3$ and which are at predetermined positions to the input pixel $x_3$ are selected as the class tap. For example, input pixels which are adjacent to the selected input pixel $x_3$ in the spatial direction Y are selected as a class tap.

For example, as shown in FIG. 106, the position of the HD pixel $y_1$ which is the pixel of interest is (−0.25, +0.25) as to the corresponding pixel $x_{11}$, so the distance in the spatial direction X between the corresponding pixel $x_{11}$ and the pixel of interest $y_1$ is 0.25 pixels, i.e., ¼ pixels.

In the event that the amount of change in the spatial direction Y as to 1 pixel distance in the spatial direction X in the data continuity is 2 pixels (in the event that the gradient of the data continuity is 2), an input pixel which is the closest to a position 0.25 pixels in the spatial direction X and 0.50 pixels (the distance 0.50 having been obtained by multiplying the distance 0.25 in the spatial direction X by 2 in gradient) in the spatial direction Y from the pixel of interest $y_1$, e.g., the input pixel $x_{11}$, is selected as the center pixel, as shown in FIG. 106.

Then, for example, the input pixel $x_8$ and the input pixel $x_{14}$ which are adjacent to the selected input pixel $x_{11}$ in the spatial direction Y are selected.

That is to say, in this case, the corresponding pixel and the center pixel is the same pixel.

In the event that the amount of change in the spatial direction Y as to 1 pixel distance in the spatial direction X in the data continuity is 3.25 pixels (in the event that the gradient of the data continuity is 3.25), an input pixel which is the closest to a position 0.25 pixels in the spatial direction X and 0.8125 pixels (the distance 0.8125 having been obtained by multiplying the distance 0.25 in the spatial direction X by 3.25 in gradient) in the spatial direction Y from the pixel of interest $y_1$, e.g., the input pixel $x_{14}$, is selected as the center pixel, as shown in FIG. 106.

Then, for example, the input pixel $x_{11}$ and the input pixel $x_{17}$ which are adjacent to the selected input pixel $x_{14}$ in the spatial direction Y are selected.

That is to say, in this case, the corresponding pixel and the center pixel are different pixels.

For example, as shown in FIG. 107, in the event that the position of an HD pixel $y_2$ which is the pixel of interest is (+0.25, +0.25) as to the corresponding pixel $x_{11}$, the distance in the spatial direction X between a pixel $x_{12}$ which is at a position 1 pixel in the spatial direction X from the corresponding pixel $x_{11}$ and the pixel of interest $y_2$ is 0.75 pixels, i.e., ¾ pixels.

In the event that the amount of change in the spatial direction Y as to 1 pixel distance in the spatial direction X in the data continuity is 1 pixel (in the event that the gradient of the data continuity is 1), an input pixel which is the closest to a position 0.75 pixels in the spatial direction X and 0.75 pixels in the spatial direction Y (the distance 0.75 having been obtained by multiplying the distance 0.75 in the spatial direction X by 1 in gradient) from the pixel of interest $y_2$, e.g., the input pixel $x_9$, is selected as a class tap.

Then, with the selected input pixel $x_9$ as a reference, input pixels which are in one row in the spatial direction Y as to the input pixel $x_9$ and which are at predetermined positions as to the input pixel $x_9$ are selected as a class tap. For example, the input pixel $x_6$ and the input pixel $x_{12}$ which are adjacent to the selected input pixel $x_9$ in the spatial direction Y are selected.

In the event that the amount of change in the spatial direction Y as to 1 pixel distance in the spatial direction X in the data continuity is 2 pixels (in the event that the gradient of the data continuity is 2), an input pixel which is the closest to a position 0.75 pixels in the spatial direction X and 1.50 pixels in the spatial direction Y (the distance 1.50 having been obtained by multiplying the distance 0.75 in the spatial direction X by 2 in gradient) from the pixel of interest $y_2$, e.g., the input pixel $x_6$, is selected as a class tap, as shown in FIG. 107.

Then, with the selected input pixel $x_6$ as a reference, input pixels which are in one row in the spatial direction Y as to the input pixel $x_6$ and which are at predetermined positions as to the input pixel $x_6$ are selected as a class tap. For example, the input pixel $x_3$ and the input pixel $x_9$ which are adjacent to the selected input pixel $x_6$ in the spatial direction Y are selected.

Thus, multiplying the distance of a perimeter pixel as to the pixel of interest in a predetermined direction by the gradient of data continuity yields the distance of the perimeter pixel in the other direction, so that the positions of perimeter pixels extracted as a class tap are determined based on the direction of data continuity.

This allows perimeter pixels having data continuity to be selected as a class tap. Accordingly, perimeter pixels having common features can be selected as a class tap, so even more appropriate class classification can be performed.

Also, with the image processing device according to the present invention, the direction of data continuity in the time-space directions is detected, and class taps in the time-space directions can be extracted based on the direction of data continuity in the time-space directions thus detected.

FIG. 108 is a diagram for describing the processing of extracting class taps in the time-space directions, based on the data continuity direction C in the time-space directions detected with the data continuity detecting device 101 of the image processing device according to the present invention.

In FIG. 108, the number of pixels in the one spatial direction of the output image is double that of the input image, and the number of frames per time increment of the output image is double.

In FIG. 108, past points in time correspond to the left side position in the drawing, and future points in time correspond to the right side position in the drawing. At the upper side of FIG. 108, the coordinate values of the spatial direction increase (positive side), and at the lower side of FIG. 108, the coordinate values of the spatial direction decrease (negative side).

In FIG. 108, $f_{-1}$, $f_0$, $f_{-1}$ represent frames of the input image, and $F_{-2}$, $F_{-1}$, $F_0$, $F_1$, $F_2$, $F_3$ represent frames of the output image.

In the data continuity direction C shown in FIG. 108, the amount of change in the spatial direction as to the distance of one frame in the time direction is 3.25 pixels with the input image as a reference.

For example, the pixel $x^{(5)}$ which is −0.25 frames in the time direction and −0.75 pixels in the spatial direction as to the pixel of interest (indicated with a black circle in the drawing) belonging to a region having data continuity, the pixel $x^{(4)}$ which is −0.25 frames in the time direction and +0.25 pixels in the spatial direction, and the pixel $x^{(6)}$ which is −0.25 frames in the time direction and −1.75 pixels in the spatial direction, are extracted as a class tap.

The pixel $x^{(2)}$ which is +0.75 frames in the time direction and +2.75 pixels in the spatial direction as to the pixel of interest belonging to the region having data continuity, the pixel $x^{(1)}$ which is +0.75 frames in the time direction and +3.75 pixels in the spatial direction, and the pixel $x^{(3)}$ which is +0.75 frames in the time direction and +1.75 pixels in the spatial direction, are extracted as a class tap.

Further, the pixel $x^{(8)}$ which is −1.25 frames in the time direction and −3.75 pixels in the spatial direction as to the pixel of interest belonging to the region having data continuity, the pixel $x^{(7)}$ which is −1.25 frames in the time direction and −2.75 pixels in the spatial direction, and the pixel $x^{(9)}$ which is −1.25 frames in the time direction and −4.75 pixels in the spatial direction, are extracted as a class tap.

The processing for extracting class taps in the time-space directions based on the gradient of the data continuity in the time-space directions is the same as substituting one spatial direction in the processing described with reference to FIG. 106 and FIG. 107 with the time direction, so description thereof will be omitted.

Extracting class taps in the time-space directions based on the gradient of the data continuity in the time-space directions allows class taps to be extracted taking into consideration the data continuity in the time-space directions.

Returning to FIG. 6, in step S103, the features detecting unit 103 detects features from the input image or class tap, and supplies the detected features to the class classification unit 104, as well as supplying the class tap to the class classification unit 104, following which the flow proceeds to step S104.

In step S104, the class classification unit 104 performs class classification with regard to the pixel of interest on any one of the one or more classes, based on the features of class tap supplied from the features detecting unit 103, the class code representing the class of the pixel of interest which is obtained as the result thereof is supplied to the coefficient memory 105 and the prediction tap extracting unit 106, and the flow proceeds to step S105.

In step S105, the prediction tap extracting unit 106 extracts multiple perimeter pixels of the input image that correspond to the pixel of interest, based on the data continuity detected by the data continuity detecting unit 101 to take the extracted multiple perimeter pixels of the input image as a prediction tap.

The processing for extracting prediction taps with the prediction tap extracting unit 106 is the same as the processing by the class tap extracting unit 102, and accordingly detailed description thereof will be omitted.

Thus, perimeter pixels having data continuity can be selected as a class tap. Accordingly, perimeter pixels having common features can be selected as a prediction tap, so even higher precision or more accurate prediction can be performed.

That is to say, the prediction tap extracting unit 106 the prediction tap extracting unit 106 extracts from the input image multiple pixel values which are spatially or temporally close to the position of the pixel of interest, based on the data continuity detected by the data continuity detecting unit 101 and the class code supplied from the class classification unit 104, and generates a prediction tap. The prediction tap is supplied to the pixel value predicting unit 107, and the processing proceeds to step S106.

In step S106, the coefficient memory 105 reads out a prediction coefficient (tap coefficient) stored at an address corresponding to the class code supplied from the class classification unit 104, and thereby obtains the prediction coefficient of the class of the pixel of interest, supplies the prediction coefficient to the pixel value predicting unit 107, and the flow proceeds to step S107.

In step S107, the pixel value predicting unit 107 predicts, by adaptation processing, (the prediction value of) the pixel of interest from the multiple perimeter pixels extracted by the prediction tap extracting unit 106, based on the features detected by the features detecting unit 103, and the flow proceeds to step S108. That is to say, in step S107, the pixel value predicting unit 107 performs the computation shown in Expression (1) using the prediction tap from the prediction tap extracting unit 106 and the prediction coefficient (tap coefficient) from the coefficient memory 105, to predict (the prediction value of) the pixel of interest.

In step S108, the class tap extracting unit 102 determines whether there are any pixels in the frame of interest of the HD image which have not yet been taken as the pixel of interest, and in the event that determination is made that such exist, the flow returns to step S102, and the same processing is repeated.

Also, in the event that determination is made in step S108 that there are no pixels in the frame of interest which have not yet been taken as the pixel of interest, i.e., in the event that all HD pixels making up the frame of interest have been predicted, the pixel value predicting unit 107 outputs an output image made up of the predicted pixels, and the processing ends.

Thus, the image processing device of the configuration shown in FIG. 5 can generated an output image with higher resolution from an input image, and output the generated output image.

FIG. 109 through FIG. 118 illustrate an example of the processing results of the image processing device according to the present invention.

FIG. 109 is a diagram illustrating an example of an input image. FIG. 110 is a diagram illustrating the original image of the input image. That is to say, the pixel values of the input image shown in FIG. 109 have been calculated from a 4-pixel average of the pixel values shown in FIG. 110.

FIG. 111 is a diagram illustrating an image generated by applying conventional class classification adaptation processing to the input image shown in FIG. 109.

FIG. 112 is a diagram illustrating an image generated by detecting the gradient of data continuity from the input image shown in FIG. 109, extracting class taps and prediction taps so that the corresponding pixel and center pixel are always the same, based on the gradient of data continuity, and performing class classification and applying adaptation processing.

FIG. 113 is a diagram illustrating an image generated from the input image shown in FIG. 109 by the image processing device shown in FIG. 5. That is to say, FIG. 113 is a diagram illustrating an image generated by detecting the gradient of data continuity from the input image, extracting class taps and prediction taps so that the corresponding pixel and center pixel are appropriately different, based on the gradient of data continuity, and performing class classification and applying adaptation processing.

FIG. 114 is a diagram illustrating another example of an input image. FIG. 115 is a diagram illustrating the original image of the input image shown in FIG. 114. That is to say, the pixel values of the input image shown in FIG. 114 have been calculated from a 4-pixel average of the pixel values shown in FIG. 115.

FIG. 116 is a diagram illustrating an image generated by applying conventional class classification adaptation processing to the input image shown in FIG. 114.

FIG. 117 is a diagram illustrating an image generated by detecting the gradient of data continuity from the input image shown in FIG. 114, extracting class taps and prediction taps so that the corresponding pixel and center pixel are always the same, based on the gradient of data continuity, and performing class classification and applying adaptation processing.

Even if class taps and prediction taps are extracted based on the gradient of the data continuity, a smooth image cannot be obtained if the corresponding pixel and center pixel are made to be the same. This is thought to be due to taps being extracted which contain the same waveform in the vertical direction, and mapped as having no change in waveform in the horizontal direction.

FIG. 118 is a diagram illustrating an image generated from the input image shown in FIG. 114 by the image processing device shown in FIG. 5. That is to say, FIG. 118 is a diagram illustrating an image generated by detecting the gradient of data continuity from the input image, extracting class taps and prediction taps so that the corresponding pixel and center pixel are appropriately different, based on the gradient of data continuity, and performing class classification and applying adaptation processing.

It is easy to see that the image generated from the input image with the image processing device shown in FIG. 5 is a smoother image than the image generated by applying conventional class classification adaptation processing, and is closer to the original image. Particularly, according to the present invention, as can be seen in the image shown in FIG. 118, the image of the moiré portion of two lines can be reproduced almost completely.

Next, FIG. 119 is a block diagram illustrating the configuration of an embodiment of a learning device for performing learning to obtain a tap coefficient for each class to be stored in the coefficient memory 105 shown in FIG. 5.

An HD image, for example, serving as an image for tap coefficient learning (tutor image), is input to the learning device shown in FIG. 119. The input image input to the learning device is supplied to a student image generating unit 801 and a tutor pixel extracting unit 809.

The student image generating unit 801 generates an SD image which is a student image from the input image (tutor image) input thereto, and supplies this to image memory 802. The student image generating unit 801 obtains the average value of the pixel values of four HD pixels which are adjacent in the horizontal direction or vertical direction in the HD image serving as the tutor image to take this as a pixel value of the SD image, for example, thereby generating an SD image serving as a student image, corresponding to the HD image serving as the tutor image. Now, the SD image needs to be of an image quality corresponding to the SD image which is to be processed by the image processing device shown in FIG. 5. The image memory 802 temporarily stores the SD image which is the student image from the student image generating unit 801.

With the learning device shown in FIG. 119, tap coefficients are generated taking the SD image as student data.

A data continuity detecting unit 803 detects the data continuity from the student image stored in the image memory 802, in the same way as with the case of the data continuity detecting unit 101 in FIG. 5, and supplies data continuity information indicating the detected continuity to a class tap extracting unit 804 and prediction tap extracting unit 807.

The detailed configuration of the data continuity detecting unit 803 is the same as that of the data continuity detecting unit 101, so description thereof will be omitted.

The class tap extracting unit 804 sequentially takes one of the pixels contained in the HD image serving as a tutor image corresponding to the SD image which is the student image stored in the image memory 802, as the pixel of interest, as with the case of the class tap extracting unit 102 in FIG. 5.

Further, the class tap extracting unit 804 extracts multiple perimeter pixels of the student image stored in the image memory 802, corresponding to the pixel of interest, based on the data continuity detected by the data continuity detecting unit 804, and takes the extracted multiple perimeter pixels of the student image as a class tap. That is to say, the class tap extracting unit 804 extracts a class tap regarding the pixel of interest from the SD image stored in the image memory 802, based on the data continuity detected by the data continuity detecting unit 803, and supplies this to the features detecting unit 805. Here, the call tap extracting unit 804 generates a class tap having the same tap configuration as that generated by the class tap extracting unit 102 in FIG. 5.

The features detecting unit 805 detects features from the student image supplied from the image memory 802 or the class tap supplied from the class tap extracting unit 804, and supplies the detected features to a class classification unit 806, in the same way as with the processing of the features detecting unit 103 in FIG. 5.

For example, the features detecting unit 805 detects a movement vector of pixels of the SD image, based on the SD image supplied from the image memory 802 or the class tap supplied from the class tap extracting unit 804, and supplies the detected movement vector to the class classification unit 806 as features. Also, for example, the features detecting unit 805 detects spatial or temporal change of pixel values of multiple pixels of the SD image or class tap based on the SD image or class tap, and supplies the detected change in pixel values to the class classification unit 806 as features.

Further, for example, the features detecting unit 805 detects the gradient of temporal change in pixel values of multiple pixels of the class tap or SD image, based on the SD image supplied from the image memory 802 or the class tap supplied from the class tap extracting unit 804, and supplies the detected gradient of change in pixel values to the class classification unit 806 as features.

Note that the Laplacian, Sobel, dispersion, etc., for the pixel values, can be obtained as features with the features detecting unit 805, in the same way as with the features detecting unit 103.

That is to say, the features detecting unit 805 detects the same features as the features detecting unit 103 in FIG. 5.

The features detecting unit 805 supplies the class tap to the class classification unit 806, separate from the features.

The class classification unit 806 is configured in the same way as with the class classification unit 104 in FIG. 5, and performs class classification of the pixel of interest to one class of one or more classes, based on the features or class tap from the features detecting unit 805, and supplies the class code indicating the class of the pixel of interest to the prediction tap extracting unit 807 and the learning memory 810.

The prediction tap extracting unit 807 is configured in the same way as the prediction tap extracting unit 106 in FIG. 5, and extracts multiple perimeter pixels of the student image corresponding to the pixel of interest, based on the data continuity detected by the data continuity detecting unit 803, and takes the extracted multiple perimeter pixels of the student image as a prediction tap. That is to say, the prediction tap extracting unit 807 extracts, from the SD image stored in the image memory 802, a prediction tap regarding the pixel of interest, based on the data continuity detected by the data continuity detecting unit 803 and the class code supplied from the class classification unit 806, and supplies this to a supplementing computing unit 808. Here, the prediction tap extracting unit 807 generates a prediction tap having the same tap configuration as that generated by the prediction tap extracting unit 106 in FIG. 5.

A tutor pixel extracting unit 809 extracts a pixel of interest from the input image (HD image) which is a tutor image as tutor data (a tutor pixel), and supplies the extracted tutor data to the supplementing computing unit 808. That is to say, the tutor pixel extracting unit 809 takes the HD image which is the input learning image, as tutor data without change, for example. Here, the HD image obtained by the image processing device in FIG. 5 has image quality corresponding to that of the HD image used as tutor data at the learning device in FIG. 119.

The supplementing computing unit 808 and normal equation computing unit 811 learn the relation between the tutor data and the student data for each class indicated by the class code supplied from the class classification unit 806, using the tutor data which is the pixel of interest and the prediction tap supplied from the prediction tap extracting unit 807, thereby obtaining the tap coefficient for each class.

That is to say, the supplementing computing unit 808 performs the supplementing of Expression (8) with regard to the prediction tap (SD pixel) supplied from the prediction tap extracting unit 807 and the HD pixel which is the tutor data which is the pixel of interest.

Specifically, the supplementing computing unit 808 uses the SD pixels $x_{n,k}$ serving as student data making up the prediction tap to perform computation equivalent to multiplication of the SD pixels in the matrix at the left side of Expression (8) one with another ($x_{n,k} x_{n',k}$), and summation ($\Sigma$).

Further, the supplementing computing unit 808 uses the SD pixels $x_{n,k}$ serving as student data making up the prediction tap and the HD pixel $y_k$ which is the tutor data which is the pixel of interest to perform computation equivalent to multiplication of the SD pixels $x_{n,k}$ of the vector with the HD pixel $y_k$ ($x_{n,k} y_k$) at the right side of Expression (8), and summation ($\Sigma$).

The supplementing computing unit 808 formulates normal equations corresponding to the Expression (8) for each class by performing the above-described supplementing with all pixels of the HD image serving as the tutor data as the pixel of interest, and then supplies the normal equations to learning memory 810.

The learning memory 810 stores normal equations corresponding to the Expression (8) supplied from the supplementing computing unit 808, wherein SD pixels have been set as student data and HD pixels as tutor data.

A normal equation computing unit 811 obtains the normal equation of Expression (8) for each class from the learning memory 810, and obtains and output the tap coefficient for each class by solving the normal equations (learning for each class) by sweeping, for example.

That is to say, the supplementing computing unit 808 and the normal equation computing unit 811 learn predicting means for predicting the pixel of interest from the extracted multiple perimeter pixels, for each of the detected features.

In this case, the predicting means are specific means for predicting the pixel of interest from the extracted multiple perimeter pixels, and refers to, for example, the pixel value predicting unit 107 regarding which the operations are stipulated by the tap coefficient for each class, or processing at the pixel value predicting unit 107. Learning the predicting means for predicting the pixel of interest from multiple perimeter pixels means to realize (construct), for example, predicting means for predicting the pixel of interest from multiple perimeter pixels.

Accordingly, learning the predicting means for predicting the pixel of interest from multiple perimeter pixels means to obtain tap coefficients for each of the classes, for example. Obtaining tap coefficients for each of the classes specifically determines the pixel value predicting unit 107 or processing at the pixel value predicting unit 107, whereby the pixel value predicting unit 107 is realized or processing at the pixel value predicting unit 107 is executed.

The coefficient memory 812 stores the tap coefficients for each class output from the normal equation calculating unit 811.

Next, the learning processing for obtaining the tap coefficient for each class, which is performed by the learning device shown in FIG. 119, will be described with reference to the flowchart in FIG. 120.

First, in step S801, the student image generating unit 801 obtains a learning input image (tutor image) which is an HD image for example, and thins out pixels, thereby generating a student image which is an SD image, for example. For example, the student image generating unit 801 obtains the average value of four HD pixels which are horizontally or vertically adjacent in the HD image, and takes the average value as the pixel value of the SD image, thereby generating an SD image. The SD image is supplied to the image memory 802.

In step S802, the data continuity detecting unit 803, as with the case of the data continuity detecting unit 101 in FIG. 5, detects data continuity from the student image stored in the image memory 802, supplies data continuity information indicating the detected continuity to the class tap extracting unit 804 and the prediction tap extracting unit 807, and the flow proceeds to step S803.

Details of the processing for detecting data continuity in step S802 are the same as the processing in step S101, so description of the details thereof will be omitted.

The flow then proceeds to step S803, where the class tap extracting unit 804 selects, from the HD pixels in the HD image serving as the tutor data, one which has not been yet taken as a pixel of interest, as the pixel of interest. The class tap extracting unit 804, in the same way as with the case of the class tap extracting unit 102 in FIG. 5, extracts multiple perimeter pixels in the student image stored in the image memory 802 which corresponds to the pixel of interest, based on the data continuity detected in the processing in step S802, and takes the multiple perimeter pixels of the student image extracted as a class tap.

That is to say, the class tap extracting unit 804 extracts, from the SD image stored in the image memory 802, a class tap regarding the pixel of interest based on the data continuity detected by the data continuity detecting unit 803, and supplies this to the features detecting unit 805. The class tap extracting unit 804 supplies the class tap to the features detecting unit 805, and the flow proceeds to the step S804.

In step S804, the features detecting unit 805, as with the case of the features detecting unit 103 in FIG. 5, detects, from the student image generated in the processing of step S801 or the class tap extracted in the processing of step S803, features such as a movement vector or change in the pixel values of the pixels of the SD image, or the like, supplies the detected features to the class classification unit 806, and the flow proceeds to step S805.

In step S805, the class classification unit 806, as with the case of the class classification unit 104 in FIG. 5, uses the features from the features detecting unit 805 or the class tap to classify the pixel of interest into one class of the one or more classes, supplies class code representing the class of the pixel of interest to the prediction tap extracting unit 807 and the learning memory 810, and the flow proceeds to step S806.

In step S806, the prediction tap extracting unit 807, as with the case of the prediction tap extracting unit 106 in FIG. 5, extracts multiple perimeter pixels of the student image corresponding to the pixel of interest, based on the data continuity detected by the data continuity detecting unit 803, and takes the extracted multiple perimeter pixels of the student image as a prediction tap. That is to say, the prediction tap extracting unit 807 extracts, from the SD image serving as a student image stored in the image memory 802, a prediction tap corresponding to the pixel of interest, based on the data continuity detected by the data continuity detecting unit 803 and the class code supplied from the class classification unit 806, and supplies this to the supplementing computing unit 808, and the flow proceeds to step S807.

In step S807, the tutor pixel extracting unit 809 extracts the pixel of interest, i.e., the tutor pixel (tutor data) which is an HD pixel from the input image, and supplies the extracted tutor pixel to the supplementing computing unit 808, and the flow proceeds to step S808.

In step S808, the supplementing computing unit 808 performs the supplementing in the above-described Expression (8) regarding the prediction tap (student data) supplied from the prediction tap extracting unit 807 and the tutor pixel (tutor data) supplied from the tutor pixel extracting unit 809, and stores the normal equation supplemented with the student data and the tutor data in the learning memory 810, and the flow proceeds to step S809.

In step S809, the class tap extracting unit 804 determines whether or not there are yet HD pixels of the HD image serving as tutor data which have not been taken as the pixel of interest, i.e., whether or not supplementing of all pixels to be processed has ended. In the event that determination is made in step S809 that there are HD pixels of the HD image serving as tutor data which have not yet been taken as the pixel of interest, the flow returns to step S803, and the same processing is subsequently repeated.

Also, in the event that determination is made in step S809 that are no more HD pixels of the HD image serving as tutor data which have not been taken as the pixel of interest, i.e., that supplementing of all pixels to be processed has ended, the flow proceeds to step S810, where the normal equation calculating unit 811 reads out from the learning memory 810 the normal equations for classes regarding which tap coefficients have not yet been obtained, from the normal equations of Expression (8) obtained for each class by supplementing in the earlier step S808, and solves the normal equations of Expression (8) read out by sweeping or the like (learns for each class), obtains a prediction coefficient (tap coefficient) for a predetermined class, and supplies this to the coefficient memory 812. The coefficient memory 812 stores the prediction coefficient (tap coefficient) for a predetermined class supplied from the normal equation calculating unit 811 for each class, and the flow proceeds to step S811.

That is to say, in step S808 and step S810, the predicting means for predicting the pixel of interest from the multiple perimeter pixels extracted by the prediction tap extracting 807 are learned for each of the features detected by the features detecting unit 805.

In step S811, the normal equation calculating unit 811 determines whether or not computation of the prediction coefficients has ended for all classes, and in the event that determination is made that computation of the prediction coefficients has not ended for all classes, the flow returns to step S810, and the processing for obtaining he prediction coefficient for the next class is repeated.

In the event that determination is made in step S811 that computation of the prediction coefficients has ended for all classes, the processing ends.

Thus, prediction coefficients for each class stored in the coefficient memory 812 are stored in the coefficient memory 105 of the image processing device shown in FIG. 5.

Now, with the learning processing of prediction coefficients (tap coefficients) as described above, there may be cases wherein, depending on the image or the like for learning that is prepared, classes are generated regarding which the number of normal equations necessary for obtaining tap coefficients cannot be obtained; regarding such classes, a default tap coefficient can be output at the normal equation computing unit 811, etc., for example. Or, an arrangement may be made wherein, in the event that classes are generated regarding which the number of normal equations necessary for obtaining tap coefficients cannot be obtained, a new learning image is prepared, and the tap coefficient learning is performed again. This holds true for learning of tap coefficients with the later-described learning device, as well.

FIG. 121 is a block diagram illustrating another configuration of an embodiment of the image processing device according to the present invention.

The image processing device of which the configuration is shown in FIG. 121 acquires an input image, and creates and outputs an image with twice the resolution in the horizontal direction of the screen as to the input image that is input (hereafter referred to as a horizontal double-density image).

With the image processing device shown in FIG. 121, for example, an SD image which is an example of an input image is input, the data continuity is detected from the input SD image, and class classification adaptation processing is performed on the SD image based on the detected data continuity, thereby creating pixels of a horizontal double-density image (hereafter called horizontal double-density pixels), as well as class classification adaptation processing being performed on the SD image without using data continuity, thereby creating horizontal double-density pixels. The integration properties of the horizontal double-density pixels created as to the SD image based on the data continuity are determined, and based on the determination results, one is selected of the horizontal double-density pixels created based on the data continuity and the horizontal double-density pixels created without using the data continuity, and output image which is a horizontal double-density image is synthesized with the selected horizontal double-density pixels, and the synthesized image is output.

That is to say, with the image processing device of which the configuration is shown in FIG. 121, a data continuity detecting unit 901, a class tap extracting unit 902, a features detecting unit 903, a class classification unit 904, coefficient memory 905, a prediction tap extracting unit 906, a pixel value predicting unit 907, an integration property determining unit 908, an image synthesizing unit 909, a class tap extracting unit 910, a features detecting unit 911, a class classification unit 912, coefficient memory 913, a prediction tap extracting unit 914, and a pixel value predicting unit 915, are provided.

An input image is provided to the data continuity detecting unit 901, class tap extracting unit 902, features detecting unit 903, prediction tap extracting unit 906, integration property determining unit 908, class tap extracting unit 910, features detecting unit 911, and prediction tap extracting unit 914.

The data continuity detecting unit 901 detects data continuity from the input image, and supplies data continuity information indicating the detected continuity to the class tap extracting unit 902 and the prediction tap extracting unit 906. The data continuity information includes the direction (temporal or spatial angle or gradient) of the region of pixels having data continuity, for example (hereafter also referred to as data continuity direction).

The data continuity detecting unit 901 is configured in the same way as with the data continuity detecting unit 101, so detailed description thereof will be omitted. Processing of detecting data continuity with the data continuity detecting unit 901 is the same as the case of the data continuity detecting unit 101, so description thereof will be omitted.

The class tap extracting unit 902 sequentially takes one of the horizontal double-density pixels of the horizontal double-density image to be obtained by class classification adaptation processing as the pixel of interest. The class tap extracting unit 902 then extracts multiple perimeter pixels of the input image corresponding to the pixel of interest, based on the data continuity detected by the data continuity detecting unit 901, and takes the extracted multiple perimeter pixels of the input image as a class tap. That is to say, the class tap extracting unit 902 extracts a class tap to be used for class classification regarding the pixel of interest from the input image, based on the data continuity detected by the data continuity detecting unit 901, and outputs the extracted class tap to the features detecting unit 903.

For example, the class tap extracting unit 902 extracts, as a class tap, multiple pixels at positions spatially or temporally close to the position of the pixel of interest based on the data continuity, from the input image that has been input, and outputs this to the features detecting unit 903.

Note that the data continuity detecting unit 901, class tap extracting unit 902, and prediction tap extracting unit 906 can be provided with frame memory, in the same way as with the case of the data continuity detecting unit 101, class tap extracting unit 102, and prediction tap extracting unit 106.

Also, a single frame memory can be provided on the input side with the image processing device shown in FIG. 121, as well.

For example, the class tap extracting unit 902 extracts from the input image, 3×3 pixels, horizontally×vertically, closest to the position of the pixel of interest, thereby taking a class tap with regard to the pixel of interest, based on the data continuity detected by the data continuity detecting unit 901.

The class tap extracting unit 902 supplies the extracted class tap to the features detecting unit 903.

The processing of class tap extracting by the class tap extracting unit 902 is the same as with the case of the class tap extracting unit 102, and accordingly, detailed description thereof will be omitted.

The features detecting unit 903 detects features from the class tap supplied from the class tap extracting unit 902 or the input image, and supplies the detected features to the class classification unit 904.

For example, the features detecting unit 903 detects a movement vector of pixels of the input image, based on the class tap supplied from the class tap extracting unit 902 or the input image, and supplies the detected movement vector to the class classification unit 904 as features. Also, for example, the features detecting unit 903 detects spatial or temporal change (activity) of pixel values of multiple pixels of the class tap or input image, based on the class tap or the input image, and supplies the detected change in pixel values to the class classification unit 904 as features.

Further, for example, the features detecting unit 903 detects the gradient of temporal change in pixel values of multiple pixels of the class tap or the input image, based on the class tap supplied from the class tap extracting unit 902 or the input image, and supplies the detected gradient of change in pixel values to the class classification unit 904 as features.

Note that the Laplacian, Sobel, dispersion, etc., for the pixel values, can be used as features.

The features detecting unit 903 supplies the class tap to the class classification unit 904, separate from the features.

The class classification unit 904 performs class classification of the pixel of interest to one class of one or more classes, based on the features or class tap from the features detecting unit 903, and supplies the resulting class code corresponding to the class of the pixel of interest to the coefficient memory 905 and the prediction tap extracting unit 906.

The class classification unit 904 generates class codes with the same processing as the class classification unit 104, and accordingly detailed description thereof will be omitted.

The coefficient memory 905 stores tap coefficients obtained by learning, for each of one or more classes, the relation between tutor data which is horizontal double-density pixels of a horizontal double-density image which is an example of an output image serving as a tutor for learning, and student data which is the pixel values of an SD image which is an example of an input image serving as a student for learning. Upon class code of the pixel of interest being supplied from the class classification unit 904, the coefficient memory 905 reads out the tap coefficient stored in the address corresponding to the class code, thereby obtaining the tap coefficient for the class of the pixel of interest, which is supplied to the pixel value predicting unit 907.

Note that the tap coefficients stored in the coefficient memory 905 are learned by the learning device of which the configuration is shown in FIG. 119 or the learning processing described with reference to the flowchart shown in FIG. 120. In this case, the learning device of which the configuration is shown in FIG. 119 receives input of a horizontal double-density image as the input image, and the student generating unit 801 generates an SD image from the horizontal double-density image. In the same way, in step S801, and an SD image is generated from the horizontal double-density image which is the input image.

The prediction tap extracting unit 906 extracts multiple perimeter pixels corresponding to the pixel of interest from the input image, based on the data continuity detected by the data continuity detecting unit 901, and takes the extracted multiple perimeter pixels of the input image as a prediction tap. That is to say, the prediction tap extracting unit 906 extracts, from the input image, a prediction tap used to obtain (the prediction value of) the pixel of interest at the pixel value predicting unit 907, based on the data continuity detected by the data continuity detecting unit 901 and the class code supplied from the class classification unit 904, and supplies the extracted prediction tap to the pixel value predicting unit 907.

For example, the prediction tap extracting unit 906 extracts, from the input image, multiple pixel values at positions spatially or temporally near the pixel of interest, based on the data continuity, so as to take these as a prediction tap, which is supplied to the pixel value predicting unit 907. For example, the prediction tap extracting unit 906 extracts, from an input image, 3×3 pixels, horizontally×vertically, closest to the position of the pixel of interest, thereby taking a prediction tap with regard to the pixel of interest, based on the data continuity detected by the data continuity detecting unit 901.

Note that the pixel values to be taken as the class tap and the pixel values to be taken as the prediction tap may be the same, or may differ. That is to say, the class tap and prediction tap can be each individually configured (generated). Also, the pixel values to be taken as the prediction tap may be different for each class, or the same.

Note that the configurations of the class tap and prediction tap are not restricted to 3×3 pixel values.

The processing of prediction tap extracting by the prediction tap extracting unit 906 is the same as the case of the prediction tap extracting unit 106, and accordingly, detailed description thereof will be omitted.

The pixel value predicting unit 907 performs the integration computation shown in Expression (1) using the tap coefficients $w_1, w_2, \ldots$ regarding the class of the pixel of interest supplied from the coefficient memory 905, and (the prediction values making up) the prediction taps $x_1, x_2, \ldots$ from the prediction tap extracting unit 906, thereby predicting (the prediction value of) the pixel of interest y, which is taken as the pixel value of the horizontal double-density pixel. The pixel value predicting unit 907 supplies the pixel values of the horizontal double-density pixels computed in this way, to the integration property determining unit 908 and image synthesizing unit 909.

For example, the class tap extracting unit 902 takes the pixel $y^{(1)}$ and the pixel $y^{(2)}$ which are encompassed in the spatial direction by the corresponding pixel $x^{(5)}$ of the input image shown in FIG. 122 as a pixel of interest, the pixel value predicting unit 907 predicts the pixel value of the pixel of interest $y^{(1)}$ and the pixel value of the pixel of interest $y^{(2)}$ shown in FIG. 122, and supplies the predicted pixel value of the pixel of interest $y^{(1)}$ and pixel value of the pixel of interest $y^{(2)}$ to the integration property determining unit 908 and image synthesizing unit 909.

The integration property determining unit 908 detects the relation between a first prediction value of a first pixel of interest predicted by the pixel value predicting unit 907, a second prediction value of a second pixel of interest of the output image, which is spatially adjacent to the first pixel of interest, predicted by the pixel value predicting unit 907, and the pixel value of a corresponding pixel of the input image disposed at a position encompassing at least the first pixel of interest and the second pixel of interest in the spatial direction.

That is to say, for example, the integration property determining unit 908 detects the relation between the prediction value of the pixel of interest $y^{(1)}$, the prediction value of the pixel of interest $y^{(2)}$, and the corresponding pixel $x^{(5)}$ of the input image which is disposed at a position encompassing the pixel of interest $y^{(1)}$ and the pixel of interest $y^{(2)}$ in the spatial direction, as shown in FIG. 122.

Now, the relation between the pixel of interest $y^{(1)}$, the pixel of interest $y^{(2)}$, and the corresponding pixel $x^{(5)}$ of the input image which is disposed at a position encompassing the pixel of interest $y^{(1)}$ and the pixel of interest $y^{(2)}$ in the spatial direction, will be described.

FIG. 123 is a diagram corresponding to FIG. 7, for describing the array of pixels provided to the image sensor which is a CCD, and regions corresponding to the pixels of the horizontal double-density image. In FIG. 123, A through I represent individual pixels. Regions a through r represent photoreception regions where the individual pixels A through I have been halved vertically. In the event that the width of the photoreception region of the pixels A through I is 2 L, the width of the regions a through r is L. The image processing device of which the configuration is shown in FIG. 121 calculates the pixel values of the pixels corresponding to the regions a through r.

FIG. 124 is a diagram for describing the pixel values of the pixels corresponding to the light cast onto the region g through the region l. F(x) in FIG. 124 is an example of a function representing the intensity distribution of light of the real world, which takes a coordinate x in the spatial direction X in space (on the detecting element) as a variable.

Assuming that the pixel value of one pixel is represented by uniform integration of F(x), the pixel value Y1 of the pixel corresponding to the region i is represented by Expression (50), the pixel value Y2 of the pixel corresponding to the region j is represented by Expression (51), and the pixel value Y3 of the pixel E is represented by Expression (52).

$$Y1 = \int_{x_1}^{x_2} F(x)dx \cdot \frac{1}{L} \quad (50)$$

$$Y2 = \int_{x_2}^{x_3} F(x)dx \cdot \frac{1}{L} \quad (51)$$

-continued $$Y3 = \int_{x_1}^{x_3} F(x)dx \cdot \frac{1}{2L} \quad (52)$$
$$= \frac{Y1 + Y2}{2}$$

In Expression (50) through Expression (52), x1, x2, and x3 are spatial coordinates of the boundaries of the photoreception region of the pixel E, region I, and region j, respectively.

Y1 and Y2 in Expression (50) through Expression (52) each correspond to the pixel values of the horizontal double-density pixels (pixel of interest $y^{(1)}$ or pixel of interest $y^{(2)}$ of the horizontal double-density image as to the SD image, which the image processing device shown in FIG. 121 is to obtain. Also, Y3 in Expression (52) corresponds to the pixel value of the SD pixel (corresponding pixel) corresponding to the pixel values Y1 and Y2 of the horizontal double-density pixels in the horizontal double-density image.

Substituting Y3 with $x^{(5)}$, Y1 with $y^{(1)}$, and Y2 with $y^{(2)}$, respectively, Expression (53) can be yielded from Expression (52).

$$x^{(5)} = (y^{(1)} + y^{(2)})/2 \quad (53)$$

The integration property determining unit 908 determines whether or not Expression (53) holds regarding the prediction value of the pixel of interest $y^{(1)}$, the prediction value of the pixel of interest $y^{(2)}$, and the corresponding pixel $x^{(5)}$ of the input image which is disposed at a position encompassing the pixel of interest $y^{(1)}$ and the pixel of interest $y^{(2)}$ in the spatial direction shown in FIG. 112.

In the event that Expression (53) holds, the prediction value of the pixel of interest $y^{(1)}$ and the prediction value of the pixel of interest $y^{(2)}$ can be said to be true. In other words, in the event that Expression (53) does not hold, the prediction processing of the pixel of interest $y^{(1)}$ and the prediction processing of the pixel of interest $y^{(2)}$ can be said to have failed.

Describing in the further detail, the integration property determining unit 908 subtracts the pixel value of (the prediction value of) the pixel of interest $y^{(1)}$ and pixel value of (the prediction value of) the pixel of interest $y^{(2)}$ supplied from the pixel predicting unit 907 from the pixel value of the corresponding pixel $x^{(5)}$ of the input image. The integration property determining unit 908 compares the subtraction results with a threshold value set beforehand. In the event that the subtraction results are smaller than the threshold value, the integration property determining unit 908 determines that the relation in Expression (53) holds, and in the event that the subtraction results are equal to or greater than the threshold value, determines that the relation in Expression (53) does not hold. The integration property determining unit 908 supplies integration property determination information which indicates the determination results to the image synthesizing unit 909.

Note that the threshold value may be stored in the integration property determining unit 908 beforehand, or may be externally supplied to the integration property determining unit 908.

The class tap extracting unit 910 sequentially takes one of the horizontal double-density pixels of the horizontal double-density image to be obtained by class classification adaptation processing as the pixel of interest. The class tap extracting unit 910 takes as the pixel of interest the pixel taken as the pixel of interest by the class tap extracting unit 902. That is to say, the class tap extracting unit 910 and the class tap extracting unit 902 both take the same pixel as the pixel of interest.

The class tap extracting unit 910 then extracts multiple perimeter pixels of the input image corresponding to the pixel of interest, and takes the extracted multiple perimeter pixels of the input image as a class tap. That is to say, the class tap extracting unit 910 extracts a class tap to be used for class classification regarding the pixel of interest from the input image, and outputs the extracted class tap to the features detecting unit 911.

For example, the class tap extracting unit 910 extracts, as a class tap, multiple pixels at positions spatially or temporally close to the position of the pixel of interest, from the input image that has been input, and outputs this to the features detecting unit 911.

Note that the class tap extracting unit 910 and prediction tap extracting unit 914 can be provided with frame memory, in the same way as with the case of the class tap extracting unit 102 and prediction tap extracting unit 106.

For example, as shown in FIG. 122, the class tap extracting unit 910 extracts from the input image, 3×3 pixels, horizontally×vertically, which are pixel $x^{(1)}$ through pixel $x^{(9)}$, closest to the position of the pixel of interest, thereby taking a class tap with regard to the pixel of interest $y^{(1)}$.

The class tap extracting unit 910 supplies the extracted class tap to the features detecting unit 911.

Note that the class tap extracted by the class tap extracting unit 910 may be the same class tap as that extracted by the class tap extracting unit 902, or may be a different one.

The features detecting unit 911 detects features from the class tap supplied from the class tap extracting unit 910 or the input image, and supplies the detected features to the class classification unit 912.

For example, the features detecting unit 911 detects a movement vector of pixels of the input image, based on the class tap supplied from the class tap extracting unit 910 or the input image, and supplies the detected movement vector to the class classification unit 912 as features. Also, for example, the features detecting unit 911 detects spatial or temporal change (activity) of pixel values of multiple pixels of the class tap or input image, based on the class tap supplied from the class tap extracting unit 910 or the input image, and supplies the detected change in pixel values to the class classification unit 912 as features.

Further, for example, the features detecting unit 911 detects the gradient of temporal change in pixel values of multiple pixels of the class tap or the input image, based on the class tap supplied from the class tap extracting unit 910 or the input image, and supplies the detected gradient of temporal change in pixel values to the class classification unit 912 as features.

Note that the Laplacian, Sobel, dispersion, etc., for the pixel values, can be used as features.

The features detecting unit 911 supplies the class tap to the class classification unit 912, separate from the features.

The class classification unit 912 performs class classification of the pixel of interest to one class of one or more classes, based on the features or class tap from the features detecting unit 911, and supplies the resulting class code corresponding to the class of the pixel of interest to the coefficient memory 913 and the prediction tap extracting unit 914.

The coefficient memory 913 stores tap coefficients obtained by learning, for each of one or more classes, the relation between tutor data which is horizontal double-density pixels of a horizontal double-density image which is an example of an output image serving as a tutor for learning, and student data which is pixel values of an SD image which is an example of an input image serving as a student for learning. Upon the class code of the pixel of interest being supplied from the class classification unit 912, the coefficient memory 913 reads out the tap coefficient stored in the address corresponding to the class code, thereby obtaining the tap coefficient for the class of the pixel of interest, which is supplied to the pixel value predicting unit 915.

The details of the learning method of tap coefficients stored in the coefficient memory 913 will be described later.

The prediction tap extracting unit 914 extracts multiple perimeter pixels corresponding to the pixel of interest from the input image, and takes the extracted multiple perimeter pixels of the input image as a prediction tap. That is to say, the prediction tap extracting unit 914 extracts, from the input image, a prediction tap used to obtain (the prediction value of) the pixel of interest at the pixel value predicting unit 915, based on the class code supplied from the class classification unit 912, and supplies the extracted prediction tap to the pixel value predicting unit 915.

For example, the prediction tap extracting unit 914 extracts, from the input image, multiple pixel values at positions spatially or temporally near the pixel of interest, based on the class code supplied from the class classification unit 912, so as to take these as a prediction tap, which is supplied to the pixel value predicting unit 915. For example, as shown in FIG. 122, the prediction tap extracting unit 914 extracts, from an input image, 3×3 pixels, horizontally×vertically, which are pixel $x^{(1)}$ through pixel $x^{(9)}$, closest to the position of the pixel of interest, class code supplied from the class classification unit 912, thereby taking a class tap with regard to the pixel of interest $y^{(1)}$.

Note that the pixel values to be taken as the class tap and the pixel values to be taken as the prediction tap may be the same, or may differ. That is to say, the class tap and prediction tap can be each individually configured (generated). Also, the pixel values to be taken as the prediction tap may be different for each class, or the same.

Note that the configurations of the class tap and prediction tap are not restricted to 3×3 pixel values.

Note that the prediction tap extracted by the prediction tap extracting unit 914 may be the same prediction tap as that extracted by the prediction tap extracting unit 906, or may be a different one.

The pixel value predicting unit 915 performs the integration computation shown in Expression (1) using the tap coefficients $w_1, w_2, \ldots$ regarding the class of the pixel of interest supplied from the coefficient memory 913, and (the prediction values making up) the prediction taps $x_1, x_2, \ldots$ from the prediction tap extracting unit 914, thereby predicting (the prediction value of) the pixel of interest y, which is taken as the pixel value of the horizontal double-density image. The pixel value predicting unit 915 supplies the pixel values of the horizontal double-density pixels computed in this way, to the image synthesizing unit 909.

For example, the class tap extracting unit 910 takes as a pixel of interest the pixel $y^{(1)}$ and the pixel $y^{(2)}$ shown in FIG. 122 which are encompassed in the spatial direction by the corresponding pixel $x^{(5)}$ of the input image, the pixel value predicting unit 915 predicts the pixel value of the pixel of interest $y^{(1)}$ and the pixel value of the pixel of interest $y^{(2)}$ shown in FIG. 122, and supplies the predicted pixel value of the pixel of interest $y^{(1)}$ and pixel value of the pixel of interest $y^{(2)}$ to the image synthesizing unit 909.

The image synthesizing unit 909 selects either one or the other of the prediction values supplied from the pixel value predicting unit 907 and the pixel value predicting unit 915, based on the integration property determination information supplied from the integration property determining unit 908, and synthesizes the image by setting the selected prediction value to the output image as the pixel value.

That is to say, in the event that integration property determination information indicating that the relation of Expression (53) holds is supplied from the integration property determining unit 908, the prediction value of the pixel of interest $y^{(1)}$ and the prediction value of the pixel of interest $y^{(2)}$ supplied from the pixel value predicting unit 907 are true, so the prediction value of the pixel of interest $y^{(1)}$ and the prediction value of the pixel of interest $y^{(2)}$ supplied from the pixel value predicting unit 907 are set as pixel values of the output image by the image synthesizing unit 909.

On the other hand, in the event that integration property determination information indicating that the relation of Expression (53) does not hold is supplied from the integration property determining unit 908, the prediction value of the pixel of interest $y^{(1)}$ and the prediction value of the pixel of interest $y^{(2)}$ supplied from the pixel value predicting unit 907 are not true, i.e., the processing of prediction at the pixel predicting unit 907 has failed, so the prediction value of the pixel of interest $y^{(1)}$ and the prediction value of the pixel of interest $y^{(2)}$ supplied from the pixel value predicting unit 915 are set as pixel values of the output image by the image synthesizing unit 909.

The image synthesizing unit 909 outputs the output image thus synthesized.

That is to say, the image synthesizing unit 909 selectively outputs the prediction value of the pixel of interest $y^{(1)}$ and the prediction value of the pixel of interest $y^{(2)}$ output from the pixel value predicting unit 907, according to the detection results of the relation between the prediction value of the pixel of interest $y^{(1)}$ predicted by the pixel value predicting unit 907, the prediction value of the pixel of interest $y^{(2)}$ predicted by the pixel value predicting unit 907, and the pixel value of the corresponding pixel $x^{(5)}$ in the input image which is disposed at a position encompassing the at least the pixel of interest $y^{(1)}$ and the pixel of interest $y^{(2)}$ in the spatial direction.

FIG. 125 is a diagram illustrating an example of an output image including prediction values from the pixel value predicting unit 907, wherein the relation of Expression (53) does not hold.

FIG. 126 is a diagram illustrating an example of an output image of the image processing device shown in FIG. 121, i.e., an example of an output image wherein prediction values from the pixel value predicting unit 907 wherein the relation of Expression (53) does not hold have been substituted with prediction values from the pixel value predicting unit 915.

Thus, the image processing device according to the present invention can avoid prediction failure.

In this way, the image processing device of which the configuration is shown in FIG. 121 is capable of creating an output image with higher resolution, corresponding to an input image that has been input, and outputting the created image.

Next, the image creation processing for creating an output with higher resolution from an input image which the image processing device in FIG. 121 performs, will be described with reference to the flowchart in FIG. 127.

In step S901, the data continuity detecting unit 901 executes the processing for detecting continuity. The data continuity detecting unit 901 detects the data continuity contained in the input image, and supplies data continuity information indicating the detected data continuity to the class tap extracting unit 902 and prediction tap extracting unit 906. For example, the data continuity detecting unit 901 detects the direction of data continuity from the input image.

In step S902, the class tap extracting unit 902 selects a pixel of interest which is a horizontal double-density pixel of interest in the horizontal double-density image to be created. The class tap extracting unit 902 extracts multiple perimeter pixels corresponding to the pixel of interest in the input image, based on the data continuity detected by the data continuity detecting unit 901, and takes the multiple perimeter pixels of the input image that have been extracted, as a class tap. The class tap is supplied to the features detecting unit 903, and the flow proceeds to step S903. For example, the class tap extracting unit 902 extracts, from the input image, multiple pixel values spatially or temporally close to the position of the pixel of interest, based on the data continuity detected by the data continuity detecting unit 901, as a class tap, thereby generating a class tap.

In step S903, the features detecting unit 903 detects the features from the input image or the class tap extracted in the processing in step S902, supplies the detected features to the class classification unit 904, and also supplies the class tap to the class classification unit 904, and the flow proceeds to step S904.

In step S904, the class classification unit 904 performs class classification with regard to the pixel of interest to one of the one or more classes, based on the features or the class tap supplied from the features detecting unit 903, supplies the class code representing the class of the pixel of interest obtained as a result to the coefficient memory 905 and the prediction tap extracting unit 906, and the flow proceeds to step S905.

In step S905, the prediction tap extracting unit 906 extracts multiple perimeter pixels corresponding to the pixel of interest from the input image, based on the data continuity detected by the data continuity detecting unit 901, and takes the multiple perimeter pixels of the input image extracted as a prediction tap. The processing of extracting the prediction tap with the prediction tap extracting unit 906 is the same as with the processing with the class tap extracting unit 902, and accordingly description thereof will be omitted.

The prediction tap extracting unit 906 extracts multiple pixels values which are spatially or temporally close to the position of the pixel of interest from the input image as a prediction tap, based on the data continuity detected by the data continuity detecting unit 901 and the class code supplied from the class classification unit 904, thereby generating a prediction tap. The prediction tap is supplied to the pixel value predicting unit 907, and the processing proceeds to step S906.

In step S906, the coefficient memory 905 reads out the prediction coefficient (tap coefficient) stored in the address corresponding to the class code, supplied from the class classification unit 904, thereby obtaining the prediction coefficient for the class of the pixel of interest, the prediction coefficient is supplied to the pixel value predicting unit 907, and the flow proceeds to step S907.

In step S907, the pixel value predicting unit 907 predicts (the prediction value of) the pixel of interest form the multiple perimeter pixels which have been extracted by the prediction tap extracting unit 906, by adaptation processing, based on the features detected by the features detecting unit 903, and the flow proceeds to step S908. That is to say, in step S907, the pixel value predicting unit 907 performs the computation shown in Expression (1) using the prediction tap from the prediction tap extracting unit 906 and the prediction coefficient (tap coefficient) from the coefficient memory 905, thereby predicting (the prediction value of) the pixel of interest.

In step S901 through step S907, the pixel values of two pixels of interest encompassed by one corresponding pixel of the input image in the spatial direction are predicted based on the data continuity.

In step S908, the class tap extracting unit 910 selects a pixel of interest which is a horizontal double-density pixel of interest in the horizontal double-density image to be created. The class tap extracting unit 910 extracts multiple perimeter pixels corresponding to the pixel of interest in the input image, and takes the multiple perimeter pixels of the input image that have been extracted, as a class tap. The class tap is supplied to the features detecting unit 911, and the flow proceeds to step S909. For example, the class tap extracting unit 910 extracts, from the input image, multiple pixel values spatially or temporally close to the position of the pixel of interest, as a class tap, thereby generating a class tap.

In step S909, the features detecting unit 911 detects the features from the input image or the class tap extracted in the processing in step S908, supplies the detected features to the class classification unit 912, and also supplies the class tap to the class classification unit 912, and the flow proceeds to step S910.

In step S910, the class classification unit 912 performs class classification with regard to the pixel of interest to one of the one or more classes, based on the features or the class tap supplied from the features detecting unit 911, supplies the class code representing the class of the pixel of interest obtained as a result to the coefficient memory 913 and the prediction tap extracting unit 914, and the flow proceeds to step S911.

In step S911, the prediction tap extracting unit 914 extracts multiple perimeter pixels corresponding to the pixel of interest from the input image, based on the class code supplied from the class classification unit 912, and takes the multiple perimeter pixels of the input image extracted as a prediction tap. That is to say, the prediction tap extracting unit 914 extracts multiple pixels values which are spatially or temporally close to the position of the pixel of interest from the input image as a prediction tap, based on the class code supplied from the class classification unit 912, thereby generating a prediction tap. The prediction tap is supplied to the pixel value predicting unit 915, and the processing proceeds to step S912.

In step S912, the coefficient memory 913 reads out the prediction coefficient (tap coefficient) stored in the address corresponding to the class code supplied from the class classification unit 912, thereby obtaining the prediction coefficient for the class of the pixel of interest, the prediction coefficient is supplied to the pixel value predicting unit 915, and the flow proceeds to step S913.

In step S913, the pixel value predicting unit 915 predicts (the prediction value of) the pixel of interest from the multiple perimeter pixels which have been extracted by the prediction tap extracting unit 914, by adaptation processing, based on the features detected by the features detecting unit 911, and the flow proceeds to step S914. That is to say, in step S913, the pixel value predicting unit 915 performs the computation shown in Expression (1) using the prediction tap from the prediction tap extracting unit 914 and the prediction coefficient (tap coefficient) from the coefficient memory 913, thereby predicting (the prediction value of) the pixel of interest.

In step S908 through step S913, the pixel values of two pixels of interest encompassed by one corresponding pixel of the input image in the spatial direction are predicted without using the data continuity.

In step S914, the integration property determining unit 908 determines whether or not integration properties hold regarding the prediction values of the two pixels of interest predicted in the processing of step S907 and the corresponding pixel of the input image which is disposed at a position encompassing the two pixels of interest in the spatial direction, and the flow proceeds top step S915.

For example, in step S914, (the prediction value of) the two pixels of interest supplied from the pixel value predicting unit 907 are subtracted from the pixel value of the corresponding pixel of the input image. The subtraction results are compared with a threshold value set beforehand. In the event that the subtraction results are smaller than the threshold value, determination is made that integration properties hold, and in the event that the subtraction results are equal to or greater than the threshold value, determination is made that integration properties do not hold. The integration property determination information which indicates the determination results is supplied to the image synthesizing unit 909.

That is to say, in step S914, the relation is detected between the first prediction value of the first pixel of interest predicted by the pixel value predicting unit 907, the second prediction value of the second pixel of interest predicted by the pixel value predicting unit 907, which is spatially adjacent to the first pixel of interest, and the corresponding pixel of the input image which is disposed at a position encompassing at least the first pixel of interest and the second pixel of interest in the spatial direction.

In step S915, the image synthesizing unit 909 selects either one or the other of the prediction value predicted by the pixel value predicting unit 907 and the prediction value predicted by the pixel value predicting unit 915, based on the results of the determination made in step S914, and synthesizes the image by setting the selected prediction value to the output image as the pixel value, and the flow proceeds to step S916.

That is to say, in the event that the image synthesizing unit 909 determines in step S914 that integration properties hold, the prediction values of the two pixels of interest predicted in the processing in step S907 are true, so in step S915 the prediction values of the two pixels of interest predicted in the processing in step S907 are set as pixel values of the output image, thereby synthesizing the output image.

On the other hand, in the event that the image synthesizing unit 909 determines in step S914 that integration properties do not hold, the prediction values of the two pixels of interest predicted in the processing in step S907 are not true, i.e., the prediction processing in step S907 has failed, so in step S915 the prediction values of the two pixels of interest predicted in the processing in step S913 are set as pixel values of the output image.

In step S916, the class tap extracting unit 902 determines whether or not there are pixels in the frame of interest of the horizontal double-density image which have not yet been taken as the pixel of interest, and in the event that determination is made that such exist, the flow returns to step S902, and the same processing is subsequently repeated.

Also, in the event that determination is made in step S916 that there are no pixels in the frame of interest of the horizontal double-density image which have not yet been taken as the pixel of interest, i.e., in the event that all horizontal double-density pixels making up the frame of interest have been predicted, the image synthesizing unit 909 outputs the synthesized output image, and the processing ends.

That is to say, in step S916, the prediction values of the two pixels of interest predicted in the processing of step S907 are selectively output, based on the detection results regarding the relation between the prediction values of the two pixels of interest predicted by the processing in step S907, and the pixel value of the corresponding pixel in the input image which is disposed at a position encompassing at least the two pixels of interest in the spatial direction.

In this way, the image processing device of which the configuration is illustrated in FIG. 121 can generated an output image with higher resolution from an input image without failure, and output the generated output image.

Note that while the image processing device shown in FIG. 121 has been described as acquiring an input image and outputting a created horizontal double-density image, but an arrangement may be made wherein an image with double resolution in the time direction (hereafter referred to as time double-density image) is created and output.

FIG. 128 is a diagram describing the pixel of interest in a case of creating a time double-density image. In FIG. 128, the horizontal direction of the diagram corresponds to the time direction of the input image (SD image) and the time double-density image, and the vertical direction in the diagram corresponds to one spatial direction, e.g., the spatial direction Y which is the vertical direction of the screen, of the input image and the time double-density image.

Note that in FIG. 128, past point-in-time corresponds to the position to the left side in the drawing, and future point-in-time corresponds to the position to the right side in the drawing.

Now, in FIG. 128, ○ marks represent SD pixels making up the SD image, and × marks represent time double-density pixels making up the time double-density image. Also, in FIG. 128, the time double-density image is an image having double the number of frames in the time direction as compared to the input image. For example, in comparison with an input image made up of 30 frames per second, a time double-density image is made up of 60 frames per second. Note that the number of pixels situated in one frame of the time double-density image is the same as the number of pixels situated in one frame of the input image.

In FIG. 128, $f_{-2}$, $f_{-1}$, $f_0$, $f_1$, $f_2$ represent frames of the input image, and $F_{-4}$, $F_{-3}$, $F_{-2}$, $F_{-1}$, $F_0$, $F_1$, $F_2$, $F_3$, $F_4$, $F_5$ represent frames of the time double-density image.

In the case of creating a time double-density image, the data continuity detecting unit 901 detects data continuity in the time-space directions. The class tap extracting unit 902 takes the pixel $y^{(1)}$ and the pixel $y^{(2)}$ of the time double-density image shown in FIG. 128, which are encompassed by the and the corresponding pixel $x^{(5)}$ of the input image in the time direction, as pixels of interest. Based on the data continuity, the pixel value predicting unit 907 predicts the pixel value of the pixel of interest $y^{(1)}$ and the pixel value of the pixel of interest $y^{(2)}$ shown in FIG. 128, and supplies the predicted pixel value of the pixel of interest $y^{(1)}$ and the predicted pixel value of the pixel of interest $y^{(2)}$ to the integration property determining unit 908 and the image synthesizing unit 909.

Now, the relation between the pixel of interest $y^{(1)}$, the pixel of interest $y^{(2)}$, and the corresponding pixel $x^{(5)}$ encompassing the pixel of interest $y^{(1)}$ and the pixel of interest $y^{(2)}$ in the time direction, will be described, with reference to FIG. 129.

F(t) in FIG. 129 is a function representing the intensity distribution of light of the real world, which takes time t as a variable. In FIG. 129, the shutter time of the sensor which images the SD image which is the input image is the period from point-in-time t1 to point-in-time t3, and is represented as 2ts.

Assuming that the pixel value of one pixel of the SD image is represented by uniform integration of F(x), the pixel value Y1 of the pixel corresponding to the period from the point-in-time t1 to point-in-time t2 is represented by Expression (54), the pixel value Y2 of the pixel corresponding to the period from the point-in-time t2 to point-in-time t3 is represented by Expression (55), and the pixel value Y3 output from the sensor as an SD image is represented by Expression (56).

$$Y1 = \int_{t_1}^{t_2} F(t)dt \cdot \frac{1}{ts} \qquad (54)$$

$$Y2 = \int_{t_2}^{t_3} F(t)dt \cdot \frac{1}{ts} \qquad (55)$$

$$Y3 = \int_{t_1}^{t_3} F(t)dt \cdot \frac{1}{2ts} \qquad (56)$$
$$= \frac{Y1 + Y2}{2}$$

Y1 and Y2 in Expression (54) through Expression (56) each correspond to the pixel values of the time double-density pixels (pixel of interest $y^{(1)}$ or pixel of interest $y^{(2)}$ of the time double-density image as to the SD image, which the image processing device shown in FIG. 121 is to obtain. Also, Y3 in Expression (56) corresponds to the pixel value of the SD pixel (corresponding pixel) corresponding to the pixel values Y1 and Y2 of the time double-density pixels in the time double-density image.

Substituting Y3 with $x^{(5)}$, Y1 with $y^{(1)}$, and Y2 with $y^{(2)}$, respectively, Expression (57) can be yielded from Expression (56).

$$x^{(5)} = (y^{(1)} + y^{(2)})/2 \qquad (57)$$

The integration property determining unit 908 determines whether or not Expression (57) holds regarding the prediction value of the pixel of interest $y^{(1)}$, the prediction value of the pixel of interest $y^{(2)}$, which are shown in FIG. 128, and the corresponding pixel $x^{(5)}$ of the input image which is disposed at a position encompassing the pixel of interest $y^{(1)}$ and the pixel of interest $y^{(2)}$ in the spatial direction.

In the event that Expression (57) holds, the prediction value of the pixel of interest $y^{(1)}$ and the prediction value of the pixel of interest $y^{(2)}$ can be said to be true. Conversely, in the event that Expression (57) does not hold, the prediction processing of the pixel of interest $y^{(1)}$ and the prediction processing of the pixel of interest $y^{(2)}$ can be said to have failed.

Describing in the further detail, the integration property determining unit 908 subtracts (the prediction value of) the pixel of interest $y^{(1)}$ and (the prediction value of) the pixel of interest $y^{(2)}$ supplied from the pixel predicting unit 907 from the pixel value of the corresponding pixel $x^{(5)}$ of the input image. The integration property determining unit 908 compares the subtraction results with a threshold value set beforehand. In the event that the subtraction results are smaller than the threshold value, the integration property determining unit 908 determines that the relation in Expression (57) holds, and in the event that the subtraction results are equal to or greater than the threshold value, determines that the relation in Expression (57) does not hold.

The class tap extracting unit 910 takes the pixel $y^{(1)}$ and the pixel $y^{(2)}$ shown in FIG. 128, which are encompassed by the corresponding pixel $x^{(5)}$ of the input image in the time direction, as pixels of interest, the pixel value predicting unit 915 predicts the pixel value of the pixel of interest $y^{(1)}$ and the pixel value of the pixel of interest $y^{(2)}$, shown in FIG. 128, and supplies the predicted pixel value of the pixel of interest $y^{(1)}$ and pixel value of the pixel of interest $y^{(2)}$ to the image synthesizing unit 909.

The image synthesizing unit 909 selects either one or the other of the prediction value supplied from the pixel value predicting unit 907 and the prediction value of the pixel value predicting unit 915, based on the integration property determination information supplied from the integration property determining unit 908, and synthesizes the image by setting the selected prediction value to the output image as the pixel value.

That is to say, in the event that integration property determination information indicating that the relation of Expression (57) holds is supplied from the integration property determining unit 908, the prediction value of the pixel of interest $y^{(1)}$ and the prediction value of the pixel of interest $y^{(2)}$ supplied from the pixel value predicting unit 907 are true, so the image synthesizing unit 909 sets the prediction value of the pixel $y^{(1)}$ and the prediction value of the pixel $y^{(2)}$ supplied from the pixel value predicting unit 907 as pixel values of the output image.

On the other hand, in the event that integration property determination information indicating that the relation of Expression (57) does not hold is supplied from the integration property determining unit 908, the prediction value of the pixel of interest $y^{(1)}$ and the prediction value of the pixel of interest $y^{(2)}$ supplied from the pixel value predicting unit 907 are not true, i.e., the processing of prediction at the pixel predicting unit 907 has failed, so the image synthesizing unit 909 sets the prediction value of the pixel of interest $y^{(1)}$ and the prediction value of the pixel of interest $y^{(2)}$ supplied from the pixel value predicting unit 915 as pixel values of the output image.

That is to say, the integration property determining unit 908 detects the relation between a first prediction value of a first pixel of interest predicted by the pixel value predicting unit 907, a second prediction value of a second pixel of interest predicted by the pixel value predicting unit 907, which is adjacent to the first pixel of interest temporally, and the pixel value of a corresponding pixel of the input image disposed at a position encompassing at least the first pixel of interest and the second pixel of interest in the time direction.

The image synthesizing unit 909 selectively outputs the prediction value of the first pixel of interest and the prediction value of the second pixel of interest output from the pixel value predicting unit 907, according to the detection results of the relation between the prediction value of the first pixel of interest predicted by the pixel value predicting unit 907, the prediction value of the second pixel of interest predicted by the pixel value predicting unit 907, and the pixel value of the corresponding pixel.

The image synthesizing unit 909 outputs the output image, which is a time double-density image, thus synthesized.

As described above, the image processing device shown in FIG. 121 can acquire an input image, and create and output a time double-density image.

Thus, in the event of applying the class classification adaptation processing to the input image, a higher quality image can be obtained.

In a case wherein first continuity of image data corresponding to the continuity of light signals of the real world is detected for a plurality of first perimeter pixels within the input image data that correspond to a first pixel of interest within the high-quality image data, second continuity of image data corresponding to the continuity of light signals of the real world is detected for a plurality of second perimeter pixels within the input image data that correspond to a second pixel of interest within the high-quality image data which is temporally or spatially adjacent to the first pixel of interest, a plurality of third perimeter pixels within the input image data that correspond to the first pixel of interest are extracted based on the first continuity of image data detected, a plurality of fourth perimeter pixels within the input image data that correspond to the second pixel of interest are extracted based on the second continuity of image data detected, a plurality of fifth perimeter pixels within the input image data that correspond to the first pixel of interest are extracted based on the first continuity of image data detected, a plurality of sixth perimeter pixels within the input image data that correspond to the second pixel of interest are extracted based on the second continuity of image data detected, first features of the plurality of third perimeter pixels extracted are detected, second features of the plurality of fourth perimeter pixels extracted are detected, the first pixel of interest is predicted from the plurality of fifth perimeter pixels extracted, based on the first features detected, the second pixel of interest is predicted from the plurality of sixth perimeter pixels extracted, based on the second features detected, a first prediction value of the first pixel of interest and a second prediction value of the second pixel of interest are output, the relation is detected between the first prediction value of the first pixel of interest predicted, the second prediction value of the second pixel of interest predicted, and the pixel values of corresponding pixels within the input image data situated at positions encompassing at least the first pixel of interest and the second pixel of interest in the temporal direction or spatial direction, and the first prediction value of the first pixel of interest and the second prediction value of the second pixel of interest are selectively output, according to the detection results, data continuity can be used to obtain processing results which are more accurate and have higher precision.

Next, FIG. 130 is a block diagram illustrating the configuration of an embodiment of a learning device for performing learning to obtain a tap coefficient for each class to be stored in the coefficient memory 913 shown in FIG. 121.

An HD image, for example, serving as an image for tap coefficient learning (tutor image), is input to the learning device shown in FIG. 130. The input image input to the learning device is supplied to a student image generating unit 951 and a tutor pixel extracting unit 958.

The student image generating unit 951 generates an SD image which is a student image from the input image (tutor image) input thereto, and supplies this to image memory 952. The student image generating unit 951 obtains the average value of the pixel values of two HD pixels which are adjacent in the horizontal direction in the HD image serving as the tutor image, for example, thereby generating an SD image serving as a student image, corresponding to the HD image serving as the tutor image. Now, the SD image needs to be of an image quality corresponding to the SD image which is to be processed by the image processing device shown in FIG. 121. The image memory 952 temporarily stores the SD image which is the student image from the student image generating unit 951.

With the learning device shown in FIG. 130, tap coefficients are generated taking the SD image as student data.

The class tap extracting unit 953 sequentially takes one of the HD pixels of the HD image serving as a tutor image corresponding to the SD image which is the student image stored in the image memory 952, as the pixel of interest, as with the case of the class tap extracting unit 910 in FIG. 121.

Further, the class tap extracting unit 953 extracts a class tap regarding the pixel of interest from the SD image stored in the image memory 952, and supplies this to the features detecting unit 954. Here, the class tap extracting unit 953 generates a class tap of the same tap structure as that generated by the class tap extracting unit 910 in FIG. 121.

The features detecting unit 954 detects features from the student image stored in the image memory 952 or the class tap supplied from the class tap extracting unit 953, and supplies the detected features to a class classification unit 955, in the same way as with the processing of the features detecting unit 911 in FIG. 121.

For example, the features detecting unit 954 detects a movement vector of pixels of the SD image, based on the SD image stored in the image memory 952 or the class tap supplied from the class tap extracting unit 953, and supplies the detected movement vector to the class classification unit 955 as features. Also, for example, the features detecting unit 954 detects spatial or temporal change of pixel values of multiple pixels of the SD image or class tap, based on the SD image supplied from the image memory 952 or the class tap supplied from the class tap extracting unit 952 and supplies the detected change in pixel values to the class classification unit 955 as features.

Further, for example, the features detecting unit 954 detects the gradient of temporal change in pixel values of multiple pixels of the class tap or SD image, based on the SD image supplied from the image memory 952 or the class tap supplied from the class tap extracting unit 953, and supplies the detected gradient of temporal change in pixel values to the class classification unit 955 as features.

Note that the Laplacian, Sobel, dispersion, etc., for the pixel values, can be obtained as features with the features detecting unit 954, in the same way as with the features detecting unit 911.

That is to say, the features detecting unit 954 detects the same features as the features detecting unit 911 in FIG. 121.

The features detecting unit 954 supplies the class tap to the class classification unit 955, separate from the features.

The class classification unit 955 is configured in the same way as with the class classification unit 912 in FIG. 121, and performs class classification of the pixel of interest to one class of one or more classes, based on the features or class tap from the features detecting unit 954, and supplies the class code indicating the class of the pixel of interest to the prediction tap extracting unit 956 and the learning memory 959.

The prediction tap extracting unit 956 is configured in the same way as the prediction tap extracting unit 914 in FIG. 121, and extracts, from the SD image stored in the image memory 952, a prediction tap regarding the pixel of interest, based on the class code supplied from the class classification unit 955, and supplies this to a supplementing computing unit 957. Here, the prediction tap extracting unit 956 generates a prediction tap with the same tap configuration as that generated by the prediction tap extracting unit 914 in FIG. 121.

A tutor pixel extracting unit 958 extracts a pixel of interest from the input image (horizontal double-density image) which is a tutor image as tutor data (a tutor pixel), and supplies the extracted tutor data to the supplementing computing unit 957. That is to say, the tutor pixel extracting unit 958 takes the horizontal double-density image which is the input learning image, as tutor data without change, for example. Now, the horizontal double-density image obtained with the image processing device in FIG. 121 corresponds to the image quality of the horizontal double-density image used by the learning device in FIG. 130 as tutor data.

The supplementing computing unit 957 and normal equation computing unit 960 learn the relation between the tutor data and the student data for each class indicated by the class code supplied from the class classification unit 955, using the tutor data which is the pixel of interest and the prediction tap supplied from the prediction tap extracting unit 956, thereby obtaining the tap coefficient for each tap.

That is to say, the supplementing computing unit 957 performs the supplementing of Expression (8) with regard to the prediction tap (SD pixel) supplied from the prediction tap extracting unit 956 and the horizontal double-density pixel which is the tutor data which is the pixel of interest.

Specifically, the supplementing computing unit 957 uses the SD pixels $x_{n,k}$ serving as student data making up the prediction tap to perform computation equivalent to multiplication of the SD pixels in the matrix at the left side of Expression (8) one with another ($x_{n,k} x_{n',k}$), and summation ($\Sigma$).

Further, the supplementing computing unit 957 uses the SD pixels $x_{n,k}$ serving as student data making up the prediction tap and the horizontal double-density pixel $y_k$ which is the tutor data which is the pixel of interest to perform computation equivalent to multiplication of the SD pixels $x_{n,k}$ of the vector with the horizontal double-density pixel $y_k$ ($x_{n,k} y_k$) at the right side vector of Expression (8) and summation ($\Sigma$).

The supplementing computing unit 957 formulates normal equations corresponding to the Expression (8) for each class by performing the above-described supplementing with all pixels of the horizontal double-density image serving as the tutor data as the pixel of interest, and then supplies the normal equations to learning memory 959.

The learning memory 959 stores normal equations corresponding to the Expression (8) supplied from the supplementing computing unit 957, wherein SD pixels have been set as student data and horizontal double-density pixels as tutor data.

A normal equation computing unit 960 obtains the normal equation of Expression (8) for each class from the learning memory 959, and obtains and output the tap coefficient for each class by solving the normal equations (learning for each class) by sweeping, for example.

That is to say, the supplementing computing unit 957 and the normal equation computing unit 960 learn predicting means for predicting the pixel of interest from the extracted multiple perimeter pixels, for each of the detected features.

In this case, the predicting means are specific means for predicting the pixel of interest from the extracted multiple perimeter pixels, and refers to, for example, the pixel predicting unit 915 regarding which the operations are stipulated by the tap coefficient for each class, or processing at the pixel value predicting unit 915. Learning the predicting means for predicting the pixel of interest from multiple perimeter pixels means to realize (construct), for example, predicting means for predicting the pixel of interest from multiple perimeter pixels.

Accordingly, learning the predicting means for predicting the pixel of interest from multiple perimeter pixels means to obtain tap coefficients for each of the classes, for example. Obtaining tap coefficients for each of the classes specifically determines the pixel predicting unit 915 or processing at the pixel predicting unit 915, whereby the pixel predicting unit 915 is realized or processing at the pixel predicting unit 915 is executed.

The coefficient memory 961 stores the tap coefficients for each class output from the normal equation calculating unit 960.

Next, the learning processing for obtaining the tap coefficient for each class, which is performed by the learning device shown in FIG. 130, will be described with reference to the flowchart in FIG. 131.

First, in step S951, the student image generating unit 951 obtains a learning input image (tutor image) which is a horizontal double-density image for example, and thins out pixels, thereby generating a student image which is an SD image, for example. For example, the student image generating unit 951 obtains the average value of two horizontal double-density pixels which are horizontally or vertically adjacent in the horizontal double-density image, and takes the average value as the pixel value of the SD image, thereby generating an SD image. The SD image is supplied to the image memory 952.

The flow then proceeds to step S952, where the class tap extracting unit 953 selects, from the horizontal double-density pixels in the horizontal double-density image serving as the tutor data, one which has not been yet taken as a pixel of interest, as the pixel of interest. The class tap extracting unit 953, in the same way as with the case of the class tap extracting unit 910 in FIG. 121, extracts the class tap from the SD image serving as the student image stored in the image memory 952 which corresponding to the pixel of interest. The class tap extracting unit 953 supplies the class tap to the features detecting unit 954, and the flow proceeds to step S953.

In step S953, the features detecting unit 954, as with the case of the features detecting unit 911 in FIG. 121, detects, from student image generated in the processing of step S951 or the class tap generated in the processing of step S953, features such as a movement vector or change in the pixel values of the pixels of the SD image, or the like, supplies the detected features to the class classification unit 955, and the flow proceeds to step S954.

In step S954, the class classification unit 955, as with the case of the class classification unit 912 in FIG. 121, uses the features or the class tap from the features detecting unit 954 to classify the pixel of interest into one class of the one or more classes, supplies class code representing the class of the pixel of interest to the prediction tap extracting unit 956 and the learning memory 959, and the flow proceeds to step S955.

In step S955, the prediction tap extracting unit 956, as with the case of the prediction tap extracting unit 914 in FIG. 121, extracts the class tap from the SD image serving as the student image stored in the image memory 952 corresponding to the pixel of interest, based on the class code supplied from the class classification unit 955, and supplies this to the supplementing computing unit 957, and the flow proceeds to step S956.

In step S956, the tutor pixel extracting unit 958 extracts the pixel of interest, i.e., the tutor pixel (tutor data) which is a horizontal double-density pixel from the input image, and supplies the extracted tutor pixel to the supplementing computing unit 957, and the flow proceeds to step S957.

In step S957, the supplementing computing unit 957 performs the supplementing in the above-described Expression (8) regarding the prediction tap (student data) supplied from the prediction tap extracting unit 956 and the tutor pixel (tutor data) supplied from the tutor pixel extracting unit 958, and stores the normal equation supplemented with the student data and the tutor data in the learning memory 959, and the flow proceeds to step S958.

In step S958, the class tap extracting unit 953 determines whether or not there are yet horizontal double-density pixels of the horizontal double-density image serving as tutor data which have not been taken as the pixel of interest, i.e., whether or not supplementing of all pixels to be processed has ended. In the event that determination is made in step S958 that there are horizontal double-density pixels of the horizontal double-density image serving as tutor data which have not yet been taken as the pixel of interest, the flow returns to step S952, and the same processing is subsequently repeated.

Also, in the event that determination is made in step S958 that are no more horizontal double-density pixels of the horizontal double-density image serving as tutor data which have not been taken as the pixel of interest, i.e., that supplementing of all pixels to be processed has ended, the flow proceeds to step S959, where the normal equation calculating unit 960 reads out from the learning memory 959 the normal equations for classes regarding which tap coefficients have not yet been obtained, from the normal equations of Expression (8) obtained for each class by supplementing in the earlier step S957, and solves the normal equations of Expression (8) read out by sweeping or the like (learns for each class), obtains a prediction coefficient (tap coefficient) for a predetermined class, and supplies this to the coefficient memory 961. The coefficient memory 961 stores the prediction coefficient (tap coefficient) for a predetermined class supplied from the normal equation calculating unit 960 for each class, and the flow proceeds to step S960.

In step S960, the normal equation calculating unit 960 determines whether or not computation of the prediction coefficients has ended for all classes, and in the event that determination is made that computation of the prediction coefficients has not ended for all classes, the flow returns to step S959, and the processing for obtaining the prediction coefficient for the next class is repeated.

In the event that determination is made in step S960 that computation of the prediction coefficients has ended for all classes, the processing ends.

Thus, prediction coefficients for each class stored in the coefficient memory 961 are stored in the coefficient memory 913 of the image processing device shown in FIG. 121.

In the case of performing learning in this way, images with higher image quality can be obtained in the prediction.

In a case wherein image data continuity corresponding to the continuity of light signals of the real world is detected for a plurality of first perimeter pixels within the input image data that correspond to a pixel of interest within the high-quality image data, a plurality of second perimeter pixels within the input image data that correspond to the pixel of interest in the high-quality image data are extracted based on the image data continuity detected, a plurality of third perimeter pixels within the input image data that correspond to the pixel of interest are extracted based on the image data continuity detected, features of the plurality of second perimeter pixels extracted are detected; and predicting means for predicting the pixel of interest from the plurality of third perimeter pixels extracted are learned for each of the detected features, using data continuity enables processing results to be obtained which are more accurate and have higher precision.

Now, while description has been made regarding the image processing device wherein SD images are input and images which are high-resolution in a spatial direction or temporal direction corresponding to the SD image are output, however, it is needless to say that input images are not restricted to SD images. For example, with the image processing device, an arrangement may be made wherein time double-density images or vertical double-density images are input and HD images are output.

While the above-described series of processing can be executed by hardware, this can also be executed by software. In the case of executing the series of processing by software, programs making up the software are installed from a recording medium to a computer with built-in dedicated hardware, or a general-use personal computer capable of executing various functions by having various types of programs installed, for example.

FIG. 132 is a block diagram illustrating an example of the configuration of a personal computer for executing the above-described series of processing by programs. A CPU (Central Processing Unit) 1001 executes various types of processing following programs stored in ROM (Read Only Memory) 1002 or the storage unit 1008. RAM (Random Access Memory) 1003 stores programs to be executed by the CPU 1001, data, and so forth, as suitable. The CPU 1001, ROM 1002, and RAM 1003, are mutually connected by a bus 1004.

Also connected to the CPU 1001 is an input/output interface 1005 via the bus 1004. An input device 1006 made up of a keyboard, mouse, microphone, and so forth, and an output unit 1007 made up of a display, speaker, and so forth, are connected to the input/output interface 1005. The CPU 1001 executes various types of processing corresponding to commands input from the input unit 1006. The CPU 1001 then outputs images and audio and the like obtained as a result of processing to the output unit 1007.

A storage unit 1008 connected to the input/output interface 1005 is configured of a hard disk for example, and stores the programs and various types of data which the CPU 1001 executes. A communication unit 1009 communicates with external devices via the Internet and other networks. In the case of this example, the communication unit 1009 acts as an external interface for acquiring input images or outputting output images.

Also, an arrangement may be made wherein programs are obtained via the communication unit 1009 and stored in the storage unit 1008.

A drive 1010 connected to the input/output interface 1005 drives a magnetic disk 1051, optical disk 1052, magneto-optical disk 1053, or semiconductor memory 1054 or the like mounted thereto, and obtains programs and data recorded therein. The obtained programs and data are transferred to the storage unit 1008 as necessary and stored.

The storage medium storing the program for carrying out the series of processing is not restricted to packaged media which is distributed separately from the computer so as to provide the user with the program, such as a magnetic disk 1051 (including flexible disks), optical disk 1052 (including CD-ROM (Compact Disc-Read Only Memory), DVD (Digital Versatile Disc), magneto-optical disk 1053 (including MD (Mini-Disc)™), semiconductor memory 1054, and so forth, as shown in FIG. 132, in which the program has been recorded; but also is configured of ROM 1022 in which the program has been recorded, or a hard disk or the like included in the storage unit 1028, these being provided to the user in a state of having been built into the computer beforehand.

Note that the program for executing the series of processing described above may be installed to the computer via cable or wireless communication media, such as a Local Area Network, the Internet, digital satellite broadcasting, and so forth, via interfaces such as routers, modems, and so forth, as necessary.

It should be noted that in the present specification, the steps describing the program stored in the recording medium include processing of being carried out in time-sequence following the described order, as a matter of course, but this is not restricted to time-sequence processing, and processing of being executed in parallel or individually is included as well.

INDUSTRIAL APPLICABILITY

Thus, according to the first invention, images with higher resolution can be output.

Also, according to the first invention, data continuity can be used to obtain processing results which are more accurate and have higher precision.

According to the second invention, with the image processing device, images with higher resolution can be output.

Also, according to the second invention, with the image processing device, data continuity can be used to obtain processing results which are more accurate and have higher precision.

The invention claimed is:

1. A learning device for learning predicting means which predict, from input image data made up of multiple pieces of pixel data obtained by an imaging device having a plurality of pixels each having time integration effects or spatial integration effects imaging light signals of the real world, high-quality image data with higher quality than said input image, said learning device comprising:

image data continuity detecting means for detecting image data continuity corresponding to the continuity of light signals of said real world, for a plurality of first perimeter pixels within said input image data that correspond to a pixel of interest within said high-quality image data;

first extracting means for extracting a plurality of second perimeter pixels within said input image data that correspond to said pixel of interest in said high-quality image data, based on said image data continuity detected by said image data continuity detecting means;

second extracting means for extracting a plurality of third perimeter pixels within said input image data that correspond to said pixel of interest, based on said image data continuity detected by said image data continuity detecting means;

features detecting means for detecting features of said plurality of second perimeter pixels extracted by said first extracting means; and learning means for learning said predicting means for predicting said pixel of interest from said plurality of third perimeter pixels extracted by said second extracting means for each of said features detected by said features detecting means.

2. A learning method for learning predicting means which predict, from input image data made up of multiple pieces of pixel data obtained by an imaging device having a plurality of pixels each having time integration effects or spatial integration effects imaging light signals of the real world, high-quality image data with higher quality than said input image, said method comprising:

an image data continuity detecting step for detecting image data continuity corresponding to the continuity of light signals of said real world, for a plurality of first perimeter pixels within said input image data that correspond to a pixel of interest within said high-quality image data;

a first extracting step for extracting a plurality of second perimeter pixels within said input image data that correspond to said pixel of interest in said high-quality image data, based on said image data continuity detected in said image data continuity detecting step;

a second extracting step for extracting a plurality of third perimeter pixels within said input image data that correspond to said pixel of interest, based on said image data continuity detected in said image data continuity detecting step;

a features detecting step for detecting features of said plurality of second perimeter pixels extracted in said first extracting step; and a learning step for learning said predicting means for predicting said pixel of interest from said plurality of third perimeter pixels extracted in said second extracting step for each of said features detected in said features detecting step.

3. A recording medium storing a computer-readable program for learning processing, for learning predicting means which predict, from input image data made up of multiple pieces of pixel data obtained by an imaging device having a plurality of pixels each having time integration effects or spatial integration effects imaging light signals of the real world, high-quality image data with higher quality than said input image, said program comprising:

an image data continuity detecting step for detecting image data continuity corresponding to the continuity of light signals of said real world, for a plurality of first perimeter pixels within said input image data that correspond to a pixel of interest within said high-quality image data;

a first extracting step for extracting a plurality of second perimeter pixels within said input image data that correspond to said pixel of interest in said high-quality image data, based on said image data continuity detected in said image data continuity detecting step;

a second extracting step for extracting a plurality of third perimeter pixels within said input image data that correspond to said pixel of interest, based on said image data continuity detected in said image data continuity detecting step;

a features detecting step for detecting features of said plurality of second perimeter pixels extracted in said first extracting step; and a learning step for learning said predicting means for predicting said pixel of interest from said plurality of third perimeter pixels extracted in said second extracting step for each of said features detected in said features detecting step.

\* \* \* \* \*